US012651521B2

(12) United States Patent
Fucci et al.

(10) Patent No.: US 12,651,521 B2
(45) Date of Patent: Jun. 9, 2026

(54) METHODS AND SYSTEMS FOR AN EMERGENCY RESPONSE DATA EXCHANGE SYSTEM

(71) Applicant: RAPIDSOS, INC., New York, NY (US)

(72) Inventors: Conor Fucci, Brooklyn, NY (US); James Patrick Olejar, Jr., Fort Lauderdale, FL (US); Zachery LaValley, Arlington, MA (US); Patricia Ann Beesley, Cedar Grove, NJ (US); Lillian Nguyen, San Bruno, CA (US); Leah Lewy, Jersey City, NJ (US); Indranil Chatterjee, San Mateo, CA (US); Henry Katz, Brookline, MA (US); Zvika Ferentz, Harrison, NY (US); Jeffrey Sternberg, Rockville Centre, NY (US); Nicholas Edward Horelik, Long Island City, NY (US); William Thomas Guthrie, Fairplay, CO (US)

(73) Assignee: RAPIDSOS, INC., New York, NY (US)

( * ) Notice: Subject to any disclaimer, the term of this patent is extended or adjusted under 35 U.S.C. 154(b) by 11 days.

(21) Appl. No.: 19/007,100

(22) Filed: Dec. 31, 2024

(65) Prior Publication Data

US 2025/0140101 A1 May 1, 2025

Related U.S. Application Data

(63) Continuation-in-part of application No. 18/239,433, filed on Aug. 29, 2023, which is a continuation of
(Continued)

(51) Int. Cl.
G08B 25/00 (2006.01)
G06F 3/0482 (2013.01)
(Continued)

(52) U.S. Cl.
CPC ......... *G08B 25/001* (2013.01); *G06F 3/0482* (2013.01); *G06F 3/0486* (2013.01);
(Continued)

(58) Field of Classification Search
CPC .... G08B 25/001; G08B 25/016; G08B 25/08; G08B 27/001; G06F 3/0482; G06F 3/0486; G06F 9/542
(Continued)

(56) References Cited

U.S. PATENT DOCUMENTS 8,688,071 B1 * 4/2014 Daly ..................... H04W 4/029
455/414.3
8,890,685 B1 * 11/2014 Sookman ................ H04W 4/90
340/539.13
(Continued)

FOREIGN PATENT DOCUMENTS

EP 2161912 A2 3/2010
JP 2011223285 A 4/2011

OTHER PUBLICATIONS

PCT/US2020/046857 International Search Report and Written Opinion dated Nov. 18, 2020.

*Primary Examiner* — Omar Casillashernandez
(74) *Attorney, Agent, or Firm* — Michael L. Ross; William J. Pigott

(57) ABSTRACT

Described herein are systems, devices, methods, and media for an emergency response data exchange system. The system provides an operations center emergency management application with a textual and/or graphical notification of emergency communications initiated on a premises man-
(Continued)

(i) Device (ii) EMS aged by the operations center. The system exchanges operations center data (e.g., floorplans, video feeds, point of contact information, building access controls) with an emergency communications center (ECC) and/or with a first responder device to facilitate reducing emergency response times. The system selectively establishes communications (e.g., messaging windows) between the operations center, ECC, and/or first responder device to facilitate real-time information sharing between relevant parties of an emergency.

30 Claims, 46 Drawing Sheets

Related U.S. Application Data application No. 17/196,438, filed on Mar. 9, 2021, now Pat. No. 11,741,819, which is a continuation of application No. 16/663,295, filed on Oct. 24, 2019, now Pat. No. 10,977,927.

(60) Provisional application No. 62/750,175, filed on Oct. 24, 2018.

(51) Int. Cl.

| | |
|---|---|
| *G06F 3/0486* | (2013.01) |
| *G06F 9/54* | (2006.01) |
| *G08B 25/01* | (2006.01) |
| *G08B 25/08* | (2006.01) |
| *G08B 27/00* | (2006.01) |

(52) U.S. Cl.
CPC ........... *G06F 9/542* (2013.01); *G08B 25/016* (2013.01); *G08B 25/08* (2013.01); *G08B 27/001* (2013.01)

(58) Field of Classification Search
USPC ........................................................ 340/540
See application file for complete search history.

(56) References Cited

U.S. PATENT DOCUMENTS

| | | | | |
|---|---|---|---|---|
| 2005/0239477 | A1 | 10/2005 | Kim | |
| 2005/0242944 | A1 | 11/2005 | Bankert | |
| 2008/0268830 | A1* | 10/2008 | Sharma | H04W 4/029 |
| | | | | 455/421 |
| 2010/0146541 | A1* | 6/2010 | Velazquez | H04N 21/4882 |
| | | | | 725/33 |
| 2011/0151829 | A1 | 6/2011 | Velusamy | |
| 2011/0205068 | A1* | 8/2011 | Huynh | G07F 17/3227 |
| | | | | 340/573.1 |
| 2013/0012155 | A1 | 1/2013 | Forstall | |
| 2013/0082837 | A1 | 4/2013 | Cosentino | |
| 2014/0370841 | A1 | 12/2014 | Roberts | |
| 2015/0031324 | A1 | 1/2015 | Zentner | |
| 2015/0065081 | A1* | 3/2015 | Estes | H04W 4/021 |
| | | | | 455/404.2 |
| 2015/0087259 | A1 | 3/2015 | Hinsen | |
| 2017/0078226 | A1 | 3/2017 | Daly | |
| 2019/0174289 | A1* | 6/2019 | Martin | H04M 3/5141 |

* cited by examiner

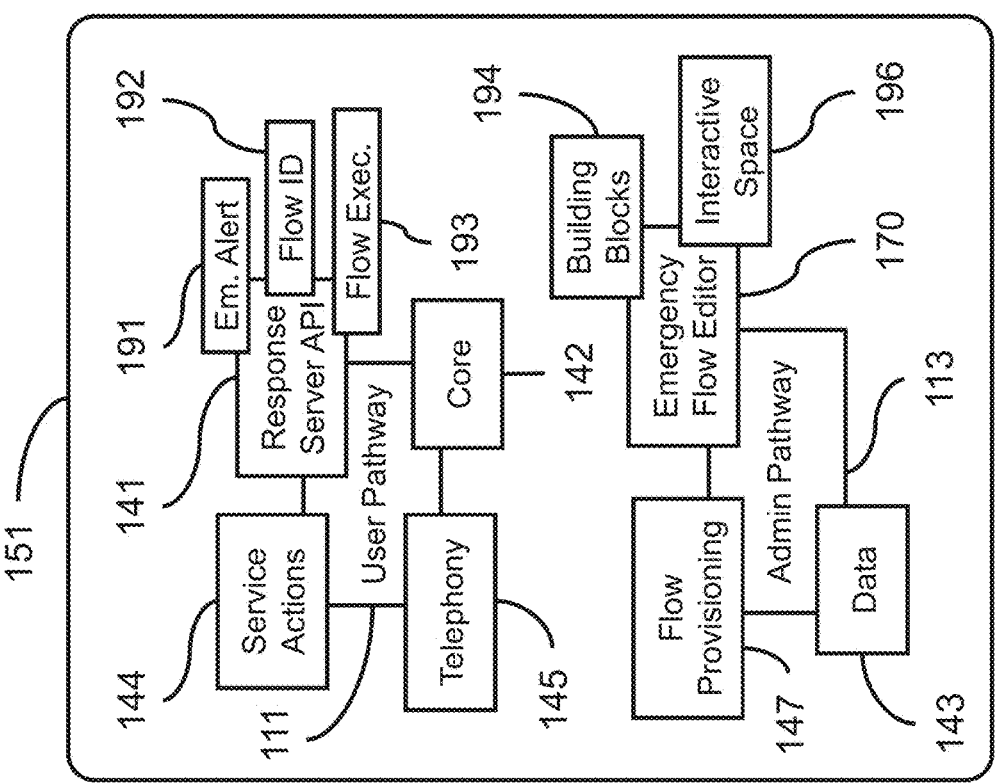
(iv) Emergency Flow Program
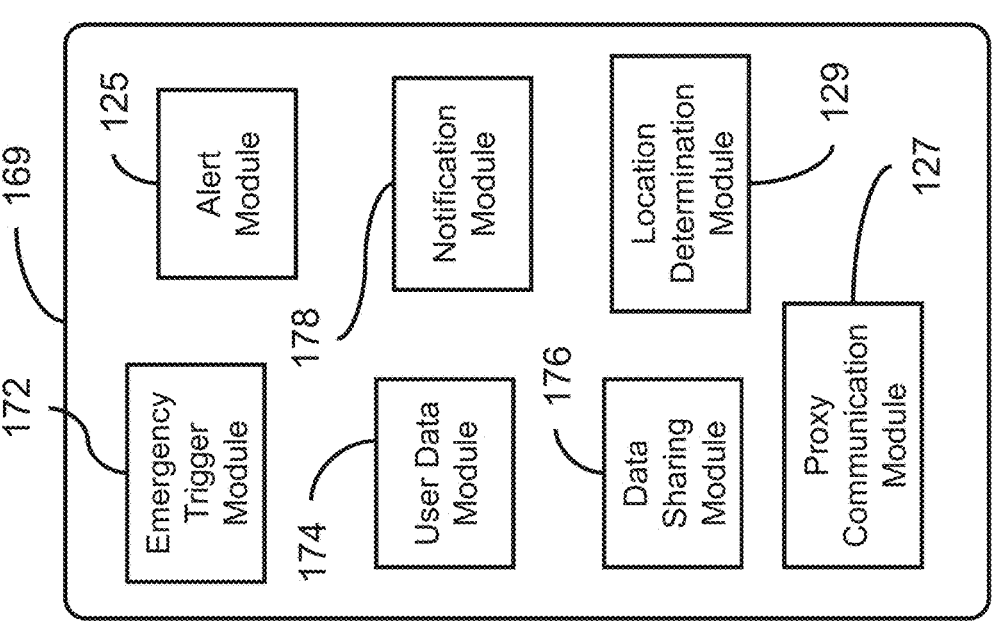
(iii) Triggering Device
FIG. 1C

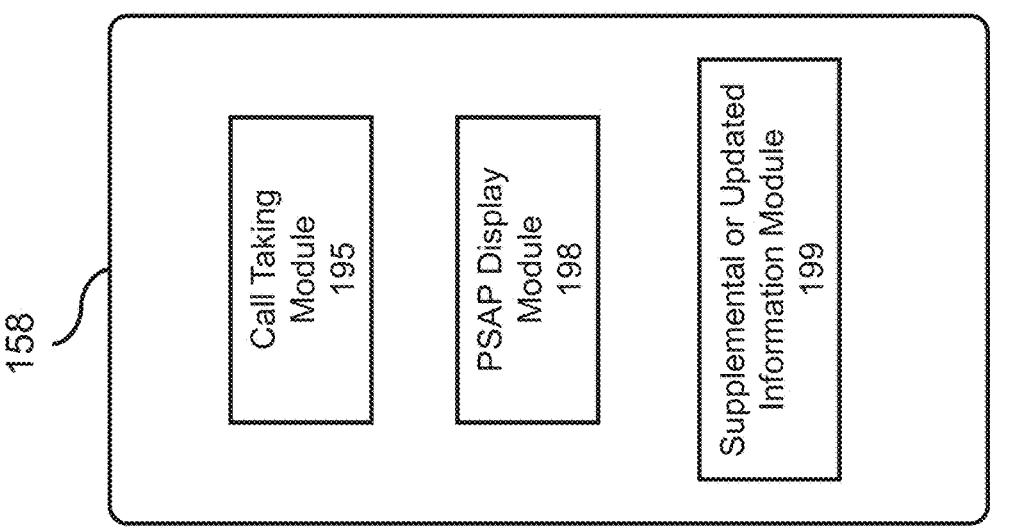
158
Call Taking Module 195
PSAP Display Module 198
Supplemental or Updated Information Module 199
(vi) PSAP Software
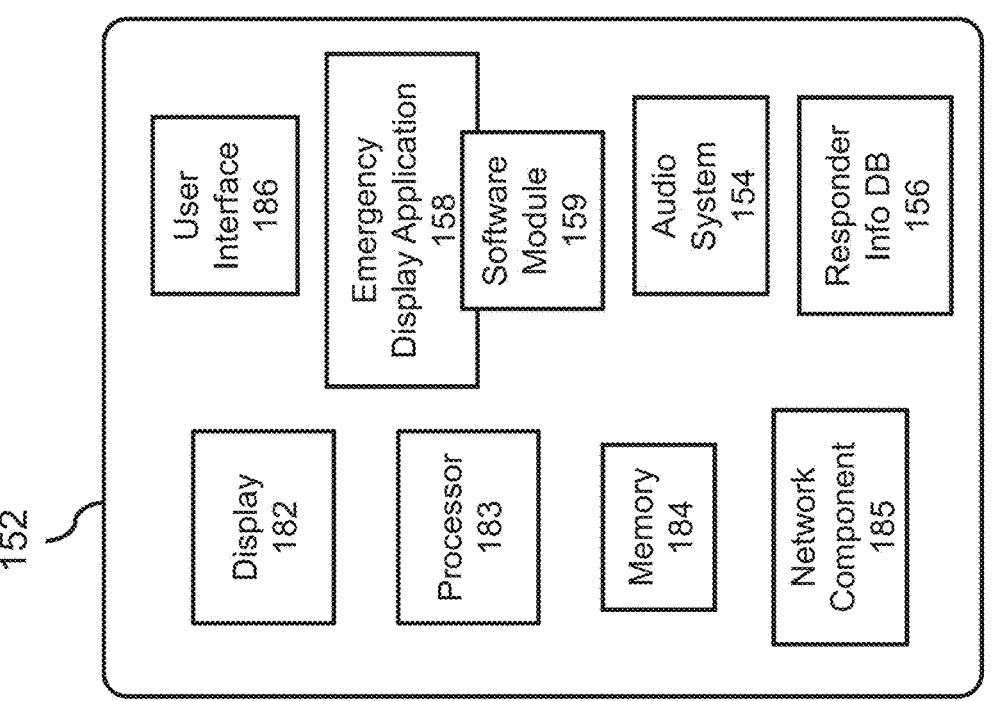
152
User Interface 186
Emergency Display Application 158
Software Module 159
Audio System 154
Responder Info DB 156
Display 182
Processor 183
Memory 184
Network Component 185
(v) PSAP System
FIG. 1D

DOCUMENT

OVERVIEW

CUSTOMIZATIONS

AUTHENTICATION

API

MANAGE

TEST

Call Flow company_contacts

Company

RapidSOS

User

M. M.          555-5555

Contacts

N. H.          666-6666

+ Add Contacts

Location 40.7128        -74.0060

INITIATE CALL FLOW

CODE EXAMPLE | API REQUEST | ALI DISPLAY

```
public static void main(String[] args) {
    try {
        OkHttpClient client = new
OkHttpClient();
        MediaType tokenMediaType =
MediaType.parse("application/x-www-
form-urlencoded");
        RequestBody tokenBody =
RequestBody.create(tokenMediaType,
"client_id=ab3IKpmeVfDGHHIPrsNmh
uSa5ReEwcPd&client_secret=Fa5Jzx
CB2psSOrvs&grant_type=client_cred
entials");
        Request tokenRequest = new
Request.Builder()
```

FIG. 9A

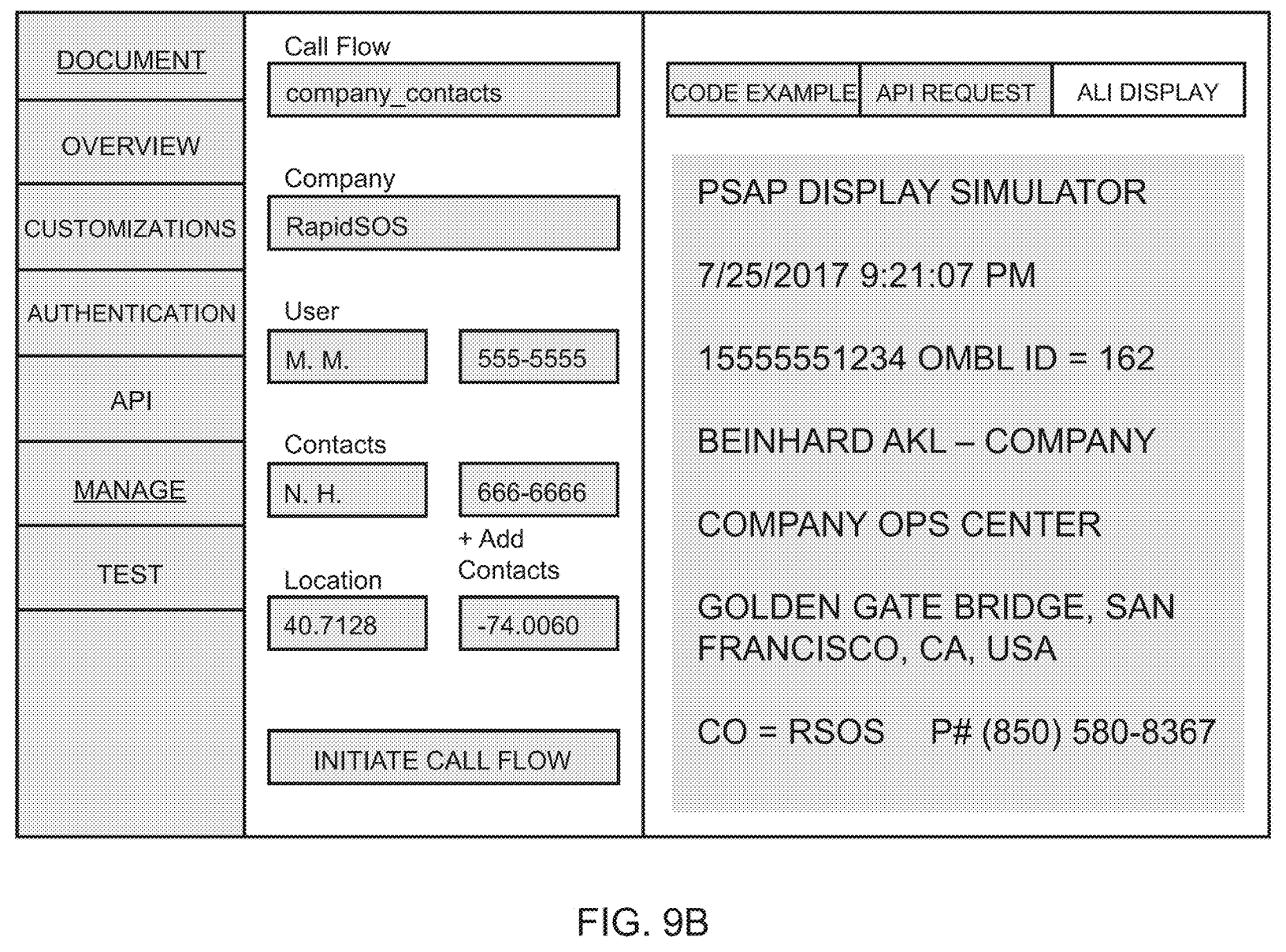

| DOCUMENT | | | | | | | |
|---|---|---|---|---|---|---|---|
| OVERVIEW | | | | | | | |
| CUSTOMIZATIONS | | | | | | | |
| AUTHENTICATION | | | | | | | |
| API | | | | | | | |
| MANAGE | | | | | | | |
| TEST | | | | | | | |

Call Flow company_contacts

Company

RapidSOS

User

M. M. | 555-5555

Contacts

N. H. | 666-6666

+ Add Contacts

Location

40.7128 | -74.0060

INITIATE CALL FLOW

| CODE EXAMPLE | API REQUEST | ALI DISPLAY |
|---|---|---|

PSAP DISPLAY SIMULATOR

7/25/2017 9:21:07 PM

15555551234 OMBL ID = 162

BEINHARD AKL – COMPANY

COMPANY OPS CENTER

GOLDEN GATE BRIDGE, SAN FRANCISCO, CA, USA

CO = RSOS    P# (850) 580-8367

FIG. 9B

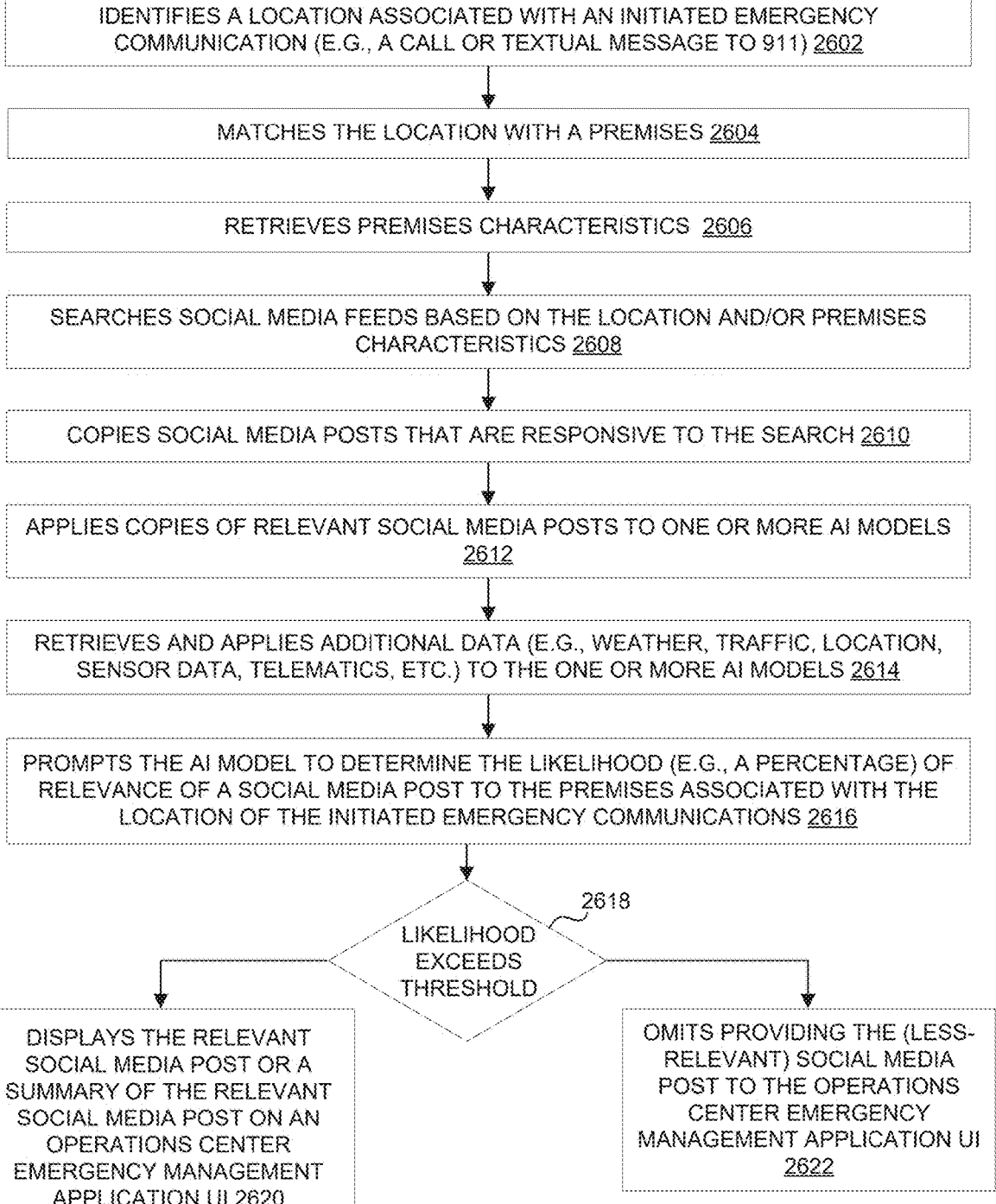

PROCESS FOR VALIDATING SOCIAL MEDIA POSTS FOR EMERGENCY MANAGEMENT APPLICATIONS 2600

IDENTIFIES A LOCATION ASSOCIATED WITH AN INITIATED EMERGENCY COMMUNICATION (E.G., A CALL OR TEXTUAL MESSAGE TO 911) 2602

MATCHES THE LOCATION WITH A PREMISES 2604

RETRIEVES PREMISES CHARACTERISTICS 2606

SEARCHES SOCIAL MEDIA FEEDS BASED ON THE LOCATION AND/OR PREMISES CHARACTERISTICS 2608

COPIES SOCIAL MEDIA POSTS THAT ARE RESPONSIVE TO THE SEARCH 2610

APPLIES COPIES OF RELEVANT SOCIAL MEDIA POSTS TO ONE OR MORE AI MODELS 2612

RETRIEVES AND APPLIES ADDITIONAL DATA (E.G., WEATHER, TRAFFIC, LOCATION, SENSOR DATA, TELEMATICS, ETC.) TO THE ONE OR MORE AI MODELS 2614

PROMPTS THE AI MODEL TO DETERMINE THE LIKELIHOOD (E.G., A PERCENTAGE) OF RELEVANCE OF A SOCIAL MEDIA POST TO THE PREMISES ASSOCIATED WITH THE LOCATION OF THE INITIATED EMERGENCY COMMUNICATIONS 2616

LIKELIHOOD EXCEEDS THRESHOLD 2618

DISPLAYS THE RELEVANT SOCIAL MEDIA POST OR A SUMMARY OF THE RELEVANT SOCIAL MEDIA POST ON AN OPERATIONS CENTER EMERGENCY MANAGEMENT APPLICATION UI 2620

OMITS PROVIDING THE (LESS-RELEVANT) SOCIAL MEDIA POST TO THE OPERATIONS CENTER EMERGENCY MANAGEMENT APPLICATION UI 2622

FIG. 26

PROCESS FOR SELECTIVELY EXCHANGING EMERGENCY RESPONSE
DATA BETWEEN AN OPERATIONS CENTER AND AN ECC 2700

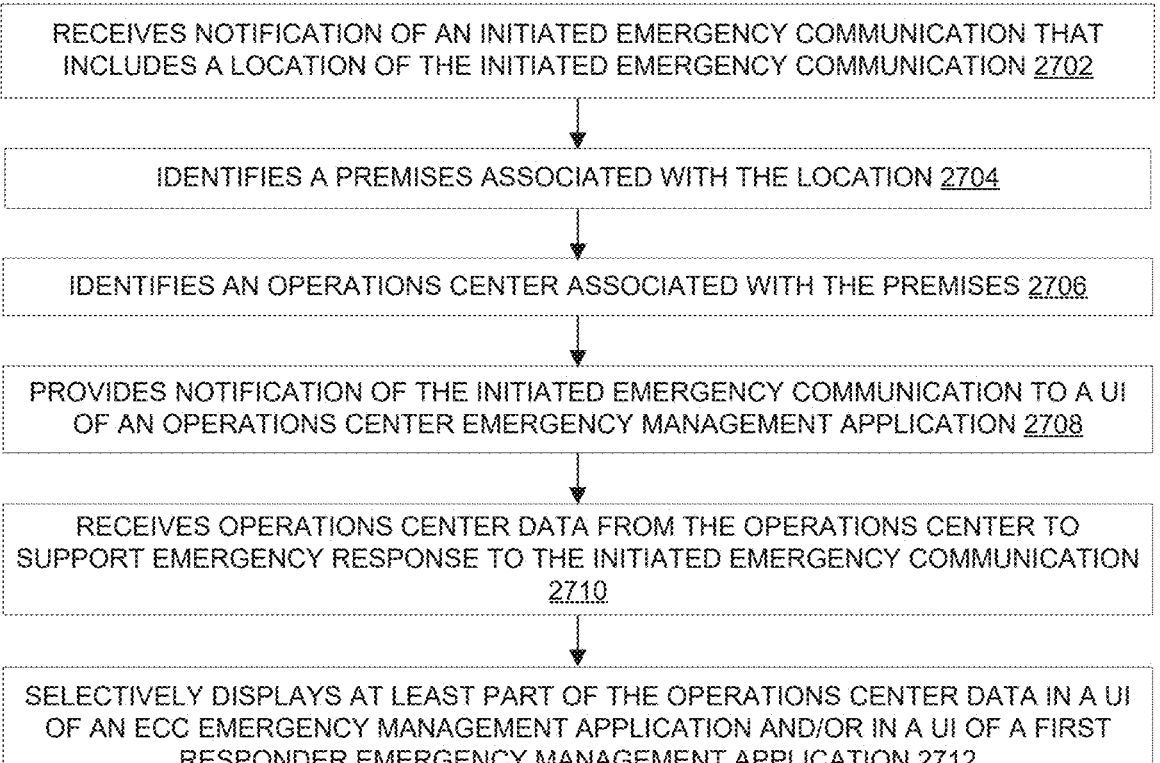

RECEIVES NOTIFICATION OF AN INITIATED EMERGENCY COMMUNICATION THAT
INCLUDES A LOCATION OF THE INITIATED EMERGENCY COMMUNICATION 2702

IDENTIFIES A PREMISES ASSOCIATED WITH THE LOCATION 2704

IDENTIFIES AN OPERATIONS CENTER ASSOCIATED WITH THE PREMISES 2706

PROVIDES NOTIFICATION OF THE INITIATED EMERGENCY COMMUNICATION TO A UI
OF AN OPERATIONS CENTER EMERGENCY MANAGEMENT APPLICATION 2708

RECEIVES OPERATIONS CENTER DATA FROM THE OPERATIONS CENTER TO
SUPPORT EMERGENCY RESPONSE TO THE INITIATED EMERGENCY COMMUNICATION
2710

SELECTIVELY DISPLAYS AT LEAST PART OF THE OPERATIONS CENTER DATA IN A UI
OF AN ECC EMERGENCY MANAGEMENT APPLICATION AND/OR IN A UI OF A FIRST
RESPONDER EMERGENCY MANAGEMENT APPLICATION 2712

FIG. 27

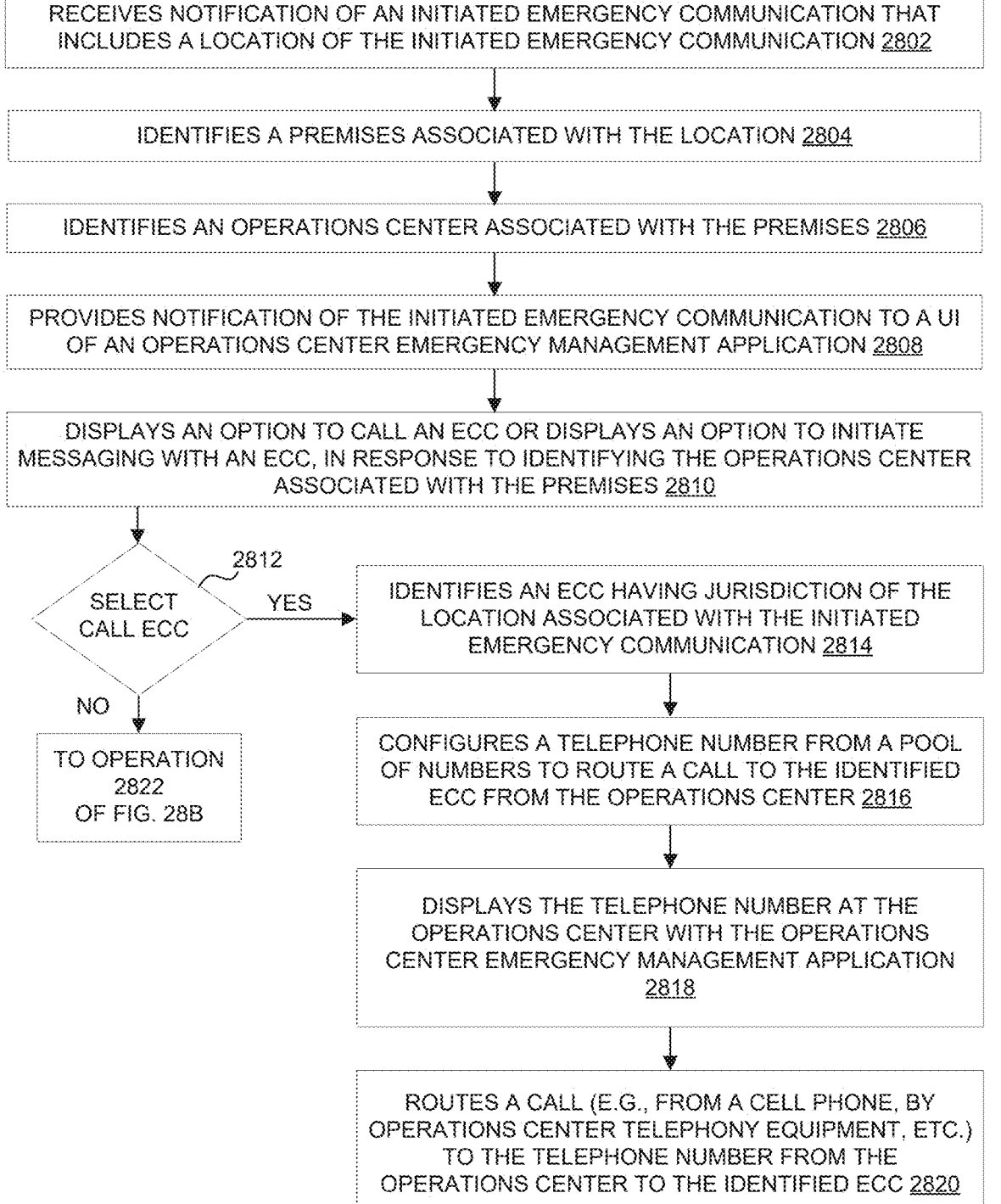

PROCESS FOR ESTABLISHING COMMUNICATIONS BETWEEN AN
OPERATIONS CENTER AND AN ECC 2800

RECEIVES NOTIFICATION OF AN INITIATED EMERGENCY COMMUNICATION THAT
INCLUDES A LOCATION OF THE INITIATED EMERGENCY COMMUNICATION 2802

IDENTIFIES A PREMISES ASSOCIATED WITH THE LOCATION 2804

IDENTIFIES AN OPERATIONS CENTER ASSOCIATED WITH THE PREMISES 2806

PROVIDES NOTIFICATION OF THE INITIATED EMERGENCY COMMUNICATION TO A UI
OF AN OPERATIONS CENTER EMERGENCY MANAGEMENT APPLICATION 2808

DISPLAYS AN OPTION TO CALL AN ECC OR DISPLAYS AN OPTION TO INITIATE
MESSAGING WITH AN ECC, IN RESPONSE TO IDENTIFYING THE OPERATIONS CENTER
ASSOCIATED WITH THE PREMISES 2810

2812

SELECT
CALL ECC

YES

NO

TO OPERATION
2822
OF FIG. 28B

IDENTIFIES AN ECC HAVING JURISDICTION OF THE
LOCATION ASSOCIATED WITH THE INITIATED
EMERGENCY COMMUNICATION 2814

CONFIGURES A TELEPHONE NUMBER FROM A POOL
OF NUMBERS TO ROUTE A CALL TO THE IDENTIFIED
ECC FROM THE OPERATIONS CENTER 2816

DISPLAYS THE TELEPHONE NUMBER AT THE
OPERATIONS CENTER WITH THE OPERATIONS
CENTER EMERGENCY MANAGEMENT APPLICATION
2818

ROUTES A CALL (E.G., FROM A CELL PHONE, BY
OPERATIONS CENTER TELEPHONY EQUIPMENT, ETC.)
TO THE TELEPHONE NUMBER FROM THE
OPERATIONS CENTER TO THE IDENTIFIED ECC 2820

FIG. 28A

PROCESS FOR ESTABLISHING COMMUNICATIONS BETWEEN AN
OPERATIONS CENTER AND AN ECC 2800

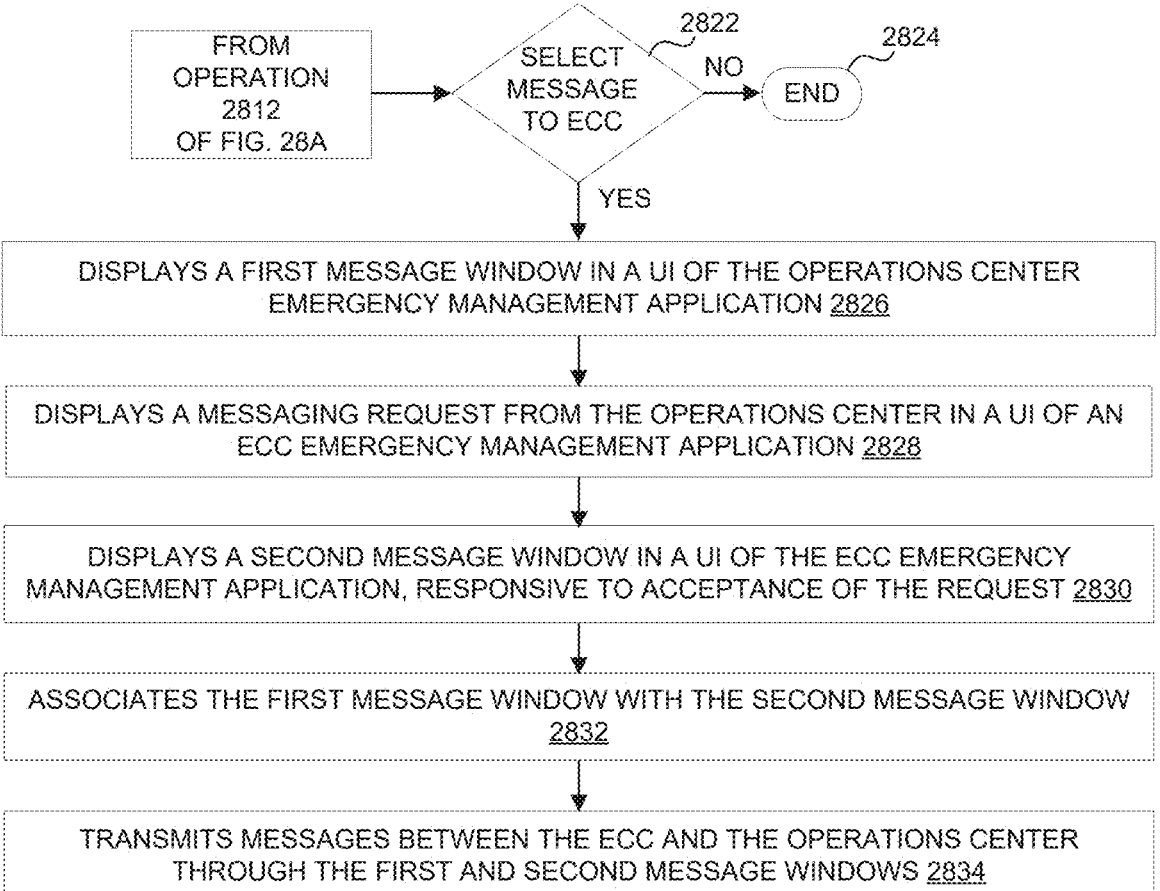

DISPLAYS A FIRST MESSAGE WINDOW IN A UI OF THE OPERATIONS CENTER
EMERGENCY MANAGEMENT APPLICATION 2826

DISPLAYS A MESSAGING REQUEST FROM THE OPERATIONS CENTER IN A UI OF AN
ECC EMERGENCY MANAGEMENT APPLICATION 2828

DISPLAYS A SECOND MESSAGE WINDOW IN A UI OF THE ECC EMERGENCY
MANAGEMENT APPLICATION, RESPONSIVE TO ACCEPTANCE OF THE REQUEST 2830

ASSOCIATES THE FIRST MESSAGE WINDOW WITH THE SECOND MESSAGE WINDOW
2832

TRANSMITS MESSAGES BETWEEN THE ECC AND THE OPERATIONS CENTER
THROUGH THE FIRST AND SECOND MESSAGE WINDOWS 2834

FIG. 28B

PROCESS FOR Z-AXIS ESTIMATION OF INITIATED EMERGENCY
COMMUNICATIONS 2900

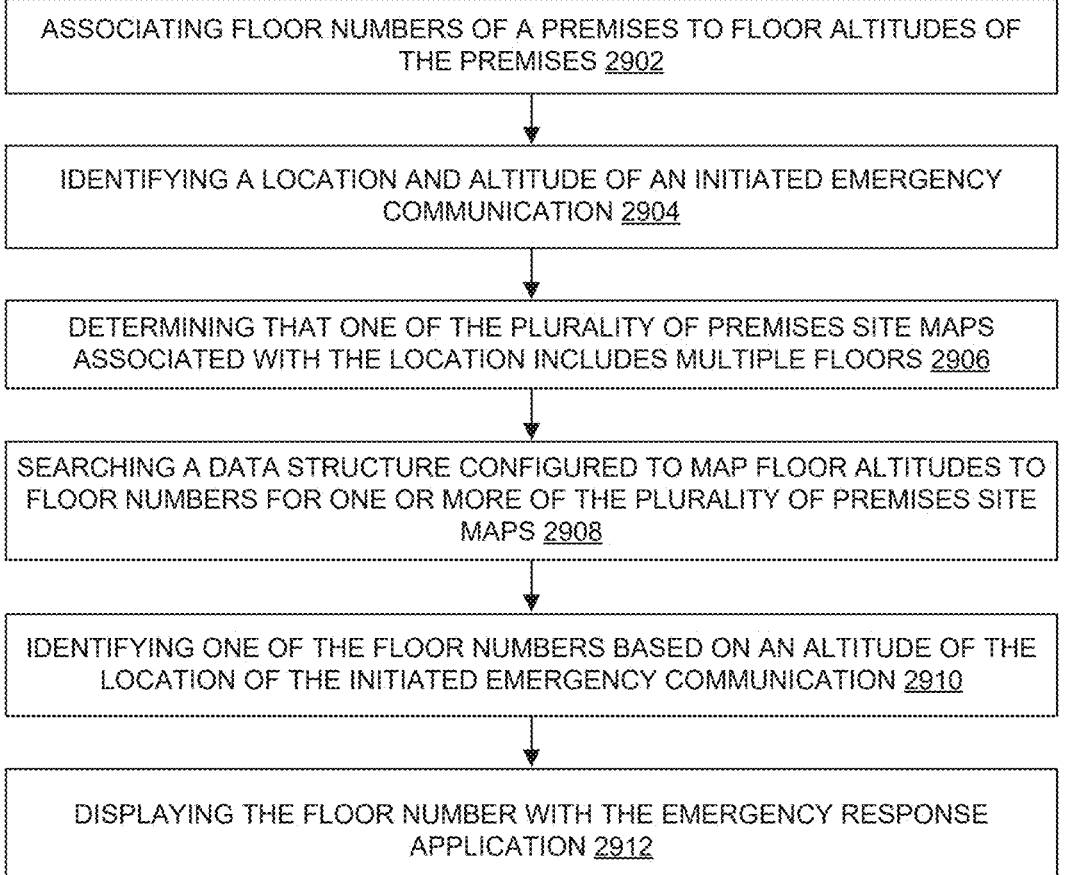

ASSOCIATING FLOOR NUMBERS OF A PREMISES TO FLOOR ALTITUDES OF
THE PREMISES 2902

IDENTIFYING A LOCATION AND ALTITUDE OF AN INITIATED EMERGENCY
COMMUNICATION 2904

DETERMINING THAT ONE OF THE PLURALITY OF PREMISES SITE MAPS
ASSOCIATED WITH THE LOCATION INCLUDES MULTIPLE FLOORS 2906

SEARCHING A DATA STRUCTURE CONFIGURED TO MAP FLOOR ALTITUDES TO
FLOOR NUMBERS FOR ONE OR MORE OF THE PLURALITY OF PREMISES SITE
MAPS 2908

IDENTIFYING ONE OF THE FLOOR NUMBERS BASED ON AN ALTITUDE OF THE
LOCATION OF THE INITIATED EMERGENCY COMMUNICATION 2910

DISPLAYING THE FLOOR NUMBER WITH THE EMERGENCY RESPONSE
APPLICATION 2912

FIG. 29

PROCESS FOR PROVIDING RADIO DISPATCH INSIGHTS TO AN
OPERATIONS CENTER 3200

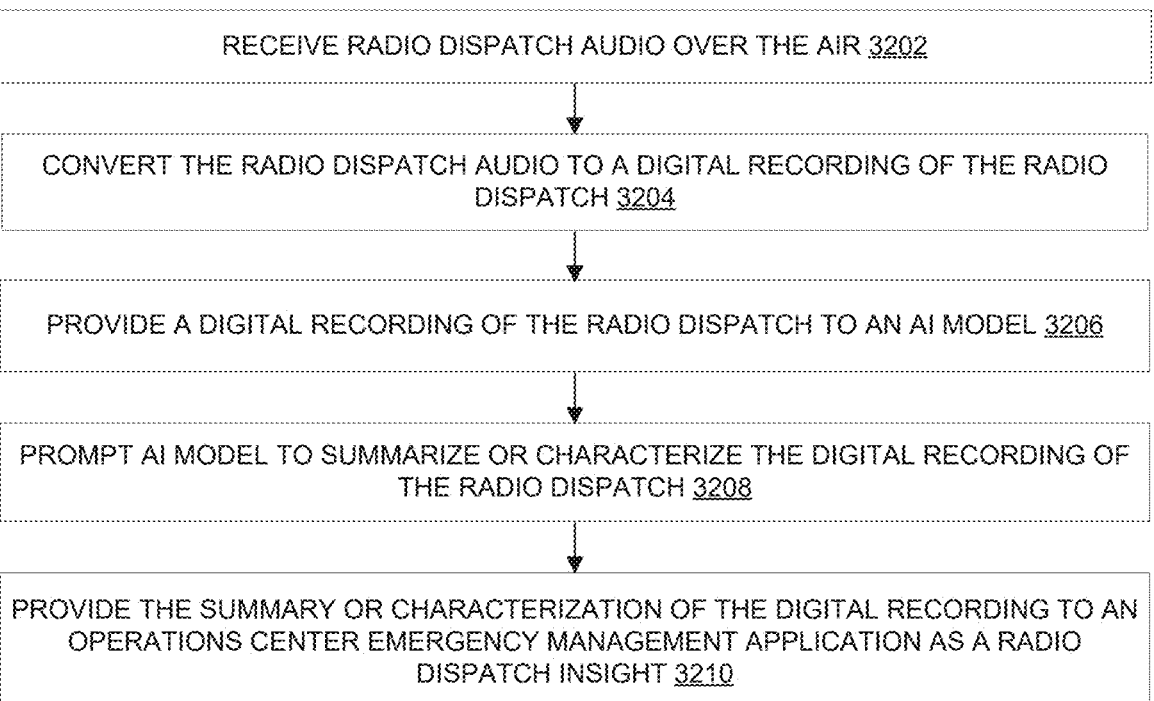

RECEIVE RADIO DISPATCH AUDIO OVER THE AIR 3202

CONVERT THE RADIO DISPATCH AUDIO TO A DIGITAL RECORDING OF THE RADIO
DISPATCH 3204

PROVIDE A DIGITAL RECORDING OF THE RADIO DISPATCH TO AN AI MODEL 3206

PROMPT AI MODEL TO SUMMARIZE OR CHARACTERIZE THE DIGITAL RECORDING OF
THE RADIO DISPATCH 3208

PROVIDE THE SUMMARY OR CHARACTERIZATION OF THE DIGITAL RECORDING TO AN
OPERATIONS CENTER EMERGENCY MANAGEMENT APPLICATION AS A RADIO
DISPATCH INSIGHT 3210

FIG. 32

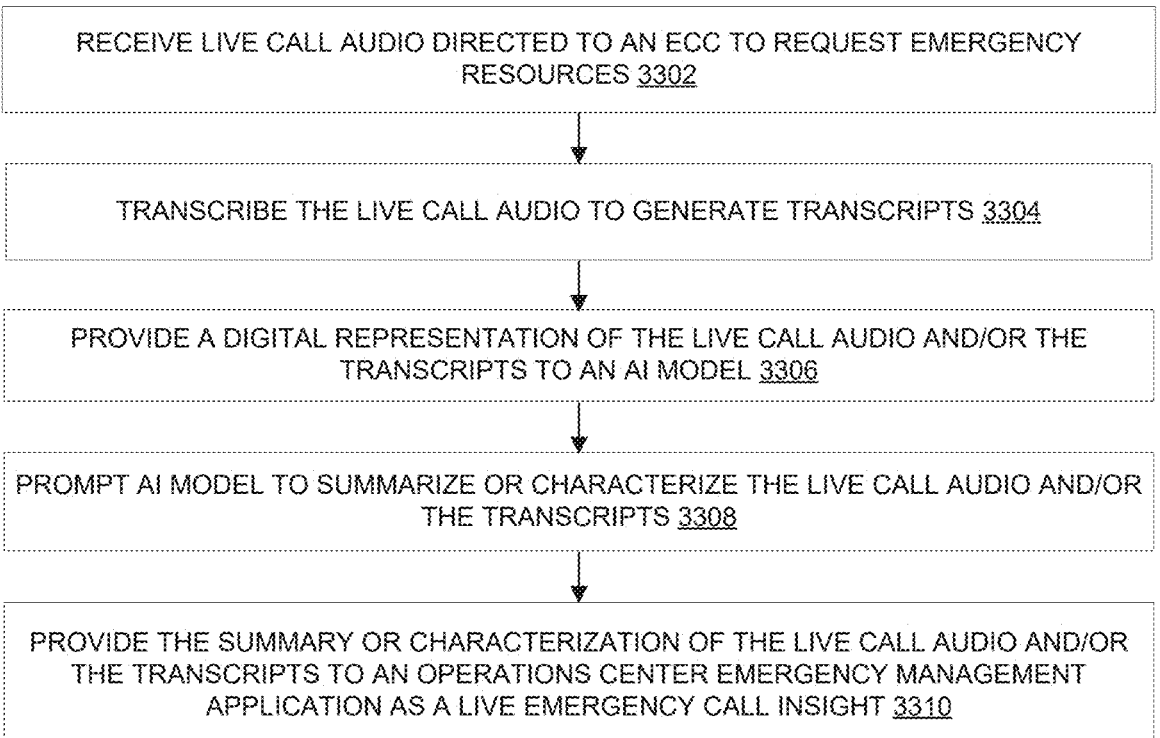

PROCESS FOR PROVIDING LIVE EMERGENCY CALL INSIGHTS TO AN
OPERATIONS CENTER 3300

RECEIVE LIVE CALL AUDIO DIRECTED TO AN ECC TO REQUEST EMERGENCY
RESOURCES 3302

TRANSCRIBE THE LIVE CALL AUDIO TO GENERATE TRANSCRIPTS 3304

PROVIDE A DIGITAL REPRESENTATION OF THE LIVE CALL AUDIO AND/OR THE
TRANSCRIPTS TO AN AI MODEL 3306

PROMPT AI MODEL TO SUMMARIZE OR CHARACTERIZE THE LIVE CALL AUDIO AND/OR
THE TRANSCRIPTS 3308

PROVIDE THE SUMMARY OR CHARACTERIZATION OF THE LIVE CALL AUDIO AND/OR
THE TRANSCRIPTS TO AN OPERATIONS CENTER EMERGENCY MANAGEMENT
APPLICATION AS A LIVE EMERGENCY CALL INSIGHT 3310

FIG. 33

METHODS AND SYSTEMS FOR AN EMERGENCY RESPONSE DATA EXCHANGE SYSTEM

CROSS-REFERENCE

This application is a Continuation in Part of U.S. Ser. No. 18/239,433, filed Aug. 29, 2023, which further is a continuation of U.S. Ser. No. 17/196,438, filed Mar. 9, 2021 and issuing as U.S. Pat. No. 11,741,819 on Aug. 29, 2023, which further is a continuation of U.S. Ser. No. 16/663,295, filed Oct. 24, 2019, which further claims the benefit of U.S. Provisional Application No. 62/750,175, filed Oct. 24, 2018, all of which are assigned to the same assignee as the present application, and all of which are hereby incorporated by reference herein in their entirety. This application further claims the benefit of U.S. Provisional Application No. 63/632,501, filed Apr. 10, 2024, which is hereby incorporated by reference herein in its entirety.

BACKGROUND OF THE INVENTION

A person in an emergency situation may request help using a mobile communication device such as a cell phone to dial a designated emergency number like 9-1-1 or a direct access phone number for the local emergency service provider (e.g., an emergency dispatch center). This call is assigned to one or more first responders by the emergency service provider. However, these communications are typically limited to audio calls with narrow functionality since most emergency service providers that receive emergency calls currently lack the capacity for more sophisticated communications.

SUMMARY OF THE INVENTION

One advantage provided by the systems, servers, devices, methods, and media of the instant application is the ability to easily and efficiently make customized emergency flow scripts for handling emergency alerts. In some embodiments, emergency flows scripts are assembled into custom emergency flows using various emergency flow building blocks. These blocks provide a modular structure that allows authorized users to select specific building blocks as desired to create unique emergency flows that are tailored to the needs of the users. In some embodiments, the blocks are depicted on a graphic user interface that allows users to drag and drop building blocks to generate emergency flows with ease.

Another advantage provided by the systems, servers, devices, methods, and media of the instant application are emergency response management processes that execute customized emergency flow scripts based on the emergency alert. In some embodiments, an emergency alert comprises an emergency flow identifier that is used to determine the emergency flow script to execute in response to receiving the alert. Thus, a single call management system may provide multiple customized emergency flow scripts based on various parameters (e.g., type of device sending the emergency alert, device functionality, type of emergency, etc.).

Another advantage provided by the systems, servers, devices, methods, and media of the instant application is the facilitation of emergency response communications. Many companies and institutions provide devices and services for monitoring potential emergencies, such as wearable devices that monitor heart rates or intelligent vehicular systems that can detect when a vehicle has been in an accident. However, due to the regulatory requirements for emergency communications (e.g., calling 9-1-1 in the United States), few of the aforementioned services and devices are capable of connecting end users directly to emergency responders. The management systems provided herein provide these services and devices with the infrastructure necessary to connect their end users with emergency responders through a simple and customizable integration.

Another advantage provided by the systems, servers, devices, methods, and media of the instant application are emergency response management processes that execute emergency flow scripts or notification procedures in response to receiving an emergency indication (e.g., a query for emergency information) from an emergency service provider (e.g., a public safety answering point (PSAP)). By executing emergency flow scripts or notification procedures in response to emergency indications received from emergency service providers, the emergency management system can eliminate the need for additional hardware and software to be installed on communication devices in order to initiate emergency flow scripts or notification procedures.

Another advantage provided by the systems, servers, devices, methods, and media of the instant application are emergency flows or notification procedures that allow to continue a sequence of notification until a user who is available and willing to call for emergency help is found. In addition, automated notification messages and status updates can also be sent during an emergency situation.

Another advantage provided by the systems, servers, devices, methods, and media of the instant application is an emergency management system (EMS) for receiving emergency data from an emergency service provider (ESP; e.g., a public safety answering point (PSAP)) and share the emergency data with one or more "upstream" recipients. By sharing emergency data upstream, the EMS can help facilitate faster and more intelligent emergency responses. In some embodiments, the EMS can use emergency data received from an ESP to trigger a notification procedure or an emergency flow. In some embodiments, the EMS can use emergency data received from an ESP to provide the ESP with functional enhancements, such as the ability to remotely activate a school building's emergency lockdown system.

In one aspect, disclosed herein is a method for notifying one or more contacts of an emergency by an emergency management system, the method comprising: (a) receiving a query comprising a user identifier from an emergency service provider (ESP), wherein the user identifier is associated with a user in an emergency; (b) determining a personalized notification procedure associated with the user identifier; (c) identifying the one or more contacts to be notified regarding the emergency according to the personalized notification procedure; and (d) initiating communication with the one or more contacts according to the personalized notification procedure. In some embodiments, the personalized notification procedure comprises sending at least one message to a contact list comprising one or more emergency contacts to be notified regarding the emergency. In some embodiments, the step of initiating communication with the one or more contacts in (d) comprises calling one or more emergency contacts to be notified regarding the emergency. In some embodiments, the query is received based on a proxy emergency communication made by an emergency contact from the contact list on behalf of the user in an emergency. In some embodiments, the user is in a data sharing group comprising the one or more contacts linked to one or more member devices. In some embodiments, the user has authorized location sharing with the one or more member devices associated with the one or more emergency contacts during the emergency. In some embodiments, the method further comprises obtaining a location of the user and sharing the location with one or more member devices authorized for location sharing according to the personalized notification procedure. In some embodiments, the location of the user is determined using location services for an electronic device associated with the user. In some embodiments, one or more emergency contacts of the user are authorized to receive additional data comprising images, video feed, sensor data, or ESP or response data during an emergency. In some embodiments, the one or more contacts comprise an emergency contact associated with the user identifier, or an organizational contact associated with the user identifier, or both. In some embodiments, the one or more contacts includes an organizational contact. In some embodiments, the one or more contacts comprises a call center. In some embodiments, the user identifier is a phone number. In some embodiments, the user identifier is an email address, user account ID or username. In some embodiments, the user identifier identifies an electronic device associated with the user. In some embodiments, the user identifier is an international mobile equipment identity (IMEI) number for a user device, a device ID, Mac address, an internet protocol (IP) address, Wi-fi or Bluetooth access point, or a SIM card number. In some embodiments, the method further comprises: (a) receiving submission of the user identifier to be associated with the personalized notification procedure; (b) configuring the personalized notification procedure based on user instructions or organizational customizations; and (c) associating the user identifier with the personalized notification procedure in a user identification database. Disclosed herein, in another aspect, is an emergency management system configured to carry out the method of any of the preceding embodiments. Disclosed herein, in another aspect, is non-transitory computer readable medium including instructions executable by a processor to create an application configured to carry out the method of any of the preceding embodiments.

Disclosed herein, in another aspect, is a method for identifying and executing emergency flows by an emergency management system, the method comprising: (a) receiving a query comprising a user identifier from an emergency service provider (ESP); (b) identifying at least one emergency flow script associated with the user identifier, said emergency flow script defining a pathway of execution of two or more emergency flow building blocks, wherein each of said two or more emergency flow building blocks comprises instructions to perform an emergency response function; and (c) executing the emergency flow script associated with the user identifier. In some embodiments, the at least one emergency flow script comprises two emergency flow scripts associated with the user identifier. In some embodiments, the two emergency flow scripts comprise a main emergency flow and an auxiliary emergency flow. In some embodiments, the two emergency flow scripts comprise a home emergency flow and a work emergency flow. In some embodiments, the ESP is a public safety answering point (PSAP). In some embodiments, the user identifier is a phone number. In some embodiments, the method further comprises: (a) providing a graphical user interface comprising a plurality of emergency flow building blocks; and (b) providing an interactive digital environment within which two or more emergency flow building blocks are visually assembled into the emergency flow script. In some embodiments, the emergency flow script is stored within an emergency flow database comprising a plurality of emergency flow scripts. In some embodiments, the method further comprises: (a) receiving submission of the user identifier to be associated with the emergency flow script; and (b) associating the user identifier with the emergency flow script. In some embodiments, executing the emergency flow script comprises: (a) accessing a prioritized list of accounts associated with the user identifier; (b) attempting to connect with an account on the prioritized list in order of priority; and (c) attempting to connect with a next account on the prioritized list in order of priority when a connection with a preceding account on the prioritized list is unsuccessful. In some embodiments, executing the emergency flow script comprises delivering an emergency notification to an electronic device associated with an emergency contact associated with the user identifier. In some embodiments, the emergency notification is an SMS text message. In some embodiments, executing the emergency flow script further comprises: (a) querying a location database using the user identifier; and (b) retrieving a location associated with the user identifier from the location database; wherein the emergency notification comprises the location associated with the user identifier. In some embodiments, the location database receives the location associated with the user identifier from an electronic device associated with the user identifier before being queried using the user identifier. In some embodiments, executing the emergency flow script comprises: (a) transmitting an interactive message to an electronic device linked to an emergency contact associated with the user identifier; (b) receiving confirmation of receipt of the interactive message; and (c) establishing a communication link between an emergency service provider and the electronic device associated with the emergency contact. In some embodiments, the communication link comprises a data channel. In some embodiments, the communication link comprises a voice over IP (VoIP) channel. In some embodiments, the method further comprises: (a) querying an emergency database using the user identifier; (b) retrieving emergency data associated with the user identifier from the emergency database; and (c) transmitting the emergency data associated with the user identifier to the emergency service provider. In some embodiments, the method further comprises establishing a communicative link with an electronic device associated with the user identifier. In some embodiments, the method further comprises gathering emergency data from the electronic device through the communicative link. In some embodiments, executing the emergency flow script comprises transmitting the emergency data gathered from the electronic device to an emergency contact associated with the user identifier or an emergency service provider. In some embodiments, the electronic device is a computer, a tablet, a mobile phone, a smartphone, a laptop, a vehicle emergency system, a server, a panic button, a wearable device, an IoT device, a sensor, or a home security device. In some embodiments, the method further comprises delivering an emergency notification to the electronic device according to the emergency flow script. Disclosed herein, in another aspect, is an emergency management system configured to carry out the method of any of the preceding embodiments. Disclosed herein, in another aspect, is non-transitory computer readable medium including instructions executable by a processor to create an application configured to carry out the method of any of the preceding embodiments.

Disclosed herein, in another aspect, is a method for identifying and executing emergency flows by an emergency management system, the method comprising: (a) receiving a query comprising a user identifier from an emergency service provider (ESP); (b) identifying an organizational identifier associated with the user identifier; (c) identifying an emergency flow script associated with the organizational identifier, the emergency flow script defining a pathway of execution of emergency functions; and (d) executing the emergency flow script associated with the organizational identifier. In some embodiments, identifying the organizational identifier in step (b) comprises searching for an associated organization in one or more databases using the user identifier. In some embodiments, organizational identifier is associated with one or more organizational credentials. Disclosed herein, in another aspect, is an emergency management system configured to carry out the method of any of the preceding embodiments. Disclosed herein, in another aspect, is non-transitory computer readable medium including instructions executable by a processor to create an application configured to carry out the method of any of the preceding embodiments.

Disclosed herein, in another aspect, is a method for providing notification of an emergency by an emergency management system, the method comprising: (a) receiving a query comprising a user identifier from an emergency service provider (ESP); (b) identifying an organizational identifier associated with the user identifier; (c) identifying a notification procedure associated with the organizational identifier; and (d) executing the notification procedure associated with the organizational identifier. In some embodiments, the notification procedure comprises connecting with one or more organizational emergency contacts. In some embodiments, connecting with one or more organizational emergency contacts comprises sending a text message, sending an email message, sending a chat message, and calling the organizational emergency contacts. Disclosed herein, in another aspect, is an emergency management system configured to carry out the method of any of the preceding embodiments. Disclosed herein, in another aspect, is non-transitory computer readable medium including instructions executable by a processor to create an application configured to carry out the method of any of the preceding embodiments.

Disclosed herein, in another aspect, is a method for providing notification of an emergency by an emergency management system, the method comprising: (a) receiving a query comprising a user identifier from an emergency service provider (ESP); (b) querying a location database using the user identifier to retrieve a location associated with the user identifier; (c) determining that the location associated with the user identifier is located within an organizational geofence associated with an organizational identifier; (d) identifying an emergency flow script associated with the organizational identifier, the emergency flow script defining a pathway of execution of emergency functions comprising steps for notifying one or more emergency contacts; and (e) executing the emergency flow script associated with the organizational identifier. In some embodiments, the emergency flow script specifies an organizational contact to be notified of an emergency. Disclosed herein, in another aspect, is an emergency management system configured to carry out the method of any of the preceding embodiments. Disclosed herein, in another aspect, is non-transitory computer readable medium including instructions executable by a processor to create an application configured to carry out the method of any of the preceding embodiments.

Disclosed herein, in another aspect, is an emergency management system comprising: (a) a user identification database storing a plurality of user identifiers associated with notification procedures; (b) a server comprising at least one processor and a memory; and (c) non-transitory computer readable storage medium encoded with a server application including instructions executable by the at least one processor, the server application comprising: (i) a query module configured to receive a query comprising a user identifier from an emergency service provider (ESP); (ii) a user identification module configured to locate a notification procedure associated with the user identifier in the user identification database; and (iii) an emergency notification module configured to execute the notification procedure associated with the user identifier, wherein the notification procedure defines a pathway of execution of emergency functions comprising steps for notifying one or more emergency contacts. In some embodiments, the system further comprises a registration application configured to: (a) receive a submission of the user identifier; (b) receive a definition of the notification procedure; and (c) associate the user identifier with the notification procedure within the user identification database. In some embodiments, the registration application is a mobile application or web application and comprises a graphical user interface for receiving the submission of the user identifier and the definition of the notification procedure.

Disclosed herein, in another aspect, is an emergency management system for identifying and executing emergency flows, the system comprising: (a) an emergency flow database configured to: (i) store a plurality of emergency flow scripts; and (ii) store a plurality of user identifiers, wherein each user identifier is associated with one or more emergency flow scripts; and (b) an emergency response server configured to: (i) receive a query comprising a user identifier from an emergency service provider (ESP); (ii) identify an emergency flow script associated with the user identifier from the emergency flow database; and (iii) execute the emergency flow script associated with the user identifier, wherein the emergency flow script defines a pathway of execution of emergency functions comprising steps for notifying one or more emergency contacts regarding an emergency. In some embodiments, the system further comprises an emergency flow editor application providing a graphical user interface comprising: (a) a plurality of emergency flow building blocks, wherein each emergency flow building block comprises instructions to perform an emergency response function; and (b) an interactive digital environment within which two or more emergency flow building blocks are visually assembled into the emergency flow script.

Disclosed herein, in another aspect, is a system for emergency communications comprising: (a) an emergency triggering device configured to transmit an emergency alert when an emergency is detected; and (b) at least one server providing an emergency management system server application configured to: (i) receive the emergency alert from the triggering device, the emergency alert comprising a list of at least one associated device of the triggering device; and (ii) connect to an associated device from the list; (iii) prompt the associated device for confirmation of the emergency by a user of the associated device; and (iv) establish a conference bridge with the user and an appropriate dispatch center for responding to the emergency. In some embodiments, the emergency alert is triggered autonomously based on sensor data. In some embodiments, the emergency alert is triggered when sensor values exceed a threshold. In some embodiments, the server application is configured to determine an appropriate emergency dispatch center based on location information from the emergency alert. In some embodiments, the server application is configured to connect with the triggering device before connecting with the at least one associated device. In some embodiments, the list is a prioritized list having a plurality of associated devices. In some embodiments, the server application is configured to connect to a next associated device in the prioritized list in order of priority when a connection with a preceding associated device is unsuccessful. In some embodiments, the server application attempts to connect to at least two associated devices concurrently. In some embodiments, the system further comprises a database storing user account information comprising at least one phone number and any emergency contacts for one or more users. In some embodiments, the server application looks up the at least one associated device by querying the at least one database using a telephone number associated with the triggering device. In some embodiments, the emergency alert comprises an authorization code or credential for initiating an emergency call. In some embodiments, the server application looks up an associated device by querying the at least one database using one of an email address, physical address, x-y coordinate, BSSID, SSID, and MAC address of the associated device. In some embodiments, the user is connected to the emergency dispatch center by an audio call, wherein an emergency management system establishes a conference bridge with the user and the emergency dispatch center. In some embodiments, the user is connected to an appropriate emergency dispatch center based on the location information in the emergency alert through a proxy emergency call. In some embodiments, a notification is sent to the user when the emergency alert has been triggered and the server application was unable to connect to a user. In some embodiments, a unique session identification for the emergency is included in the emergency alert and included in session updates. In some embodiments, the emergency is triggered by user interaction with the triggering device, wherein the user interaction comprises at least one of pressing a soft or hard button, a gesture, or a voice command.

Disclosed herein, in another aspect, is a method for notifying one or more contacts of an emergency by an emergency management system, the method comprising: (a) receiving a query comprising a user identifier from an emergency service provider (ESP), wherein the user identifier is associated with a user in an emergency; (b) sending location data for the user identifier to the ESP through a secure pathway; (c) identifying a personalized notification procedure associated with the user identifier; (d) executing the notification procedure associated with the user identifier, said notification procedure comprising identifying the one or more contacts to be notified regarding the emergency and communicating with the one or more contacts. In some embodiments, the user identifier is used to query for location data in one or more emergency databases. In some embodiments, the location data is device-based hybrid location determined on one or more devices associated with the user. In some embodiments, the location data comprises latitude, longitude and location accuracy. In some embodiments, the location data is shared with the one or more contacts. In some embodiments, additional data associated with the user identifier is shared with the one or more contacts, wherein the additional data comprises user data, medical data, webcam images, video feed, audio files, or any combination thereof. Disclosed herein, in another aspect, is an emergency management system configured to carry out the method of any of the preceding embodiments. Disclosed herein, in another aspect, is non-transitory computer readable medium including instructions executable by a processor to create an application configured to carry out the method of any of the preceding embodiments.

Disclosed herein, in another aspect, is a method for notifying one or more contacts of an emergency by an emergency management system, the method comprising: (a) receiving a query comprising a user identifier from an emergency service provider (ESP), wherein the user identifier is associated with a user in an emergency; (b) identifying a personalized notification procedure associated with the user identifier wherein the personalized notification procedure takes the location data as an input for selecting an emergency flow script from a plurality of emergency flow scripts; (c) executing the selected emergency flow script associated with the user identifier. In some embodiments, the selected emergency flow script is an organizational emergency flow, wherein the location data indicates that the user was on the premises of the associated organization. In some embodiments, the selected emergency flow script is a family emergency flow, wherein the location data is shared with verified emergency contacts. In some embodiments, the selected emergency flow script is a work emergency flow, wherein the time of the emergency indicates that the user is working. Disclosed herein, in another aspect, is an emergency management system configured to carry out the method of any of the preceding embodiments. Disclosed herein, in another aspect, is non-transitory computer readable medium including instructions executable by a processor to create an application configured to carry out the method of any of the preceding embodiments.

Disclosed herein, in another aspect, is a system for emergency communications comprising: (a) a triggering device detecting an audio emergency trigger and sending an emergency alert to the emergency management system; and (b) at least one server providing a server application at the emergency management system, said server application comprising: (i) a software module receiving the emergency alert from the triggering device; (ii) a software module determining a callback number for the triggering device, wherein the callback number is selected and assigned to the triggering device when the triggering device does not have a phone number; (iii) a software module determining a location of the triggering device, pairing the location with the callback number, and updating a location database accessible by emergency service providers with the paired location and callback number; (iv) a software module identifying an appropriate emergency service provider for responding to the emergency alert based on the location of the triggering device and facilitating an emergency communication session with the appropriate emergency service provider, wherein the callback number enables the emergency communication session with the triggering device to be re-established in case of disconnection. In some embodiments, the triggering device comprises a microphone for picking up voice and sound triggers. In some embodiments, the triggering device comprises a microphone and speakers for establishing an emergency call. In some embodiments, the audio emergency trigger is a voice command. In some embodiments, the emergency communication session is initiated after receiving a confirmation of the emergency selected from the list comprising a second voice command, background sounds, webcam images, and video feed. In some embodiments, the emergency communication session is initiated after receiving confirmation of the emergency by first connecting with a call center. In some embodiments, determining the location of the triggering device comprises getting a user to provide or confirm the location of the emergency. In some embodiments, the emergency communication session is initiated after verifying user consent for initiating the emergency communication session. In some embodiments, the emergency alert comprises an API request to the emergency management system to initiate the emergency communication session. In some embodiments, the triggering device is a phone and the callback number is a phone number of the triggering device. In some embodiments, the triggering device is an Internet of Things (IoT) device. In some embodiments, the triggering device is a smart speaker. In some embodiments, the triggering device is connected as part of a mesh network. In some embodiments, the triggering device is part of a local network of smart devices. In some embodiments, the local network is a home, office, or business network. In some embodiments, the emergency communication session is established on a communication device that is paired or synched with the triggering device via Wi-fi, Bluetooth or other connection. In some embodiments, the emergency alert from the triggering device is sent to the emergency management system through a mesh network or an intermediate communication device. In some embodiments, the intermediate communication device is a cell phone or Internet router. In some embodiments, the triggering device gathers emergency information in response to detecting the audio emergency trigger and provides the emergency information to the emergency management system. In some embodiments, the emergency information comprises location information, sensor data, audio, video, user information, emergency contact information, type of emergency, or any combination thereof. In some embodiments, the triggering device gathers the emergency information from one or more devices in a local network. In some embodiments, the location database is an E911 ALI database. In some embodiments, the location database is an NG911 clearinghouse database. In some embodiments, the emergency communication session is a two-way audio session established using SIP protocol. In some embodiments, wherein the triggering device utilizes a voice assistance service to transmit the emergency alert to the emergency management system as an API request. In some embodiments, the server application further comprises a software module re-establishing the communication session upon receiving a request to re-establish communications with the callback number from the emergency service provider. In some embodiments, the triggering device receives sensor data from a network of sensor devices indicative of an emergency situation and attempts to report the emergency situation to a user. In some embodiments, the triggering device attempts to report the emergency situation to the user by broadcasting an audio message. In some embodiments, participants in the emergency communication session are the emergency service provider and an associated device of the triggering device. In some embodiments, the associated device is a communication device associated with the triggering device or a user of the triggering device and is selected from a prioritized list of associated devices to participate in the emergency communication session.

In another aspect, disclosed herein is a method for notifying one or more recipients of an emergency by an emergency management system comprises: a) receiving an electronic communication from an emergency service provider (ESP), wherein the electronic communication is an indication of an emergency alert received by the ESP and comprises a user identifier; b) gathering a set of emergency data associated with the emergency alert, wherein the set of emergency data comprises the user identifier; c) determining, using the set of emergency data, an appropriate notification procedure to be executed; and d) executing the notification procedure to initiate communication with the one or more recipients. In some embodiments, the one or more recipients are specified by the notification procedure. In some embodiments, the one or more recipients comprises a prioritized list of emergency contacts that are contacted sequentially. In some embodiments, the electronic communication is received through an application programming interface (API). In some embodiments, the electronic communication comprises some or all of the set of emergency data. In some embodiments, the method further comprises: a) wherein the set of emergency data comprises a user identifier; and b) wherein determining the appropriate notification procedure using the set of emergency data comprises identifying a notification procedure associated with the user identifier from a notification procedure database. In some embodiments, the user identifier is a phone number or an email address. In some embodiments, the method further comprises: a) receiving definition of the notification procedure, wherein the notification procedure defines one or more contacts and an order of contacting the one or more contacts; b) associating the notification procedure with the user identifier; and c) storing the notification procedure in a notification procedure database. In some embodiments, the definition of the notification procedure is received through a graphical user interface of an emergency response application provided by the EMS. In some embodiments, executing the notification procedure to initiate communication with the one or more recipients comprises transmitting at least one electronic message indicative of an emergency associated with the user identifier to the one or more contacts. In some embodiments, executing the notification procedure to initiate communication with the one or more recipients comprises initiating a voice call with the one or more contacts. In some embodiments, the voice call is facilitated over voice over internet protocol (VoIP). In some embodiments, the one or more contacts comprises an emergency contact associated with the user identifier. In some embodiments, the one or more contacts comprises an organizational contact associated with the user identifier. In some embodiments, the method further comprises obtaining a location associated with the user identifier and sharing the location with the one or more contacts according to the notification procedure. In some embodiments, the location associated with the user identifier is obtained from an electronic device associated with the user identifier. In some embodiments, the location associated with the user identifier is a device-based hybrid location generated by the electronic device associated with the user identifier. In some embodiments, the set of emergency data comprises the location associated with the user identifier. In some embodiments, the set of emergency data comprises a location; and determining the appropriate notification procedure using the set of emergency data comprises: i) accessing a set of geofences associated with a plurality of third-party accounts; ii) determining that the location is within a geofence associated with a first third-party account; and iii) identifying a notification procedure associated with the first third-party account. In some embodiments, the set of emergency data further comprises an emergency type; and executing the notification procedure comprises: i) identifying a set of emergency types selected for the first third-party account; ii) determining that the emergency type associated with the emergency alert is included in the set of emergency types selected for the first third-party account; and iii) executing the notification procedure in response to determining that the emergency type is included in the set of emergency types selected for the first third-party account. In some embodiments, the third-party account is a second ESP. In some embodiments, the set of emergency data comprises a user identifier and wherein determining the appropriate notification procedure to be executed comprises: a) identifying a third-party account associated with the user identifier; and b) identifying a notification procedure associated with the third-party account. In some embodiments, executing the notification procedure comprises transmitting a second set of data comprising some or all of the set of emergency data to the one or more recipients. In some embodiments, the ESP is a public safety answering point (PSAP) and wherein the emergency alert is an emergency call received by the PSAP. In some embodiments, the ESP is an alarm monitoring center. In some embodiments, the recipient is a neighboring PSAP. Disclosed herein is an emergency management system (EMS) comprising at least one processor and non-transitory computer readable storage medium including instructions executable by the at least one processor to perform the method for notifying one or more recipients of an emergency.

In another aspect, disclosed herein is a method for notifying one or more contacts of an emergency by an emergency management system comprises: a) receiving definition of a personalized notification procedure defining one or more contacts and an order of contacting the one or more contacts; b) associating the personalized notification procedure with a user identifier; c) storing the personalized notification procedure in a notification procedure database; d) receiving an emergency communication comprising the user identifier from an emergency service provider (ESP); e) identifying the personalized notification procedure associated with the user identifier from the notification procedure database; and f) executing the personalized notification procedure to initiate communication with the one or more contacts according to the personalized notification procedure. Disclosed herein is an emergency management system (EMS) comprising at least one processor and non-transitory computer readable storage medium including instructions executable by the at least one processor to perform the method for notifying one or more recipients of an emergency.

In another aspect, disclosed herein is a method for notifying one or more recipients of an emergency by an emergency management system comprises: a) receiving an electronic communication from an emergency service provider (ESP), wherein the electronic communication is associated with an emergency alert received by the ESP and comprises a set of emergency data comprising a location; b) accessing a set of geofences associated with third-party accounts; c) determining that the location is within a geofence associated with a first third-party account; d) identifying a notification procedure associated with the first third-party account; and e) executing the notification procedure to initiate communication with the one or more recipients. Disclosed herein is an emergency management system (EMS) comprising at least one processor and non-transitory computer readable storage medium including instructions executable by the at least one processor to perform the method for notifying one or more recipients of an emergency.

In another aspect, disclosed herein is a method for notifying one or more recipients of an emergency by an emergency management system comprises: a) receiving an electronic communication from an emergency service provider (ESP), wherein the electronic communication is associated with an emergency alert received by the ESP and comprises a set of emergency data comprising a location and an emergency type; b) accessing a set of geofences associated with third-party accounts; c) determining that the location is within a geofence associated with a first third-party account; d) identifying a notification procedure associated with the first third-party account; e) identifying a set of emergency types selected for the first third-party account; f) determining that the emergency type is included in the set of emergency types selected for the first third-party account; and g) in response to determining that the emergency type is included in the set of emergency types selected for the first third-party account, executing the notification procedure to initiate communication with the one or more recipients. Disclosed herein is an emergency management system (EMS) comprising at least one processor and non-transitory computer readable storage medium including instructions executable by the at least one processor to perform the method for notifying one or more recipients of an emergency.

In another aspect, disclosed herein is a method for notifying one or more recipients of an emergency by an emergency management system comprises: a) receiving an electronic communication from an emergency service provider (ESP), wherein the electronic communication is associated with an emergency alert received by the ESP and comprises a set of emergency data comprising a user identifier; b) identifying a third-party account associated with the user identifier from a database; c) identifying a notification procedure associated with the third-party account from a notification procedure database comprising a plurality of notification procedures associated with a plurality of third-party accounts; and d) executing the notification procedure associated with the third-party account to initiate communication with the one or more recipients according to the notification procedure. Disclosed herein is an emergency management system (EMS) comprising at least one processor and non-transitory computer readable storage medium including instructions executable by the at least one processor to perform the method for notifying one or more recipients of an emergency.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 1A, FIG. 1B, FIG. 1C, and FIG. 1D depict embodiments of the (i) emergency flow management system (EFMS), (ii) communication device (e.g., a triggering device), (iii) emergency management system (also referred to as "EMS"), (iv) emergency flow program, (v) emergency service provider (ESP) system, and (vi) ESP software;

FIG. 9A and FIG. 9B depict an embodiment of a dash-board for testing emergency flows;

FIG. 26 illustrates an example flow diagram of a process for validating social media posts for emergency management applications, in accordance with embodiments of the disclosure.

FIG. 27 illustrates an example flow diagram of a process for selectively exchanging emergency response data between an operations center and an emergency communications center (ECC), in accordance with embodiments of the disclosure.

FIGS. 28A and 28B illustrates an example flow diagram of a process for establishing communications between an operations center and an ECC, in accordance with embodiments of the disclosure.

FIG. 29 illustrates a flow diagram of a process for z-axis estimation of initiated emergency communications, in accordance with embodiments of the disclosure.

FIG. 32 illustrates a flow diagram of a process for providing radio dispatch insights to an operations center, in accordance with embodiments of the disclosure.

FIG. 33 illustrates a flow diagram of a process for providing live emergency call insights to an operations center, in accordance with embodiments of the disclosure.

DETAILED DESCRIPTION

Figure 1A:
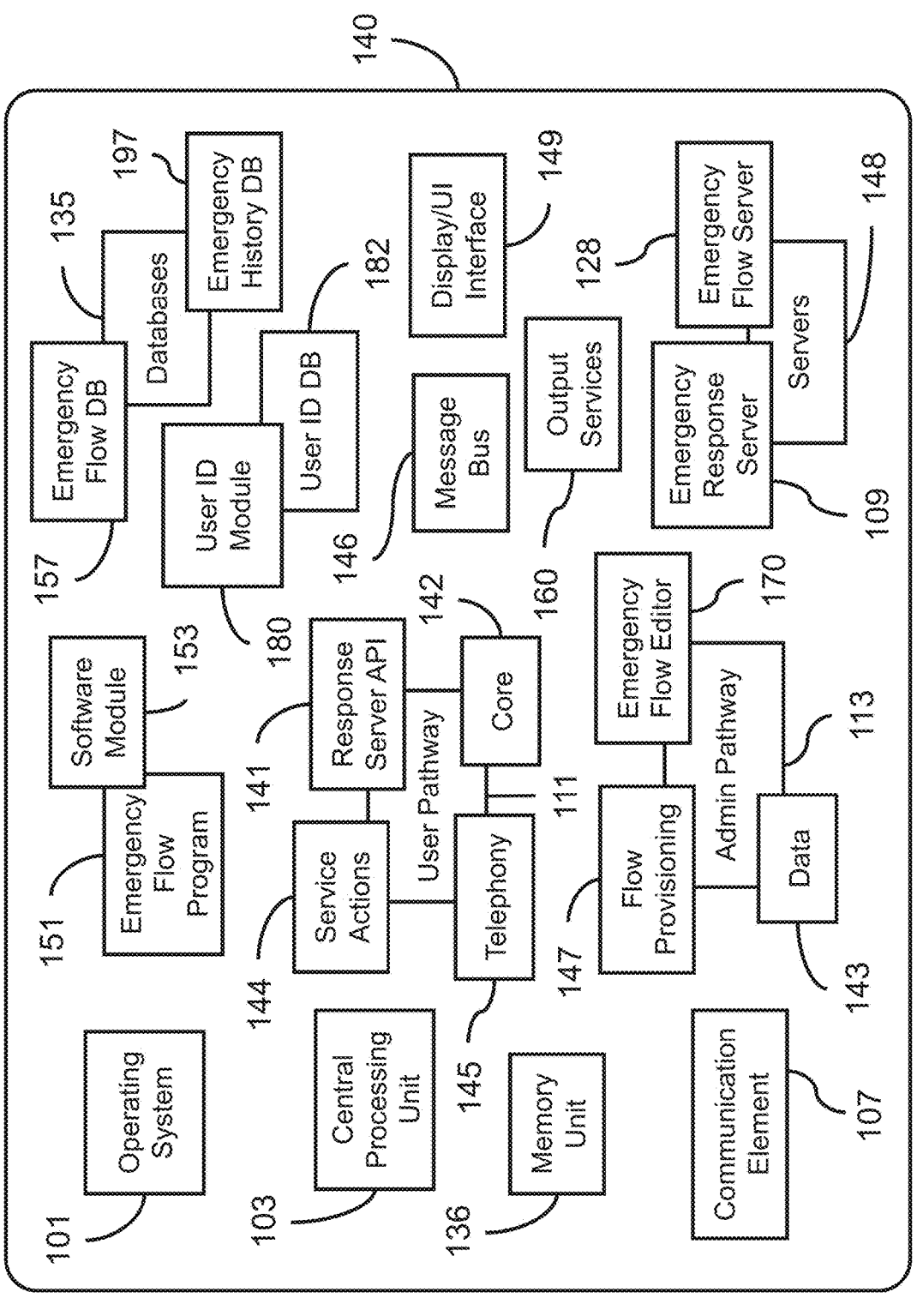

In some embodiments, disclosed herein is a method for notifying one or more contacts of an emergency by an emergency management system, the method comprising: (a) receiving a query comprising a user identifier from an emergency service provider (ESP), wherein the user identifier is associated with a user in an emergency; (b) determining a personalized notification procedure associated with the user identifier; (c) identifying the one or more contacts to be notified regarding the emergency according to the personalized notification procedure; and (d) initiating communication with the one or more contacts according to the personalized notification procedure.

In some embodiments, disclosed herein is a method for identifying and executing emergency flows by an emergency management system, the method comprising: (a) receiving a query comprising a user identifier from an emergency service provider (ESP); (b) identifying at least one emergency flow script associated with the user identifier, said emergency flow script defining a pathway of execution of two or more emergency flow building blocks, wherein each of said two or more emergency flow building blocks comprises instructions to perform an emergency response function; and (c) executing the emergency flow script associated with the user identifier.

In some embodiments, disclosed herein is a method for identifying and executing emergency flows by an emergency management system, the method comprising: (a) receiving a query comprising a user identifier from an emergency service provider (ESP); (b) identifying an organizational identifier associated with the user identifier; (c) identifying an emergency flow script associated with the organizational identifier, the emergency flow script defining a pathway of execution of emergency functions; and (d) executing the emergency flow script associated with the organizational identifier. In some embodiments, identifying the organizational identifier in step (b) comprises searching for an associated organization in one or more databases using the user identifier.

In some embodiments, disclosed herein is a method for providing notification of an emergency by an emergency management system, the method comprising: (a) receiving a query comprising a user identifier from an emergency service provider (ESP); (b) identifying an organizational identifier associated with the user identifier; (c) identifying a notification procedure associated with the organizational identifier; and (d) executing the notification procedure associated with the organizational identifier.

In some embodiments, disclosed herein is a method for providing notification of an emergency by an emergency management system, the method comprising: (a) receiving a query comprising a user identifier from an emergency service provider (ESP); (b) querying a location database using the user identifier to retrieve a location associated with the user identifier; (c) determining that the location associated with the user identifier is located within an organizational geofence associated with an organizational identifier; (d) identifying an emergency flow script associated with the organizational identifier, the emergency flow script defining a pathway of execution of emergency functions comprising steps for notifying one or more emergency contacts; and (e) executing the emergency flow script associated with the organizational identifier.

In some embodiments, disclosed herein is an emergency management system comprising: (a) a user identification database storing a plurality of user identifiers associated with notification procedures; (b) a server comprising at least one processor and a memory; and (c) non-transitory computer readable storage medium encoded with a server application including instructions executable by the at least one processor, the server application comprising: (i) a query module configured to receive a query comprising a user identifier from an emergency service provider (ESP); (ii) a user identification module configured to locate a notification procedure associated with the user identifier in the user identification database; and (iii) an emergency notification module configured to execute the notification procedure associated with the user identifier, wherein the notification procedure defines a pathway of execution of emergency functions comprising steps for notifying one or more emergency contacts.

In some embodiments, disclosed herein is an emergency management system for identifying and executing emergency flows, the system comprising: (a) an emergency flow database configured to: (i) store a plurality of emergency flow scripts; and (ii) store a plurality of user identifiers, wherein each user identifier is associated with one or more emergency flow scripts; and (b) an emergency response server configured to: (i) receive a query comprising a user identifier from an emergency service provider (ESP); (ii) identify an emergency flow script associated with the user identifier from the emergency flow database; and (iii) execute the emergency flow script associated with the user identifier, wherein the emergency flow script defines a pathway of execution of emergency functions comprising steps for notifying one or more emergency contacts regarding an emergency.

In some embodiments, disclosed herein is a system for emergency communications comprising: (a) an emergency triggering device configured to transmit an emergency alert when an emergency is detected; and (b) at least one server providing an emergency management system server application configured to: (i) receive the emergency alert from the triggering device, the emergency alert comprising a list of at least one associated device of the triggering device; and (ii) connect to an associated device from the list; (iii) prompt the associated device for confirmation of the emergency by a user of the associated device; and (iv) establish a conference bridge with the user and an appropriate dispatch center for responding to the emergency.

In some embodiments, disclosed herein is a method for notifying one or more contacts of an emergency by an emergency management system, the method comprising: (a) receiving a query comprising a user identifier from an emergency service provider (ESP), wherein the user identifier is associated with a user in an emergency; (b) sending location data for the user identifier to the ESP through a secure pathway; (c) identifying a personalized notification procedure associated with the user identifier; (d) executing the notification procedure associated with the user identifier, said notification procedure comprising identifying the one or more contacts to be notified regarding the emergency and communicating with the one or more contacts.

In some embodiments, disclosed herein is a method for notifying one or more contacts of an emergency by an emergency management system, the method comprising: (a) receiving a query comprising a user identifier from an emergency service provider (ESP), wherein the user identifier is associated with a user in an emergency; (b) identifying a personalized notification procedure associated with the user identifier wherein the personalized notification procedure takes the location data as an input for selecting an emergency flow script from a plurality of emergency flow scripts; (c) executing the selected emergency flow script associated with the user identifier.

In some embodiments, disclosed herein is a system for emergency communications comprising: (a) a triggering device detecting an audio emergency trigger and sending an emergency alert to the emergency management system; and (b) at least one server providing a server application at the emergency management system, said server application comprising: (i) a software module receiving the emergency alert from the triggering device; (ii) a software module determining a callback number for the triggering device, wherein the callback number is selected and assigned to the triggering device when the triggering device does not have a phone number; (iii) a software module determining a location of the triggering device, pairing the location with the callback number, and updating a location database accessible by emergency service providers with the paired location and callback number; (iv) a software module identifying an appropriate emergency service provider for responding to the emergency alert based on the location of the triggering device and facilitating an emergency communication session with the appropriate emergency service provider, wherein the callback number enables the emergency communication session with the triggering device to be re-established in case of disconnection.

Emergency Communications

Modern communication devices, for example, smart phones, tablet computers, wearable communication devices, smart sensor devices and/or systems are often equipped with a variety of features for determining location information of the communication device using, for example, GPS, or triangulation with cellular phone towers. Modern communication devices also often include functionality to store data regarding a user of the communication device, for example, health information about the user.

In some embodiments, the communication device (or communication module of the device) communicates with a recipient through one or more data channels. In some embodiments, the recipient is an emergency management system. In some embodiments, the EMS routes communications to an EDC. In further embodiments, the EMS establishes a first data channel with the communication device and a second data channel between the EMS and the EDC, wherein the EMS bridges the first and second data channels to enable the communication device and the EDC to communicate. In some embodiments, the EMS converts data (e.g., data set) from the communication device into a format suitable for the EDC (e.g., analog or digital, audio, SMS, data, etc.) before sending or routing the formatted data to the EDC. In some embodiments, the EMS routes communications to a device associated with a first responder. In some embodiments, the communication device relays additional communications, information, and/or data sent or shared between member devices in the group of devices to the EMS or EDC after a request for assistance has been sent. In further embodiments, the additional information is relayed to the EMS or EDC after the request for assistance has been sent in order to provide current information that is relevant to the request. For example, in some instances, communications between member devices contain information relevant to the emergency (e.g., information that the user of member device who is experiencing a medical emergency suffers from diabetes). Accordingly, in some embodiments, the information is sent autonomously, at request of a user of the communication device, or at request of the recipient (e.g., EMS, EDC, first responder, etc.).

Emergency Management System

FIG. 1A shows a schematic diagram of one embodiment of an emergency flow management system 140 as described herein. In some embodiments, the emergency flow management system 140 is a standalone system that can interact with devices, the emergency management system, and/or dispatch centers. In other embodiments, the emergency flow management system is distributed in various devices and systems.

In some embodiments, the emergency flow management system (EFMS) 140 comprises one or more of an operating system 101, a central processing unit 103, a memory unit 136, a communication element 107, a display or user interface 149 (for an EFMS administrator to maintain and update the system) and an emergency flow program 151 (e.g., server application) including at least one software module 153.

In some embodiments, the emergency flow management system 140 comprises one or more databases 135. In some embodiments, the emergency flow management system 140 comprises an emergency flow database 157 from which emergency flows may be called when there is an emergency trigger. In some embodiments, the emergency flow management system 140 comprises an emergency history database, which enters and maintains a log of emergency incidents, emergencies triggered, and/or emergency flows that have been implemented. In some embodiments, emergency flow management system 140 includes a message bus 146, one or more servers 148 implementing instructions form the emergency flow program 151 (e.g., emergency flow server 128 for generating emergency flows and emergency response server 109 for executing emergency flows) and output services 160.

Figure 1B:
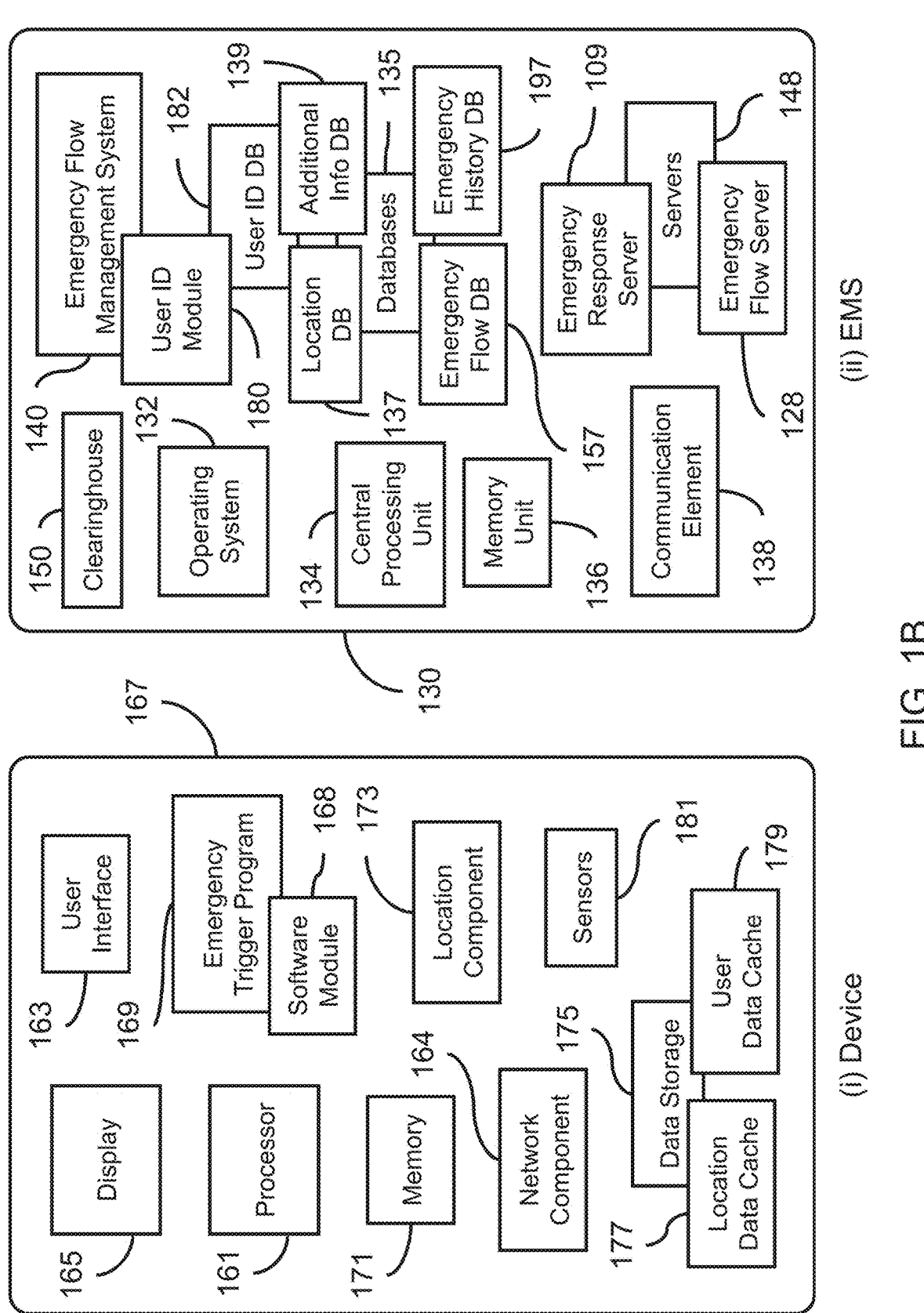

FIG. 1B shows a schematic diagram of one embodiment of a device described herein. In some embodiments, the device 167 is an electronic device such as a triggering device which may be a communication device (e.g., wearable, mobile or cellular phone, computer, laptop, vehicular console, smart car, personal digital assistant, IoT devices, smart home, smart TV, etc.). In some embodiments, the triggering device is a wearable device. In some embodiments, the triggering device is a wireless mobile device or a smartphone. In some embodiments, the triggering device is a combination of devices (e.g., a wearable device communicatively connected to a mobile phone). In some embodiments, the triggering device is a walkie-talkie or a two-way radio. In some embodiments, a user 102 (not shown) is selected from one or more persons who are the primary users of the device 167. When the user 102 is in an emergency situation, the device 167 can be triggered.

In some embodiments, the device 167 comprises at least one processor 161, a memory 171 (e.g., an EPROM memory, a RAM, a solid-state memory), a display 165, a user interface 163, a network component 164 (e.g., an antenna and associated components, Wi-Fi adapters, Bluetooth® adapters, etc.), sensors 181, and an emergency trigger program 169 (e.g., mobile application, server application, computer program, application). In some embodiments, the device is equipped with a location component 173, for example, a global positioning system (GPS), location services, etc. In some embodiments, the device comprises data storage 175. In further embodiments, the device comprises a location data cache 177 and a user data cache 179.

In some embodiments, the device 167 has several components including a display 165 and user interface 173, which allow the user 102 (not shown) to interact with the device 167. In some embodiments, the display 165 is a part of the user interface 163 (e.g., a touchscreen is both a display and provides an interface to accept user interactions). In some embodiments, the user interface 163 includes physical buttons such as the on/off and volume buttons. In some embodiments, the display 165 and/or the user interface 163 comprises a touch screen (e.g., a capacitive touch screen), which is capable of displaying information and receiving user input. In some embodiments, the device 167 comprises hardware components not including a display 165 and a user interface 163, wherein the device functions autonomously without requiring active user guidance or interaction.

In some embodiments, a device 167 includes various accessories that allow additional functionality. In some embodiments, the accessories (not shown) include one or more of the following: microphone (e.g., for user voice interaction), a camera (e.g., for input of gestures commands or pictures from the user), speakers, one or more sensors 181, such as a fingerprint reader or scanner/health or environmental sensors, USB/micro-USB port, headphone jack, a card reader, SIM card slot, and any combination thereof.

In some embodiments, a device 167 autonomously detects emergencies based on data from various sources such as the sensors 181 (sensor data) or sound detection picked up from the microphone or another accessory (e.g., smoke detector). For example, in some embodiments, a device autonomously detects an emergency based on sensor data when sensor readings or values exceed a threshold (e.g., a predefined threshold set by the device software by default, by a user, or by an EMS). In some embodiments, the device 167 obtains relevant data from associated device to trigger the emergency.

In some embodiments, the emergency management system 130 houses components of the emergency flow management system (EFMS). In some embodiments, the emergency management system 130 comprises an application for assembling and/or configuring emergency flow scripts. In some embodiments, the emergency management system 130 comprises an application for managing an emergency response to an emergency alert including execution of an emergency flow script. In some embodiments, the emergency management system 130 comprises one or more of an operating system 132, at least one central processing unit or processor 134, a memory unit 136, a communication element 138, and a server application 151 (e.g., an emergency flow program). In some embodiments, the emergency management system 130 comprises one or more databases 135 (e.g., location database 137, an additional information database 139, emergency flow database 157, user identification database 182, and/or emergency history database 197). In some embodiments, the emergency management system 130 may include one or more servers 148. In some embodiments, an emergency response server 109 executes an emergency flow when an emergency or emergency-like situation is triggered via a user pathway 111. In some embodiments, an emergency flow server 128 allows an administrator to generate and modify emergency flows via an admin pathway 113. In some embodiments, the emergency management system 130 comprises at least one of a location database 137 and an additional information database 139. In some embodiments, the emergency flow program 151 comprises at least one software module 153 for carrying out one or more instructions.

In some embodiments, as depicted by FIG. 1B, the emergency management system 130 includes a user identification module 180 or a user identification database 182. In some embodiments, the user identification module 180 associates user identifiers (e.g., phone numbers or email addresses) with notification procedures or emergency flows and stores with user identifiers in the user identification database 182. In some embodiments, the user identification database 182 is a relational database. In some embodiments, a user identifier is stored in the user identification database 182 and associated with one or more attributes, such as a notification procedure identifier, an emergency flow identifier, an organizational identifier, or another user identifier. For example, in some embodiments, a user identifier for John Doe is his phone number, (123) 456-7890. In this example, John works for Wells Fargo and has a wife and two children. The user identifier for John (phone number (123) 456-7890) may be stored in the user identification database 182 and associated with an organizational identifier for Wells Fargo, as well as user identifiers (e.g., phone numbers) for John's wife and two children. In some embodiments, the user identification module 180 is included in the emergency flow management system 140. In some embodiments, the user identification module 180 is part of an emergency notification system, as described below with respect to FIG. 14. In some embodiments, the user identification module receives submission of a user identifier and definition or selection of a notification procedure to be associated with the user identifier through a registration application. In some embodiments, the registration application is a mobile or web application and provides a graphical user interface for the submission of user identifiers and definition or selection of notification procedures. In some embodiments, the user identification database 182 is a component (e.g., a portion or sub-database) of the emergency flow database 157.

In some embodiments, the emergency management system (EMS) 130 includes a clearinghouse 150 (also referred to as an "Emergency Clearinghouse") for storing and retrieving emergency data. In some embodiments, the clearinghouse 150 includes sub-clearinghouses, such as a location clearinghouse and an additional data clearinghouse. In some embodiments, the location clearinghouse includes a location ingestion module and a location retrieval module (not shown). In some embodiments, the additional data clearinghouse includes an additional data ingestion module and an additional data retrieval module (not shown). In other embodiments, additional data and location data (e.g., emergency data) are stored in one or more databases in a distributed manner. In some embodiments, the emergency data is stored in an external or third-party server that is accessible to the EMS 130. Generally, the clearinghouse 150 functions as an interface that receives and stores emergency data from electronic or communication devices that is then retrieved, transmitted, and/or distributed to recipients (e.g., emergency personnel) before, during, or after emergencies. The clearinghouse can receive emergency data from electronic or communication devices such as mobile phones, wearable devices, laptop or desktop computers, personal assistants, intelligent vehicle systems, home security systems, IoT devices, camera feeds, and other sources. In some embodiments, the emergency data optionally consists of locations or additional data such as medical history, personal information, or contact information. In some embodiments, during an emergency, an emergency service provider (ESP; e.g., a public safety answering point (PSAP)) queries the clearinghouse 150 for emergency data pertaining to an emergency. The clearinghouse 150 then identifies the emergency and any emergency data pertaining to the emergency stored within the clearinghouse 150 and transmits the pertinent emergency data to the requesting ESP. Accordingly, in some embodiments, the clearinghouse 150 acts as a data pipeline for ESPs otherwise without access to emergency data that is critical to most effectively and efficiently responding to an emergency. Location data stored within the clearinghouse 150 can allow emergency responders to arrive at the scene of an emergency faster, and additional data stored within the clearinghouse 150 can allow emergency responders to be better prepared for the emergencies they face.

FIG. 1C shows a schematic diagram of one embodiment of an emergency trigger program 169 installed on a device, such as a triggering device 167. In some embodiments, the emergency trigger program 169 comprises one or more device software modules selected from an emergency trigger module 172 (for saving conditions for triggering an emergency alert), an alert module 125 (for sending the emergency alert), a user data module 174 (for entering and storing user contacts and other preferences and user data), a location determination module 129 (for determining device-based location through GPS, location services, or other methods), a data sharing module 176 (for sharing data from the device with EMS, EFMS, EDC or responders, etc.), a proxy communication module 127 (for making a proxy call on behalf of another), a notification module 178 (for displaying communications from the EFMS to the user), or any combination thereof.

FIG. 1C also shows a schematic diagram of one embodiment of an emergency flow program 151 installed on a server (e.g., a server in an EMS). In some embodiments, the emergency flow program 151 comprises one or more server software modules selected from an administrator's (admin) pathway 113 comprising an emergency flow editor module 170, a flow provisioning module 147, a data module 143, a telephony module 145, or any combination thereof. In some embodiments, the emergency flow editor module 170 comprises a building blocks module 194, an interactive space module 196, or any combination thereof.

In some embodiments, the emergency flow program 151 comprises one or more server software modules selected from a user pathway 111 comprising a response server API module 141, a core module 142, a service actions module 144, a telephony module 145, or any combination thereof. In some embodiments, the response server API module 141 comprises an emergency alert module 191, a flow identification module 192, a flow execution module 193, or any combination thereof.

FIG. 1D shows a schematic diagram of one embodiment of a Public Safety Answering Point (PSAP) system 152 as described herein. In some embodiments, the PSAP system 152 comprises one or more of a display 182, a user interface 186, at least one central processing unit or processor 183, a memory unit 184, a network component 185, an audio system 154 (e.g., microphone, speaker and/or a call-taking headset) and a computer program such as a PSAP Emergency Display Application 158. In some embodiments, the PSAP application 158 comprises one or more software modules 159. In some embodiments, the PSAP system 152 comprises a database of responders 156, such as medical assets, police assets, fire response assets, rescue assets, safety assets, etc.

FIG. 1D also shows a schematic diagram of one embodiment of a PSAP application 158 installed on a PSAP system 152 (e.g., a server in the PSAP system). In some embodiments, the PSAP application 158 comprises one or more software modules. In some embodiments, a software module is a call taking module 195, a PSAP display module 198, a supplemental or updated information module 199 or a combination thereof. In some embodiments, the PSAP application 158 displays the information as depicted in the example shown in FIG. 9B. In some embodiments, the PSAP application 158 displays the information on a map.

Figure 12:
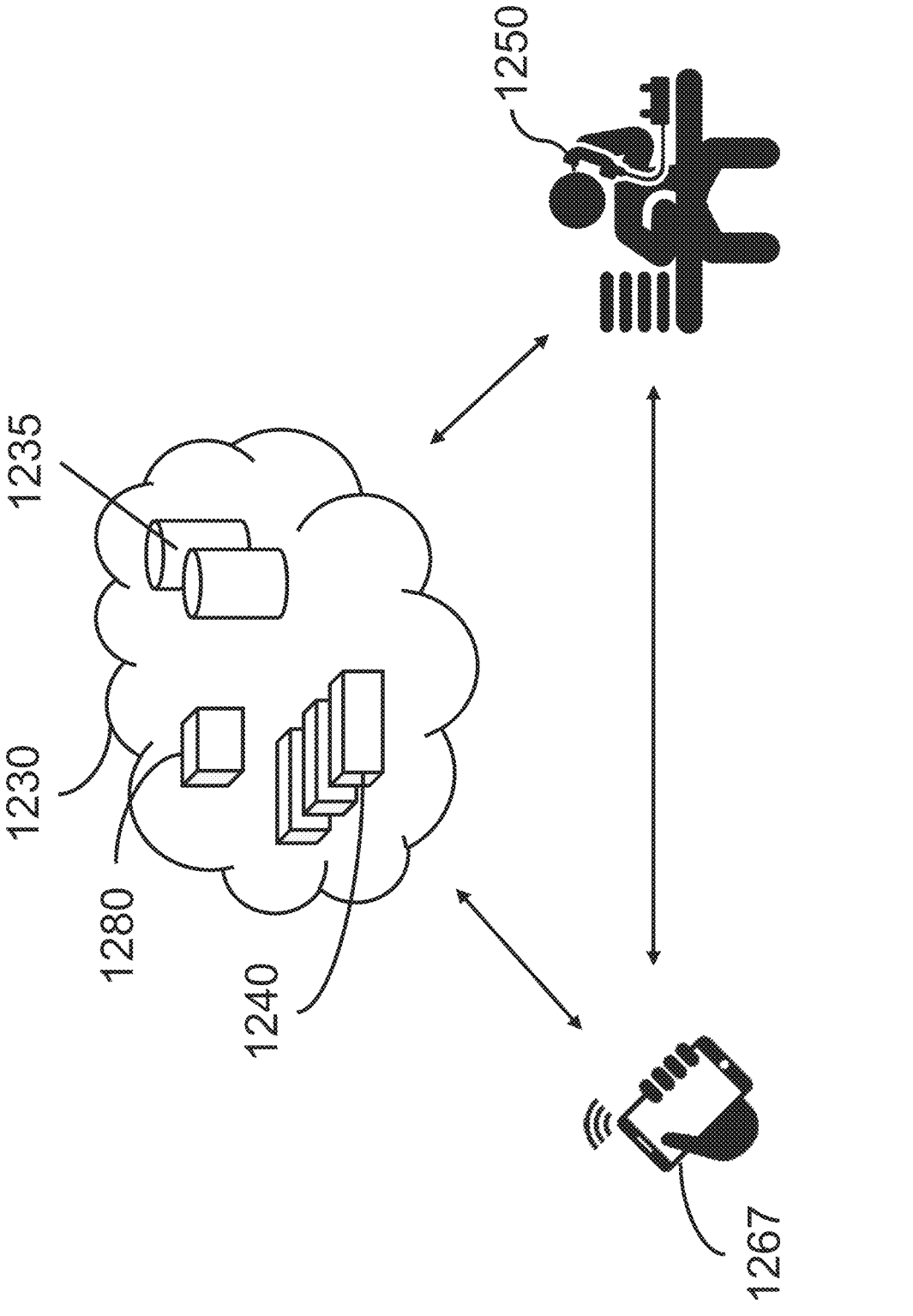
FIG. 12 depicts an embodiment of a system for managing emergency flows and emergency notifications.

In some embodiments, location and supplemental information may be displayed for emergency service providers (e.g., police, fire, medical, etc.) and/or responders on their devices. It is contemplated that responder devices may be installed a responder device program (not shown) similar to PSAP display module 198 as depicted in FIG. 12. In some embodiments, the responder device program displays the emergency location on a map.

Figure 2:
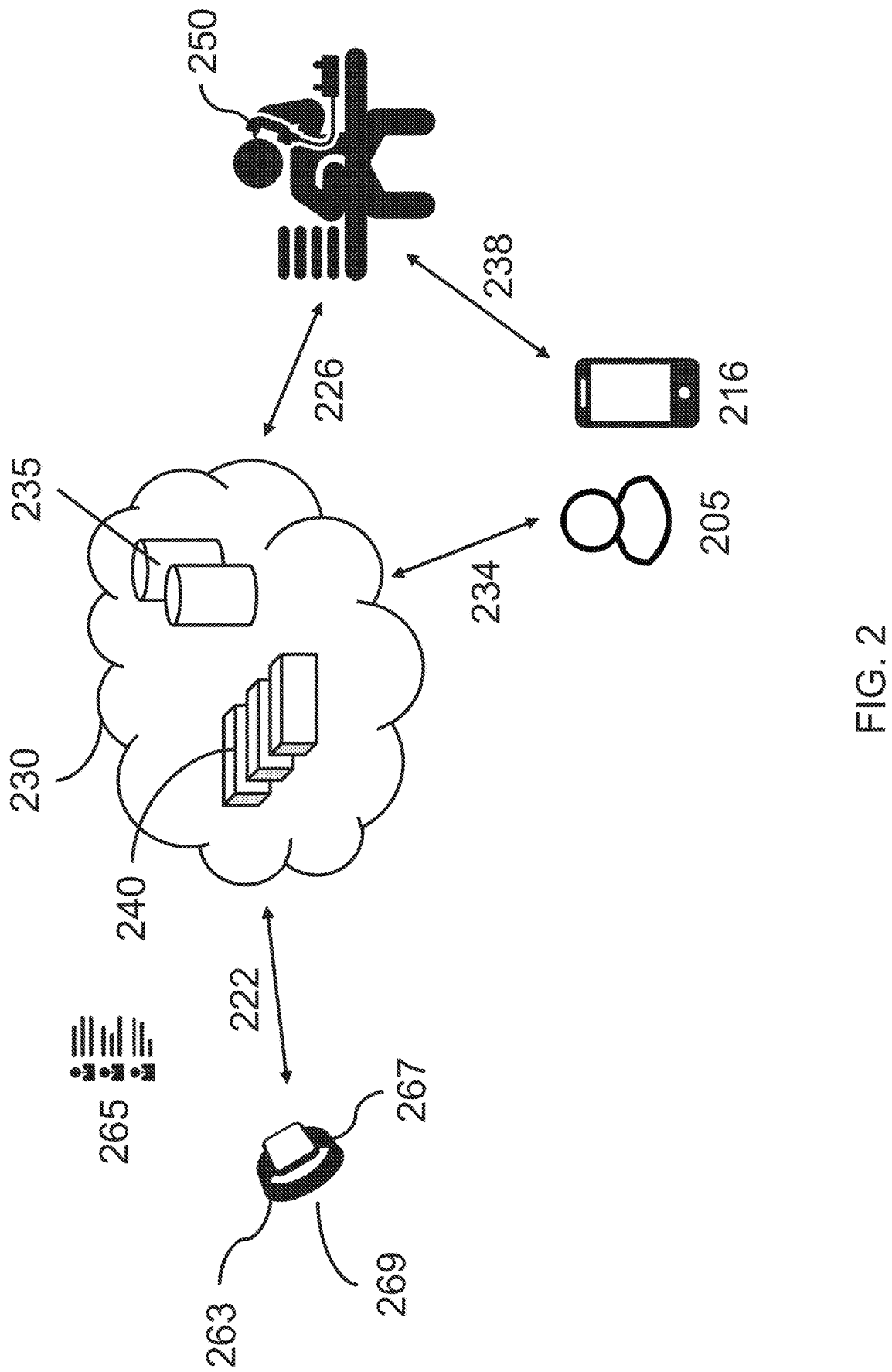
FIG. 2 depicts an embodiment of a system for managing emergency flows.

FIG. 2 also depicts an embodiment of a system for connecting with other devices after an emergency alert has been triggered. As shown, a triggering device 267 sends the emergency alert, which is a request for assistance to respond to an emergency, to the EFMS 240, which is housed in the EMS 230.

In some embodiments, the triggering device 267 includes a network component (e.g., a Wi-Fi antenna) which sends the emergency alert. In some embodiments, the emergency alert is sent via the internet, cellular network, or landline network. For example, the emergency alert may be sent via an API call (such as through the alert module depicted in FIG. 1B) over the internet to the EMS 230, or to a third-party system (e.g., a home security device could contact the security company's system), which is able to contact the EMS via an API call. In some embodiments, the alert is an SMS notification to the EMS or to the third-party system, which will contact the EMS. In some embodiments, when the data signal is strong, data API calls are used because of good data transfer rates for sending the alert quickly. In some embodiments, when the data signal is not good (e.g., low signal-to-noise ratio, high latency), SMS and/or other methods are used as a fallback option for sending the emergency alert.

In some embodiments, the emergency alert is transmitted via a land mobile radio system (LMRS) using custom signals to a third-party system, which optionally connects to the EMS. As an example, the triggering device is a two-way radio in a vehicle, which connects to another two-way radio in its vicinity to send the emergency alert. In certain embodiments, whenever a device or user is able to connect to the EMS (e.g., via an API call), the alert is optionally sent to the EMS.

In some cases, the connectivity (e.g., Wi-Fi signals) is weak or the pathways are not secure, and the emergency alert is transmitted using another communication device (e.g., a mobile phone) or a routing device (e.g., Wi-Fi router). In some embodiments, the triggering device 267 is not Internet-enabled and sends the alert through designated pathways or to designated devices (e.g., via a mobile phone connected by Bluetooth to device 267). In some embodiments, an IoT device sends the alert to a controlling or master device (e.g., a home console that connects to smoke alarms). In another example of this embodiment, the triggering device 267 is a physical "panic" button (e.g., a button under the desk of a bank teller) that is discreetly pressed in the event of a possible emergency situation and sends an emergency alert to a controlling or master device (e.g., a bank's central communication system). In some embodiments, the controlling or master device forwards the alert to an emergency service such as an EMS or EDC such as according to an emergency flow script. In some embodiments, an IoT device includes sensors that detect environmental conditions, and another device (e.g., a digital assistant, wearable, phone, etc.) evaluates if the sensed value indicates an emergency situation or likely emergency situation and sends an emergency alert. In some embodiments, the IoT devices or digital assistants on the ground detect a voice command or sense data, and the processing is done at a remote location, such as on the cloud.

In some embodiments, an emergency is detected when sensor values exceed a certain threshold or fall outside an acceptable range. In some embodiments, an emergency is detected when sensor values exceed a certain threshold (that is optionally user configurable or preset) such as for a temperature sensor, a smoke detector, a carbon dioxide detector, or a carbon monoxide detector.

In some embodiments, the triggering device 267 includes a computer program 269 for triggering the emergency flow and sending the alert. The computer program 269 pre-installed on the device or has been loaded and installed by the user (e.g., user 202, not shown). In some embodiments, the user 202 went through a setup or registration process for the device 267, where he or she has provided user data such as emergency contacts (e.g., phone numbers, email addresses, messaging IDs), user information, location (e.g., a physical address of the location of the device 267), etc. In some embodiments, user data, location data, emergency data, etc., is saved in data cache or storage in the device 267. In other embodiments, the data is saved in one or more databases 235 in the EMS, in third-party servers or in cloud-based systems. In some embodiments, the data is protected by password protection, authentication protocols for transmission, encryption, use of secured pathways, and other methods for limiting the risk of security breaches. In some embodiments, the computer program 269 includes an emergency trigger script that has been integrated into the computer program 269 and provides instructions for generating and transmitting the emergency alert, as described below. The emergency trigger script may be integrated into the computer program 269 by default or integrated into the computer program 269 as an add-on. In some embodiments, the emergency trigger script is provided by the EMS 230, such as through a web interface. In some embodiments, the emergency trigger script is an API client, wherein the API client is a set of code configured to generate a request (e.g., an API call) against an API (application programming interface).

In some embodiments, the emergency is triggered by user input such as the user interacting with the user interface 263 of the triggering device 267. In some embodiments, the user presses one or more hard or soft buttons on the user interface 263. However, other types of user interactions such as touch, tap, pattern of touches, gesture, and voice-activation are also contemplated. For example, a user in a taxicab who suspects that the cab driver does not know where he or she is going, or is intoxicated, or is attempting to abduct the user, the user may select a hard or soft button (e.g., a panic button) or a pattern of presses on the user's cell phone to discreetly trigger an emergency alert.

In some embodiments, the triggering device 267 autonomously detects emergency situations or likely emergency situations. In some embodiments, the triggering device 267 sends an alert based on autonomously detected emergencies using one or more sensors (not shown) such as, for example, a smoke alarm, thermometer, or carbon monoxide sensor in a building. In some embodiments, the sensors sense one or more environmental or health parameters. In some embodiments, the environmental parameter is selected from the group consisting of: light, motion, temperature, pressure, humidity, vibration, magnetic field, sound, smoke, carbon monoxide, radiation, hazardous chemicals, acid, base, reactive compounds, volatile organic compounds, and smog. In some embodiments, health parameters include heart rate, pulse, electric signals from the heart, blood oxygen levels, blood pressure, blood sugar level, and other health parameters. In some embodiments, the triggering device 267 is an Internet of Things (IoT) device such as a home thermostat, vehicle console, a pacemaker implant, etc. As used herein, IoT refers to the ever-growing network of physical devices, buildings, vehicles, and other objects that feature an IP address for internet network connectivity for exchanging data. In many cases, IoT devices are embedded with electronics, software, sensors, network connectivity, or a combination thereof. In some embodiments, IoT devices feature an IP address for internet connectivity. In addition to an IP address, an IoT device is optionally associated with a MAC address or an SSID. It is understood that, IoT devices are connected with one or more other devices through Bluetooth®, Wi-Fi, or other wired and/or wireless technologies which allow for transfer of data.

In some embodiments, the IoT device is in a network of sensors. As an example, IoT networks, wireless sensor networks (WSN) or wireless sensor and actuator networks (WSAN) monitor environmental parameters such as temperature, pressure, sound, etc., using a network of sensors or devices. When one sensor or device detects a sensed value outside of the identified range indicating a likely emergency, it will pass the data to other devices in the network. In some embodiments, the sensor network is a Wi-Fi, WiMAX, or LTE MESH network. In some embodiments, the sensor or IoT devices form nodes in the sensor network. In some embodiments, the sensor network includes a central node for controlling the network. In some embodiments, the sensor network has a distributed architecture to reduce the impact of a failed node.

In some embodiments, an IoT device comprises at least one of the following components including a sensing component (e.g., thermocouple), a networking component (a radio transceiver with an antenna or connection for an external antenna), a microcontroller, an electronic circuit connected to the sensing component, and an energy source. In some embodiments, the sensor network is controlled by a center console (e.g., a smart home console).

In some embodiments, the triggering device 267 is a communication device such as a mobile phone, a computer, a wearable device (e.g., a smart watch), a digital assistant, etc. In some embodiments, when the triggering device 267 is a mobile phone, the emergency alert is sent via a cellular connection, if it is available. In some embodiments, after the alert is sent to the EFMS 240 via communication link 222, the EFMS 230 initiates an emergency flow script. As a part of the emergency flow, an emergency call along two-way communication link 226 may be established (e.g., via path 702, 704A, 708 shown in FIG. 7). In some cases, communication link 222 is a data link, which optionally supports a data call such as VoIP. In some embodiments, link 222 is used for sending data such as user data, location data, emergency data, text, images, and video from the triggering device 267. In some embodiments, communication link 222 is established via landline, cellular network or the Internet. In some embodiments, the communication link 222 is through VoIP with both voice and data transmitted in the same path (e.g., in the SIP signaling, as headers or in multi-part messages). In some embodiments, the communication link 222 is an analog voice call over landline or cellular network and a data link for transferring data via Wi-Fi, cellular data, etc. Generally, data links are preferred for transmission of both voice and data whenever they are available, and the signal strength is good. In certain cases, the communication link is sent through NG911 systems, where the data is optionally sent through SIP signaling. In some embodiments, updated data (e.g., current location data) may be transmitted via link 222 and provided to the EDC 250 via link 226.

In some embodiments, the EMS 230 includes one or more databases 235 housed in one or more servers in the same or in a remote location. In some embodiments, location database 237 (not shown) houses location data regarding the location of the emergency. In some embodiments, user database 239 (not shown) houses user data and/or emergency data (such as an emergency contact list 265). In other embodiments, the location, user, and/or emergency data (such as an emergency contact list 265) are saved on a data cache 215 (not shown) in the triggering device 267 or in data storage in other devices such as mobile phone 206, computer 246, or mobile phone 216, etc. In other embodiments, the data is saved online in one or more remote servers or cloud-based systems. The location data and additional data (user data and emergency data) may be provisioned in the databases 235, 239 (not shown), or a third-party server, etc. and sent to the EDC 250 after a query has been received. In some embodiments with a standalone EFMS 240 (as depicted in FIG. 1A), databases 135 may be housed within the EFMS 240.

In some embodiments, the emergency contact list 265 is entered by the user 202 at the time of registration or installation of the computer program 269 or at another time. In some embodiments, the emergency contact list 265 is a list of phone numbers, email addresses, IP addresses, MAC addresses, or any combination thereof. In some embodiments, computing devices which are not associated with a phone number (such as computer 246, not shown) are identified by an IP address, MAC address, URLs or SSIDs.

Figure 7:
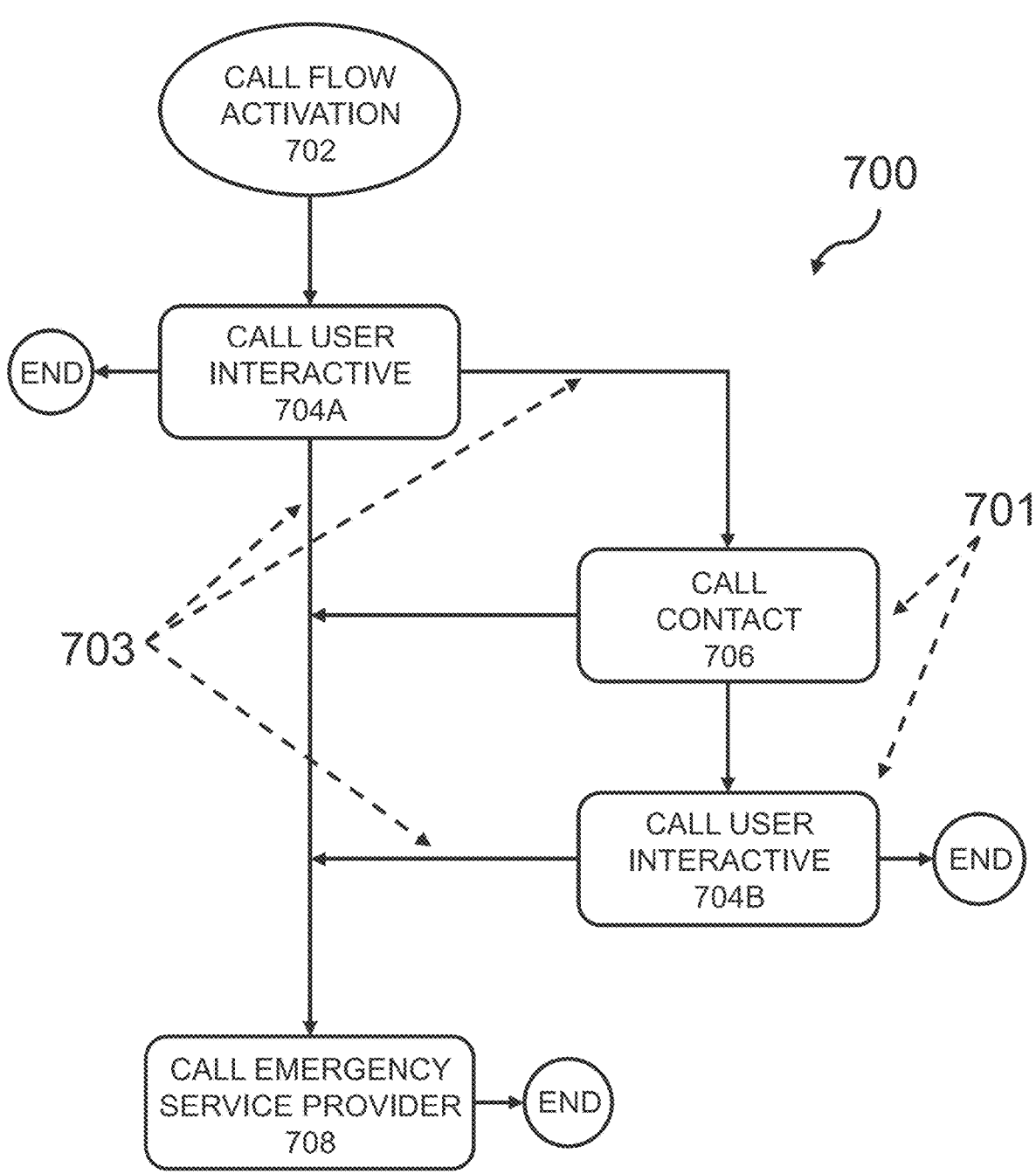
FIG. 7 illustrates an embodiment of an emergency flow.
Figure 8:
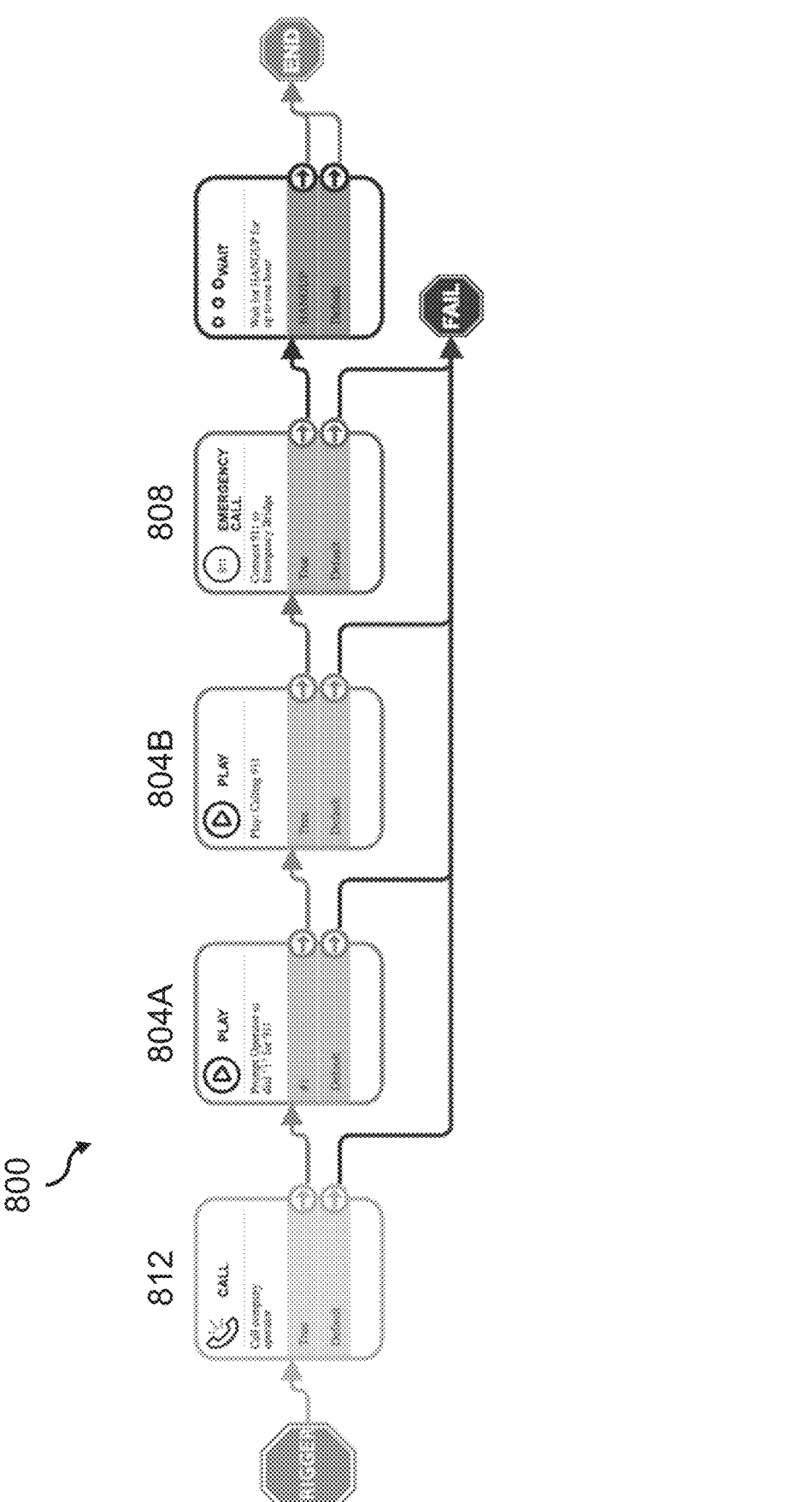
FIG. 8 illustrates an embodiment of an emergency flow.

In some embodiments, the EFMS 240 attempts to connect to a user using one or more communication links (e.g., 234) when the user has not answered the call (NA response). In some emergency flows, the EFMS 240 sends the alert indirectly to an EDC 250 (e.g., a PSAP). In some emergency flows, the EFMS 240 sends the alert to a third-party (not associated with user 202 (e.g., a corporate representative of an organization, etc.). In some emergency flows, the EFMS 240 attempts to connect to user 202 via devices associated with user 202's account such as communication device 206 (not shown) or computer 246 (not shown). In some emergency flows, the EFMS 240 optionally connects to user 205 (and other users designated as emergency contacts or frequently called contacts, etc.) via communication device 216. In some embodiments, a direct connection 238 between device 216 and dispatcher 250 is established or the user 205 is connected via the EFMS 240 via links 222 and 226. However, the EFMS 240 may send the alert to any number of recipients, separately or simultaneously, in any order (e.g., according to any emergency flow). Examples of flows are depicted in FIGS. 7 & 8.

In another configuration of an emergency flow, a mobile device (e.g., a wearable 267) is communicatively connected to a communication device (e.g., a mobile phone 206, not shown) via Bluetooth®, Wi-Fi, or other wireless communication methods. In some embodiments, the communication device 206 provides location and/or communication capabilities (e.g., whether the device is SMS, email, and/or data enabled). In some embodiments, the mobile device is Internet-enabled & Location-enabled, allowing the user to send the emergency alert triggering an emergency flow in the EFMS 240. Subsequently, the wearable device 267 optionally participates in an emergency session with EDC 250 via the communication device 206 through an indirect connection.

In some emergency flows, the communication device 206 comprises an application 208 (not shown), which may include some modules from emergency trigger program 269 on wearable 267. In some embodiments, the emergency trigger program 269 on wearable 267 is distributed between the two devices (wearable 267 and communication device 206). This provides an advantage in allowing the wearable device that is light-weight with limited functions to be used in combination with the information and capabilities of the communication device 206 for responding to an emergency. Various hardware and software capabilities of the wearable devices are contemplated.

In some scenarios, a user 202 configures emergency contacts (name, phone number), validates phone numbers, and enables the emergency flow from the communication device 206 while only sensor readings are obtained from the wearable 267 to trigger the emergency. In other embodiments, the application 208 receives an emergency alert from a device over Bluetooth. In some embodiments, the application 208 sends an emergency alert with a list of two contacts and emergency location (as reported by the phone) to the EFMS 240. The EFMS 240 may then execute an emergency flow comprising: first call contact and prompt contact to confirm emergency by pressing 1; if the call is not answered or confirmed, repeat with second contact; if someone answered and confirmed emergency, connect call to appropriate PSAP based on the provided location; and wherein each contact hears a descriptive TTS message upon answering the call.

Figure 3:
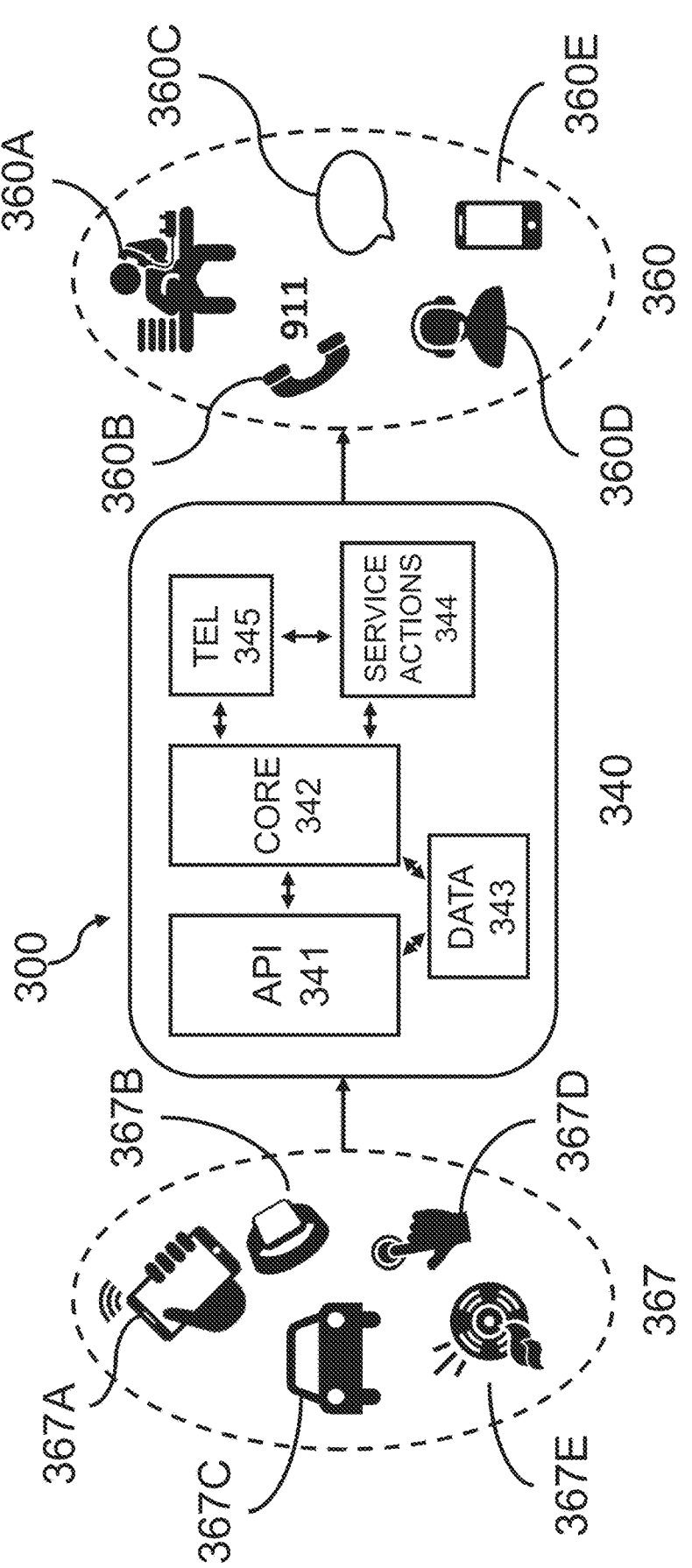
FIG. 3 depicts an embodiment of a system for managing emergency flows.

FIG. 3 depicts an embodiment of a system 300 including triggering devices 367, an Emergency Flow Management System (EFMS) 340, and output services 360. As previously mentioned, one advantage provided by the systems, servers, devices, and methods described herein is the ability to facilitate emergency response communications across devices, services, and systems managed by different parties. As will be discussed in further detail, in some embodiments, the EFMS 340 is capable of being reconfigured and customized by any individual or organization (e.g., a smartphone application developer or a wearable device manufacturer) such that the EFMS 340 can be seamlessly integrated into the devices, services, and/or systems provided by the individual or organization (hereinafter, "administrator") according to the individual or organization's specific needs. Accordingly, as shown in this embodiment, the system 300 is implemented with a variety of triggering devices 367 and a variety of output services 360.

In some embodiments, a triggering device 367 is activated and delivers an emergency alert to the EFMS 340. In some embodiments, the triggering device 367 is an electronic device associated with a user, such as a smartphone 367A (e.g., an iPhone), a wearable device 367B (e.g., an Apple Watch or FitBit tracker), or a smart home IoT device 367E (e.g., an Amazon Echo or a Nest smoke and carbon monoxide alarm). In some embodiments, the triggering device is a vehicle 367C such as a car or truck. In one example of this embodiment, the vehicle 367C includes an intelligent vehicle system capable of detecting when a component of the vehicle 367C has failed or when the vehicle 367C has been in an accident or otherwise compromised. In another example of this embodiment, the vehicle 367C includes or is otherwise communicatively coupled to a vehicle safety service that can connect the passengers of a vehicle that has been compromised with a first responder or a customer service agent (e.g., OnStar or AAA). In this example, when the vehicle 367C becomes compromised, the intelligent vehicle safety system can deliver an emergency alert to the vehicle safety service, which may in turn attempt to contact passengers of the vehicle 367C or send a corresponding emergency alert to another recipient (e.g., to the EFMS 340). In some embodiments, the triggering device comprises a software or hardware panic button 367D. As an example, the triggering device 367 is a physical button installed under the steering wheel of a taxi cab, so that a taxi driver who feels threatened by a passenger (e.g., a passenger with a weapon or a passenger who is being verbally abusive) may discreetly call for help. Similarly, in another example, the triggering device 367 is a digital button found in a graphical user interface of a ride sharing smartphone application (e.g., the Uber app) that a passenger may select to discreetly call for help if the passenger feels threatened by a driver of a ride sharing vehicle.

In some embodiments, the triggering device 367 is triggered via user input or automatic detection. For example, in embodiments in which the triggering device is a wearable device 367B (e.g., an Apple Watch), the wearable device 367B comprises at least one sensor such as a gyroscope, an accelerometer, and/or a heart rate monitor. In this example, if the heart rate monitor detects that the heartrate of the user is abnormal (e.g., higher or lower than average for the user, or arrhythmic), and the gyroscope and/or accelerometer detect a sudden, downward motion of the wearable device 367B (e.g., acceleration exceeds a threshold), the wearable device 367B determines that the user has potentially fallen due to a cardiac emergency and may need assistance. In response to such a determination, the wearable device 367B automatically delivers an emergency alert to the EFMS 340 without input from the user. Alternatively, in some embodiments, if a user of a wearable device 367B feels that they are experiencing or soon to experience a medical emergency, the user optionally selects a button on the wearable device 367B to manually deliver an emergency alert to the EFMS 340. Similarly, in some embodiments, a user of a smartphone 367A or wearable device 367B who is under assault or feels they will soon be under assault is able to select a button on the smartphone 367A or wearable device 367B to manually deliver an emergency alert to the EFMS 340. In some embodiments, the emergency alert is delivered to the EFMS 340 by an electronic device communicatively coupled to the triggering device. For example, in some embodiments, a wearable device coupled to a cell phone via Bluetooth generates an emergency alert that is then delivered to the EFMS by the cell phone via Wi-Fi or cellular data.

In another example, in an embodiment in which the triggering device 367 is a smart home device 367E, the smart home device optionally includes at least one sensor such as a smoke detector or carbon monoxide detector. In this example, when the smart home device 367E detects a concentration of carbon monoxide that exceeds a threshold concentration, the smart home device 367E determines that the user and or house of the user is in a state of emergency, and automatically deliver an emergency alert to the EFMS 340. In another example, when a user is experiencing an emergency, the user optionally manually prompts the smart home device 367E to deliver an emergency alert to the EFMS 340 by pressing a button on the smart home device 367E or by interacting with the smart home device 367E non-physically, such as by verbally communicating with the smart home device 367E (e.g., by saying aloud, "[name of smart home device 367E], call 9-1-1"). In another example of this embodiment, the smart home device 367B includes a video camera or optical sensor. When the video camera (and accompanying software and/or processor) or optical sensor determines the presence of an unauthorized person inside or otherwise proximal to the house of the user, in some embodiments, the smart home device 367E automatically delivers an emergency alert to the EFMS 340. Alternatively, the triggering device 367 is a non-optical device or application and is activated manually or automatically in any fashion.

In some embodiments, the EFMS 340 is configured to receive an emergency alert from a triggering device 367 and execute an emergency flow, as will be discussed in further detail below. In some embodiments, as depicted in FIG. 3, the EFMS 340 includes an API module 341, a core module 342, a data module 343, a service actions module 344, and a telephony module 345. In some embodiments, these modules interact to execute premade or customized emergency flows. In some embodiments, the emergency flows are executed according to various configurations of emergency flow building blocks, wherein the emergency flow building blocks each represent an emergency flow script that performs at least one function. In some embodiments, the various configurations of emergency flow building blocks are labeled and identified with unique emergency flow identification numbers (hereinafter, "emergency flow ID"). In some embodiments, an emergency alert delivered to the EFMS 340 from a triggering device 367 is accompanied by an emergency flow ID, which is recognized by the API module 341 to point to an associated emergency flow for execution by the EFMS 340.

In some embodiments, the EFMS 340 is configured to receive an emergency alert delivered from a triggering device 367 at the API module 341. In some embodiments, the emergency alert delivered from the triggering device 367 includes an emergency flow ID or a user identifier, such as a phone number or email address. In some embodiments, the emergency alert delivered from the triggering device 367 includes additional data. For example, in some embodiments, the emergency alert delivered from the triggering device 367 includes location data, such as a longitude and latitude coordinate pair, or a street address. The location data may include information obtained from one or more sources such as, for example, a location component (such as a GPS, not shown), Wi-Fi access points information using a Wi-Fi antenna (not shown), Bluetooth beacon data using a Bluetooth antenna (not shown), cellular trilateration using a cellular transmitter capable of supporting various technologies such as CDMA, LTE, or WiMAX, and barometric pressure using a pressure sensor to estimate altitude. In some embodiments, the emergency alert delivered from the triggering device 367 includes user data associated with a user of the triggering device 367. For example, the emergency alert delivered from the triggering device 367 is optionally accompanied by medical history data associated with a user that the user has stored on a smartphone 367A. In another example, the emergency alert delivered from the triggering device 367 is accompanied by heart rate data obtained by a wearable device 367B before or during the time that the emergency alert was delivered. In another example, the emergency alert delivered by the triggering device 367 is accompanied by driving data determined by an intelligent vehicle system integrated into a vehicle 367C, such as the speed at which the vehicle was moving before or during the time that the emergency alert was delivered.

Once the EFMS 340 receives an emergency alert (e.g., an API call generated by an emergency trigger script integrated into a computer program on a triggering device), the EFMS 340 then executes an emergency flow associated with the emergency alert (e.g., an emergency flow associated with the emergency trigger script or any data included in the emergency alert). In some embodiments, the EFMS 340 employs the API module 341 to process the emergency alert and any accompanying data (e.g., emergency flow ID, location data, or user data) and activate the core module 342 to execute one or more emergency flows. In some embodiments, before activating the core module 342, the API module must access an emergency flow database (e.g., data module 343) to identify one or more emergency flows for the EFMS 340 to execute. In some embodiments, an emergency flow script (as described above) that generates an emergency alert is directly associated with one or more emergency flows. In some embodiments, the API module 341 determines which emergency flow for the EFMS 340 to execute based on a user identifier included in the emergency alert. In some embodiments, the API module 341 determines which emergency flow for the EFMS 340 to execute based on an emergency flow ID included with the emergency alert delivered from the triggering device 367. In some embodiments, the API module 341 determines which emergency flow for the EFMS 340 to execute based on an emergency flow ID (also referred to as an emergency call flow identifier or flow identifier) and additional data included with the emergency alert. For example, in some embodiments, an emergency flow ID corresponds to multiple emergency flows (e.g., emergency flow A, emergency flow B, emergency flow C, etc.) which are optionally executed preferentially based on the assessed situation of a user. In one example of this embodiment, an emergency alert is delivered to the EFMS 340 from a wearable device 367B. In this example, the emergency alert includes emergency flow ID #123 and additional data gathered by a heart rate monitor, a gyroscope, and an accelerometer. In this example, emergency flow ID #123 corresponds to two emergency flows, emergency flow A, which includes contacting a nurse and calling 9-1-1, and emergency flow B, which includes contacting a nurse but does not include calling 9-1-1. When the additional data included in the emergency alert indicates that a user of the wearable device has merely fallen, the API module 341 optionally executes emergency flow B. However, if the additional data included in the emergency alert indicates that the user has fallen due to a cardiac emergency, the API module 341 optionally executes emergency flow A instead. In some embodiments, emergency flow A and emergency flow B are considered and/or referred to as complete definitions of an emergency flow (e.g., emergency flow ID #123 represents a template of an emergency flow that requires one or more additional inputs to complete the definition of the emergency flow; emergency flow A and emergency flow B represent complete definitions of the emergency flow corresponding to emergency flow ID #123).

In some embodiments, a particular emergency flow ID only corresponds to one particular emergency flow. In some embodiments, the triggering device 367 selects between multiple emergency flow IDs based on data collected by the triggering device 367 or provided by a user. In some other embodiments, in which an emergency alert does not include an emergency flow ID, the API module 341 selects an emergency flow to execute based on alternative factors, such as the type or brand of triggering device 367, a location of the triggering device, a weather forecast at the location of the triggering device 367, or other parameters. In some embodiments, the flow identifier (e.g., an emergency flow ID) is a flow identification number included in the emergency alert. In some embodiments, the flow identifier is included in the header, footer, message, metadata, or a combination thereof in the emergency alert. In some embodiments, the flow identifier is not a flow identification number and takes another form (e.g., device type, device name, application name, application publisher, etc.). In some embodiments, an emergency alert includes an emergency flow ID and/or an identifier of the organization (hereinafter "organization ID" or "organization identifier") that created the associated emergency flow. For example, in some embodiments, the emergency alert is an HTTP POST that includes an emergency flow ID in the payload of the HTTP POST and an organization ID associated with the organization that created the associated emergency flow in the header of the HTTP POST, as shown below. In some embodiments, after receiving an emergency alert, the API module 341 first identifies an organization using an organization ID included in the emergency alert and then references the emergency flow database (e.g., data module 343) to determine one or more emergency flows created by the organization. In some embodiments, the API module 341 then uses an emergency flow ID included in the emergency alert to select a corresponding emergency flow from the one or more emergency flows created by the organization to execute. In some embodiments, the emergency flow ID is a name of the corresponding emergency flow selected by the organization that created the emergency flow. In some embodiments, the API module 341 selects an emergency flow in response to an emergency alert from a triggering device 367 through any appropriate means regardless of the form of the flow identifier. In some embodiments, the emergency alert does not include a flow identifier. In some embodiments, the API module 341 selects a default emergency flow in response to an emergency alert that includes no additional data (e.g., no flow identifier, device location, sensor data, etc.).

An embodiment of a template of an emergency alert is shown below in the form of an HTTP POST:

```
url = "https://api-sandbox.rapidsos.com/v1/rem/trigger"
payload = [
    "callflow": "company_contacts",
    "variables": [
        "location": [
            "latitude": "",
            "longitude": "",
            "uncertainty": ""
        ],
        "user": [
            "full name": "",
            "phone_number": ""
        ],
        "contacts": [
            [
                "full name": "",
                "phone_number": "" ]
        ],
    ]
```

In the foregoing template of an emergency alert, "company_contacts" is both the emergency flow ID and the name of the associated emergency flow as selected or inputted by the administrator that created the emergency flow. In this example, "location"; "user"; "contacts"; and "company" are variables required by the "company_contacts" emergency call flow. "Latitude"; "longitude"; and "uncertainty" are components of the "location" variable; "full_name"; and "phone_number" are components of the "user" variable; and "full_name" and "phone_number" are components of the "contacts" variable. In some embodiments, a value is provided in the emergency alert for each of the variables or components of a variable. In some embodiments, as described above, all variables, and components therein, defined or required by an emergency call flow are necessary for the emergency call flow to be executed by the API module 341.

In some embodiments, emergency flows are stored within a data module 343 located within or otherwise communicatively coupled to the EFMS 340. In some embodiments, the API module 341 consults the data module to determine an emergency flow to execute in response to the emergency alert. For example, in some embodiments, the emergency alert includes an emergency flow ID that corresponds to one or more emergency flows stored within the data module 343. The API module 341 then optionally references the data module 343 for an emergency flow corresponding to the emergency flow ID. In some embodiments, after receiving an emergency alert including an emergency flow ID and any accompanying additional data, the API module 341 references the data module 343 to find an emergency flow corresponding to the emergency flow ID. In some embodiments, the API module 341 then processes the emergency flow, determines any necessary inputs for the emergency flow, and verifies that the additional information included in the emergency alert includes the necessary inputs for the emergency flow. For example, a particular emergency flow may additionally require a measurement of a user's heart rate as a necessary input for the emergency flow. In this example, if the emergency alert does not include a user's heart rate (e.g., the emergency alert includes an emergency flow ID corresponding to the particular emergency flow and a location, but is missing a user's heart rate), the EFMS 340 may not be able to execute the particular emergency flow. In response, the EFMS 340 optionally declines the emergency alert or delivers a notification to the triggering device 367 informing the user that the emergency alert was incomplete. In this embodiment, when the API module 341 determines that the emergency alert does include the necessary inputs for the emergency flow, the API module 341 compiles the necessary inputs received from the emergency alert with the emergency flow to create a complete definition of the emergency flow (as discussed above) and delivers the complete definition of the emergency flow to the core module 342.

In some embodiments, the data module 343 additionally includes an emergency flow history database that records individual instances of particular emergency flow sessions. For example, in some embodiments, after the API module 341 receives an emergency alert including an emergency flow ID and activates the core module 342, the core module 342 records an entry in the emergency flow history database for the particular emergency flow session of the particular emergency flow being executed. In some embodiments, the entry is given a unique session ID or an identifier from the emergency flow history database. In some embodiments, the core module 342 records an entry in the emergency flow history database for every emergency flow session. In some embodiments, the core module 342 records an entry in the emergency flow history database for each emergency alert received by the API module 341. In some embodiments, the core module 342 records an entry in the emergency flow history database for each emergency alert received by the API module 341 that includes an emergency flow ID. In some embodiments, the core module 342 records an entry in the emergency flow history database for a particular emergency flow session of a particular emergency flow after the particular emergency flow has been fully executed. In some embodiments, the core module 342 updates an entry in the emergency flow history database for a particular emergency flow session of a particular emergency flow after each step (e.g., after each individual emergency flow building block) of the execution of the particular emergency flow, or after some steps of the execution of the particular emergency flow.

In some embodiments, after an emergency flow is executed by the EFMS 340, the core module 342 updates an entry in the emergency flow history database for a particular emergency flow session of a particular emergency flow to include additional data about the particular emergency flow session. For example, in some embodiments, the core module 342 records in the emergency flow history database data including, but not limited to: which emergency contacts were contacted, and/or which emergency contacts responded, if an EDC was contacted, if contacting an EDC was successful or unsuccessful, if a party opted to contact an EDC, or which party opted to contact an EDC. In some embodiments, after the execution of a particular emergency flow, the core module 342 updates an entry in the emergency flow history database for the particular emergency flow session of the particular emergency flow to reflect that the particular emergency flow session was successful or unsuccessful. In some embodiments, the criteria for success of a particular emergency flow are predetermined by the administrator that created the particular emergency flow. In some embodiments, the criteria for success of a particular emergency flow are predetermined by the EFMS 340.

The EFMS 340 is capable of executing many different permutations of emergency flows as disclosed herein. In some embodiments, emergency flows are defined by various emergency flow building blocks, each emergency flow building block defined by a script, written in a programming language, which contains instructions for executing various functions relating to an emergency flow. In some embodiments, the various functions are executed by the telephony module 345 and the service actions module 344, as depicted in FIG. 3.

In some embodiments, the EFMS 340 employs the service actions module 344 to execute various emergency flow building blocks that require transmitting data and communications to and from various users and output services 360 using various mediums and communication modes. For example, in some embodiments, an emergency flow includes an emergency flow building block with instructions for delivering a text message through short message service (SMS) or multimedia messaging service (MMS) or text message 360C to an account associated with a user, which is optionally executed by the service actions module 344. In another example, in some embodiments, an emergency call block requires the EFMS 340 to deliver a message to an account associated with a user through an internet enabled communication service 360E (e.g., WhatsApp, Slack, or Facebook Messenger) via an API call or HTTP post, which is optionally executed by the service actions module 344. In some embodiments, associated contacts are also contacted by a voice call (PSTN or data or VoIP call). In some embodiments, associated contacts are called, and a TTS message is played. In yet another example, in some embodiments, an emergency flow includes an emergency flow building block with instructions for delivering an audio adaptation of a text message (e.g., text-to-speech message) to an account associated with a user, which is optionally executed by the service action module 344. In yet another example, an emergency flow may include an emergency flow building block with instructions for querying a triggering device 367 or an electronic device associated with a user for a location associated with a user, which is optionally executed by the service actions module 344.

In some embodiments, the service actions module 344 includes a location service (e.g., a location API) that can be employed by the API module 341 to send or retrieve locations to and from a location database. In some embodiments, the location database is external to the EFMS. For example, in some embodiments, an emergency alert includes a location (e.g., a location generated by the triggering device or an electronic device associated with the triggering device). After receiving the emergency alert, the API module 341 can employ the location service to transmit the location included in the emergency alert to an external location database. In some embodiments, the service actions module 344 includes a voice command service that the API module 341 can employ during emergency flows to receive oral input from users. For example, in some embodiments, an emergency flow building block, such as an interactive call block, as described below, may accept voice inputs using the voice command service.

In some embodiments, the telephony module 345 is constructed using hardware components such as voice over internet protocol (VoIP) gateways and open source communication software. In some embodiments, the EFMS 340 employs the telephony module 345 to execute various emergency flow building blocks requiring communication links. For example, in some embodiments, an emergency flow includes a building block with instructions for delivering an interactive phone call to a user (e.g., an automated phone call that accepts inputs from the recipient of the call). In some embodiments, while executing the emergency flow, the core module 342 employs the telephony module 345 to execute the interactive call. In another example, in some embodiments, an emergency flow includes a building block with instructions for delivering a call to an output service 360 (e.g., an emergency dispatch center 360A, specifically a 911 call center or PSAP 360B, or a customer service representative 360D), which is optionally executed by the telephony module 345.

Figure 4:
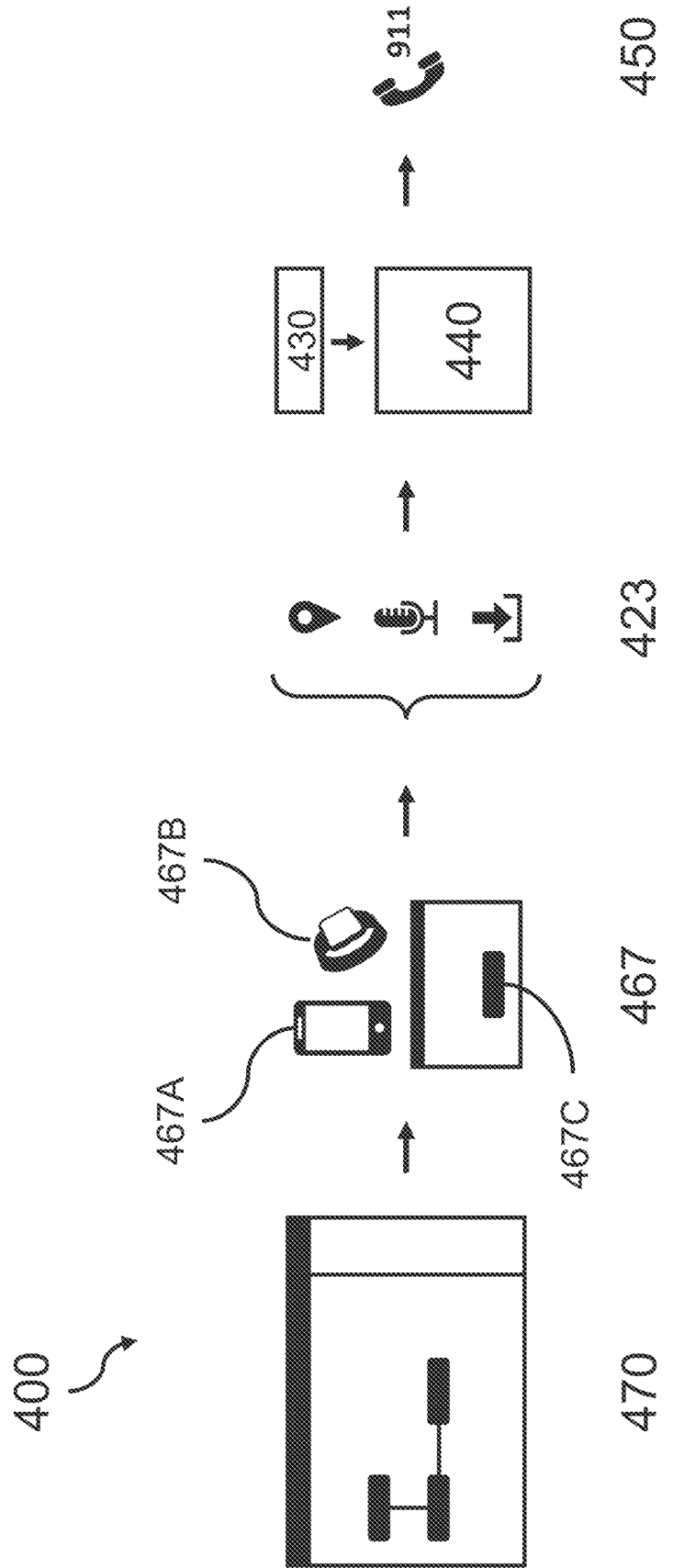
FIG. 4 depicts an embodiment of a system for developing and deploying emergency flows.

FIG. 4 depicts an embodiment of a system 400 including a graphical user interface (GUI) 470 for managing emergency flows, triggering devices 467, a pipeline 423 for delivering an emergency alert, the EFMS 440, the EMS 430, and an output service 450. Examples of triggering devices include mobile or smart phones 467A, wearables 467B, and portable computing devices 467C such as laptops or tablets. In some embodiments, the GUI 470 is a web interface (such as a website or a mobile application) from which a user can download an emergency trigger script that can be integrated into a triggering device 467. In some embodiments, the web interface is provided by the EMS 430. In other embodiments, the web interface is provided by a third-party. The web interface may provide access to one or more default or customized emergency flows. For example, the web interface may provide a default emergency flow A designed for smartwatches and a default emergency flow B designed for smart speaker devices. In such an embodiment, a user with a smartwatch could then access the web interface (e.g., on a computer or directly from the smartwatch) and select to download an emergency trigger script associated with default emergency flow A. The emergency trigger script can be downloaded in numerous forms, including, but not limited to, a block of code, an executable program, a plug-in, or a mobile application. Likewise, the emergency trigger script can be integrated into various devices and applications in different ways. For example, Amazon provides a "Skills Store" for the Amazon Alexa, a smart speaker device, where users can download new "skills" (app like programs that allow the Alexa to perform additional functions). In this example, an emergency trigger script associated with default emergency flow B may be downloaded in the form of a skill from the Alexa Skills Store.

In some embodiments, a method for managing emergency flows by an emergency management system comprises: a) providing an emergency trigger script configured to be integrated into a software application installed on an electronic device; b) receiving an emergency alert from a triggering device into which the emergency trigger script has been integrated, wherein the emergency alert is generated by the emergency trigger script in response to the triggering device detecting an indication of an emergency and comprises a user identifier and a location associated with the user identifier; c) identifying an emergency flow script associated with the emergency trigger script; and d) executing the emergency flow script associated with the emergency trigger script to provide the location associated with the user identifier to one or more recipients. In some embodiments, the emergency trigger script is provided through a web interface. In some embodiments, the emergency alert is an application programming interface (API) call. In some embodiments, the emergency flow script associated with the emergency trigger script is identified using the user identifier. In some embodiments, the emergency alert further comprises an emergency flow identifier and wherein the emergency flow script associated with the emergency trigger script is identified using the emergency flow identifier. In some embodiments, the triggering device generates the emergency alert using the emergency trigger script. In some embodiments, the emergency flow script is identified within an emergency flow database comprising two or more emergency flow scripts. In some embodiments, the emergency alert further comprises emergency data associated with the user identifier and wherein executing the emergency flow script further comprises transmitting the emergency data associated with the user identifier to the one or more recipients. In some embodiments, the method further comprises gathering emergency data associated with the user identifier from one or more databases, wherein executing the emergency flow script further comprises transmitting the emergency data associated with the user identifier to the one or more recipients. In some embodiments, executing the emergency flow script associated with the emergency trigger script comprises transmitting a text-based message to the one or more recipients. In some embodiments, the emergency flow script defines a pathway of execution of two or more emergency flow building blocks, wherein each of the two or more emergency flow building blocks comprises instructions for performing an emergency function. In some embodiments, the indication of the emergency is a selection of a soft or physical button on the triggering device by a user. In some embodiments, the indication of the emergency is a voice command detected by the triggering device. In some embodiments, the indication of the emergency is sensor data generated by a sensor communicatively coupled to the triggering device. In some embodiments, the one or more recipients comprises a call center or a public safety answering point (PSAP). In some embodiments, the emergency alert comprises a list of emergency contacts for a user associated with the triggering device. In some embodiments, the triggering device is one of a communication device, a wearable device, or an internet of things (IoT) device. In some embodiments, the method further comprises: a) retrieving emergency data associated with the emergency alert from one or more databases; and b) transmitting the emergency data to the one or more recipients.

In some embodiments, a method for managing emergency flows by an emergency management system comprises: a) receiving an emergency communication comprising a user identifier from an emergency service provider (ESP), wherein the emergency communication is indicative of an emergency; b) identifying an emergency flow script associated with the user identifier, said emergency flow script defining a pathway of execution of two or more emergency flow building blocks, wherein each of the two or more emergency flow building blocks comprises instructions for performing an emergency response function; and c) executing the emergency flow script associated with the user identifier according to the pathway of execution of the two or more emergency flow building blocks. In some embodiments, at least two emergency flow scripts are associated with the user identifier, including a main emergency flow and an auxiliary emergency flow. In some embodiments, at least two emergency flow scripts are associated with the user identifier, including a home emergency flow and a work emergency flow. In some embodiments, the ESP is a public safety answering point (PSAP). In some embodiments, the emergency communication is an application programming interface (API) call. In some embodiments, the user identifier is a phone number. In some embodiments, the method further comprises: a) providing a graphical user interface comprising a plurality of emergency flow building blocks, wherein each emergency flow building block comprises instructions for performing an emergency response function; and b) providing an interactive digital environment within which two or more emergency flow building blocks are visually assembled into the emergency flow script, wherein the emergency flow script defines a pathway of execution of the two or more emergency flow building blocks. In some embodiments, the emergency flow script is stored within an emergency flow database comprising a plurality of emergency flow scripts.

In some embodiments of the system 400, the GUI 470 is an emergency flow editor that an administrator accesses to configure an emergency flow. The emergency flow editor 470 then optionally stores the emergency flow in an emergency flow database (e.g., the data module 343 depicted in FIG. 3) and assigns the emergency flow an emergency flow ID. In some embodiments, the administrator then installs a program, application, or script (e.g., an emergency trigger script) into a triggering device 467 configured to deliver data pertaining to the emergency via pipeline 423. Non-limiting examples of the data delivered through the pipeline 423 sent by the triggering device 467 include location data, audio and/or video (streaming or a file), sensor data, emergency indication(s) (e.g., user pressed panic button for a specific type of emergency), and any user commands (e.g., command to notify certain contacts in the contact list). In some embodiments, the data is transmitted within the emergency alert including the emergency flow ID. In some embodiments, the data is transmitted before or after the emergency alert is sent via the pipeline 423 to the EFMS 440, which functions in conjunction with the EMS 430 to execute the emergency flow. In some embodiments, the emergency alert 425 (not shown) includes additional data, such as a location associated with a user, health data associated with a user, or a list of accounts associated with a user. In some embodiments, the execution of the emergency flow includes initiating communications with an output service 450, such as an EDC or PSAP.

In some embodiments, the data pertaining to the emergency is transmitted to the EDC 450 via a pipeline 424 (not marked). The data is transmitted as a part of an emergency alert or afterwards. In some embodiments, the data is provisioned in the EFMS 440, EMS 430 or a third-party server and sent to the EDC 450 in response to a query from the EDC 450.

The data transmitted through pipelines 423, 424 is optionally encrypted and sent through secure pathways to authorized recipients. Pipelines 423, 424 are contemplated to deliver location, voice, and additional data (e.g., user data, images, video feed) from device 467 to the EDC 450 in a secure and compatible format.

In one implementation of this embodiment, the administrator is a company that produces a smartwatch. The company optionally uses the emergency flow editor 470 to create an emergency flow that activates when a wearer of the smartwatch (e.g., the triggering device 467) presses a button on the smartwatch that indicates (e.g., delivers an emergency alert 425 to the EFMS 440) that the wearer is in a state of distress (e.g., the wearer of the smartwatch has fallen and is incapable of picking themselves up). When activated, the emergency flow is configured by the company to instruct the EFMS 440 to deliver an interactive call to the smartwatch (if the smartwatch is capable of receiving calls) or to a phone associated with the wearer in which the interactive call asks the wearer if they are in need of emergency assistance. The interactive call then optionally waits for a predetermined duration of time (e.g., 20 seconds) for an input from the wearer of the smartwatch (e.g., the interactive call may present the wearer with two options: press 1 for yes or * for no). If the wearer selects 1, or the predetermined duration of time expires before the wearer submits an input, the EFMS 440 then initiates a call with an EDC and connects the wearer with the EDC 450 once the EDC has accepted the call. If the wearer selects *, the EFMS 440 terminates the emergency response flow.

In another implementation of this embodiment, the administrator is a company that provides a vehicle safety service (e.g., OnStar or AAA). In this example, the company uses the emergency flow editor 470 to create an emergency flow that is automatically activated when an intelligent vehicular system (integrated with the vehicle safety service) within a vehicle detects that the vehicle has been compromised (e.g., when the vehicle has been in an accident). In this example, when the intelligent vehicular system detects that the vehicle has been compromised, the vehicle (e.g., the triggering device 467) delivers an emergency alert 425 to the EFMS 440, which executes the emergency flow. In this example, when executed, the emergency flow is configured by the company to instruct the EFMS 440 to call a customer service provider 450 (e.g., a AAA representative), call the vehicle, and bridge the calls between the vehicle and the customer service provider 450. The emergency flow also optionally provides the customer service provider 450 with an option to initiate a call with an EDC 450 (e.g., call a PSAP).

Figure 5:
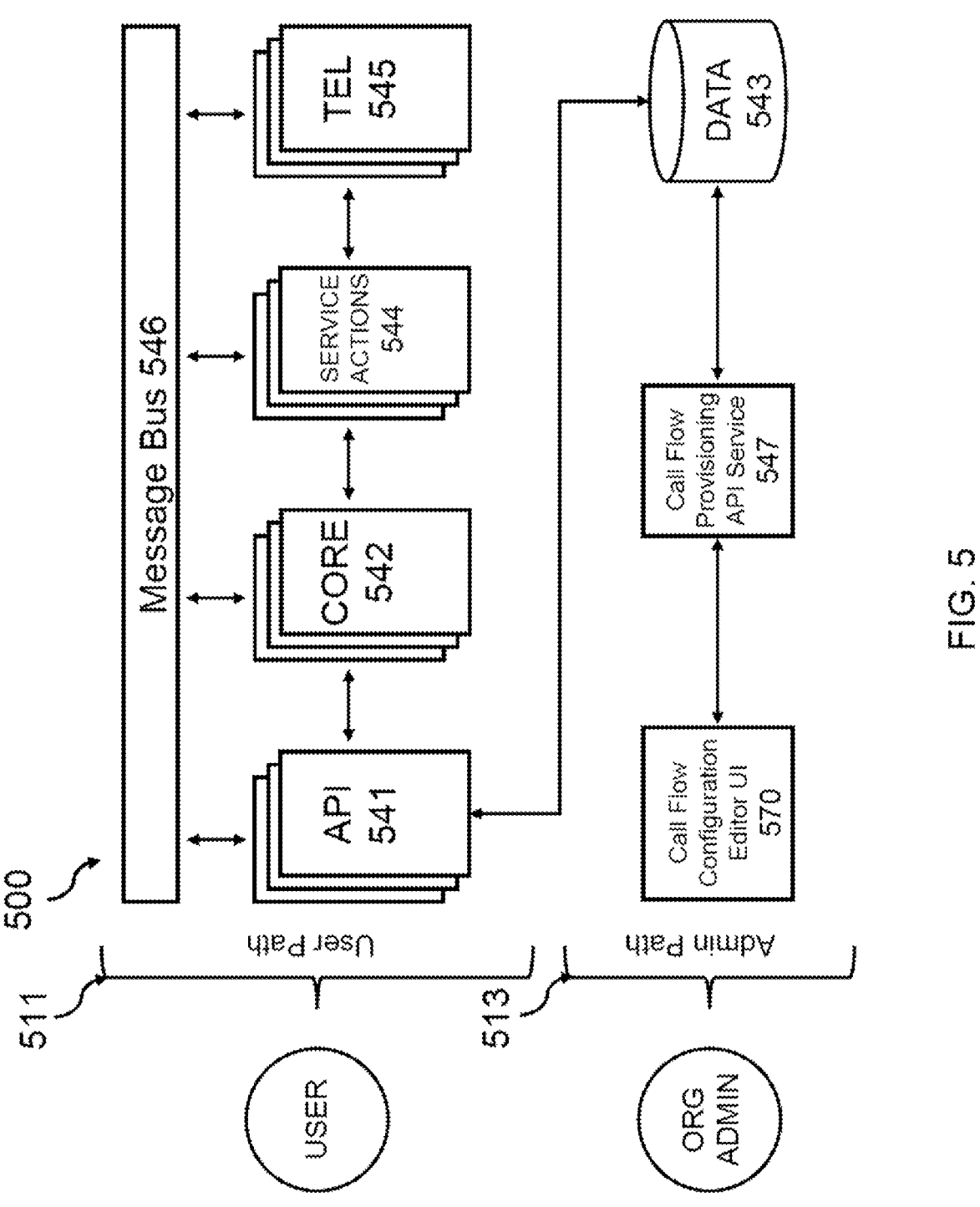
FIG. 5 depicts an embodiment of a system for developing and deploying emergency flows.

FIG. 5 depicts an embodiment of a system 500 for the creation and implementation of an emergency flow. As depicted in FIG. 5, in some embodiments, the system 500 contains two pathways: an administrator pathway 513 (admin path) and a user pathway 511 (user path). The admin path 513 is initiated by an administrator. In the admin path, the administrator accesses an emergency flow editor 570 to configure an emergency flow to fit the needs of the administrator's product or service, such as the smartwatch or vehicle described in the examples provided above with respect to FIG. 4. In some embodiments, in the admin path, an emergency flow provisioning API service 547 compiles the emergency flow, assigns an emergency flow ID to the emergency flow, and stores the emergency flow within a data module 543. The user path 511 is initiated by a user 500, or a device associated with a user, of the product or service provided by the administrator, such as the vehicle or the wearer of the smartwatch described in the examples provided above with respect to FIG. 4. In some embodiments, in the user path, the API module 541 receives an emergency alert including an emergency flow ID from a triggering device. In some embodiments, the API module 541 then references the emergency flow ID with the data module 543 to find the emergency flow corresponding to the emergency flow ID and delivers the emergency flow to the core module 542 for execution. In some embodiments, the core module 542 employs the service actions module 544 and the telephony module 545 to execute various blocks of the emergency flow. In some embodiments, the API module 541, the core module 542, the service actions module 544, and the telephony module 545 are separately and simultaneously in communication with the message bus 546, which facilitates and coordinates synchronous and asynchronous communications (e.g., a communication bridge, text messages, etc.) between the modules and various users and accounts (e.g., a user, emergency contacts, emergency responders, etc.).

The Emergency Console

Figure 6:
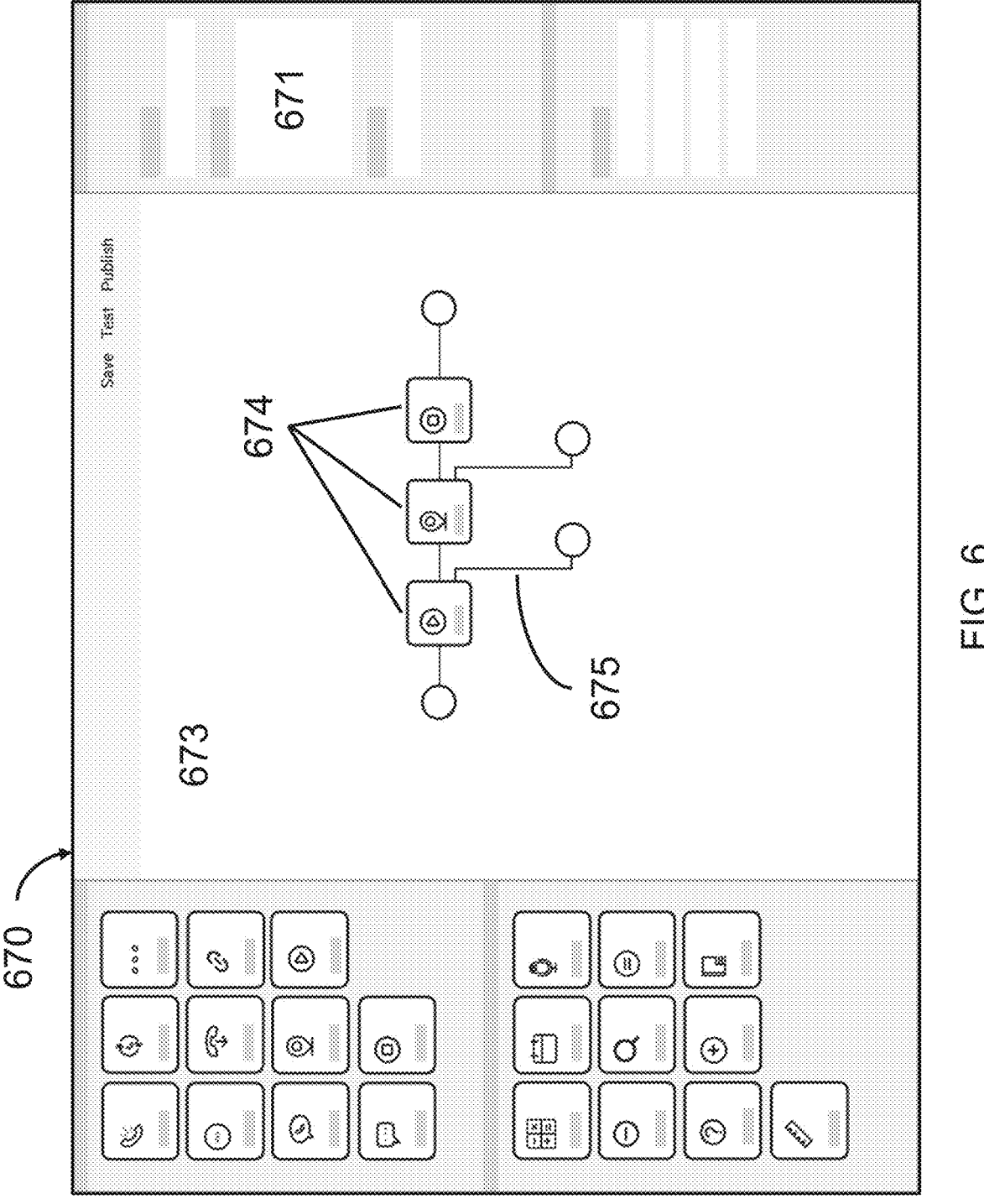
FIG. 6 shows an user interface of an application for developing and deploying emergency flows.

FIG. 6 depicts a view of an emergency flow configuration editor 670 (also referred to as the Emergency Console or an emergency flow editor). In some embodiments, the emergency flow editor 670 is used to configure customized emergency flows. In some embodiments, the emergency flow editor 670 includes a programming language input field 671 in which users manually program an emergency flow by inputting written programming commands to create a script 672 (not shown; also referred to as an "emergency flow script") that defines the emergency flow. In some embodiments, the emergency flow editor additionally or alternatively includes a graphical user interface 673 (also referred to as an "interactive space") which users can use to visually assemble emergency flows by dragging and dropping (or otherwise manipulating) graphical representations of emergency flow building blocks 674 into various arrangements. In some embodiments, an emergency flow building block is defined by a short script (e.g., a compilation or block of written programming commands), written in a programming language, that contains instructions for executing various functions (also referred to as emergency response functions) relating to an emergency flow. A single emergency flow building block generally contains instructions relating to one emergency flow function, as will be described in greater detail, and generally does not represent an entire emergency flow. In some embodiments, an arrangement of emergency flow building blocks in the graphical user interface 673 automatically results in the creation of a script 672 (e.g., an emergency flow script), which is optionally displayed in the programming language input field 671. In some embodiments, an emergency flow building block receives at least one input, performs at least one emergency response function based upon the at least one input, and generates at least one output. In some embodiments, at least one input for an emergency flow building block comprises an output received from another emergency flow building block. In some embodiments, adjacent emergency flow building blocks in an emergency flow script are connected such that an output of a preceding emergency flow building block forms an input for at least one succeeding emergency flow building block. In some embodiments, the emergency flow editor 670 includes either the programming language input field 671 or the graphical user interface 673, but not both. In some embodiments, the emergency flow editor includes both the programming language input field 671 and the graphical user interface 673. In some embodiments, the emergency flow editor 673 includes options or buttons to save, test, and publish an emergency flow. While users can use the emergency flow editor 670 to visually assemble customized emergency flows, the emergency flow editor 670 may additionally or alternatively allow users to access default or premade emergency flows provided by the emergency management system.

In some embodiments, the Emergency Console allows a variety of customizable emergency flows between users, emergency contacts, emergency services, and related third parties by establishing a multitude of voice and data connections to Public Safety Answering Points (PSAPs) through a variety of trigger mechanisms. In some embodiments, the trigger mechanisms enable implementation in a variety of scenarios including software panic buttons (e.g., within mobile applications), remote activation by associated emergency contacts, and others. The Emergency Console allows for the customization and generation of emergency flows while ensuring that the generated emergency flows comply with regulatory constraints (Federal, State or local laws, regulations, policies, best practices, etc.) applicable to the location and type of emergency. In some embodiments, the Emergency Console is a part of the EMS. In some embodiments, the Emergency Console is part of an EDC such as a PSAP. In some embodiments, the Emergency Console is operated on an emergency response server. In some embodiments, the EMS comprises an emergency response server. In some embodiments, the Emergency Console is a web interface that provides tools for generating and testing emergency flows. In some embodiments, the Emergency Console allows for emergency flows to be initiated via simple API triggers from any device.

As described above, in some embodiments, emergency flow building blocks 674 are visually arranged into an emergency flow within the graphical user interface 673 of the emergency flow editor 670. In some embodiments, the emergency flow building blocks are connected with one or more connectors 675. A single emergency flow building block may be connected to a plurality of other emergency flow building blocks preceding the single emergency flow building block and/or a plurality of other emergency flow building blocks succeeding the single emergency flow building block. For example, in emergency flow 700 (described below with regard to FIG. 7), call contact block 706 is connected to one proceeding emergency flow building block (call user interactive block 704A) and two succeeding emergency flow building blocks (call user interactive block 704B and call EDC block 708). In some embodiments, the emergency flow building blocks 674 and connectors 675 that make up an emergency flow define a pathway of execution for the emergency flow. In such embodiments, the emergency flow management system executes the emergency flow according to the pathway of execution defined by the emergency flow building blocks and connectors.

For example, referring back to emergency flow 700, after executing the call contact block 706, according to the pathway of execution defined by the emergency flow building blocks and connectors that constitute emergency flow 700, the emergency flow management system will either execute the call user interactive block 704B or execute the call EDC block 708, depending on the output of the call contact 706 block, as described below. For example, as described below, in some embodiments, a call contact block (also referred to as a "Find Next Available Contact Block") has three potential outputs: (i) contact answers the call, (ii) contact does not answer the call, and/or (iii) there are no available contacts (also referred to as an NAC response). Referring again to FIG. 7 (as described below), according to the pathway of execution defined by the emergency flow building blocks and connectors of emergency flow 700, if the output of the call contact block 706A is a contact answers the call, the emergency flow 700 continues with call EDC block 708. According to the pathway of execution, if the output of the call contact block 706 is the contact did not answer the call or there was an NAC response, the emergency flow 700 continues with call user interactive block 704B.

Emergency Flow Building Blocks

In some embodiments, the emergency flow editor 670 (e.g., the Emergency Console) contains a set of predefined emergency flow building blocks. Below is a non-exhaustive list of emergency flow building blocks that are optionally included in the set of predefined emergency flow building blocks and that may be incorporated into a customized emergency flow (e.g., customized emergency flow script).

In some embodiments, the customized emergency flow script is associated with a user identifier. In some embodiments, the customized emergency flow script is configured to account for additional user data or input. User data or input can include location information (e.g., user device location determined using GPS and/or WiFi access points), sensor data, user demographic information, health information, or other relevant data. In some embodiments, the flow script comprises one or more emergency flow building blocks configured to perform distinct emergency functions based on the user data or input. In some embodiments, the distinct emergency functions arise from a decision made within the flow script such as to decide on the path of execution of building blocks based on the user data or input. In some embodiments, when an identifier is received, it is matched with a flow script. In some embodiments, additional data is obtained including location of the user (e.g., location of the user communication device) and user data (e.g., user home and work addresses). In some embodiments, a distinct sequence of emergency functions is performed depending on the user location relative to home, work or other known locations. As an example, when a user has a fire emergency at home (e.g., based on specific emergency indication in the alert and user location compared to stored home location), the executed flow script may cause the emergency management system to notify his neighbors. Conversely, when a user who has a medical emergency at work (e.g., determined by the emergency indication in the alert and by comparing current user location to stored work address), the executed flow script may cause the user's employer to receive notification that the user had a medical emergency and will be transported to a nearby hospital. In the case when a user has a car breakdown on the freeway, the route of travel and/or recent movement/travel speed (e.g., based on GPS signal or data from a mobile map application for the last 5 minutes) can result in the executed flow script notifying the user's insurance company and/or an associated towing service.

Alternatively or in combination, multiple emergency flow scripts may be chosen from for a single user based on the additional user data. Examples of various emergency flow scripts include a traffic emergency script, a medical emergency script, a fire emergency script, a police emergency script, a natural disaster emergency script, a home emergency script, a work emergency script, a travel emergency script, and other possible scripts.

(a) Create Emergency Bridge Block: In some embodiments, the create emergency bridge block instructs the EFMS to create a communication bridge in which one or more calls are dynamically added or removed. The communication bridge serves as a hub for various calls that are made during the execution of an emergency flow. In some embodiments, the create emergency bridge block takes no inputs and produces no outputs. In some embodiments, the create emergency bridge block is a core component included in every emergency flow. In some embodiments, the create emergency bridge block is an implied emergency flow building block (e.g., the script defining the create emergency bridge block is included in every emergency flow but the create emergency bridge block is not depicted in the graphical user interface 673).

(b) Call User Block: In some embodiments, the call user block instructs the EFMS to initiate a phone call to a phone number associated with the user associated with the triggering device and connect the phone call with a communication bridge. The input for the call user block is the phone number associated with the user. The outputs of the call user block are: (i) the user answered the phone call or (ii) the user did not answer the phone call.

(c) Play Pre-Recorded Message Block: In some embodiments, the play pre-recorded message block instructs the EFMS to play a pre-recorded audio file to one or more parties currently connected to a communication bridge. The input for the play pre-recorded message block is the name or file location of the pre-recorded audio file. The play pre-recorded message block has no output.

(d) Play TTS Message Block: In some embodiments, the play TTS (text-to-speech) message block instructs the EFMS to play an audio file adaptation of a text file to one or more parties currently connected to a communication bridge. The input for the play TTS message block is the text of the message to be converted to audio. The play TTS message block has no output.

(e) Send SMS Message Block: In some embodiments, the send SMS message block instructs the EFMS to deliver a SMS message to a user or a group of users. In some embodiments, the SMS message includes information pertaining to status of the emergency flow session. The inputs for the send SMS message block are the contents of the text message to be sent and the phone number(s) of the intended recipients of the text message. The send SMS message block has no output.

(f) Timeout Block: The timeout block instructs the EFMS to add a timeout instruction for a desired event. For example, in some embodiments, an administrator can add a timeout instruction to another emergency flow building block, such as the call user block, and specify an amount of time that the emergency flow should wait at the call user block before autonomously determining a negative outcome (e.g., in the case of the call user block, the user did not answer). The input for the timeout block is the amount of time (e.g., 1-30 seconds). The output of the timeout is a confirmed negative outcome.

(g) Location Block: In some embodiments, the location block instructs the EFMS to query or detect a location of a user. In some embodiments, the location block instructs the EFMS to parse a location database for a location. In some embodiments, the location block instructs the EFMS to communicate with a triggering device to determine the location of the triggering device. The input for the location block is an account associated with a user (e.g., a phone number of the user). The output of the location block is a location of the user.

(h) API/HTTP Request Block: In some embodiments, the API/HTTP request block instructs the EFMS to execute an API or HTTP post to an internet-based service to provide status, alerts, and notifications regarding the current emergency. The API or HTTP post may be provided by the user or included in the Emergency Console. In some embodiments, the inputs for the API/HTTP request block are a URL and any necessary parameters (named parameters included in HTTP post). In some embodiments, the outputs of the API/HTTP request block are (i) success or (ii) failure.

(i) Find Next Available Contact Block: In some embodiments, the find next available contact block instructs the EFMS to loop through a list of contacts (e.g., accounts associated with a user or emergency contacts), call each one-by-one in sequence, play an audio message to them and wait for confirmation to determine whether to call the next contact. In some embodiments, a contact can confirm readiness to speak to an EDC or emergency dispatch center by responding to the audio message (e.g., by pressing 1). In some embodiments, the call of the find next available contact block is an interactive call (as discussed below). In some embodiments, the input for the find next available contact block is a list of contacts, the list of contacts including phone numbers and names. In some embodiments, the outputs of the find next available contact block are (i) contact answers the call, (ii) contact does not answer the call, and/or (iii) there are no available contacts (also referred to as an NAC response).

(j) Interactive Call/IVR Block: In some embodiments, the interactive call/IVR (interactive voice response) block instructs the EFMS to call a phone number (e.g., an account associated with a user) and play an audio message to the recipient of the call and wait for a dial tone response (e.g., an interactive call) to determine whether the recipient of the call confirms readiness to speak to an EDC or emergency dispatch center. In some embodiments, the interactive call presents the recipient with a plurality of options to choose from (e.g., press 1 to dial 9-1-1, press 2 to call an emergency contact, press * to hang up). In some embodiments, the inputs for the interactive call/IVR block are a name and associated phone number of the intended recipient of the call and an audio message to play to the recipient. In some embodiments, the inputs for the interactive call include a plurality of options for the recipient to choose from. In some embodiments, the outputs of the interactive call/IVR block are (i) a dial tone response from the recipient (ii) the call was answered or (iii) the call was unanswered.

(k) Connect to Customer Call/Operations Center Block: In some embodiments, the connect to customer/operations center block instructs the EFMS to initiate a call with an operations center associated with the administrator. The input for the connect to customer call/operations center is a phone number of the customer call/operations center. In some embodiments, the outputs of the connect to customer call/operations center are (i) successful connection to customer call/operations center or (ii) unsuccessful connection to customer call/operations center. In some embodiments, the call of the connect to customer call/operations center block is an interactive call (as described above).

(l) Connect to 9-1-1 Block: In some embodiments, the connect to 9-1-1 block instructs the EFMS to call 9-1-1 (or another emergency response/dispatch center number), add the call to a communication bridge, and provide the EDC with a location and name of a user. The inputs for the connect to 9-1-1 block are the location of the user and the name and phone number of the user. The outputs of the connect to 9-1-1 block are (i) successful connection to 9-1-1 or (ii) unsuccessful connection to 9-1-1.

(m) Add 3rd Party Block: In some embodiments, the add third party block instructs the EFMS to initiate a call with an additional party (e.g., an emergency contact, customer service, a suicide hotline, etc.) and add the call with the additional party to a communication bridge. The inputs for the add 3rd party block are a name and number of a third party. The outputs of the add third party block are (i) successful connection to third party or (ii) unsuccessful connection to third party.

(n) Failsafe Block: In some embodiments, the failsafe block instructs the EFMS to detect a failure within an emergency flow and deliver a message to a user notifying the user that the emergency flow has failed. In some embodiments, the failsafe block further instructs the API to prompt the user to call 9-1-1. In some embodiments, the failsafe block is an implied emergency flow building block (e.g., the script defining the failsafe block is included in every emergency flow but the "create emergency bridge" block is not depicted in the graphical user interface 673). In some embodiments, the failsafe block is an implied additional or associated component of every emergency flow building block configured within an emergency flow. In general, the failsafe block functions to ensure that an emergency flow is at least as reliable as a traditional emergency call (e.g., calling 9-1-1 in the United States). In some embodiments, the input for the failsafe block is a failed outcome of a previous or associated emergency flow building block (e.g., the previous or associated emergency flow building block failed to execute its intended function). The failsafe block has no output.

In some embodiments, in addition to the emergency flow building blocks, the Emergency Console contains one or more utility building blocks. For example, in some embodiments, utility building blocks may perform computational or logistical functions, as opposed to emergency functions. For example, the utility building blocks may include a calculator building block configured to perform a mathematical equation on two inputs, a datetime building block configured to return the current day and time, an evaluate building configured to evaluate an expression (e.g., an algebraic expression), a compare building block configured to execute an if/then statement. In some embodiments, the utility building blocks may include increase and decrease building blocks configured to increase or decrease the value of a numerical variable, respectively.

The Emergency Console optionally contains any number of emergency flow building blocks defining any number of emergency response functions. In some embodiments, additional emergency response functions include, but are not limited to, at least one of the following: delivering a location of a user to an emergency dispatch center or database accessible by the emergency dispatch center, identifying an emergency dispatch center suitable for responding to an emergency alert based on location data associated with or received from an electronic device associated with a user, calling an emergency contact of a user for whom an emergency alert has been received, calling an associated device of the user, and obtaining sensor data from a network of sensors associated with the user or user's electronic device. In some embodiments, the Emergency Console allows administrators to edit the short script of an emergency flow building block to reprogram the building block to be more applicable to the needs of the administrator. For example, in some embodiments, the Emergency Console may contain a predefined call user block that takes a single phone number as an input. In this example, the Emergency Console optionally allows an administrator to edit the short script of the predefined call user block such that the edited call user block now takes a list of phone numbers as its input and dials each number in the list of phone numbers one-by-one in sequence until one of the numbers is successfully reached. In some embodiments, the Emergency Console allows administrators to configure any parameter of an emergency flow building block, including, but not limited to: the input, output, and emergency response function. In some embodiments, the Emergency Console allows administrators to design their own original emergency flow building blocks, such as by writing their own short script in the programming language input field 671. In some embodiments, the Emergency Console includes a shared (e.g., accessible to all administrators) library of administrator generated emergency flow building blocks.

Example Emergency Flows

In some embodiments, emergency flows are designed based on desired solutions. As an example, a simple flow is configured to initiate a direct connection between the caller and 9-1-1. In some embodiments, complex logical flows include multiple callers or call centers with tunable timing, with text-to-speech and interactive voice response (IVR) components, with SMS messaging, with rich data interchange, etc. The EFMS service is designed to be modular so that the various building blocks, such as the ones described above, can be assembled to construct an emergency flow that meets any particular emergency connectivity solution design. In some embodiments, an emergency flow may be considered as a logic tree (e.g., a series of if/then statements that progressively lead to various actions or decisions based on the outcome of the previous action or decision). The following emergency flows examples depict emergency flows constructed by an administrator within the Emergency Console.

FIG. 7 depicts a configuration of an emergency flow 700. The emergency flow 700 may be designed for a user-triggered panic button (e.g., a soft button on a mobile application, for example). FIG. 7 depicts the emergency flow 700, as it may appear in the graphical user interface 673 in some embodiments of the Emergency Console, as a configuration of emergency flow building blocks 701 and various accompanying connectors 703. In some embodiments, connectors 703 are used to define the path or sequence of execution of the emergency flow building blocks 701. In some embodiments, emergency flow 700 begins with emergency flow activation block 702. The emergency flow activation block 702 can be triggered in various ways, such as by the EFMS 340 receiving an emergency alert including an emergency flow ID corresponding to emergency flow 700 from a triggering device 367 associated with a user at the API module 341; the API module 341 referencing the emergency flow ID with the data module 343, identifying emergency flow 700 as the emergency flow corresponding to the emergency flow ID, and delivering the emergency flow 700 to the core module 342 for execution; and the core module 342 executing the emergency flow 700. In some embodiments, the emergency flow activation 702 is an emergency flow building block. In some embodiments, the emergency flow activation 702 is an implied emergency flow building block. In some embodiments, the emergency flow activation 702 is functionally equivalent to a "create emergency bridge" block, as described above.

In some embodiments, the emergency flow 700 continues with call user interactive block 704A, an interactive call/IVR block that instructs the EFMS to deliver an interactive call (as described above) to a phone number associated with a user. The interactive call optionally plays an audio message to the user and prompts the user to select one of a plurality of options. In some embodiments, the plurality of options includes connect to an EDC (e.g., "press 1 for 9-1-1) or disconnect (e.g., press * to end this call). In some embodiments, the plurality of options additionally or alternatively includes an option to deliver a message to an emergency contact associated with the user (e.g., press 2 to alert an emergency contact). In some embodiments, the option to deliver a message to an emergency contact prompts the EFMS to deliver a text message (e.g., an SMS or MMS message) to an emergency contact. In some embodiments, the interactive call/IVR block additionally includes at least one default input parameter such as a timeout criterion (e.g., user does not provide a selection before the expiration of 30 seconds), an NA response (e.g., the phone call is not answered), or a hang up response (e.g., the user answers the call but hangs up).

After the call user interactive block 704A, in some embodiments, as depicted in FIG. 7, the emergency flow 700 proceeds in one or more directions, dependent upon the output of the call user interactive block 704A (e.g., the emergency flow building blocks shown in emergency flow 700 optionally form parallel emergency flow pathways for both calling the emergency responder 708 and messaging a contact 706). In some embodiments, when the output of the call user interactive block 704A is a user command or selection to connect to an EDC, the emergency flow 700 continues with call EDC block 708. In some embodiments, when the output of the call user interactive block 704A is a user command or selection to deliver a message to an emergency contact, or the interactive call timed out (e.g., the timeout criteria was satisfied), or there was an NA response, the emergency flow 700 continues with call contact block 706. In some embodiments, when the output of the call user interactive block 704A is the user selected to disconnect, the emergency flow 700 terminates.

In some embodiments, the emergency flow 700 continues with call contact block 706, a find next available contact block (as described above) that instructs the EFMS to loop through a list of contacts associated with the user and call each one-by-one in sequence until one of the contacts answers. In some embodiments, the calls prompted by the call contact block 706 are interactive calls that play an audio message that prompts the recipients of the calls to select one of a plurality of options. In some embodiments, the plurality of options includes an option to connect to an EDC or to disconnect. In some embodiments, the call contact block 706 additionally includes a default input such as an NAC response (e.g., there are no available contacts, or all of the listed contacts have been called and none answered) or a hang up response.

After the call contact block 706, in some embodiments, as depicted in FIG. 7, the emergency flow 700 proceeds in one or more directions, dependent upon the output of the call contact block 706. In some embodiments, when the output of the call contact block 706 is a contact selected to connect to an EDC, the emergency flow 700 continues with call EDC block 708. In some embodiments, when the output of the call contact block 706 is the contact selected to disconnect or there was an NAC response, the emergency flow 700 continues with call user interactive block 704b. In some embodiments, when the output of the call contact block 706 is the contact selected to disconnect, a hang up response, or there was an NAC response, the emergency flow 700 terminates.

In some embodiments, the emergency flow 700 continues with call user interactive block 704B, an interactive call/IVR block. In some embodiments, call user interactive block 704B functions the same as call user interactive block 704A, described above. In some embodiments, the interactive call executed by call user interactive block 704B takes different inputs and produces different outputs than those of call user interactive block 704A. After the call user interactive block 704B, the emergency flow 700 proceed in one or more directions, depending upon the output of the call user interactive block 704B. In some embodiments, when the output of the call user interactive block 704B is a user command or selection to disconnect, or a hang up response, or an NA response, or the interactive call timed out, the emergency flow 700 terminates. In some embodiments, when the output of the call user interactive block 704B is the interactive call timed out or an NA response, the emergency flow 700 repeats the call contact block 706. In some embodiments, when the output of the call user interactive block 704B is a user command or selection to connect an EDC, the emergency flow 700 continues with call EDC block 708.

In some embodiments, the emergency flow 700 continues with call EDC block 708, a connect to 9-1-1 block (as described above) that instructs the EFMS to call an emergency response or emergency dispatch center. In some embodiments, once the EDC has answered the call and been added to the communication bridge, the emergency flow 700 ends. In some embodiments, after answering the call, an EDC selects an option to query the location of the user.

A section of an example of an emergency flow script corresponding to emergency flow 700 is shown below. In the example shown below, an interactive call block is shown first, followed first by a "connect to 9-1-1" block and then by a "find next available contact" block. The following example should not be considered a complete emergency flow.

Example Emergency Flow Script

```
states:
    name: call_user
    action: INTERACTIVE_CALL
    inputs:
    phone_number: '${user.phone_number}'
        text: >-
            "This is an automated call from ${company}. If this
                is a real emergency,
            dial one to talk to a nine one operator and receive
                help. If this
            is a false alarm, please dial star to cancel your
                request for help. You
            have activated the emergency feature in ${com-
                pany}. Please dial one to
            talk to a nine one one operator and receive help. If
                this is a false
            alarm, please dial star to cancel your request for help.
                If you do not
            press one for help or star to cancel, we will call your
                emergency
            contacts and prompt them to speak to nine one one
                in your place. This
            call will now disconnect."
        on_output:
            '#1@.*': user_call_911_play
            '#\*@.*': user_cancelled_911
            HANGUP@.*: user_hangup_sms
```

'false': find_available_contact
name: user_call_911_play
   action: PLAY
   inputs:
      text: 'Now calling nine one one . . . '
      phone_number: '${user.phone_number}'
   on_output:
      'true': user_call_911_sms
   goto: fail_safe
name: find_available_contact
   action: CALL_LOOP
   inputs:
      callee_list: contacts
      text: >-
         "This is an emergency call from ${company}.
            ${user.full_name} has
         designated you as an emergency contact in the
            app. The user has
         activated the emergency procedure, dial one to
            speak to a nine one one
         operator closest to ${user.full_name}'s location
            and send help to his
         exact location, or hang up to disconnect this call.
            If you do not dial
         one to connect to a nine one one operator, we will
            call
         ${user.full_name}'s other emergency contacts if
            he has provided any.
         This call will now disconnect."
      time: 120
   store: found_contact
   on_output:
      '#1@.*': contact_call_911_play
      'false': user_call_final_911_call
   goto: fail_safe In the example shown above, after the emergency flow is activated, the emergency flow begins by executing an interactive call block (e.g., call user interactive block 704A). A call is placed to {user.phone_number} (e.g., a phone number included in or associated with the emergency alert that activated the emergency call flow) and the message shown above is dictated to the recipient of the call as a text-to-speech (TTS) message. As shown above, if the recipient selects "1", the emergency flow continues by executing a connect to 9-1-1 block (e.g., call emergency responder block 708). If the recipient selects "*", the emergency flow ends. If the recipient does not submit a response, the emergency flow continues by executing a find next available contact block (e.g., call contact block 706).

FIG. 8 illustrates a configuration of an emergency flow 800. FIG. 8 depicts the emergency flow 800, as it may appear in the graphical user interface 673 in some embodiments of the Emergency Console, as a configuration of emergency flow building blocks and various accompanying connectors. The emergency flow 800 begins with a call operations center block 812. In this example, the call operations block 812 prompts the emergency flow management system to create an emergency bridge, call an operations center, and connect the operations center call to the emergency bridge. According to the pathway of execution defined by the emergency flow building blocks and connectors of emergency flow 800, after the call operations center block 812, the emergency flow 800 either ends with a failsafe block or continues with interactive call block 804A, depending on the output of the call operations block 812. In this example, if the output of the call operations center block 812 is a successful connection the operations center, the emergency flow 800 continues with interactive call block 804A. If the output of the call operations center block 812 is anything else (e.g., the call times out, is denied, or is otherwise unsuccessful), the emergency flow 800 ends with the failsafe block, as described above.

Continuing with interactive call block 804A, in this example, the interactive call block 804A plays an audio message to the recipient of the operations center call prompting the recipient (e.g., an operator) to press 1 to connect to 9-1-1. According to the pathway of execution for the emergency flow 800, after the interactive call block 804A, the emergency flow 800 either ends with the failsafe block or continues with interactive call block 804B, depending on the output of the interactive call block 804A. In this example, if the output of the interactive call block 804B is the audio message played successfully, the emergency flow 800 continues with a connect to 9-1-1 block 808, which prompts the emergency flow management system to call 9-1-1 and connect the 9-1-1 call to the emergency bridge. If the output of the interactive call block 804B is anything else (e.g., the call is hung up or the audio message otherwise fails to play), the emergency flow 800 ends with the failsafe block.

FIGS. 9A and 9B depict screenshots for an embodiment of an interface for managing emergency flows. FIG. 9A shows a "code view" for an emergency flow and FIG. 9B shows the "ALI display" that is shown on a PSAP display (e.g., EDC 450 in FIG. 4). In some embodiments, the Emergency Console is a web application that users (e.g., administrators) can access through an internet browser (e.g., Internet Explorer, Google Chrome). In some embodiments, the Emergency Console is a desktop application that can be accessed offline. In addition to the graphical user interface 673 (see FIG. 6) in which users can configure emergency flows, the Emergency Console may include a dashboard where users can view, test, download, and otherwise manage their emergency flows. In some embodiments, users can select emergency flows from a drop-down list, as depicted in FIG. 9. In the example depicted in FIG. 9, the selected emergency flow is called "company_contacts." In some embodiments, once an emergency flow is selected, the dashboard automatically populates with information regarding the selected emergency flow. In some embodiments, the information regarding the selected emergency flow includes user names, contact names, and associated accounts (e.g., phone numbers, email accounts). In some embodiments, after an emergency flow is selected, the Emergency Console displays data pertaining to the selected emergency flow. For example, in some embodiments, the Emergency Console displays an emergency flow history (such as from the emergency flow history database described above with respect to FIG. 3) including an entry for every individual execution of the selected emergency flow. An entry optionally includes data including, but not limited to: the day and time that the selected emergency flow was executed, what type of triggering device sent the emergency alert that triggered the execution of the selected emergency flow, an identity of the user associated with the triggering device, which contacts were contacted, if a party opted to contact an emergency responder, if an emergency responder was contacted, if contacting an emergency responder was successful or unsuccessful, which party opted to contacted an emergency responder, how long the execution of the selected emergency flow lasted, or combinations thereof. In some embodiments, the emergency flow history includes additional data pertaining to the selected emergency flow including, but not limited to: the average length of the execution of the selected emergency flow, the total number of times the selected emergency flow has been executed, the absolute number of false positives (e.g., how many times the selected emergency flow was triggered and then promptly canceled), the percentage of false positives (e.g., the absolute number of false positives divided by the total number of times the selected emergency flow has been executed), the absolute number of times and percentage that an EDC was contacted, the number of times the selected emergency flow failed, or combinations thereof.

In some embodiments, as depicted in FIGS. 9A & 9B, the dashboard includes a code example tab, an API request tab, and an ALI display tab. FIG. 9A depicts a view of a dashboard within the Emergency Console when the code example tab is selected. In some embodiments, the code example tab displays the script that defines the selected emergency flow. FIG. 9B depicts a view of a dashboard within the Emergency Console when the ALI display tab is selected. In some embodiments, a user can download an emergency trigger script from the dashboard, such as under the API request tab. In some embodiments, the ALI display tab depicts a simulation of information displayed at an emergency dispatch center (e.g., PSAP) generated by the selected emergency flow.

Authentication

In some embodiments, the EFMS authenticates requests using a short-lived OAuth 2.0 access token granted using application client credentials. The token is valid for authenticating requests to the EFMS for a temporary duration of time (e.g., one hour), after which a new token for future requests will need to be fetched. Details for retrieving and using one of these tokens are described below.

(i) Getting an Authentication Token

POST https://api-sandbox.rapidsos.com/oauth/token

Request

Headers

Content-Type: x-www-form-urlencoded

Parameters client_id: Client ID of an application authorized to use the service client_secret: Client secret of an application authorized to use the service grant_type: client_credentials Response Fields (access_token: Short-lived OAuth 2.0 access token)

(ii) Using an Authentication Token

To authenticate requests using an access token, requests typically must include an Authorization header set to the value Bearer <ACCESS-TOKEN> where <ACCESS-TO-KEN> is substituted for the retrieved access token.

(iii) Triggering/Initiating Emergency Flow

The logical entity triggering the emergency flow (e.g., a mobile application, service backend, or any connected device) will trigger the emergency flow with a single API call as described below.

POST https://api-sandbox.rapidsos.com/v1/rem/trigger

Request

Headers (Authorization: Bearer <ACCESS-TOKEN>; Content-Type: application/json); Parameters (emergency flow: The name of the emergency flow to execute; variables: JSON Object defining any variables that you have defined and use in your emergency flow).

Response: Fields (code: Status code of the emergency flow initiation; id: Unique identifier of the instance (e.g., the particular emergency flow session) of the emergency flow execution; message: Human-readable descriptor of the emergency flow status).

Markup Language for Emergency Flows—REML (Proprietary Markup Language)

As discussed above, in some embodiments, emergency flows are defined by scripts written in a programming language. In some embodiments, the programming language used to write the scripts is the YAML (YAML Ain't Markup Language) language or a derivative thereof. In some embodiments, the programming language used to write the scripts is the RapidSOS Emergency Markup Language (REML). The REML language may be used to define a REML state machine. In some embodiments, the REML state machine may be specified by a "states" tag. Each REML state includes the following main items including name of state, description of state, action to be executed, action inputs (also referred to as arguments), variable name to store the results of the action, transitions based on the result of the action (e.g., which state to move to). An embodiment of the schema describes the syntax of a state:

```
name: <string>
description: <string>
action: <string>
inputs:
name1: value1
name2: value2 . . .
store: <string>
on_output:
result1: <string>
result2: <string> . . .
goto: <string>
log: <string>
```

Table 1 describes optional REML tags below.

TABLE 1

| REML Tag | |
|---|---|
| Tag | Description |
| Name | Name of a state |
| Description | Nonfunctional, descriptive comment of what a state accomplishes |
| Action | Name of the action to run i this state |
| Inputs | Map of variables to provide the action as input parameters |
| Store | Name of a variable to store the result of the action |
| on_output | Map of name/values to specify the state transition |
| Goto | Specify transition (if there's no match with "on_output") |
| Log | Mostly Troubleshooting add a customer log for this state |

In addition to the current states, certain embodiments have two built-in states that can be used to stop execution of state-machine: (i) _STATE_END_: specify successful execution of state-machine; (ii) _STATE_ERROR_: specify unsuccessful execution of state-machine.

The built-in states are optionally used in various scenarios: one of the built-in states can be specified in the script; in case of an error—the system will force transition to _STATE_ERROR_; when your state-machine ends—the state-machine will automatically move to _STATE_END_.

In some embodiments, a "transition" is used for determining the "next state". In order to demonstrate a simple transition, consider the next example of a state:

```
name: example-state
action: PLUS
inputs: {a: 1, b: 2}
on_output:
```

```
3: _STATE_END_
   goto: _STATE_ERROR_
```

In this example, the PLUS action is run with inputs a=1" and b=2. If the result is 3 (as expected), the transition moves to the _STATE_END_ state, otherwise the transition moves to the _STATE_ERROR_ state. This example shows that the "on_output" acts as an "if statement" for the action's result.

In some embodiments, transition from one state to another is determined by the following factors: the result of an action: REML will try to match the result of the action with one of the "on_output" entries. In case of a match—the next state; External events (e.g., while executing an action, the REML system can send events to your state-machine. During a phone-call between two users, each user can hang up the call regardless of the state. To handle such hang-up events and decide what is the next state based on the user who hung up the call, transitions are used. The same "on_output" tag may be used to handle events—just like the action=results); the "goto" tag—if there is no "on_output" match, the user can specify the "default next state" using the "goto" tag; if the user hasn't specified goto—the system will move to the next state in the list.

REML Actions

In some embodiments, there is a single action that can be executed (e.g., telephony operations, control actions, data actions) for each machine state. Non-limiting examples of telephony operations includes CALL, EMERGENCY CALL, HANGUP, PLAY, STOP_PLAYBACK. In some embodiments, EMERGENCY_CALL is an enhanced version of the "CALL" action. As an example, in some embodiments, for EMERGENCY_CALL, the Admin or designated representative must provide the location (latitude/longitude), which is optionally passed to the 911 via ALI database and SIP headers; the Admin or designated representative must provide the "caller name", which may be passed to the ALI database; specifying a destination "phone_number" is optional as the emergency-number is known ("test number" for non-production system, 911 for production). If a phone-number is provided, the system will optionally use it as an emergency number.

Non-limiting examples of inputs include: caller_name: name of caller that will be presented to 911; caller_number: phone-number of caller (will be presented to 911); longitude, latitude: location of emergency (will be presented to 911); emergency_number: optional string, the emergency number to call. In some embodiments, the default emergency-number is an answering machine.

```
Example: name: call_911
   action: EMERGENCY_CALL
   inputs:   {latitude:   10.10.,   longitude:   –20.20,
      caller_name="Kai",
   caller_number="1234567789"}
   on_output:
   "true": play-message
   "false": die
```

Another REML action is FAILSAFE. A FAILSAFE action for handling different types of failures can be formulated. In some embodiments, a failure is either triggered by the system (e.g., 9-1-1 not answering) or by the emergency flow (e.g., explicitly triggered by the emergency flow author).

In some embodiments, the FAILSAFE action instructs the system to post an HTTP request to a backend system provided by the emergency flow author and then immediately terminates the session, and therefore the on_output section is not applicable and not needed.

In order to initiate a fail-safe procedure, some embodiments of the emergency flow include failsafe metadata. Two embodiments the FAILSAFE action—the minimal one and the advanced one—are described below. A minimal failsafe requires a URL and a failsafe-reason as shown below. In this minimal case, the action will trigger a POST request to the URL provided by the author and the emergency flow will be terminated. As a request-body, the system will provide the 'reason' in JSON dictionary.

In some embodiments, composite actions are formulated. Composite actions decompose into a series of smaller actions before they are executed by the EFMS. In some embodiments, individual emergency flow building blocks are defined by a single REML action. In some embodiments, individual emergency flow building blocks are defined by composite actions. INTERACTIVE_CALL and CALL_LOOP are composite actions.

In some embodiments, the INTERACTIVE_CALL action decomposes into CALL, PLAY, AND WAIT actions. In cases where a user should be called, and an audio message played to them while a DTMF tone is waited on to further the emergency flow to the next state, a composite action can be used.

In some embodiments, inputs may include: phone_number: string, the phone-number to call; playback: media-resource to play; text: Text (string) to speech; time: Time to wait in seconds after the playback has stopped.

An exemplar INTERACTIVE_CALL action is shown below.

```
action: INTERACTIVE_CALL
   inputs:   {phone_number:   "${phone_number}",   text:
      "${text}"}
on_output:
   "false": fail_state
   "HANGUP@${phone_number}": fail_state
   "#1@${phone_number}": next_state
```

In some embodiments, the CALL_LOOP action decomposes into a list of actions that perform a loop through a list of dictionaries that each contain a phone number of a user to call. When the users are called, an audio is played to them, and they can hit a dtmf to break out of the loop. The final callee dict that is called during the loop is optionally saved in the variable given in the store parameter after the CALL_LOOP runs.

In some embodiments, REML includes some specific events to handle cases where two users are contacted simultaneously. For example, HANGUP@<phone>: a hang-up event from user; #<num>@<phone>: DTMF event from user.

In some embodiments, three players are connected in an emergency call. First, the user is called. When the user picks up the call, a message is played (e.g., "press 1 to connect . . . "). Once the user press '1', a corporate call center or representative may be called and during their call-if anyone hits '9', an emergency call is made and connected to the appropriate PSAP (based on location), so that there can be three or more participants in the conference emergency call or session.

Upstream Emergency Data Management

As described above, the emergency management system (EMS) disclosed herein is capable of gathering data related to an emergency (emergency data; e.g., locations and user data) and transmitting the emergency data to an emergency service provider (ESP; e.g., a public safety answering point (PSAP)) to aid the ESP in responding to the emergency. For example, in some embodiments, when a person calls 911 from their mobile phone, the EMS may receive an emergency alert from the mobile phone including a location of the mobile phone. The EMS can then transmit the location to the PSAP that receives the 911 call, either autonomously or by request, which the PSAP can use to more quickly and effectively respond to the caller's emergency. This process of transmitting data to an ESP can be referred to as a downstream flow of data. Typically, as described above, PSAPs and other ESPs have limited access to emergency data. For example, when a 911 call is routed to an average PSAP, the PSAP receives at most the caller's name, the caller's phone number, and a triangulated location that is only accurate to a few hundred meters, which can be practically worthless in a densely populated area. Any supplemental emergency data, such as a precise location or the caller's medical history, is therefore extremely valuable for an ESP.

Figure 10:
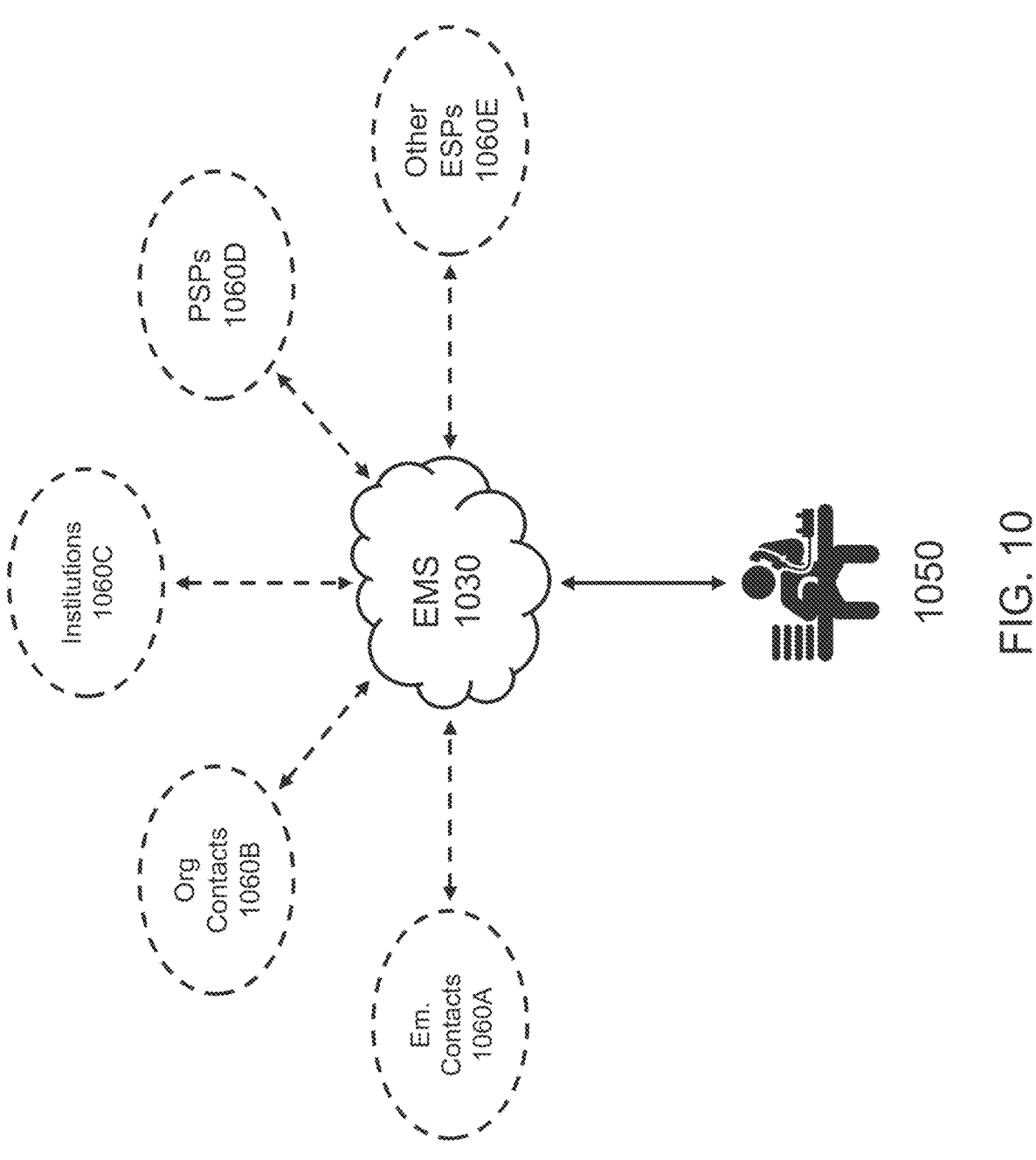
FIG. 10 depicts an embodiment of a system for managing upstream emergency data flow.

However, data generated by ESPs remains a largely untapped resource. Disclosed herein are systems, servers, devices, methods, and media for receiving and utilizing emergency data from ESPs (hereinafter, "upstream data flow"). FIG. 10A depicts a diagram of an upstream data flow management process. In some embodiments, during or after an emergency, an EMS 1030 receives an emergency communication associated with the emergency from an ESP 1050. The EMS 1030 can then process the emergency communication and any emergency data included therein and determine one or more recipients 1060 to notify of the emergency or share the emergency data with or determine one or more actions to take based on the emergency communication and emergency data, as will be described in further detail below. As depicted in FIG. 10A, the one or more recipients can include, but are not limited to, emergency contacts 1060A, organizational contacts 1060B, institutions 1060C, personal and professional service providers (PSPs) 1060D, and other ESPs 1060E. In some embodiments, the EMS 1030 can use data received from an ESP 1050 to execute emergency flows (as described above), notification procedures (as described below), and enhanced ESP functionalities (as described below).

In some embodiments, an ESP 1050 transmits an emergency communication to the EMS 1030 in the form of a request for emergency data regarding an emergency, as described above. In addition to queries for emergency data, an ESP 1050 can send an emergency communication to the EMS 1030 in various other forms. For example, in some embodiments, when an ESP 1050 (e.g., a PSAP) receives an emergency call, the ESP 1050 can transmit an emergency communication to the EMS 1030 in the form of a notification, informing the EMS 1030 of the emergency call. The emergency notification may include an identifier (e.g., the phone number of the emergency caller) and any other data relevant to the call or the caller's emergency that the ESP 1030 may have access to or gathered, such as the day and time of the emergency call, the nature of the emergency, or the caller's location. In some embodiments, the emergency communication is an API call received through an API (application programming interface) provided by the EMS 1030. In some embodiments, the emergency communication is generated and transmitted to the EMS 1030 through an emergency response application executed on a computing device at the ESP 1050. In some embodiments, the emergency response application is provided by the EMS 1030, as described below. While many of the methods and processes described herein are initiated by emergency data included in emergency communications received from ESPs, it is to be understood that, in some embodiments, the methods and processes may be initiated by emergency data included in emergency communications received from any appropriate entity, such as an electronic device capable of producing and transmitting emergency data or a backend computing system capable of gathering and transmitting emergency data.

Emergency Notification System

Figure 11:
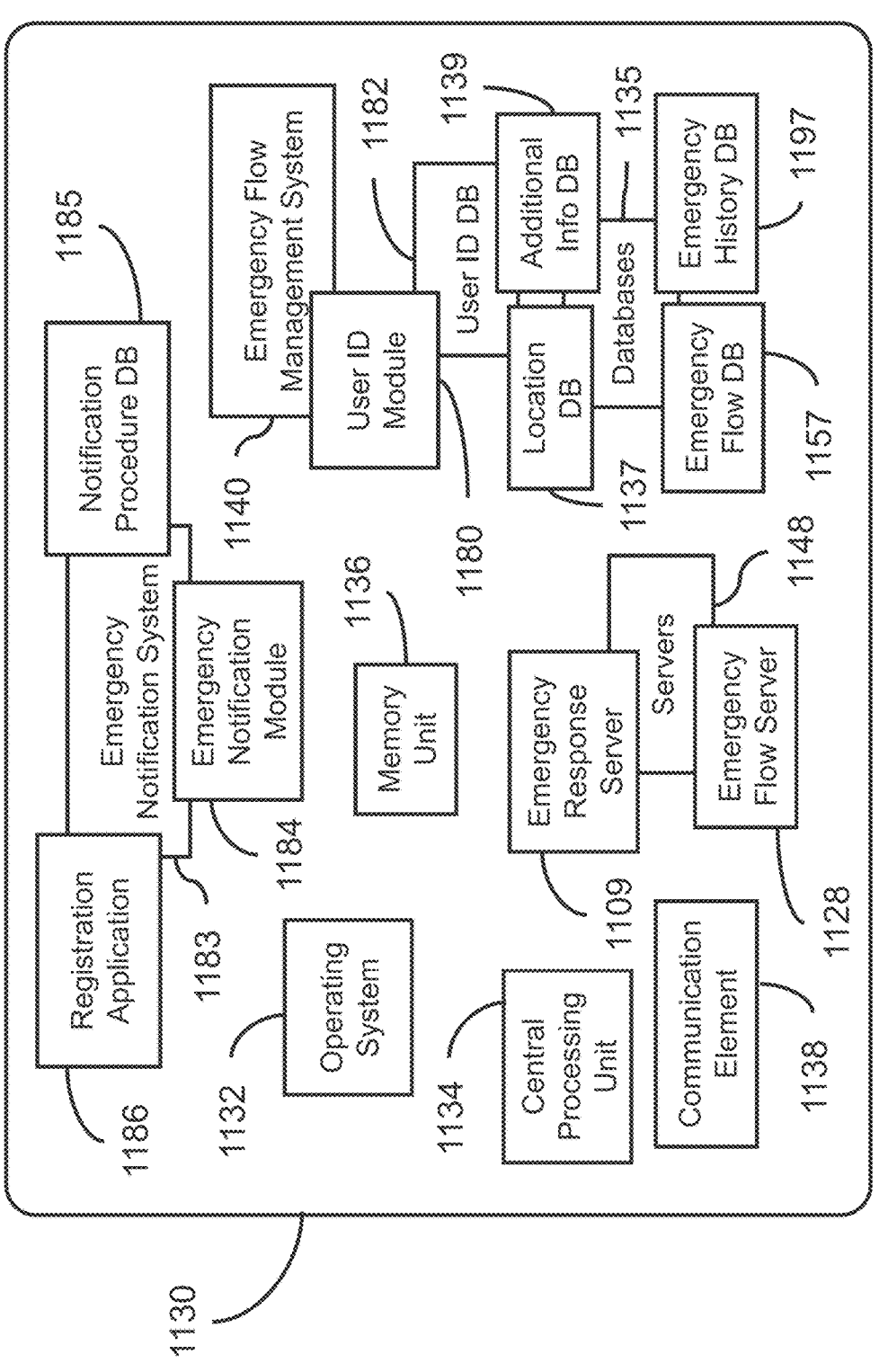
FIG. 11 depicts an embodiment of emergency management system.

FIG. 11 depicts an embodiment of the emergency management system 1130. As described above, in some embodiments, the emergency management system 1130 comprises one or more of an operating system 1132, at least one central processing unit or processor 1134, a memory unit 1136, a communication element 1138, and a server application (e.g., an emergency flow program installed on the emergency flow server 1128). In some embodiments, the emergency management system 1130 comprises one or more databases 1135 (e.g., location database 1137, an additional information database 1139, emergency flow database 1157, user identification database 1182, notification procedure database 1185, and/or emergency history database 1197). In some embodiments, the emergency management system 1130 may include one or more servers 1148. In some embodiments, an emergency response server 1109 executes an emergency flow when an emergency or emergency-like situation is triggered. In some embodiments, the emergency management system 1130 comprises at least one of a location database 1137 and an additional information database 1139.

In some embodiments, the emergency flow program comprises at least one software module (not shown) for carrying out one or more instructions. In some embodiments, the emergency management system 1130 houses components of the emergency flow management system (EFMS), as described above. In some embodiments, the emergency management system 1130 comprises an application for assembling and/or configuring emergency flow scripts. In some embodiments, the emergency management system 1130 comprises an application for managing an emergency response to an emergency alert including execution of an emergency flow script. In some embodiments, the emergency management system additionally or alternatively includes the components of an emergency notification system (ENS) 1183. In some embodiments, the emergency notification system includes an emergency notification module 1184 and a notification procedure database 1185. In some embodiments, the notification procedure database 1185 is configured to store one or more notification procedures. A notification procedure includes instructions to contact one or more contacts in the event of an emergency. In some embodiments, a notification procedure includes a prioritized list of emergency contacts. In some embodiments, the notification procedure includes contact information for an organizational contact. In some embodiments, notification procedures are associated with one or more user identifiers in the notification procedure database 1185. In some embodiments, a notification procedure includes an emergency flow identifier. In some embodiments, when the EMS receives an emergency communication including a user identifier from an emergency service provider, the emergency notification module 1184 is configured to identify a notification procedure associated with the user identifier from within the notification procedure database and execute the notification procedure. In some embodiments, the emergency notification module 1184 is configured to employ the emergency flow management system 1140 in order to execute the notification procedure (e.g., if the notification procedure includes an emergency flow identifier).

FIG. 12 depicts a system for receiving emergency communications from ESPs. In some embodiments, the system includes an emergency management system 1230, an emergency service provider 1250, and a communication device 1267. In some embodiments, as depicted in FIG. 12, the emergency management system 1230 includes one or more databases 1235, an emergency flow management system 1240 (as described above), and a user identification module 1280. As described above, in some embodiments, the user identification module 1280 associates user identifiers (e.g., phone numbers or email addresses) with notification procedures or emergency flows and stores the user identifiers in a user identification database. In some embodiments, as will be described in greater detail below, an emergency service provider 1250 sends an emergency communication in the form of a query for emergency information regarding an emergency to the emergency management system 1230 after receiving an emergency call from a communication device 1267. In some embodiments, the query includes a user identifier, which the emergency management system 1230 uses to identify a notification procedure or an emergency flow associated with the user identifier. In some embodiments, if the emergency management system identifies a notification procedure or emergency flow associated with the user identifier, the emergency management system can then execute the notification procedure or emergency flow associated with the user identifier. The EMS 1230 may additionally receive emergency data from the communication device 1267 or transmit an emergency communication to the communication device 1267, such as a notification that the notification procedure or emergency flow has been executed.

In some embodiments, notification procedures may define pathways of execution, similar to emergency flows described above. In some embodiments, the pathway of execution of a notification procedure is at least partly dependent upon input from a recipient of the notification procedure. For example, in some embodiments, a notification procedure includes a list of emergency contacts and dictates an order of contacting the emergency contacts, and only proceeds to the next contact on the list if the previous contact did not provide confirmation of receipt of the notification. In some embodiments, more highly customizable emergency flows can be used for responding to emergency or likely emergency situations. For example, default or customized emergency flow scripts provided by the EMS through an emergency flow management system (as described above) allow various functionality (e.g., a social media platform would like to get assistance for a possible suicidal user). For such situations, building and executing emergency flows can provide superior capabilities (e.g., three-way conference bridge for emergency calling). Table 2 depicts input data including account information (e.g. user information), associated contacts (or other optional inputs needed to implement the specific flow) and flow parameters (flow identifier or flow ID).

TABLE 2

| User Parameters | | | Associated Contacts | | | | | Flow Parameters | |
| User | | | | | | | | | |
| Phone | | Secondary | | | | | Work | | |
| Number/ Acct ID | User Name | User Contact | Contact Name1 | Contact Num1 | Contact Name2 | Contact Num2 | Safety Line | Flow ID(s) | User Consent |
|---|---|---|---|---|---|---|---|---|---|
| 410-234-5555 | Jane Doe | 410-234-6666 | John Doe | 410-234-7878 | Aunt Flo | 410-234-8989 | 678-234-5555 | (1) Doe_family_emergency (main flow) (2) Fleet_Co_ emergency (work flow) | Share location & additional data with John Doe; Fleet Co. notified if emergency is initiated in a fleet vehicle |

Account Data with Flow Information

On the other hand, simple notification procedures for notifying emergency contacts are also contemplated. In some cases, there is no need for significant customization and a simple notification procedure is sufficient to respond to the emergency (e.g., notifying emergency contacts when the user has been in a vehicular crash). Table 3 depicts an embodiment of input data including account information (e.g., user information), emergency contacts (or other optional inputs needed to implement the specific flow) and flow parameters (flow identifier or flow ID).

or alternatively includes emergency information, data, or multimedia associated with the user identifier. For example, in some embodiments, after the emergency management system receives a query including a user identifier from an emergency service provider, in addition to identifying an executing a notification procedure associated with the user identifier, the emergency management system can query an emergency database using the user identifier (or any other identifier associated with the user identifier) to find any available emergency information, data, or multimedia asso-

TABLE 3

| Account Data with Emergency Notification System | | | | | | | | | |
| User Parameters | | | | | | | | | |
| User Phone | | | Emergency Contacts | | | | Notification Procedure | | |
| Number/ Acct ID | User Name | Alternate Contact | Em. Contact1 | Em. Contact2 | Org. Contact1 | Org. Contact2 | Not. Meth.1 | Not. Meth.2 | Proxy Calling |
| 410-234-5555 | Jane Doe | 410-234-6666 | 410-234-7878 | 410-234-8989 | 678-234-5555 | 678-234-0000 | SMS | Email | Not Allowed |

In an alternate embodiment, a notification procedure can call one or more emergency flows to be implemented combining the advantages of both systems. For example, there may be a simple notification procedure to notify family members (e.g., see the John Doe example), but a customizable emergency flow for getting emergency assistance at a hazardous chemical site.

In one example of a notification procedure, referring back to John Doe described above with respect to FIG. 1B, John Doe, whose user identifier is a phone number (123) 456-7890, may have a notification procedure created for him that includes his family as emergency contacts. The emergency contacts may be arranged in a prioritized list beginning with his wife, followed by his oldest child, and finally ending with his youngest child. The notification procedure includes contact information (e.g., phone numbers) for each of the emergency contacts. The notification may additionally or alternatively include contact information for an organizational contact for Wells Fargo, John's employer. Thus, in this example, if an emergency service provider sends a query to the emergency management system for emergency information regarding the phone number (123) 456-7890 (for example, in response to John calling 9-1-1 from his cell phone), the emergency notification system can identify the notification procedure associated with the phone number (123) 456-7890 in the notification procedure database and execute the notification procedure by attempting to contact John's emergency contacts (his family), organizational contact (Wells Fargo), or both. In this example, the emergency notification system first notifies Wells Fargo and John's wife simultaneously before attempting to contact John's children.

In some embodiments, the emergency management system executes a notification procedure by transmitting a notification message to an account associated with one or more contacts. In some embodiments, the notification message is an SMS text message or a message in an internet-based messaging service, such as WhatsApp. In some embodiments, the message is an email. In some embodiments, the message includes one or more of the user identifier, a name associated with the user identifier, and a location (e.g., a location associated with the user identifier). In some embodiments, the notification message additionally ciated with the user identifier. For example, in some embodiments, the emergency management system queries an emergency database (e.g., a location information server (LIS)) for a location (e.g., a current location) associated with the user identifier. If a location is found, the emergency notification system can then include the location in a notification message sent to a contact according to the notification procedure.

In some embodiments, the emergency notification system includes a registration application through which users can submit user identifiers and select or define notification procedures to be associated with the user identifiers. For example, the registration application may be a mobile or web application that provides a graphical user interface that users can access on personal electronic devices such as laptops and mobile phones. In some embodiments, through the registration application, users can select a standard notification procedure from a plurality of standard notification procedures provided by the registration application to be associated with one or more user identifiers. For example, in some embodiments, a standard notification procedure provided by the registration application is sending a message simultaneously to every contact listed on a list of contacts notifying the contacts that a potential emergency has occurred (hereinafter, "standard notification procedure 1"). In another example, a standard notification procedure provided by the registration application is sending a message including a location to every contact listed on a list of contacts notifying the contacts that a potential emergency has occurred and the location of the potential emergency (hereinafter, "standard notification procedure 2"). In another example, a standard notification procedure provided by the registration application includes emergency flow ID that prompts the emergency flow management system to execute an emergency flow in which emergency contacts listed on a prioritized list of emergency contacts are called one by one until one or the emergency contacts answers and selects to connect to 9-1-1 (hereinafter, "standard notification procedure 3"). In one example of such an embodiment, referring again to John Doe, John can access the registration and, through the graphical user interface, submit his user identifier (phone number (123) 456-7890) and select between standard notification procedure 1, 2, and 3 to be associated with his user identifier. In this example, John selects standard notification procedure 2 and submits his list of prioritized emergency contacts, as described above. Thus, in this example, if John calls 9-1-1 and reaches a public safety answering point (PSAP), and the PSAP queries the emergency management system for emergency information regarding John's user identifier (phone number (123) 456-7890), the emergency notification system can identify that John's phone number has been associated with standard notification procedure 2 and automatically execute standard notification procedure 2, notifying each of his emergency contacts (his wife and two children) that John has been involved in a potential emergency and providing a location of the potential emergency.

In some embodiments, through the registration application, users can define customized notification procedures. For example, in some embodiments, a user can access the registration application and submit a user identifier. The user can then define a customized notification procedure by submitting one or more contacts and then selecting when and how each of the one or more contacts is notified when the notification procedure is executed by the emergency notification system. For example, referring back to John Doe, John may submit his phone number ((123) 456-7890) as his user identifier and then submit his wife and two children as contacts. Then, in this example, John selects the first step of his customized notification procedure to be calling his wife. He selects to end the notification procedure if the call to his wife is answered. He then selects the second step of his customized notification procedure to be simultaneously delivering an SMS text message including his location to his wife and two children if and only if the call to his wife is unanswered.

In some embodiments, a user may access the registration application and submit multiple user identifiers to be associated with one or more notification procedures. In some embodiments, a user can submit two or more user identifiers to be defined as a group within the emergency notification system. For example, referring again to John Doe, John can access the registration application and submit user identifiers (e.g., phone numbers) for himself, his wife, and both of his two children as a group, which the registration application can then associate within the emergency notification system. In some embodiments, the registration application provides a standard notification procedure for groups of user identifiers submitted through the registration application. For example, in some embodiments, if John submits a group of user identifiers for his family, the registration application can automatically associate a standard notification procedure with the user identifiers. In some embodiments, the standard notification procedure for a group of user identifiers is to notify each other member of the group when the emergency management system receives a query including one of the user identifiers from the group of user identifiers from an emergency service provider. For example, if an emergency service provider sends a query including the user identifier of John's youngest child, the emergency notification system executes the notification procedure by sending a notification message to John, John's wife, and John's older child simultaneously. In some embodiments, as mentioned above, a single user identifier can be associated with multiple notification procedures. For example, in some embodiments, just as John may submit user identifiers for his nuclear family (wife and two children) as a group through the registration application, John's mother may submit user identifiers for her nuclear family, including John, naturally.

In this example, John's user identifier is therefore associated with two separate groups and thus associated with two different notification procedures. Or, for example, in some embodiments, an organization may access the registration application and submit user identifiers to be associated with a notification procedure associated with the organization. For example, Wells Fargo (e.g., a Wells Fargo employee) may access the registration application and submit a plurality of user identifiers, including John's user identifier (phone number (123) 456-7890), to be associated with Wells Fargo's notification procedure. Thus, for example, John's user identifier could be associated with a third notification procedure. If the emergency management system receives a query including John's user identifier from an emergency service provider (e.g., a PSAP), the emergency notification system can simultaneously execute all three notification procedures associated with John's user identifier (as well as any other notification procedures associated with John's user identifier), thereby notifying members of John's nuclear family, John's mother's nuclear family, and Wells Fargo.

Figures 13A, 13B:
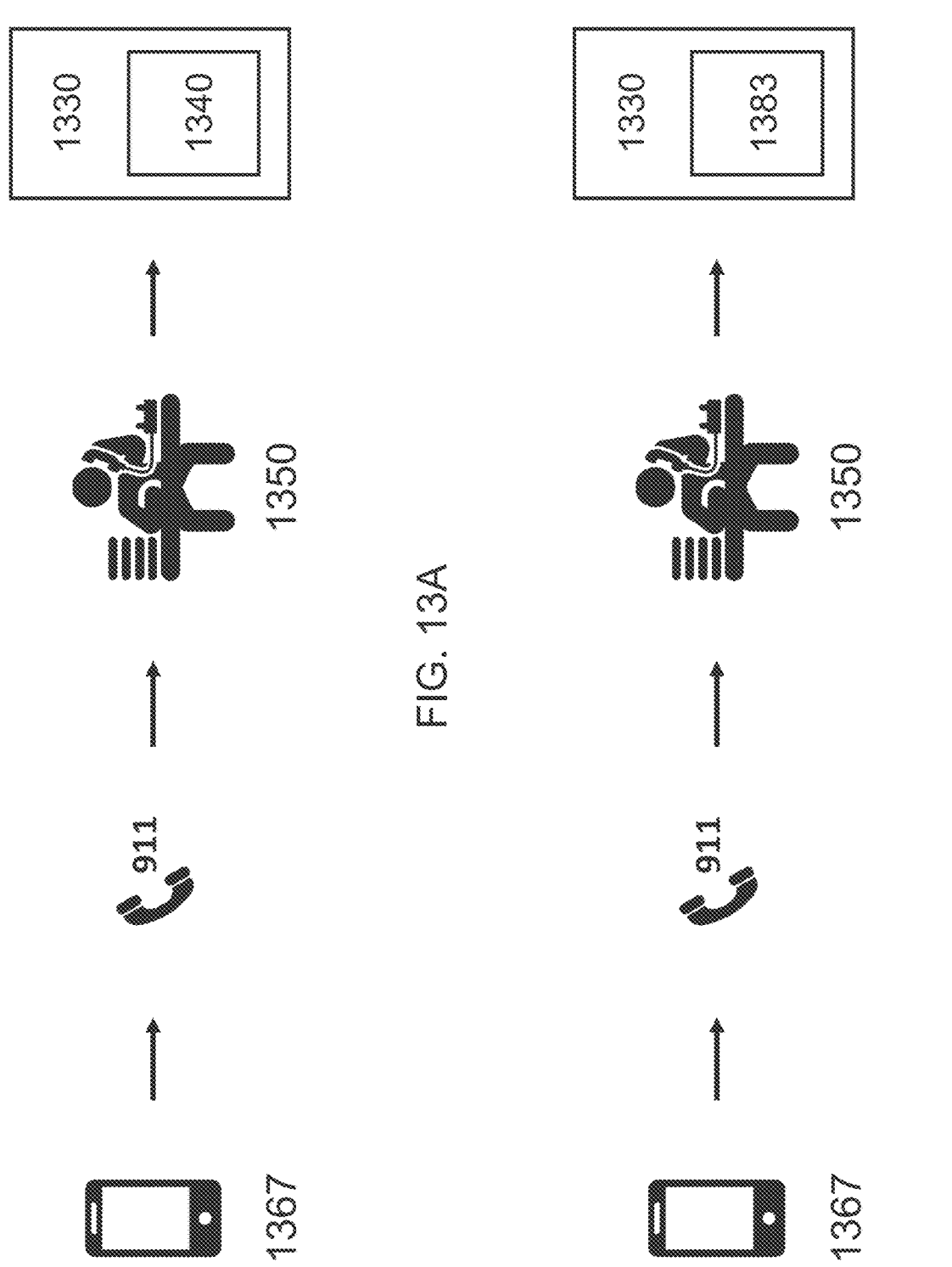
FIG. 13A and FIG. 13B depict embodiments of a system for managing upstream emergency data flow, emergency flows, and emergency notifications.

FIG. 13A and FIG. 13B depict embodiments of systems for managing emergency flows and notifications. As depicted in FIG. 13A, in some embodiments, an emergency call (e.g., 9-1-1) is dialed from a communication device 1367 and received by an emergency service provider 1350 (e.g., a PSAP). The emergency service provider 1350 can then send an emergency communication (e.g., a query for emergency data) including the phone number (e.g., the user identifier) from which the emergency call was dialed to the emergency management system 1330. The emergency management system 1330 then queries one or more databases (e.g., a user identification database) to determine if the phone number has been associated with an emergency flow. If the phone number has been associated with an emergency flow, the emergency management system 1330 then employs the emergency flow management system 1340 to execute the emergency flow associated with the phone number, as described above. As depicted in FIG. 13B, in some embodiments, an emergency call (e.g., 9-1-1) is dialed from a communication device 1367 and received by an emergency service provider 1350 (e.g., a PSAP). The emergency service provider 1350 can then send an emergency communication (e.g., a query for emergency data) including the phone number (e.g., the user identifier) from which the emergency was dialed to the emergency management system 1330. The emergency management system can then send a query to one or more database (e.g., a user identification database) to determine if the phone number has been associated with a notification procedure. If the phone number has been associated with a notification procedure, the emergency management system 1330 then employs the emergency notification system 1383 to execute the notification procedure associated with the phone number. Although the emergency response and management processes disclosed herein are often initiated by an emergency call, it is contemplated that an emergency response and management processes may be initiated by any other form of a request for emergency service, such as a text message or a digital notification.

Figure 14A:
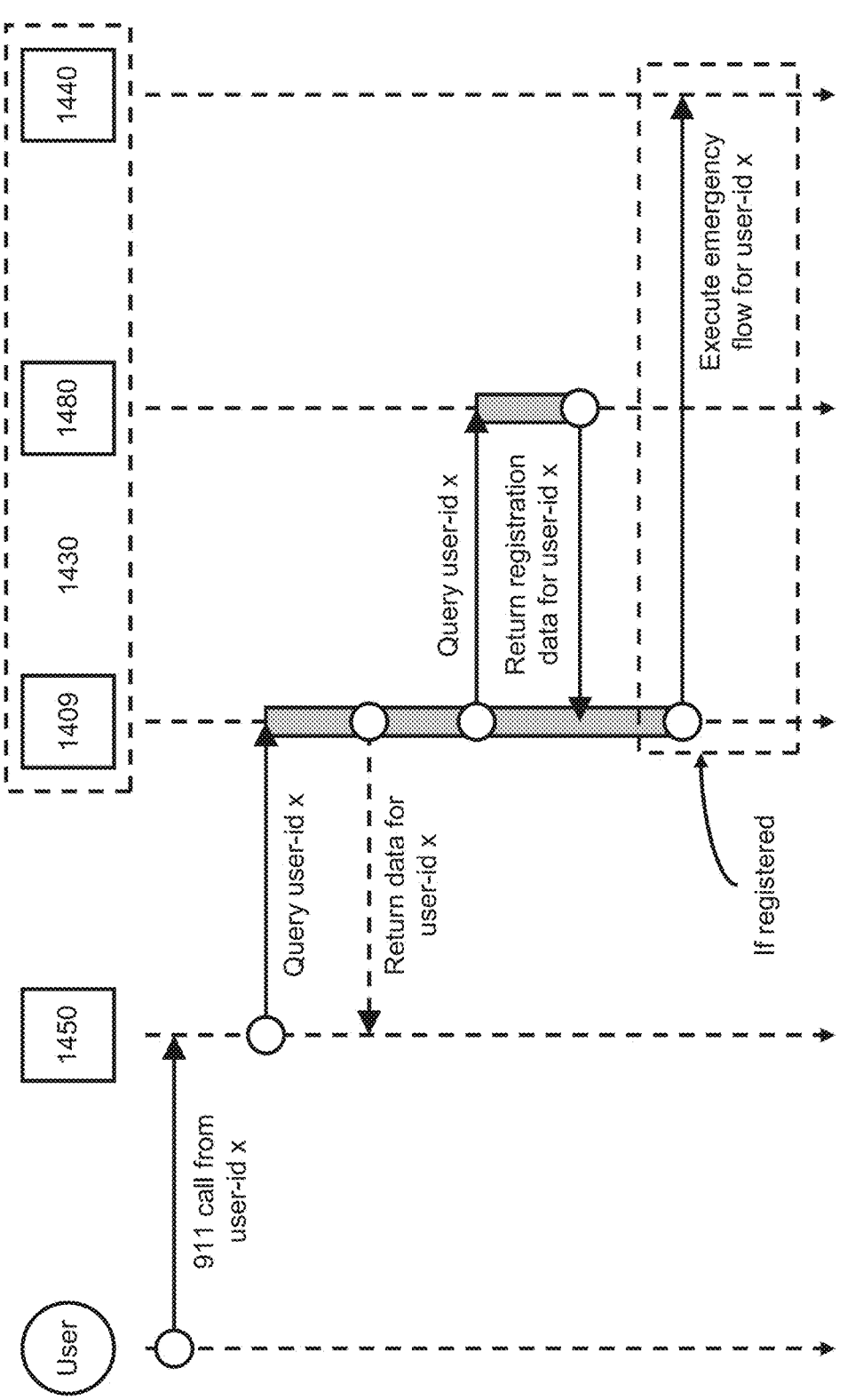
FIG. 14A and FIG. 14B illustrate embodiments of a process for managing emergency flows and notifications.
Figure 14B:
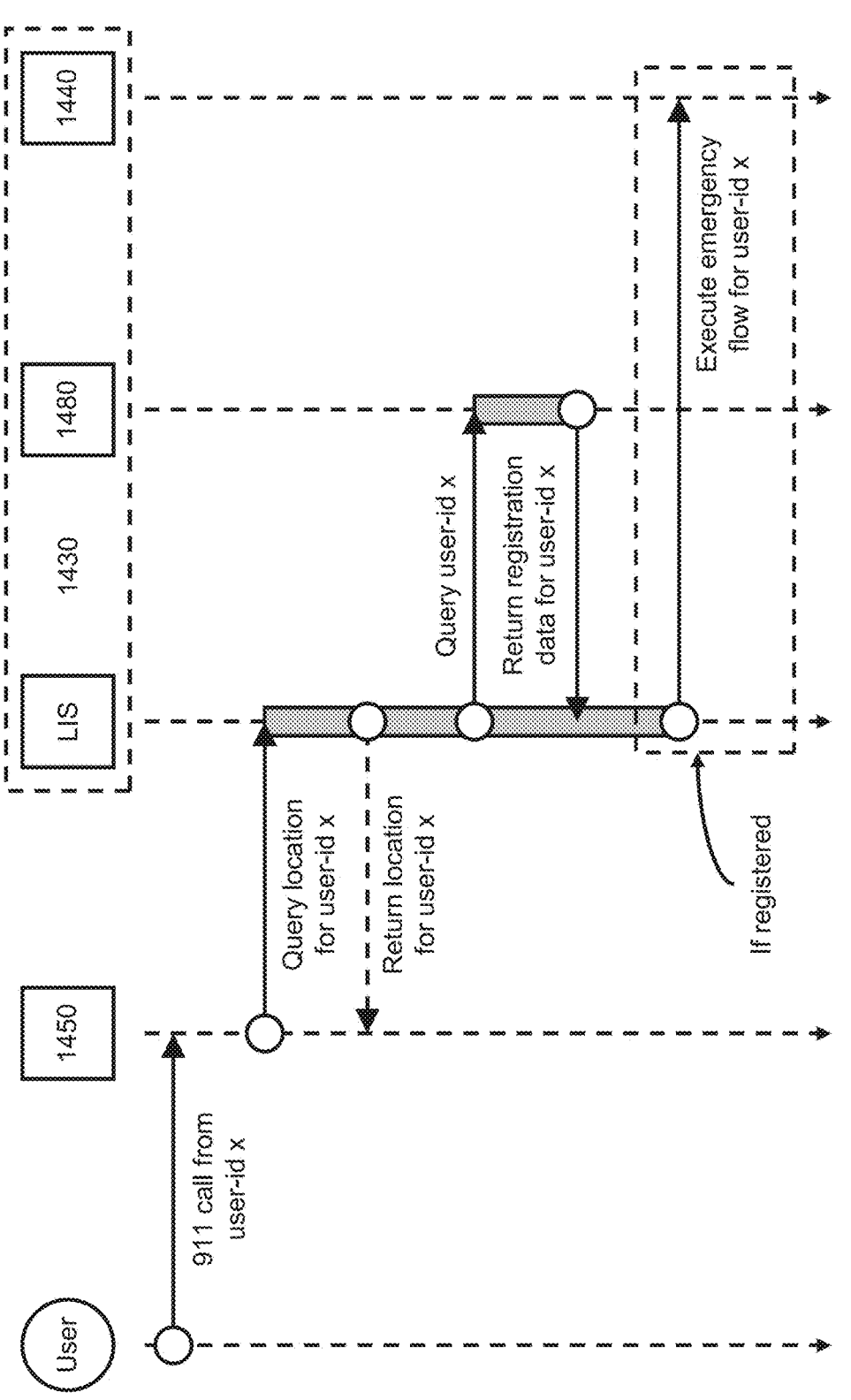

FIG. 14A and FIG. 14B illustrate embodiments of a method for managing emergency flows and notifications. As depicted in FIG. 14A, in some embodiments, an emergency management system (EMS) 1430 for responding to emergencies includes an emergency response server (ERS) 1409, a user identification module 1480, and an emergency flow management system (EFMS) 1440. In some embodiments, as depicted in FIG. 14A, when a user dials an emergency call (e.g., 9-1-1) from a communication device, the emergency call is received by an emergency service provider (e.g., PSAP 1450) with a user identifier (such as a phone number of the communication device from which the emergency call was dialed). The emergency service provider can then send an emergency communication (e.g., a query for emergency data) including the user identifier to the EMS 1430. In some embodiments, as depicted in FIG. 14A, the emergency communication is received by the ERS 1409. In some embodiments, as depicted in FIG. 14A, in response to receiving the emergency communication, the EMS 1430 searches one or more databases for emergency data or emergency information associated with the user identifier and returns the emergency data or emergency information to the emergency service provider 1450, such as through the ERS 1409. In some embodiments, after receiving the emergency communication including the user identifier from the emergency service provider at the ERS 1409, the EMS 1430 then employs the user identification module 1480 to determine if the user identifier has been associated with an emergency flow (as discussed above), such as within a user identification database. If the user identifier has been associated with an emergency flow (e.g., if registered), the user identification module 1480 can return an emergency flow identifier associated with the user identifier to the ERS 1409, which in turn transmits the emergency flow identifier to the EFMS 1440 for execution. The EFMS 1440 can then execute the emergency flow associated with the user identifier.

As depicted in FIG. 14B, in some embodiments, the EMS 1430 includes a location information server (LIS), a user identification module 1480, and an emergency flow management system (EFMS) 1440. In some embodiments, as depicted in FIG. 14B, when a user dials an emergency call (e.g., 9-1-1) from a communication device, the emergency call is received by an emergency service provider (e.g., PSAP 1450) with a user identifier (such as a phone number of the communication device from which the emergency call was dialed). The emergency service provider can then send a location query (e.g., an emergency communication) including the user identifier to the EMS 1430. In some embodiments, the location query is received by the EMS 1430 at the location information server (LIS). In some embodiments, in response to receiving the location query, the LIS searches one or more databases for a location associated with the user identifier. If a location associated with the user identifier is found, the LIS returns the location to the emergency service provider. In some embodiments, after receiving the location query including the user identifier at the LIS, the EMS 1430 then employs the user identification module 1480 to determine if the user identifier has been associated with an emergency flow (as discussed above), such as within a user identification database. If the user identifier has been associated with an emergency flow (e.g., if registered), the user identification module 1480 can return an emergency flow identifier associated with the user identifier to the LIS, which in turn transmits the emergency flow identifier to the EFMS 1440 for execution. The EFMS 1440 can then execute the emergency flow associated with the user identifier.

Figure 15:
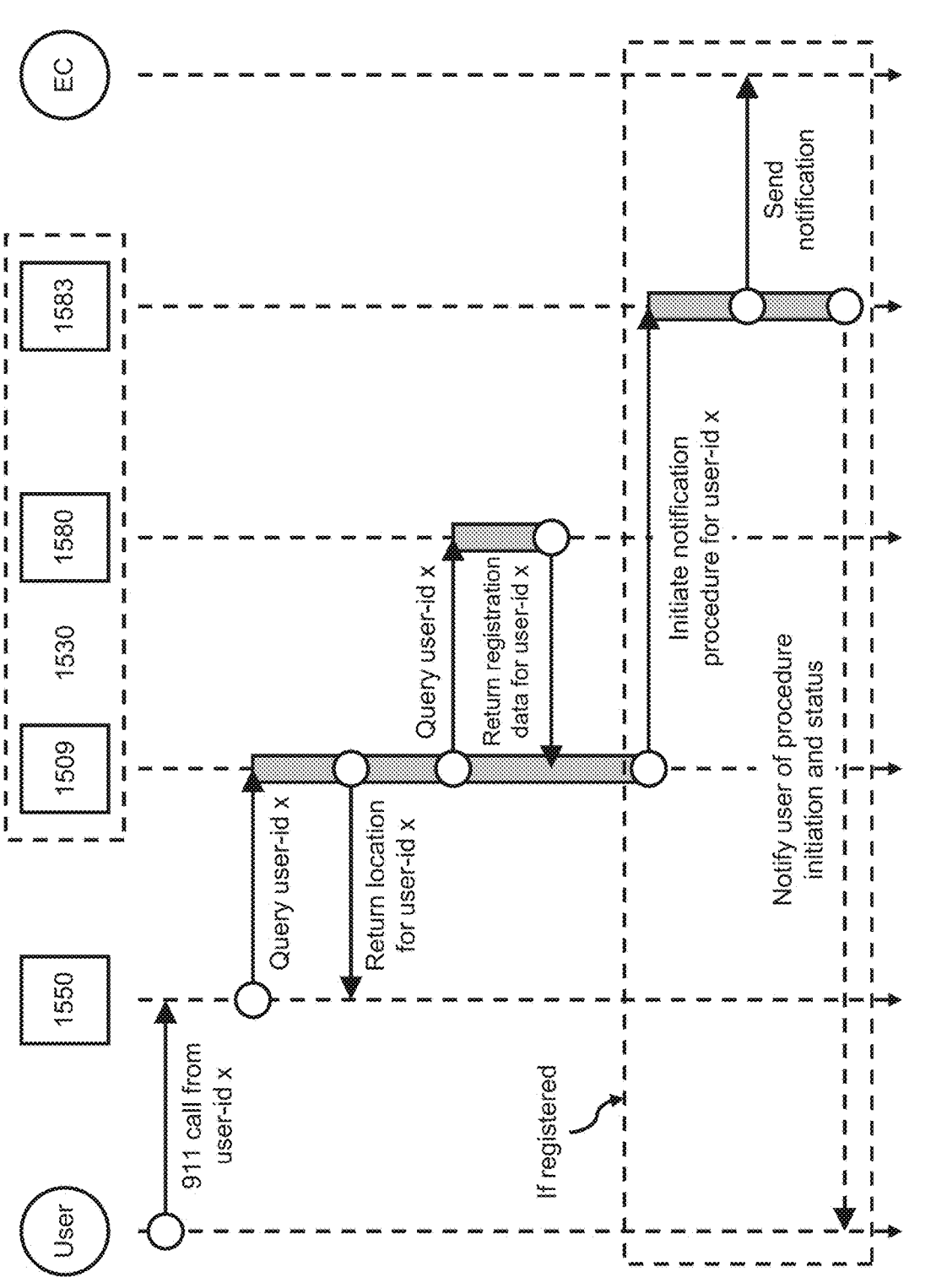
FIG. 15 illustrates an embodiment of a process for managing emergency notifications.

FIG. 15 illustrates an embodiment of a method for managing emergency notifications. In some embodiment, the emergency management system (EMS) 1530 includes an emergency response server (ERS) 1509, a user identification module 1580, and an emergency notification system (ENS) 1583. In some embodiments, as depicted in FIG. 15, when a user dials an emergency call (e.g., 9-1-1) from a communication device, the emergency call is received by an emergency service provider (e.g., PSAP 1550) with a user identifier (such as a phone number of the communication device from which the emergency call was dialed). The emergency service provider can then send an emergency communication (e.g., a query for emergency data) including the user identifier to the EMS 1530. In some embodiments, the query is received by the ERS 1509, as depicted in FIG. 15. In some embodiments, as depicted in FIG. 15, in response to receiving the query, the EMS 1530 searches one or more databases for emergency data or emergency information associated with the user identifier and returns the emergency data or emergency information to the emergency service provider, such as through the ERS 1509. In some embodiments, after receiving the query including the user identifier from the emergency service provider at the ERS 1509, the EMS 1530 then employs the user identification module 1580 to determine if the user identifier has been associated with a notification procedure (as discussed above), such as within a user identification database. If the user identifier has been associated with a notification procedure (e.g., if registered, such as through a registration application, as described above) the user identification module 1580 can return registration information regarding the notification procedure (e.g., a notification procedure identifier that identifies the particular notification procedure, such as within a notification procedure database) associated with the user identifier to the ERS 1509, which in turn transmits the registration information regarding the notification procedure to the ENS 1583 for execution. The ENS 1583 can then execute the notification procedure associated with the user identifier. As depicted in FIG. 15, in some embodiments, the ENS 1583 executes the notification procedure associated with the user identifier by sending notifications to one or more emergency contacts. In some embodiments, after executing the notification procedure associated with the user identifier, the ENS 1583 can additionally send a notification to the user notifying the user that the notification procedure has been executed or indicating a status of the execution of the notification procedure.

Figure 16:
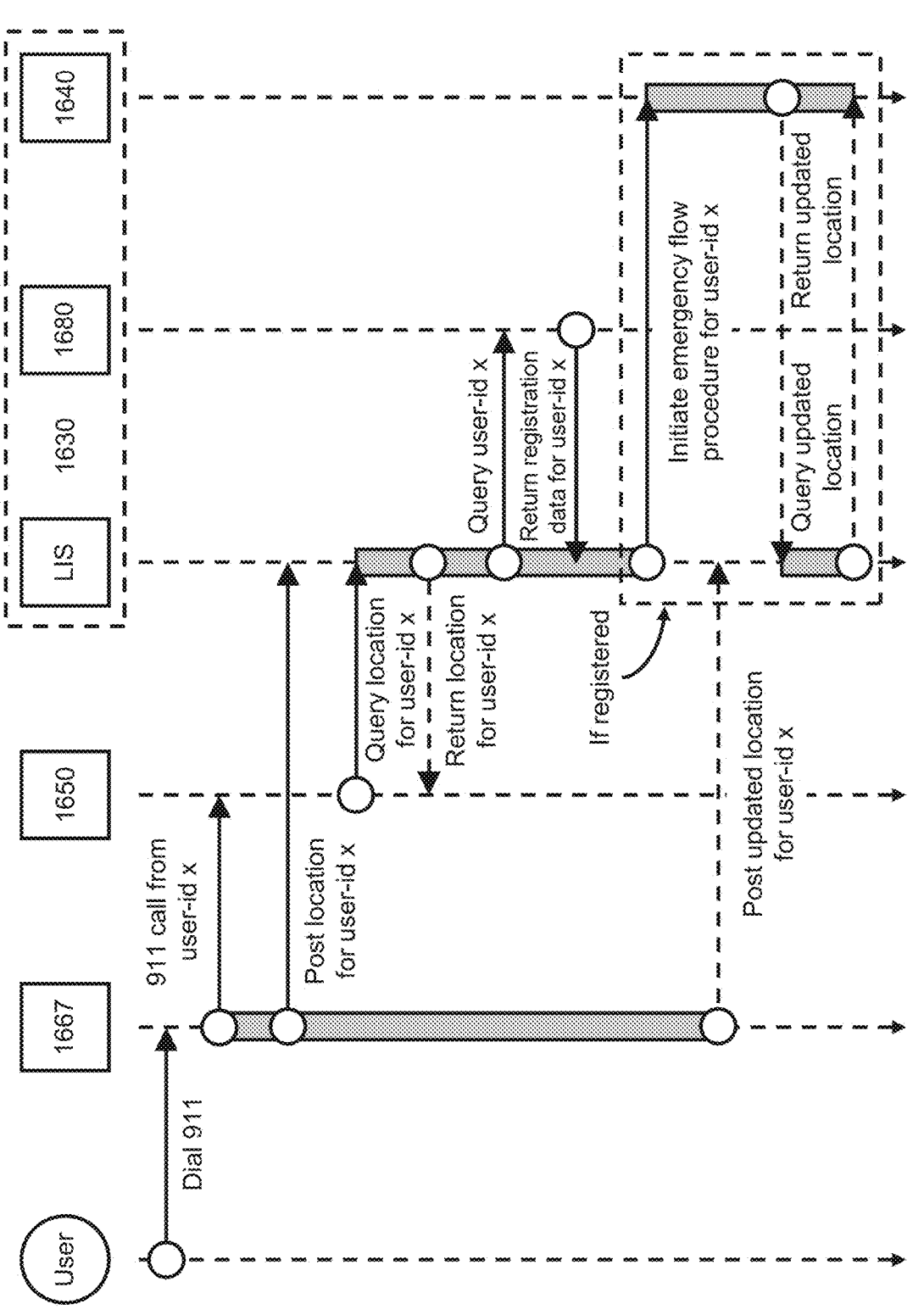
FIG. 16 illustrates an embodiment of a process for managing emergency flows.

FIG. 16 illustrates an embodiment of a method for managing emergency flows. In some embodiments, an emergency management system 1630 for responding to emergencies includes a location information server (LIS), a user identification module 1680, and an emergency flow management system (EFMS) 1640. As depicted in FIG. 16, in some embodiments, when a user dials an emergency call (e.g., 9-1-1) from a communication device, the emergency call is received by an emergency service provider (e.g., PSAP 1650) with a user identifier (such as a phone number of the communication device from which the emergency call was dialed). In some embodiments, as depicted by FIG. 16, when the emergency call is dialed, the communication device concurrently or subsequently transmits a location associated with the user identifier to the LIS. After the emergency service provider receives the emergency call, the emergency service provider 1650 can then send a location query (e.g., an emergency communication) including the user identifier to the EMS 1630. In some embodiments, the location query is received by the EMS at the location information server (LIS). In some embodiments, in response to receiving the location query, the LIS searches one or more databases for the location associated with the user identifier. If the location associated with the user identifier is found, the LIS returns the location associated with the user identifier to the emergency service provider. In some embodiments, after receiving the location query including the user identifier from the emergency service provider, the EMS 1630 additionally or alternatively employs the user identification module 1680 to determine if the user identifier has been associated with an emergency flow (as discussed above), such as within a user identification database. If the user identifier has been associated with an emergency flow (e.g., if registered), the user identification module 1680 can return an emergency flow identifier associated with the user identifier to the LIS, which in turn transmits the emergency flow identifier to the EFMS 1640 for execution. The EFMS 1640 can then execute the emergency flow associated with the user identifier. In some embodiments, the LIS additionally transmits the location associated with the user identifier to the EFMS 1640 to be used in the execution of the emergency flow. In some embodiments, during the execution of the emergency flow, the communication device transmits an updated location associated with the user identifier to the LIS. In some embodiments, during the execution of the emergency flow, the EFMS 1640 queries the LIS for an updated location associated with the user identifier. If an updated location associated with the user identifier has been transmitted to the LIS, the LIS returns the updated location to the EFMS 1640 to be incorporated into the execution of the emergency flow.

Location and Additional Data Based Notification Procedures

Figure 17:
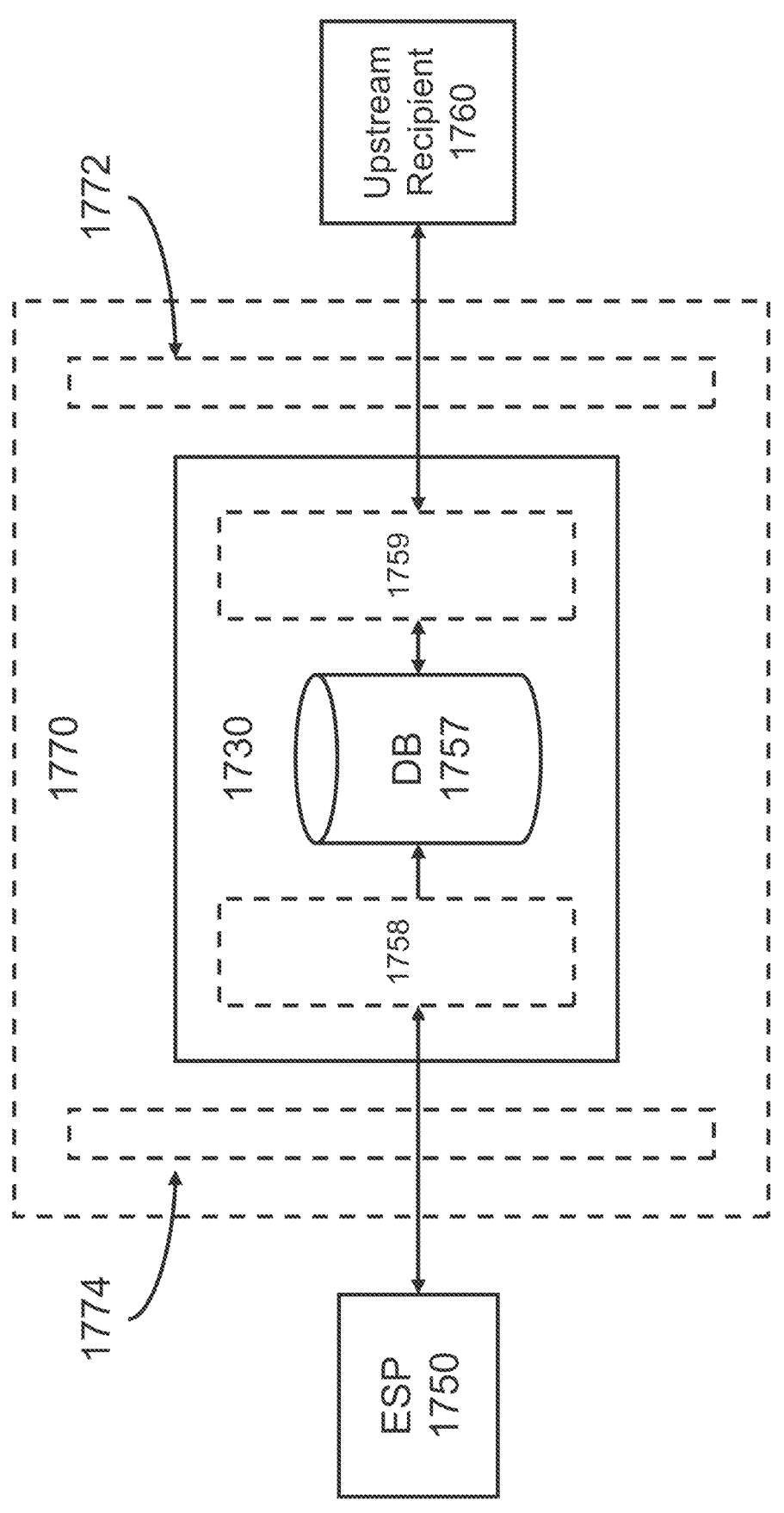
FIG. 17 depicts an embodiment of an emergency management system and geofence system.

In some embodiments, after the emergency management system (EMS) receives an emergency communication from an emergency service provider (ESP), in order to determine if an emergency flow or notification procedure should be executed or which emergency flow or notification procedure should be executed, the EMS must use emergency data received from the ESP other than a user identifier, such as a location and/or an emergency type. FIG. 17 depicts an embodiment of a geofence system 1770 applied to an emergency management system 1730. In some embodiments, the geofence system 1770 is applied to the EMS 1730 to protect potentially sensitive emergency data using geospatial analysis. In some embodiments, as will be described in further detail, the geofence system 1770 is used by the EMS 1730 to trigger the execution of emergency flows or notification procedures.

Generally, a geofence is a virtual perimeter representing a real-word geographic area. A geofence can be dynamically generated—as in a radius around a point location—or a geofence can be a predefined set of boundaries (such as school zones or neighborhood boundaries). The use of a geofence is called geofencing. For emergency response, an emergency service provider (public or private entities) may be given jurisdictional authority to a certain geographical region or jurisdiction (also referred to as "authoritative regions"). In the context of emergency services, one or more geofences may correspond to the authoritative region of an ESP. In many cases, the ESP is a public entity such as a public safety answering point (PSAP), a police department, a fire department, a federal disaster management agency, national highway police, etc., which has jurisdictional authority over a designated area (sometimes, overlapping areas). Geofences can be used to define an ESP's jurisdictional authority by various methods and in various Geographic Information System (GIS) formats. In some embodiments, geofences only represent authoritative regions if the geofence has been assigned or verified by a local, state, or federal government. In some embodiments, geofences represent assigned jurisdictions that are not necessarily authoritative regions. For example, in some embodiments, a geofence is unilaterally created by its associated ESP without verification or assignment by a local, state, or federal government.

Geofences can be defined in various ways. For example, in some embodiments, a geofence comprises one or more of the following: a county boundary, a state boundary, a collection of postal/zip codes, a collection of cell sectors, simple shapes, complex polygons, or other shapes or areas. In some embodiments, geofences comprise approximations where the "approximated" geofence encloses an approximation of the authoritative region. Updates to geofences may be required over time because the authoritative regions may change over time. Geofences may change over time (e.g., a new sub-division has cropped up) and require updates. In some embodiments, the systems and methods described herein allow geofences to be updated (e.g., an ESP administrator can upload updated geofence GIS shapefiles to the EMS).

In some embodiments, as described above, the EMS 1730 provides and maintains a clearinghouse for receiving, storing, and sharing emergency data. In some embodiments, the clearinghouse includes one or more ingestion modules 1758, one or more databases 1757, and one or more retrieval modules 1759. As depicted in FIG. 17, in some embodiments, a geofence system 1770 can be applied to the EMS 1730 (or the clearinghouse). In some embodiments, the geofence system 1770 includes an ingestion geofence module 1774 (also referred to as an "ingress filter"). In some embodiments, the geofence system 1770 includes a retrieval geofence module 1772 (also referred to as an "egress filter"). In some embodiments, the geofence system 1770 includes a geofence database (not shown) that stores a plurality of geofences associated with a plurality of entities.

In some embodiments, when an ESP 1750 transmits an emergency communication to the EMS 1730, the emergency communication includes a location (e.g., a location associated with an emergency), and the location is filtered or processed by the geofence system 1770 (such as by the ingress filter 1774) before or after any emergency data included in the emergency communication is stored within the emergency data database 1757. In processing the location received in the emergency communication from the ESP 1750, the geofence system 1770 retrieves a set of geofences associated with a set if accounts from the geofence database and determines if the location received in the emergency communication falls within any geofences within the set of geofences. If the location does fall within one or more of the geofences within the set of geofences, the EMS 1730 can then identify one or more accounts associated with the one or more geofences that the location fell within, identify one or more emergency flows or notification procedures associated with the one or more accounts (as described above), and execute the one or more emergency flows or notification procedures (as described above). In some embodiments, executing the one or more emergency flows or notification procedures includes transmitting emergency data to one or more upstream data recipients 1760. In some embodiments, before transmitting emergency data to an upstream data recipient 1760, the EMS 1730 employs the geofence system 1770 to confirm that that upstream data recipient 1760 is associated with a geofence that the location received in the emergency communication falls within by using the egress filter 1772.

Figure 18:
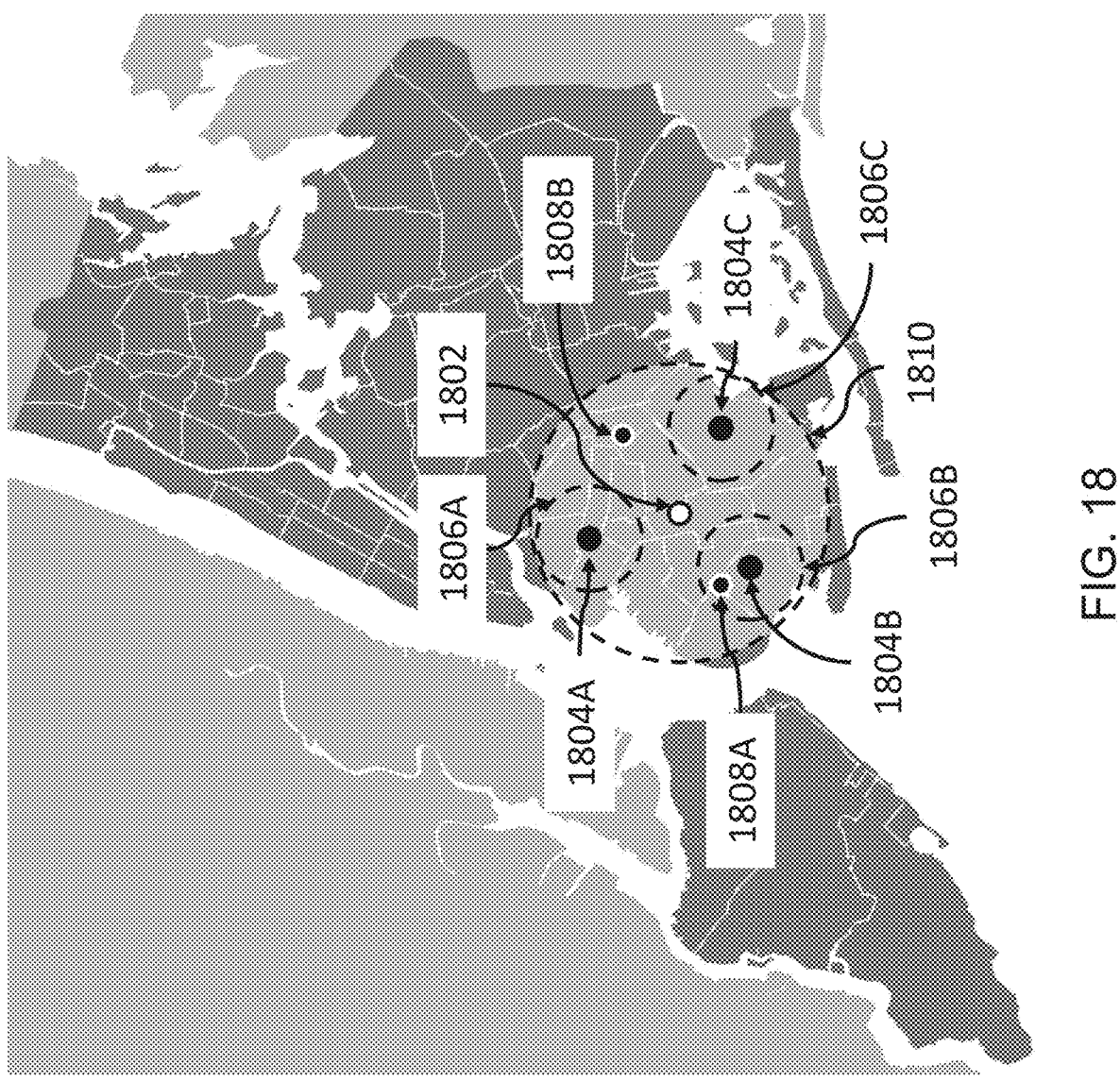
FIG. 18 illustrates embodiments of geofences.

For example, FIG. 18 illustrates examples of locations and geofences used by the EMS and geofence system. In this example, ESP location 1802 is the location of a public safety answering point (PSAP), which has an ESP geofence 1810. All of the space contained within ESP geofence 1810 is under the jurisdictional authority of the PSAP. In one example, institution location 1804A is the location of an office building, which falls within ESP geofence 1810. In this example, an administrator of the office building has registered with the EMS and provided institution geofence 1806A as associated with the office building. In another example, institution location 1804B is the location of a high school, which also falls within ESP geofence 1810. In this example, an administrator of the high school has registered with the EMS and provided institution geofence 1806B as associated with the high school. In a third example, institution location 1804C is the location of a private bank, which also falls within ESP geofence 1810. In this example, an administrator of the private bank has registered with the EMS and provided institution geofence 1806C as associated with the private bank. Each of the three institutions (the office building, the high school, and the private bank) have also signed up with the EMS for notification procedures that notify their respective administrators when an emergency occurs within their respective institution geofences. In some embodiments, if the PSAP receives an emergency call with an associated location at emergency location 1808A and transmits an emergency communication to the EMS including emergency location 1808A, the EMS can retrieve the institution geofences 1806 for each of the office building, the high school, and the private bank and determine if the emergency location 1808A falls within any of the institution geofences 1806. In this example, the EMS determines that emergency location 1808A falls within the institution geofence 1806B associated with the high school, and executes the notification procedure associated with the high school, thereby notifying the administrator of the high school that an emergency has occurred within the institution geofence 1806B associated with the high school. However, if the PSAP receives an emergency call with an associated location at emergency location 1808B and transmits an emergency communication to the EMS including emergency location 1808B, the EMS can retrieve the institution geofences 1806 and determine that emergency location 1808B does not fall within any of the institution geofences 1806. In such a case, the EMS would not execute any of the notification procedures associated with the office building, high school, or private bank.

In another example, each of the institution locations 1804 represent locations of other emergency service providers. In this example, institution location 1804A is the location of a police station, institution location 1804B is the location of a fire station, and institution location 1804C is the location of a hospital. As illustrated in FIG. 18, all three institution locations 1804 of the police station, the fire station, and the hospital fall within the authoritative jurisdiction of the PSAP (ESP geofence 1810). In this example, if the PSAP receives an emergency call associated a location at emergency location 1808A and transmits an emergency communication to the EMS including emergency location 1808A, the EMS can retrieve the institution geofences 1806 for each of the police station, fire station, and hospital and determine if emergency location 1808A falls within any of the institution geofences 1806. In this example, the EMS determines that emergency location 1808A falls within the institution geofence 1806B associated with the fire station and execute a notification procedure associated with the fire station, which could include notifying the fire station of the emergency occurring at emergency location 1808A and/or transmitting any emergency data regarding the emergency to the fire station.

In some embodiments, the EMS uses additional data to determine if an emergency flow or notification procedure should be executed in response to an emergency communication received from an ESP. For example, in some embodiments, the emergency communication received from the ESP includes an emergency type (e.g., fire, medical, police, burglary, active shooter, natural disaster, etc.) in addition to a user identifier or an emergency location. After the EMS identifies an emergency flow or notification procedure associated with the user identifier or an account having a geofence that encompasses the emergency location, the EMS can check the emergency flow or notification procedure for any additional conditions necessary or required for the emergency flow or notification procedure's execution. In some embodiments, an emergency flow or notification procedure may require that the emergency be a certain type. For example, referring back to the high school having the institution geofence 1806B, the notification procedure associated with the high school may require that the emergency for which the notification procedure is to be executed be one of a fire, natural disaster, or active shooter (excluding other types of emergencies, such as medial emergencies and burglaries). In this example, if the PSAP at ESP location 1802 receives an emergency call for a burglary with an associated location at emergency location 1808A and transmits an emergency communication to the EMS including emergency location 1808A and an indication that the emergency is a burglary emergency type, the EMS can determine that emergency location 1808A falls within the institution geofence 1806B associated with the high school but forgo executing the notification procedure associated with the high school. However, if the emergency communication includes an indication that the emergency is an active shooter emergency type, the EMS can execute the notification procedure associated with the high school. Or, for example, referring back to the fire station having the institution geofence 1806B, the notification procedure associated with the fire station may require that the emergency for which the notification procedure is to be executed is a fire.

Personal and Professional Service Providers (PSPs)

In some embodiments, after receiving an emergency communication regarding an emergency from an emergency service provider (ESP), the EMS can execute a notification procedure to transmit emergency data associated with the emergency to one or more personal or professional service providers (PSPs). In some embodiments, a PSP is a company or organization that provides services to individuals or consumers. For example, in some embodiments, a PSP is a roadside assistance provider (e.g., the American Automobile Association, or AAA), a medical insurance provider (e.g., Blue Cross Blue Shield), or a private security company. In some embodiments, a PSP can register with the EMS by selecting or creating a notification procedure or emergency flow to be associated with the PSP and providing the EMS with a list of user identifiers to be associated with the PSP and the notification procedure or emergency flow. Then, if the EMS receives an emergency communication regarding an emergency (e.g., a query for emergency data from an ESP) including a user identifier included on the list of user identifiers provided by the PSP, the EMS can execute the notification procedure or emergency flow associated with the PSP to notify the PSP of the emergency potentially involving one of their customers or take appropriate emergency actions.

Consent & User Preferences

In some embodiments, consent is required for a user identifier to be used in a notification procedure or emergency flow. For example, in some embodiments, when a user identifier is submitted to the emergency notification system to be associated with a notification procedure, the emergency notification system sends a confirmation message to the user identifier or an account associated with the user identifier. In some embodiments, a user can provide consent by replying to the confirmation message. In some embodiments, the confirmation message includes a confirmation code that a user can user to provide consent through the registration application. For example, if the user identifier is a phone number, the emergency notification system can send a confirmation message to the phone number in the form of an SMS text message. In some embodiments, the user can provide consent by replying to the SMS text message in the affirmative. In some embodiments, the SMS text message includes a confirmation code that the user must submit through the registration application in order to provide consent. In another example, if the user identifier is an email address, the emergency notification system can send a confirmation message to the email address in the form of an email. In some embodiments, the email includes a confirmation link, and the user can provide consent by selecting the confirmation link. In some embodiments, the email includes a confirmation code that the user must submit through the registration application in order to provide consent. In some embodiments, the emergency notification system will recognize a user identifier only if consent has been provided for the user identifier. Requiring consent of a user identifier can provide additional security and prevent abuse of the emergency notification system.

Enhanced ESP Functionality

Figure 19:
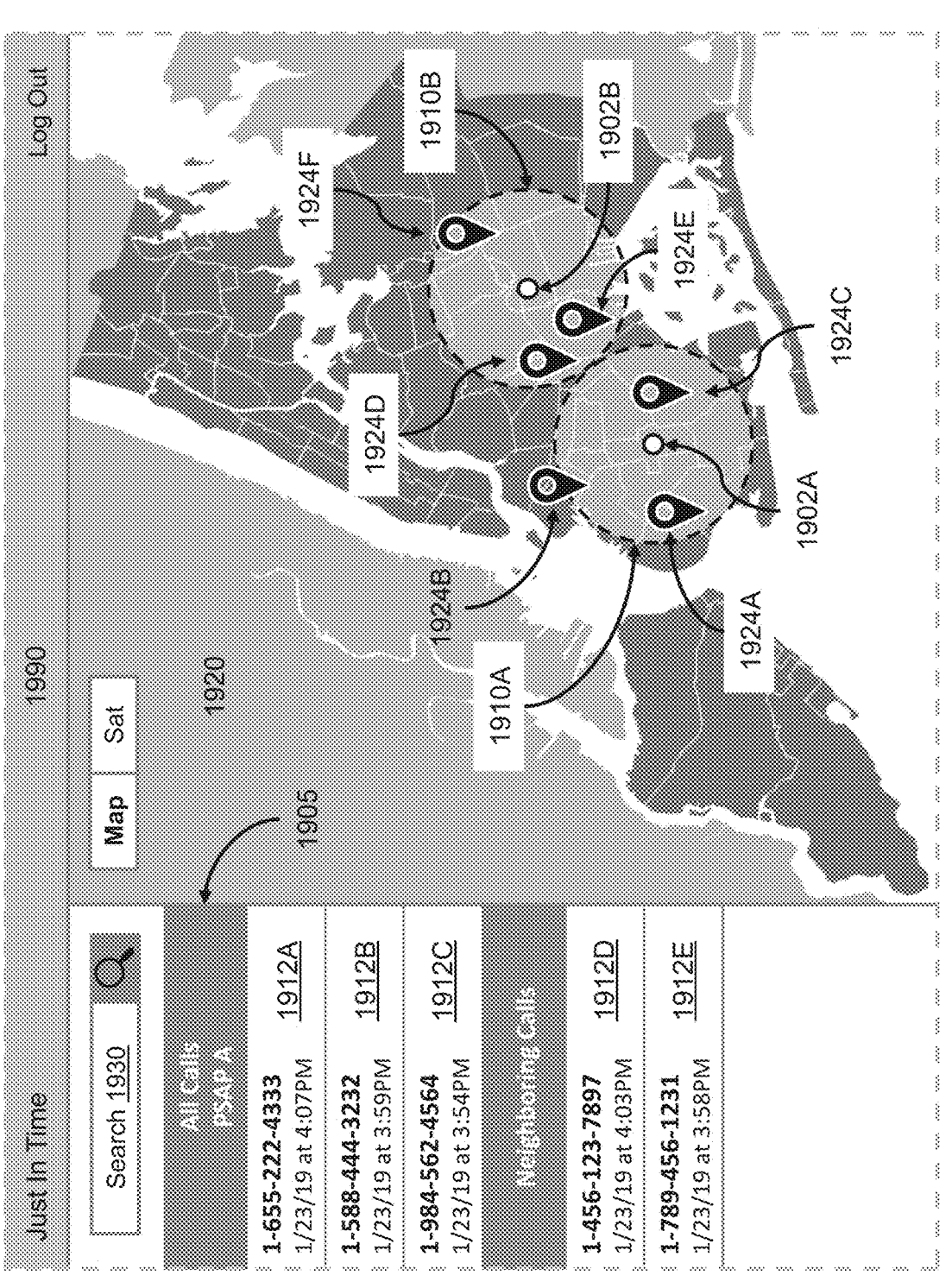
FIG. 19 illustrates an embodiment of an emergency response application.

In some embodiments, as mentioned above, the emergency management system (EMS) can use emergency data received from an emergency service provider (ESP) to provide the ESP with additional or enhanced functionality. For example, in some embodiments, the EMS can facilitate the transmission of emergency data from one ESP to another ESP. FIG. 19 illustrates an embodiment of an emergency response application. In some embodiments, the emergency response application 1990 is used to visualize or display emergency data transmitted from the EMS to an ESP. In some embodiments, the emergency response application 1990 is a web application or desktop software provided by the EMS. In some embodiments, the emergency response application is a web application or desktop software not provided by the EMS. As depicted in FIG. 19, in some embodiments, the emergency response application 1990 includes a list of emergency events 1905 corresponding to emergency calls received by an ESP and map 1920 that displays emergency locations 1924 corresponding to emergency events 1912 on the list of emergency events 1905. In this example, the emergency response application 1990 is being accessed and used by a public safety answering point (PSAP A) at ESP location 1902A, which has an ESP geofence 1910A. PSAP A has received three emergency calls, represented by emergency events 1912A, 1912B, and 1912C. PSAP A has received emergency locations for each of the three emergency calls, emergency locations 1924A, 1924B, and 1924C, respectively. In this example, PSAP A is neighbored by a second public safety answering point (PSAP B) at ESP location 1902B, which has an ESP geofence 1910B. PSAP B has also received three emergency calls and an emergency location for reach of the three emergency calls, emergency locations 1924D, 1924E, and 1924F. In this example, both PSAP A and PSAP B have integrated with the EMS such that both ESPs transmit an emergency communication including a user identifier (e.g., a phone number) and an emergency location for each emergency call that the ESPs receive. The EMS can then share relevant emergency data from one of the ESPs to the other. In this example, the EMS has determined that emergency locations 1924D and 1924E (received in separate emergency communications from PSAP B) are within a threshold distance (e.g., one mile, five miles, ten miles, etc.) of PSAP A's associated geofence, ESP geofence 1910A. In response to making this determination, the EMS can transmit emergency data regarding the two emergencies represented by emergency location 1924D and 1924E (e.g., associated user identifiers and the time at which the respective emergency calls were received) to PSAP A and display the emergency data within the emergency response application 1990. In this example, emergency data regarding the emergencies represented by emergency location 1924D and 1924E are displayed within the list of emergency events 1905 under "Neighboring Calls." The EMS may share any and all relevant emergency data between ESPs, including, but not limited to, user identifiers, emergency location, emergency day and time, emergency type, contact info, demographic data, and medical data.

Figure 20:
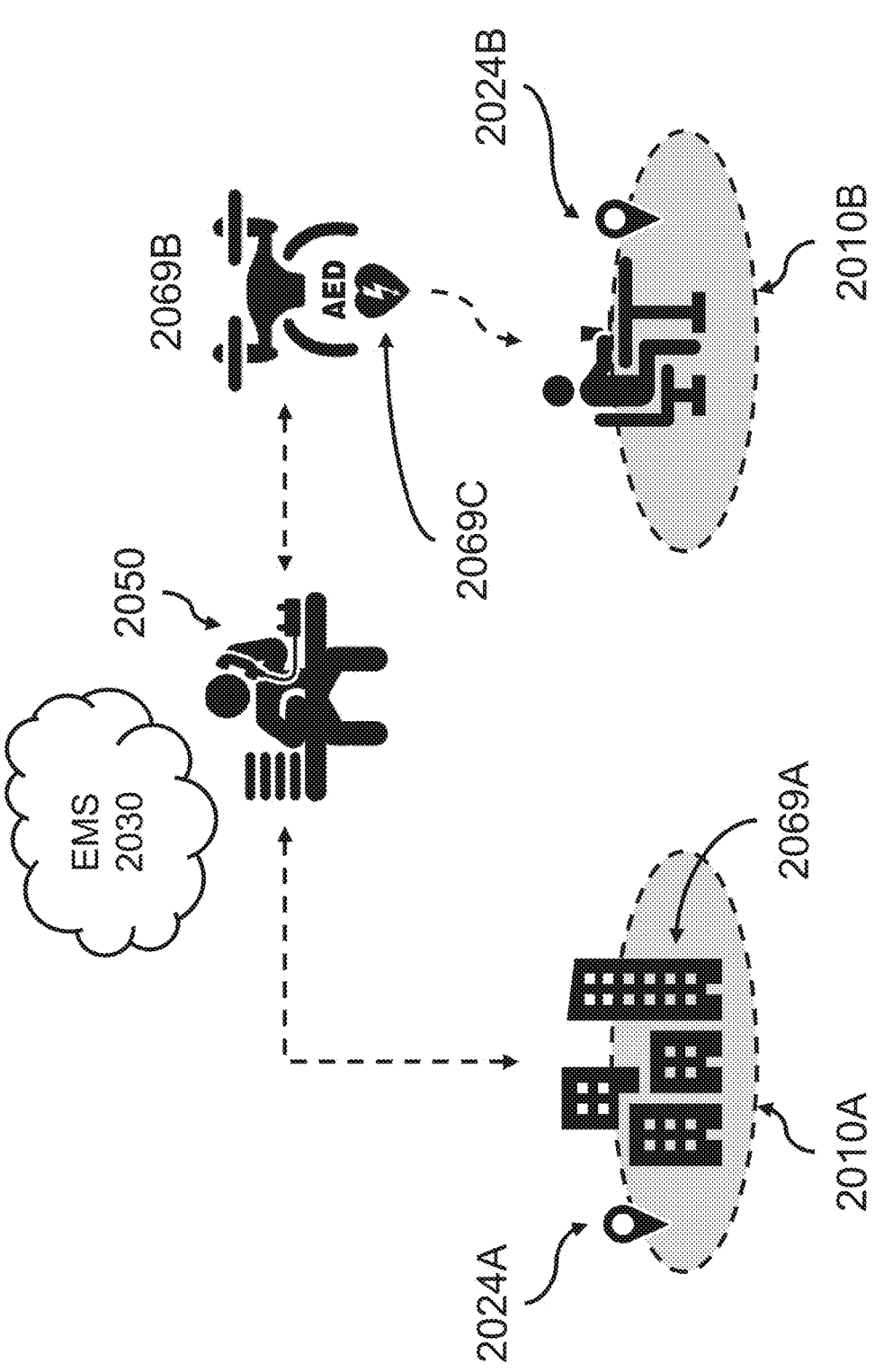
FIG. 20 depicts embodiments of a system for providing emergency service providers with functional enhancements.

FIG. 20 depicts an embodiment of a system for providing enhanced functionalities to an emergency service provider (ESP) by an emergency management system (EMS). In some embodiments, the EMS 2030 serves as an interconnect between an ESP 2050 and a commercial service provider (CSP). A CSP is a commercial entity that manages physical or non-physical assets 2069 that can be leveraged for emergency responses. In some embodiments, a method for providing enhanced functionality to an ESP by an EMS comprises: a) receiving an electronic communication from an ESP, wherein the electronic communication is associated with an emergency alert received by the ESP and comprises a first set of data comprising a location associated with the emergency alert; b) retrieving a set of geofences associated with a set of assets managed by a commercial service provider (CSP); c) determining that the location associated with the emergency alert falls within a geofence associated with an asset managed by the CSP; d) in response to determining that the location associated with the emergency alert falls within the geofence associated with the asset managed by the CSP, displaying access controls to the asset within a graphical user interface (GUI) of an emergency response application executed on a computing device at the ESP; e) receiving selection of the access controls from the ESP; and f) transmitting a request to the CSP to activate the asset according to the selection of the access controls.

In one example, a commercial service provider (CSP A) manages connected smart buildings assets, allowing users to remotely access and control various systems within a building, such as locking and unlocking doors, lighting, and video feeds from surveillance cameras. In this example, CSP A can register a building 2069A managed by CSP A with the EMS by providing the EMS with a geofence 2010A of the building 2069A. If an ESP 2050 transmits an emergency communication regarding an emergency that includes an associated emergency location 2024A, the EMS 2030 can determine that emergency location 2024A falls within the geofence 2010A of the building 2069A. In response, the EMS 2030 can provide a graphical user interface (GUI) to the ESP 2050 through an emergency response application that the ESP 2050 can use to remotely control the building 2069A. In some embodiments, the GUI includes one or more access controls for controlling the asset. For example, a call taker at ESP 2050 could use the access controls within the GUI to select to view a feed from a surveillance camera within the building, and, if the call taker sees a person with a weapon within the building, the call taker can use the access controls within the GUI to put the building 2069A in lockdown (e.g., locking hallway doors and sounding an alarm). In some embodiments, after receiving selection(s) of the access controls through the GUI, the EMS 2030 can directly activate the asset(s) according to the selection(s) of the access controls. In some embodiments, in response receiving selection(s) of the access controls through the GUI, the EMS 2030 can then transmit a request to CSP A to activate the systems within the smart building 2069A according to the selection(s) of the access controls made by the ESP 2050 through the GUI. In some embodiments, an ESP 2050 provides consent for the EMS 2030 to share data generated by the ESP 2050 with a CSP by selecting the access controls presented within the GUI. In some embodiments, an ESP 2050 selects a consent button within the GUI to provide consent for the EMS 2030 to share data generated by the ESP 2050 with a CSP before the EMS 2030 is permitted to transmit a request to activate an asset to the CSP.

In another example, a commercial service provider (CSP B) manages drone (e.g., unmanned aerial vehicles) assets that carry automated external defibrillators (AEDs). AEDs can be used to diagnose and treat cardiac arrhythmias (e.g., irregular heartbeats) through defibrillation, wherein an electrical current is passed through the body to reset the heart. The chance of survival for a person in cardiac arrest can drop by as much as ten percent for each minute the person goes without successful defibrillation. Accordingly, it is imperative during such an emergency that a person receives an AED as quickly as possible. In this example, CSP B can register a drone 2069B and an associated AED 2069C managed by CSP B by providing the EMS with a geofence 2010B of a region serviced by the drone 2069B. If an ESP 2050 transmits an emergency communication regarding an emergency that includes an associated emergency location 2024B, the EMS 2030 can determine that emergency location 2024B falls within the geofence 2010B of the region serviced by the drone 2069B. In response, the EMS 2030 can provide a graphical user interface (GUI) to the ESP 2050 through an emergency response application that the ESP 2050 can use to remotely activate the drone 2069B. In some embodiments, the GUI includes one or more access controls for controlling the asset (e.g., the drone 2069B or the AED 2069C). For example, if a call taker at ESP 2050 determines that the emergency caller is suffering from cardiac arrest or is calling on behalf of a person suffering from cardiac arrest, the call taker can use the access controls within the GUI to dispatch the drone 2069B carrying the AED 2069C to the emergency location 2024B. In some embodiments, after receiving selection(s) of the access controls through the GUI, the EMS 2030 can directly activate the asset(s) (e.g., the drone 2069B or AED 2069C) according to the selection(s) of the access controls. In some embodiments, in response to receiving selection(s) of the access controls through the GUI, the EMS 2030 can then transmit a request to CSP B to activate the drone 2069B and AED 2069C according to the selection(s) of the access controls made by the ESP 2050 through the GUI.

Digital Processing Device

In some embodiments, the platforms, media, methods and applications described herein include a digital processing device, a processor, or use of the same. In further embodiments, the digital processing device includes one or more hardware central processing units (CPU) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In some embodiments, the non-volatile memory comprises magnetoresistive random-access memory (MRAM). In other embodiments, the device is a storage device including, by way of non-limiting examples, CD-ROMs, DVDs, flash memory devices, magnetic disk drives, magnetic tapes drives, optical disk drives, and cloud computing-based storage. In further embodiments, the storage and/or memory device is a combination of devices such as those disclosed herein.

In some embodiments, the digital processing device includes a display to send visual information to a subject. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In some embodiments, the display is E-paper or E ink. In other embodiments, the display is a video projector. In still further embodiments, the display is a combination of devices such as those disclosed herein.

In some embodiments, the digital processing device includes an input device to receive information from a subject. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Non-Transitory Computer Readable Storage Medium

In some embodiments, the platforms, media, methods and applications described herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, media, methods and applications described herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft®.NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or extensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB.NET, or combinations thereof. Compilation is often performed, at least in part, to create an executable program. In some embodiments, a computer program includes one or more executable complied applications.

Software Modules

In some embodiments, the platforms, media, methods and applications described herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of barcode, route, parcel, subject, or network information. In various embodiments, suitable databases include, by way of non-limiting examples, relational databases, non-relational databases, object oriented databases, object databases, entity-relationship model databases, associative databases, and XML databases. In some embodiments, a database is internet-based. In further embodiments, a database is web-based. In still further embodiments, a database is cloud computing-based. In other embodiments, a database is based on one or more local computer storage devices.

Web Browser Plug-In

In some embodiments, the computer program includes a web browser plug-in. In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®. In some embodiments, the toolbar comprises one or more web browser extensions, add-ins, or add-ons. In some embodiments, the toolbar comprises one or more explorer bars, tool bands, or desk bands.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB. NET, or combinations thereof.

Web browsers (also called Internet browsers) are software applications, designed for use with network-connected digital processing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called microbrowsers, mini-browsers, and wireless browsers) are designed for use on mobile digital processing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

Certain Terminologies

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

As used herein, a "device" is a digital processing device designed with one or more functionality. A "triggering device" refers to a communication device with a communication component, which will allow it to send and receive information over a wireless channel, a wired channel, or any combination thereof (e.g., sending/receiving information over the Internet). Examples of triggering devices include a mobile phone (e.g., a smartphone), a laptop, a desktop, a tablet, a radio (e.g., a two-way radio), and a vehicular communication system. In some embodiments, a triggering device includes a car security system (e.g., OnStar®), a home security system, or a home control system (e.g., a networked control system for providing network controlled and/or smart temperature control such as a Wi-Fi smart thermostat, lighting, entertainment, and/or door control, such as Nest®). In some embodiments, a triggering device is an Internet of Things (IoT) device. In some embodiments, the triggering device is a sensor for sensing environmental or health indicators. In some embodiments, the sensor may include a sensing component and a communication component. In some embodiments, the triggering device is a sensor in a sensor network or a device that controls a sensor network.

In some embodiments, a triggering device is a wearable device (e.g., a communication device worn by a user). In some embodiments, a triggering device (e.g., a wearable device) comprises one or more sensors. As used herein, a "mobile wireless device" refers to a device that is portable and communicates wirelessly. In some embodiments, a user wears or carries the mobile wireless device on the user's person or in the user's vehicle. Examples of mobile wireless devices include mobile or cellular phones, wearable devices (e.g., smart watch, fitness tracker, wearable sensor, smart glasses, etc.).

As used herein, Internet of Things (IoT) refers to a network of physical devices, buildings, vehicles, and other objects that feature an IP address for internet network connectivity for exchanging data. In many cases, IoT devices are embedded with electronics, software, one or more sensors, and network connectivity. As used herein, a IoT device can be a device that includes sensing and/or control functionality as well as a WiFi™ transceiver radio or interface, a Bluetooth™ transceiver radio or interface, a Zigbee™ transceiver radio or interface, an Ultra-Wideband (UWB) transceiver radio or interface, a WiFi-Direct transceiver radio or interface, a Bluetooth™ Low Energy (BLE) transceiver radio or interface, and/or any other wireless network transceiver radio or interface that allows the IoT device to communicate with a wide area network and with one or more other devices. In some embodiments, IoT devices feature an IP address for internet connectivity. In addition to an IP address, the IoT device can be associated with a MAC address or an SSID. In some embodiments, IoT devices connect with other devices through Wi-Fi, Blue-Tooth®, a Zigbee™ transceiver radio or interface, an Ultra-Wideband (UWB) transceiver radio or interface, a WiFi- Direct transceiver radio or interface, a Bluetooth™ Low Energy (BLE) transceiver radio or interface, or other technologies which allow for transfer of data. In some embodiments, IoT devices form a mesh network allowing information to be efficiently routed between the devices. Examples of IoT devices include a home thermostat, intelligent home monitors, baby monitors, smoke or carbon monoxide detectors, home security camera systems, and other network-enabled devices. In some embodiments, a triggering device is an IoT device (e.g., a Nest® device).

As an example, a vehicular on-board console is triggered upon detection of an emergency. In some embodiments, the console contains a built-in microphone and uses the car speakers. In some embodiments, the console is connected to a Device Communication & Interface Module (DCIM), which uses an antenna to connect to the cellular network. When the car is in a crash, sensors can transmit information to the Sensing Diagnostic Module (SDM). In some embodiments, the SDM comprises an accelerometer, which measures the severity of the event based on gravitational force. The SDM sends this information to the DCIM, which uses the cellular antenna to send the emergency alert.

As used herein, an "account" refers to contact information for a user, including emergency contacts of the user. In some embodiments, the account is registered by the user to include a list of contact information for the user such as, for example, a list of associated devices. Examples of contact information on an account include phone number, email address, home address, work address, emergency contacts (e.g., name, phone number, email, etc.), and associated devices (e.g., other communication devices of the user aside from the device or triggering device sending an emergency alert). In some embodiments, the account includes contact information for organizational representatives. For example, in some cases, a social media application installed on the user's electronic device is used to send an emergency alert. The communication session can be established with the user/user device, emergency service provider personnel, and an organizational representative for the social media entity. This scenario can occur when analysis of the user's social media activity indicates a possible emergency situation such as, for example, a suicide attempt by the user. In response, the social media application on the user device sends an emergency alert to an emergency management system. Since the user did not choose to request help, a representative of the social media entity is connected to the 3-way communication session to help explain the emergency situation to the emergency service provider.

As used herein, an "associated device" refers to a communication device that is associated with the triggering device. For example, a user may be using several communication devices such as a mobile phone, a wearable, a home security system, a car computer. The user may have registered these devices with his or her account and linked these devices with a user name, user number(s), email address(es), home or other physical address(es). In some embodiments, associated devices may include communication devices of a second user who is associated with user, e.g., a husband and wife, a father and son, a patient and doctor, friends, work colleagues, etc. In some cases, the user may have added the second user as an emergency contact, a member of a group, etc. In some cases, user may have agreed to share location and other data with the second user. In some embodiments, the second user may be someone who is frequently contacted by the user and the communication device identifies the second user from the "Recently called" or "Frequently called" list. In some embodiments, the associated devices may be devices that are proximal or near-by to the triggering device such as obtained through a Wi-fi scan. In some embodiments, an associated device is proximal to the triggering device when the location of the associated device is within 1, 5, 10, 15, 20, 25, 30, 35, 40, 45, 50, 60, 70, 80, 90, 100, 200, 300, 400, or 500 meters of the location of the triggering device.

As used herein, the "list of associated devices" refers to a list of communication devices that are associated with the user or the triggering device (e.g., a second resident in a smart home). The list of associated devices may be listed by user name, phone number, email address, physical address, coordinates etc. The device entry in the list may include phone number, email address, physical address, coordinates, BSSID, SSID or MAC address. The list may be user defined or generated by the device or the EMS.

As used herein, a "request for assistance" refers to a request or message sent to a recipient asking for help. In some embodiments, a request for assistance is an emergency request for assistance (e.g., the request is associated with an emergency situation) such as, for example, an emergency alert. In some embodiments, an emergency alert comprises a request for assistance. In some embodiments, a request for assistance is associated with an emergency situation. In some embodiments, a request for assistance comprises an emergency indication. In further embodiments, an emergency indication is selected from one or more of the group consisting of traffic accident, police emergency, medical emergency, and fire emergency. In some embodiments, a request for assistance is associated with a non-emergency situation (e.g., request for a tow truck after car breaks down). In some embodiments, a request for assistance is associated with a device sending the request. In other embodiments, a request for assistance is associated with a device not sending the request (e.g., a proxy request on behalf of a second device and/or a member device in a group of devices). As used herein, a request is "associated" with a device or user when the request relates to an emergency or non-emergency situation involving the device or user. In some embodiments, a request comprises data associated with a device (or user thereof). In some embodiments, a request comprises a data set associated with a device. For example, in some embodiments, a request comprises a data set associated with a device, wherein the data set comprises current location data. In other embodiments, a request for assistance is sent and/or received separately from data associated with a device. For example, in some embodiments, a request is sent first, and the recipient subsequently queries the device that sent the request for data or a data set associated with the emergency and/or device or user involved in the emergency. Alternatively, in some embodiments, a request is sent first, and the recipient subsequently queries the device associated with the emergency for data or a data set associated with the emergency and/or device or user involved in the emergency.

As used herein, a "emergency responder" refers to any person or persons responsible for addressing an emergency situation. In some embodiments, an emergency responder refers to government personnel responsible for addressing an emergency situation. In some embodiments, an emergency responder is responsible for a particular jurisdiction (e.g., a municipality, a township, a county, etc.). In some embodiments, an emergency responder is assigned to an emergency by an emergency dispatch center. In some embodiments, an emergency responder responds to a request for emergency assistance placed by a user via a user communication device. In some embodiments, an emergency responder includes one or more fire fighters, police officers, emergency medical personnel, community volunteers, private security, security personnel at a university, or other persons employed to protect and serve the public and/or certain subsets of the population.

As used herein, an "emergency service provider" (ESP) is a public or private organization or institution responsible for providing emergency services. For example, in some embodiments, an EDC (e.g., a public safety answering point (PSAP)), a fire department, a police department, and a hospital may all be considered emergency service providers. In some embodiments, an emergency responder is a member of an ESP. In some embodiments, an ESP personnel is a person who works at an ESP. For example, an ESP personnel may be a call-taker at a PSAP or a first responder at a fire department.

As used herein, a "recipient" refers to one or more persons, services, or systems that receive a request for assistance (e.g., an emergency alert). The recipient varies depending on the type of request. In some embodiments, a recipient is an emergency service. In some embodiments, a recipient is an emergency service when the request for assistance pertains to an emergency (e.g., a tier 2 emergency). In some embodiments, a recipient is an emergency management system. In some embodiments, a recipient is an emergency dispatch center. In some embodiments, a recipient is an emergency dispatch center, wherein the request is first routed through an emergency management system (e.g., request is sent to the EMS, but ultimately is sent to an EDC). In some embodiments, a recipient is a first responder (e.g., a communication device of a first responder). In some embodiments, a recipient is a non-emergency service or personnel, for example, a relative or friend. In such situations, a user of a communication device (or member device or second device) does not require emergency assistance, but does need help. As an example, a user of a member device in a group of devices is a child who is lost in a theme park. The parent of the child has a communication device in the same group of devices as the child's member device. The parent uses the communication device to send a request for assistance on behalf of the child's member device to theme park security guards who are closer to the child than the parent. Security is then able to pick up the child quickly using the data set associated with the member device, which they are given authorization to access by the parent's communication device.

As used herein, a "user" refers to one or more person or persons associated with a device (e.g., communication device, member device, second device, device of a first responder, etc.). In some embodiments, a user utilizes a device to place a request for assistance. In some embodiments, user refers to one or more persons who are paid subscribers of a network access service, for example, cellular service subscribers. In some embodiments, a user refers to anyone who gains access to a network via a router, for example, a Wi-Fi router, and is not a paid subscriber of any access service. In some embodiments, a device associated with a user is a device carried or worn on the person of the user (e.g., a phone or wearable device). In some embodiments, a device associated with a user is not carried or worn on the person of the user (e.g., a home security sensor or camera installed in the home of the user, a vehicle tracking system installed in a vehicle of the user, etc.).

As used herein, "data" refers to a collection of information about one or more entities (e.g., user of a user communication device) and/or an environment that pertains to characteristics of the one or more entities. In some embodiments, an entity is a person. In some embodiments, an entity is a thing (e.g., a house). For example, in some embodiments, data comprises sensor data from home sensors associated with a house. In this example, the data is also associated with one or more persons (e.g., the homeowner(s) and/or inhabitant(s)). In some embodiments, data refers to meta-data. In some embodiments, data comprises health information about the user of a communication device. In some embodiments, data comprises information about the surrounding environment of the user of the user communication device (e.g., surrounding temperature, location, elevation, barometric pressure, ambient noise level, ambient light level, surrounding geography, etc.). In some embodiments, data comprises information about other users that is pre-stored in a device or in a database (e.g., a database within a group of devices who are related to the user of the user communication device as predefined by the user). In some embodiments, the data set comprises information from two or more users of user communication devices, wherein each user is affected by the current emergency situation. As an example, two unrelated users are involved in a vehicular collision, and each user sends a separate emergency request (for traffic accident) using his/her communication device. In this example, the separate emergency requests are associated (e.g., by an emergency management system and/or emergency dispatch center) with the same emergency based on the proximity of time, location, and emergency indication of the emergency requests. As a result, the data set for this accident comprises information from both user communication devices. In this example, the data set comprises location information from both devices (e.g., GPS coordinates), biosensor data for one or both devices (e.g., biosensor data such as heart rate and blood pressure can be important in case of injury), and information about the vehicle driven by each user (e.g., make, model, and year of manufacture information stored on the device). In some embodiments, data comprises current data. In further embodiments, current data comprises information that is equal to or less than 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, 55, or 60 minutes old. In further embodiments, current data comprises information that equal to or less than 1, 2, 3, 4, 5, 6, 7, 8, 9, 10, 11, 12, 13, 14, 15, 16, 17, 18, 19, 20, 21, 22, 23, or 24 hours old. In some embodiments, data comprises historical data. In further embodiments, historical data comprises information that is equal to or more than 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, 55, or 60 minutes old. In further embodiments, historical data comprises information that equal to or more than 1, 2, 3, 4, 5, 6, 7, 8, 9, 10, 11, 12, 13, 14, 15, 16, 17, 18, 19, 20, 21, 22, 23, or 24 hours old. In some embodiments, the age of information is calculated from the date the information is first collected (e.g., when a sensor first detects a sensed parameter such as, for example, heart rate).

As used herein, "health data" refers to medical information associated with a user of a device. In some embodiments, health data comprises medical history such as, for example, past illnesses, surgery, food and/or drug allergies, diseases, disorders, medical diagnostic information (e.g., genetic profile screen), or any combination thereof. In some embodiments, health data comprises family medical history (e.g., family history of breast cancer). In some embodiments, health data comprises current health information such as, for example, current symptoms, current medications, and/or current illnesses or diseases. In some embodiments, health data comprises user age, height, weight, blood type, and/or other biometrics. In some embodiments, medical history comprises medical information that is equal to or more than 1, 2, 3, 4, 5, 6, 7, 8, 9, 10, 11, 12, 13, 14, 15, 16, 17, 18, 19, 20, 21, 22, 23, or 24 hours old. In some embodiments, medical history comprises medical information that is equal to or more than 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 days old. In some embodiments, current health information comprises information that is equal to or less than 1, 2, 3, 4, 5, 6, 7, 8, 9, 10, 11, 12, 13, 14, 15, 16, 17, 18, 19, 20, 21, 22, 23, or 24 hours old. In some embodiments, current health information comprises medical information that is equal to or less than 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 days old.

As used herein, "user data" refers to general information associated with a user of a device. In some embodiments, user data comprises user identity, user name, height, weight, eye color, hair color, ethnicity, national origin, religion, language(s) spoken, vision (e.g., whether user needs corrective lenses), home address, work address, occupation, family information, user contact information, emergency contact information, social security number, alien registration number, driver's license number, vehicle VIN, organ donor (e.g., whether user is an organ donor), or any combination thereof. In some embodiments, user data is obtained via user input.

As used herein, "sensor data" refers to information obtained or provided by one or more sensors. In some instances, a sensor is associated with a device (e.g., user has a communication device with a data link via Bluetooth with a wearable sensor, such as, for example, a heart rate monitor or a pedometer). Accordingly, in some embodiments, the device obtains sensor data from the sensor (e.g., heart rate from the heart rate monitor or distance traveled from the pedometer). In some instances, the sensor data is relevant to an emergency situation (e.g., heart rate during a cardiac emergency event). In some embodiments, a sensor and/or sensor device comprises an acoustic sensor, a breathalyzer, a carbon dioxide sensor, a carbon monoxide sensor, an infrared sensor, an oxygen sensor, an ozone monitor, a pH sensor, a smoke detector, a current sensor (e.g., detects electric current in a wire), a magnetometer, a metal detector, a radio direction finder, a voltage detector, an air flow meter, an anemometer, a flow sensor, a gas meter, a water meter, a Geiger counter, an altimeter, an air speed indicator, a depth gauge, a gyroscope, a compass, an odometer, a shock detector (e.g., on a football helmet to measure impact), a barometer, a pressure gauge, a thermometer, a proximity sensor, a motion detector (e.g., in a home security system), an occupancy sensor, or any combination thereof, and in some embodiments, sensor data comprises information obtained from any of the preceding sensors. In some embodiments, one or more sensors are physically separate from a user device. In further embodiments, the one or more sensors authorize the user device to obtain sensor data. In further embodiments, the one or more sensors provide or send sensor data to the user device autonomously. In some embodiments, the user device and the one or more sensors belong to the same group of devices, wherein member devices are authorized to share data. In some embodiments, a user device comprises one or more sensors (e.g., user device is a wearable device having a sensor or sensing component).

As used herein, "communication link" refers to a communication pathway from a device (e.g., communication device) to another device or to an intermediate device (e.g., a router) on a network. In some embodiments, the communication device establishes a communication link with another device or an intermediate device to transfer information (e.g., a location of the device) or to obtain information from a recipient such as, for example, location of a first responder assigned to a request for assistance associated with the communication device (e.g., device of first responder). A communication link refers to the point-to-point communication channels, point-to-point and end-to-end data sessions, and the physical hardware facilitating the communication channel(s) (e.g., antennas used to communicate/transmit information). In some embodiments, a data session comprises session parameters and the network route taken from one device to another device.

As used herein, a "data channel" refers to a communication session between two devices wherein data packets are exchanged between the devices. In some embodiments, a data session is setup using exchange of certain data packets, also called as "handshake signals," which are able to define the capabilities of the data session. For example, in some embodiments, the data session "handshake" provides for the ability to transfer multi-media data, voice data, and other data via the data session. In some embodiments, the data session is setup without the use of handshake signals, wherein the two devices involved share data packets according to a predefined protocol (e.g., a previously agreed upon protocol). In some embodiments, the data session is routed through an EMS, which stores the multi-media, voice, and/or other data from any of the devices that are part of the data session. In further embodiments, the EMS shares the data from the data session with the other device (e.g., device of a first responder). In some embodiments, the EMS manages the data session.

As used herein, a "Received Signal Strength Indicator (RSSI)" refers to a measurement of the power present in a received radio signal. In some embodiments, the RSSI refers to a number assigned to the signal levels (e.g., power level) of packets as detected by a device receiving the packets from a device sending the packets. For example, an RSSI value may be a number within an arbitrary range such as from 0 to 100. In some embodiments, the RSSI refers to the decibel level of the power of the received data packets. In other embodiments, the RSSI refers to the actual power, for example measured in mW, as detected by the receiver. In some embodiments, RSSI is replaced with received channel power indicator (RCPI), which is a measure of the received radio signal power in a selected channel over the preamble and the entire received frame.

As used herein, "voice or speech recognition software" refers to computer programs that can recognize a person's speech to identify trigger phrases (e.g., iListen, Voice Navigator, Google Now, LilySpeech, etc.). In some embodiments, the software may be able to recognize the identity of the speaker. As used herein, "voice command" refers to words or phrases that a user may use to give command to the triggering device. The trigger phrases may be user-defined or may be from a library of phrases on the trigger device or at a remote server.

As used herein, "sound detection software" refers to computer programs for detecting trigger sounds in and around the triggering device. The trigger sounds may be user-defined or may be from a library of phrases on the trigger device or at a remote server. The trigger sounds may be sounds (alarms, breakage, gunshots, explosion, fire, car crash, etc.) or absence of sound (e.g., no heartbeat, etc.). For example, a glass break detector software may use the microphone in the trigger device to monitor any noise or vibrations to detect burglaries in a smart home. If the vibrations exceed a baseline, they may be analyzed by the software. The software may analyze frequencies typical of glass shattering and trigger an emergency alert if the sound is above a trigger threshold. In some cases, the software may compare detected sounds with glass-break profiles analysis and trigger an alert if the amplitude threshold and/or statistically expressed similarity threshold are breached. In some embodiments, an emergency is detected or triggered when a trigger sound exceeds a threshold. In some embodiments, a trigger sound threshold is about 50, 55, 60, 65, 70, 75, 80, 85, 90, 95, 100, 110, 120, 130, 140, 150, 160, 170, 180, 190, or 200 decibels. In some embodiments, a trigger sound threshold is at least about 50, 55, 60, 65, 70, 75, 80, 85, 90, 95, 100, 110, 120, 130, 140, 150, 160, 170, 180, 190, or 200 decibels. In some embodiments, a trigger sound threshold is no more than about 50, 55, 60, 65, 70, 75, 80, 85, 90, 95, 100, 110, 120, 130, 140, 150, 160, 170, 180, 190, or 200 decibels.

In some embodiments, voice recognition and speech recognition use recordings of the human voice, but differ in approach. Speech recognition strips out the personal differences between speakers to detect the words. Voice recognition typically disregards the language and meaning to detect the physical person behind the speech. Speech recognition is language dependent, while voice recognition is independent of language. In essence, voice biometrics provides speaker recognition rather than speech recognition. In some embodiments, speech recognition is the inter-disciplinary sub-field of computational linguistics that develops methodologies and technologies that enables the recognition and translation of spoken language into text by computers. It is also known as "automatic speech recognition" (ASR), "computer speech recognition", or "speech to text" (STT). In some embodiments, some speech recognition systems require "training" (also called "enrollment") where an individual speaker reads a text or isolated vocabulary into the system. The system analyzes the person's specific voice and uses it to fine-tune the recognition of that person's speech, resulting in increased accuracy. Systems that do not use training are called "speaker independent" systems. Systems that use training are called "speaker dependent". In some embodiments, speech recognition applications include voice user interfaces such as voice dialing (e.g., "Call home"), call routing (e.g., "I would like to make a collect call"), domotic (e.g., home automation) appliance control, search (e.g., find a podcast where particular words were spoken), simple data entry (e.g., entering a credit card number), preparation of structured documents (e.g., a radiology report), speech-to-text processing (e.g., word processors or emails), and aircraft (usually termed direct voice input).

In some embodiments, speech recognition systems use powerful and complicated statistical modeling systems. These systems use probability and mathematical functions (e.g., Hidden Markov Model and neural networks) to determine the most likely outcome.

As used herein, the term "voice recognition" or "speaker identification" refers to identifying the speaker, rather than what they are saying. Recognizing the speaker can simplify the task of translating speech in systems that have been trained on a specific person's voice or it can be used to authenticate or verify the identity of a speaker as part of a security process. In some embodiments, to convert speech to on-screen text or a computer command, a computer or device has to go through several complex steps.

As used herein, an "audio detector" refers to a device that can detect audio inputs (e.g., voice commands, trigger sounds). In some cases, the audio detector is a separate device (e.g., a smart speaker). In some cases, the audio detector is a component of another device (e.g., microphone inside of a smart phone). In some embodiments, sound may be detected "sound sensors", "sound detectors" or microphones. For example, a sound is a board that combines a microphone and some processing circuitry. The sound detector provides an audio output, but also a binary indication of the presence of sound, and an analog representation of its amplitude. In some embodiments, the microphone turns sound energy into electrical energy. When a user speaks, sound waves created by a user's voice carry energy toward the microphone. Inside the microphone, the diaphragm and coil move back and forth upon contact with the sound waves. A permanent magnet produces a magnetic field that cuts through the coil and an electric current is produced. The electric current flows out from the microphone to an amplifier on the sound recording device.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

EXAMPLES

The following illustrative examples are representative of embodiments of the subject matter described herein and are not meant to be limiting in any way.

Example 1—Wearables & Parallel Flows

John, an elderly man, lives in a nursing home. He suffers from a medical condition that makes him susceptible to falls and is given a smartwatch by the nursing home to provide health monitoring and to allow him to request help in case of an accident. Other residents of the nursing home are also assigned various similar devices (panic buttons, smartphones, etc.). The nursing home administrator has used an emergency flow editor software to create an emergency flow script for handling emergency alerts sent by the various smartwatches and other devices used by the nursing home. The editor software provides a graphic user interface with an interactive space that allows the administrator (an authorized user) to select graphical representations of emergency flow building blocks and drag them over to a desired location within the interactive space. The administrator is easily able to generate the customized emergency flow script by dragging and dropping the building blocks and connecting them. Although the editor software provides some standard premade building block templates, the administrator is able to customize and configure selected building block templates. In this case, the administrator adds a building block that sorts emergency alerts based on the type of device sending the alert. The building block is connected to multiple downstream emergency flows, which are executed based on the device type that is identified. In this case, a downstream emergency flow associated with smartwatches has building blocks that open a text and/or chat-based communication channel with an operator at the nursing home. The downstream emergency flow includes a first parallel emergency flow that obtains data from the smartwatch, including heart rate sensor data and current location data (either received through the emergency alert or by querying the smartwatch). The downstream emergency flow also includes a second parallel emergency flow that has a building block that determines whether the emergency is a personal emergency (e.g., health emergency such as a heart attack) or an environmental emergency (e.g., fire, earthquake), and responsive to detecting an environmental emergency, obtains sensor data from any sensors (e.g., fire alarms and/or temperature sensors) that are in the vicinity of the smartwatch (in this case, within 10 meters). In addition, the administrator sets the second parallel emergency flow to attempt detection of an environmental emergency by obtaining sensor data in vicinity of the smartwatch even in the case of a personal emergency. Once the emergency flow script has been finished, the administrator assigns the script to an emergency flow identifier for the nursing home. This identifier is programmed into the smartwatches and other nursing home devices. Finally, the administrator activates the server software that runs the emergency response server application.

A week later, John is getting out of bed when he falls and breaks his hip. John immediately presses a panic button on his smartwatch, which sends an emergency alert (which contains the emergency flow identifier) over the Wi-Fi network to the emergency response server application. The server application detects the emergency alert, extracts the emergency flow identifier, and queries the identifier against a database storing emergency flow scripts and corresponding emergency flow identifiers to identify the emergency flow script to execute in response to this emergency alert. The server application then executes the emergency flow script setup by the administrator a week earlier. The script executes instructions of the initial emergency flow building block to determine the source of the emergency alert. Upon identifying the smartwatch as the source of the emergency alert, the initial building block then branches off to a smartwatch downstream emergency flow. This downstream emergency flow has a series of building blocks forming a parallel flow for obtaining location and sensor data from the smartwatch (this custom flow takes advantage of the enhanced sensor functionality of smartwatches) by transmitting data requests to the smartwatch over the Wi-Fi network. A second parallel data flow is activated as part of this script that determines whether the emergency alert pertains to a personal or environmental emergency. In this case, the emergency alert is sent when John pressed a panic button for a personal medical emergency. Accordingly, an initial building block of the second parallel data flow determines based on the emergency alert that this is a personal emergency. However, this second parallel data flow includes a building block for assessing sensor data throughout the nursing home to determine the possibility of an environmental emergency. In this case, the building block queries thermometers and smoke/$CO_2$/CO detectors located throughout the nursing home that communicate with the server over the Wi-Fi network. The sensor data from these thermometers and detectors indicates no abnormal readings. This result causes the second parallel data flow to terminate since there is no need to provide environmental sensor data associated with the emergency request when there is no indication of an environmental emergency. In parallel, the main emergency flow calls a smartphone belonging to John and bridges the call with an operator for the nursing home. Although the smartphone is out of John's reach, it is paired with John's smartwatch via Bluetooth. John is able to answer the call by pressing a button on his smartwatch. The operator asks John the nature of his medical emergency, and John indicates that he has fallen and cannot get up. The emergency flow script provides an interactive element that bridges the communication session with a local public safety answering point when the operator interacts with the interactive element. In this case, the operator realizes that John needs urgent medical attention and presses the interactive element. This activates a building block in the emergency flow script that calls the PSAP and bridges the call with the communication session between the nursing home operator and John (e.g., creating a conference call including the PSAP dispatcher, nursing home operator, and John). John is in great pain and is unable to coherently respond to the PSAP dispatcher's questions. Thankfully, the nursing home operator has medical information and sensor data for John and is able to relay this information to the PSAP dispatcher. In addition, the emergency flow script executes a parallel emergency flow that transmits the location data, medical information, and sensor data to the PSAP (since the administrator customized the emergency flow script to take advantage of the fact that this local PSAP is equipped with the technology to receive enhanced data/meta-data). The PSAP dispatcher is able to assign first responders (EMTs from the local hospital) to John's location based on the location data received. In this scenario, the PSAP dispatcher does not have authorization to view John's medical information but has the ability to forward medical and sensor data to the first responders to keep them apprised of John's current medical condition. In the meantime, orderlies working at the nursing home have reached John and kept him stable and still while waiting for the EMTs to arrive.

Finally, the EMTs arrive and transport John to the local hospital for treatment. Upon their arrival, John uses his smartwatch to hang up on the phone call. The nursing home operator and the PSAP dispatcher also terminate their connections to the emergency communication session, thus terminating the session. Meanwhile, the emergency flow script has finished executing and terminates. Fortunately, John makes a full recovery thanks to the prompt emergency response.

Example 2—Social Media Suicide Prevention

Jane, a freshman as a top tier university, is finishing up her first semester. Jane has been struggling to fit in socially on-campus and is experiencing problems with her roommate. Moreover, Jane is double majoring in analytical chemistry and computer science and is feeling overwhelmed by the course load. For the past month, Jane has fallen into a deep depression as finals week approached. She is not alone, and administrators have been cognizant of the rise of mental health problems in the student body. In response, the university has launched a digital campaign to detect and head off mental health crises. The university partnered with a popular social media platform to monitor publicly available user postings for early detection of mental health crises such as suicide attempts. In this case, mental health crises are detected by dynamic web analysis of user postings for all university students using keywords indicative of suicidal thoughts or tendencies. In this case, Jane posts on the social media platform that she is saying farewell to her friends and is ready to end it all tonight. This post is analyzed and leads to detection of a mental health crisis. Next, an emergency alert is sent to an emergency response server along with an emergency flow identifier associated with the emergency flow script for the university's mental health emergency management campaign. The emergency flow identifier is used to determine the customized emergency flow script comprising various building blocks for managing emergency communications between all entities in this particular emergency flow. In this case, the emergency flow script is executed by the emergency response server. A first building block attempts to locate contact information for Jane associated with the mental health crisis by querying the university server database storing student information. The first building block retrieves a cell phone number, which is passed onto a second building block that calls the number. Jane does not pick up. The second building block passes on the "no pickup" output to a third building block that attempts to locate Jane's roommate Mary who does pick up her phone. Upon successfully reaching Mary, a fourth building block initiates a call to a university dispatcher and bridges the calls with Mary and the dispatcher to enable two-way communications. A fifth building block running parallel to the fourth building block provides the emergency alert to the dispatcher via a data connection to the dispatcher's computer console. The dispatcher than speaks with Mary to explain the situation and asks for Jane's whereabouts. Mary has not seen Jane all night. Fortunately, another parallel building block is attempting to locate Jane's whereabouts by searching university Wi-Fi routers to determine if any Jane's cell phone is connected to any of those routers. This building block successfully identifies two routers in the basement of the library as having detected Jane's cell phone Wi-Fi signal in the past 20 minutes and provides this output to the dispatcher. The university dispatcher then connects to campus security and requests a guard to be sent to investigate. Upon connection to the campus security, another building block is activated that transfers all collected information pertaining to this emergency to a cell phone of the security guard (which is running a mobile application in communication with the emergency response server). The guard is able to enter the router location information into a campus map application on his phone and soon finds Jane sleeping on the couch in the library basement. The guard wakes up Jane and assesses her condition. She insists she is okay but agrees to meet with the school counselor for a mental health checkup.

Example 3—Emergency Calling Using On-Board Console in a Smart Vehicle

Lisa, while driving home during a snowstorm, gets hit from behind by a truck. Lisa is badly injured and is not able to move her hands to make a call for emergency help. Lisa is in a smart car with an intelligent on-board console capable of receiving voice command and making cellular calls. Lisa does not remember the trigger words, but says "Please call emergency . . . Hmmm . . . Please help . . . ". Because Lisa's voice instructions were not clear and her voice was low, the console prompts Lisa to confirm that she would like to make an emergency call, but she has become unresponsive.

Fortunately, the event data recorder in the smart vehicle has been activated due to the crash. The event data recorder system in the on-board console includes four components: various sensors (camera, RADARs and LIDARs), the SDM (which includes the event data recorder), the DCIM and the cellular antenna. When Lisa's car got hit, the air bags deploy, and the sensors are activated. The sensors transmit the data to the SDM, which measures the severity of the accident using an accelerometer. The SDM's assessment is sent to the DCIM, which uses the cellular antenna to send an alert (attaching Lisa's voice command and the assessment of the severity of the accident) to a private call center.

When a customer service representative at the call center receives the call, she uses the built-in GPS to find the vehicle's location (or get a location through the cellular network) and calls the car to check-in with Lisa. Since Lisa is unresponsive and reviewing the severity of the accident, the representative calls 9-1-1 makes a proxy call on behalf of Lisa using the Lisa's location. Fortunately, paramedics are sent to the scene immediately and Lisa is taken to the hospital for treating her injuries.

Example 4—PSAP Trigger Example

Just In Time, an emergency response company, aids emergency service providers (such as public safety answering points, or "PSAPs") by gathering emergency data from a variety of sources and delivering the data to the emergency service providers. Traditionally, PSAPs are only technologically capable of receiving telephone calls (e.g., 9-1-1 emergency calls) with no additional data. Thus, when an emergency call is made to a PSAP from a mobile phone (with a dynamic and uncertain location), PSAP operators or call-takers must speak directly to the caller to determine the caller's location and the nature of the caller's emergency. Unfortunately, many people involved in emergency situations are unable to articulate their location or may not even know—and even if they do, the time spent articulating their location to the PSAP operator can often be the difference between life and death. Similarly, PSAP operators are forced to respond to emergencies with little or no information about the persons involved (e.g., health data or medical histories) or context of the emergencies (e.g., type of emergency, audio/video of the surroundings, etc.). Just In Time knows just how critical it is to quickly and accurately provide locations and situational/contextual information during emergencies to emergency service providers.

To aid emergency service providers (hereinafter, "ESPs"), Just In Time maintains and provides an emergency management system (hereinafter, "EMS") that receives and stores data, information, and multimedia from a plurality of sources, such as mobile phones and mobile applications, internet of things (IoT) devices, intelligent vehicle systems, and other electronic devices before and during emergencies. In many places around the world, when a person experiences an emergency they can call an emergency number (e.g., an emergency call) to be connected to an emergency service provider. For example, in the United States, a person can call 9-1-1 to be connected to a PSAP. In many cases, when an emergency service provider receives an emergency call, the emergency service provider also receives a phone number from which the emergency call was placed. The emergency service provider can then send a query including the phone number to the EMS for emergency information, which can then search its databases for emergency data or information associated with the phone number.

Elise, a thirtysomething professional living in San Francisco has two elderly grandparents that live alone in Oakland. Concerned about them, she accesses Just In Time's registration website and signs up for a notification procedure for her grandparents. She submits both of her grandparents' cell phone numbers as well as their home phone number (a landline) as user identifiers to be associated with the notification procedure. Elise then submits herself and both of her parents (along with their cell phone numbers) as emergency contacts. As part of the registration process, the EMS sends an SMS text message to Elise, her parents, and her grandparents' cell phones to confirm the registration. All of them respond to the text message in the affirmative. Additionally, the EMS delivers an interactive call to Elise's grandparents' home phone number that verbally requests verbal confirmation, which her grandparents provide, thus completing the registration process.

A week later, Elise's grandfather forgets to turn off the stove after preparing his breakfast and a fire ignites in the kitchen. In response, Elise's grandmother calls 9-1-1 from their landline home phone and is connected to a local PSAP. After receiving the emergency call, the PSAP sends a query including the home phone number to the EMS for emergency information. In response to receiving the query including the home phone number, the EMS checks if the home phone number has been associated with a notification procedure. The EMS determines that the home phone number has indeed been associated with the notification procedure that Elise registered for and, accordingly, executes the notification procedure by sending an SMS text message to Elise and her parents that an emergency call has been made from Elise's grandparents' home phone. Elise's mother is then able to drive to the grandparents' house immediately and check on her parents.

Embodiments Related to an Emergency Response Data Exchange Ecosystem

Various aspects of the entirety of the disclosure include methods and systems for an emergency response data exchange ecosystem.

The A public emergency services agency may be established to provide a variety of services. A public emergency services agency can include a 911 call center, a railway network operations center (NOC), a primary call center, a secondary call center (e.g., that receives calls from or routes calls to a primary call center), and the like. A public emergency services agency may be referred to as an emergency service provider (ESP) or an emergency communications center (ECC). One type of ESP or ECC is a public safety answering point (PSAP). A PSAP is another name for a 911 call center that receives emergency calls and dispatches emergency (first) responders in response to the emergency (e.g., 911) calls.

Private operations centers often oversee, monitor, and/or manage security and emergency incidents across one or more related premises. Common types of operations centers (OC) that may, at least partially, coordinate response to security and emergency incidents include global security operations centers (GSOCs), railway network operations centers (NOCs), emergency operations centers (EOCs), cybersecurity operations centers (CSOCs), traffic operations centers (TOCs), energy or utility operations centers (UOCs), healthcare command centers, aviation operations centers, and maritime operations centers. In some implementations, operations centers may interchangeably be referred to as a commercial service provider (CSP).

As used herein, a first responder may refer to a firefighter, an emergency medical technician, a paramedic, a police officer, a peace officer, an emergency medical dispatcher, a search and rescue team member, a hazardous materials (HazMat) responder, volunteer emergency workers, and/or public health officials. The systems, processes, and overall technologies disclosed herein may be applicable or implemented for one or more of the various types of first responders, despite some specific examples being directed to firefighters and/or medical service providers for illustrative purposes.

An emergency may be identified from a variety of sources, such as a phone call, a textual message, a video feed, an image, a smoke sensor/alarm, an accelerometer, an airbag sensor, a medical device, a smart home hub, a fire control panel, or the like. Unfortunately, the sources of information that could be used to identify and initiate a response to an emergency are disconnected and dissociated from one another—this is a technical problem that plagues the emergency response industry. For example, present day emergency systems do not associate 911 calls with activated smoke alarms, even if the calls are made within close proximity to a building having multiple floors of activated smoke alarms. Instead, each call is received in isolation, the smoke alarms are monitored by a building manager (at best), and a correlation is drawn between calls and sensor data in hindsight. Such disconnect paints an incomplete picture of emergency incidents/data, leads to delays in the communication of crucial information to first responders, and underscores the need for advancements in emergency identification and assessment.

Despite the importance of operations centers' roles and functions, operations centers are often last-to-know, late-to-know, or otherwise out of the loop regarding emergency incidents that happen on a premises managed by the operations center. For example, if the operations center manages "BigBox Store" locations, the operations center may be responsible for monitoring and coordinating emergency responses for hundreds or thousands of locations that may be distributed across multiple states, provinces, counties, and/ or ECC boundaries. Embodiments of the present disclosure include methods and systems for emergency response data exchange ecosystem. The emergency response data exchange ecosystem is operable to provide situational awareness services, data exchange services, and communications services that may be augmented by one or more AI models or services, according to aspects of the disclosure. The emergency response data exchange ecosystem integrates emergency communications data (e.g., 911 call data, 911 messages, etc.), smart device (e.g., Internet of Things devices) data, telematics data, and additional data sources with an emergency response data system to leverage AI and machine learning to improve emergency response.

The emergency response data exchange ecosystem may include an emergency response data system to support or provide various services. The emergency response data system may provide situational awareness services, data exchange services, and communications services that may each be supported by AI augmented services. The situational awareness services may include, but are not limited to, providing notification of on-premises (or "on-site") emergency communications, transcribing radio dispatch, providing insights into emergency communications, corporate phone highlighting, and clustering incidents. The data exchange services may include, but are not limited to, providing (single) point of contact information from an operations center to an ECC and/or first responder device, providing floorplans from an operations center to an ECC and/or first responder device, providing video feeds from an operations center to an ECC and/or first responder device, providing access control sharing for managed premises to an ECC and/or first responder device, providing first responder estimated time of arrival (ETA) to the operations center, and routing 911 calls from the operations center to the ECC having jurisdiction over the location of the initiated emergency communications. The communications services may include, but are not limited to, providing messaging services between an operations center, an ECC, and/or a first responder device, providing alert services to customized recipient lists, and pre-alerting first responders of initiated emergency communications for premises in or near the first responders' jurisdiction.

Embodiments of the disclosure provide a number of advantages over existing emergency response support technologies. For example, embodiments of the disclosure may lower the cognitive burden on an ECC operator, GSOC operator, or first responder to understand key, actionable information about an incident that may be coming in from multiple data streams at the same time. Embodiments of the disclosure provide a technical solution for the technical problem of communication delays between occurrence of an emergency until first responder arrive at the scene of an emergency. Embodiments of the disclosure may shorten the time it takes to communicate with key personnel about incident response. The disclosed systems and methods ingest a wide swath of data streams, notifies operations centers of on-premises emergency communications, exchanges relevant data between operations centers and ECCs, and establishes direct communications between operations centers, ECCs, and/or first responders.

The field of emergency response is crucial for public safety and well-being. ECCs and first responders often encounter dynamic and complex situations that demand quick, informed decisions. Existing technologies have limitations in providing real-time support to operations centers. Advantageously, the disclosed embodiments and AI-augmented services may revolutionize the capabilities of operations centers, ECCs, and first responders by providing real-time information, situational awareness services, data exchange services, and communications services, according to embodiments of the disclosure. Embodiments of the disclosed first responder emergency management application includes an AI-enabled virtual assistant that is configured to enhance the efficiency, safety, and effectiveness of first responders. Various embodiments of the disclosure include methods and systems for an emergency response data exchange ecosystem are described herein and represented in FIGS. 1A-33, and particularly represented in FIGS. 21A-33.

Figure 21A:
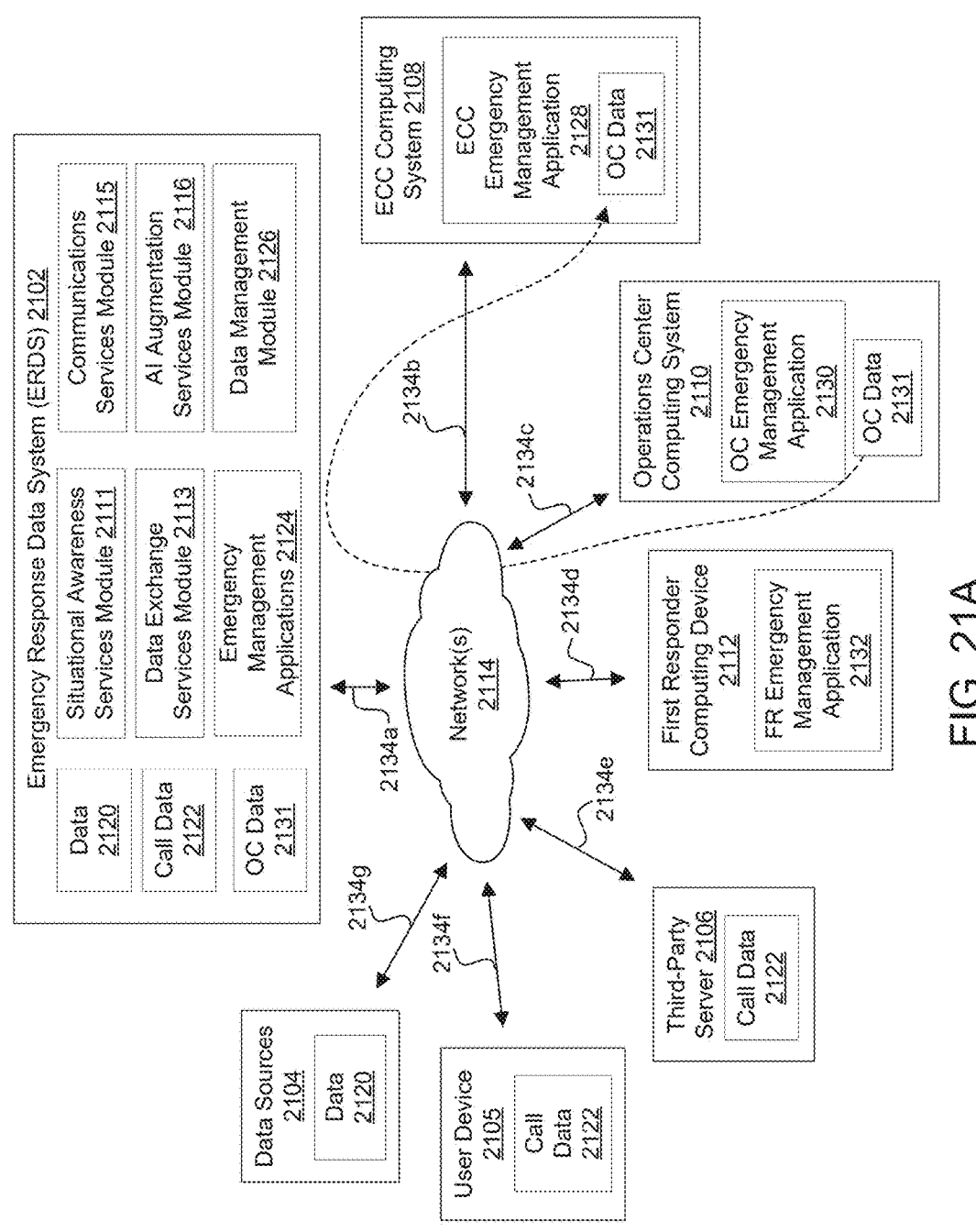
FIGS. 21A and 21B illustrate example diagrams of an emergency response data exchange ecosystem, in accordance with embodiments of the disclosure.
Figure 21B:
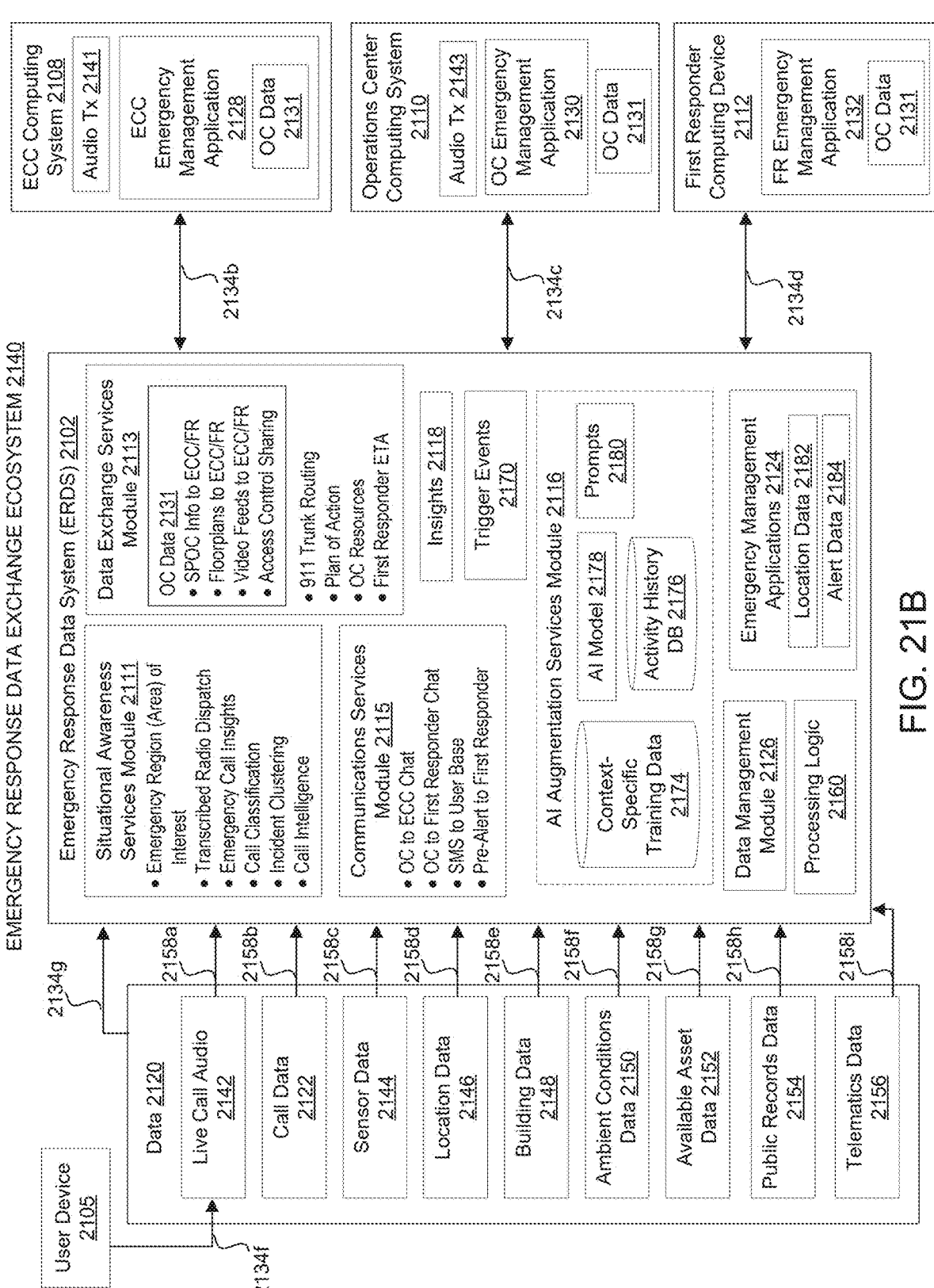

FIGS. 21A and 21B illustrate example embodiments of an emergency response data exchange ecosystem that is configured to provide situational awareness (e.g., location of an emergency on a premises) to operations centers in exchange for operations center data (e.g., floorplans, video feeds, access control, etc.) that is selectively distributed to ECCs and first responders for incident management and response, in accordance with aspects of the disclosure. FIG. 21A illustrates a diagram of an emergency response data exchange ecosystem 2100 that includes an emergency response data system (ERDS) 2102 that is communicatively coupled to a number of data sources 2104, a user device 2105, a third-party server 2106, an ECC computing system 2108, an operations center (OC) computing system 2110, and/or a first responder computing device 2112 through one or more networks 2114, according to an embodiment. Networks 2114 may include a number of wired networks, wireless networks, network components, and infrastructure. A number of communications channels 2134 (individually, 2134a, 2134b, 2134c, 2134d, 2134e, 2134f, and 2134g) may communicatively couple the various components of emergency response data exchange ecosystem 2100.

User device 2105 may include a telephone, a smart phone, tablet, a laptop, personal computer, a chrome book, or other computing devices that may be used, to initiate an emergency communication (e.g., a 911 call, a 911 text-based message, etc.) or to otherwise report an incident, according to various embodiments of the disclosure. Call data 2122 represents audio data, video, data, images, multimedia messages, and/or text messages provided from user device 2105 to ECC computing system 2108 and/or operations center computing system 2110, according to an embodiment. Third-party server 2106 may include a telecommunications or device manufacturer server that receives location data, user identification data, and/or call statistics for emergency calls and/or text-based emergency messages made by user device 2105. Third-party server 2106 may be configured to provide (e.g., push, respond to queries, etc.) call data 2122 to emergency response data system 2102 to support operation of emergency management applications 2124 and emergency response data exchange ecosystem 2100, according to an embodiment. Emergency management applications may be interchangeably referred to as emergency response applications.

Emergency response data system 2102 is configured to provide a number of services and applications to support operations centers, ECCs, and first responders using various types of data (e.g., data 2120, call data 2122, OC data 2131, etc.), in accordance with aspects of the disclosure. Emergency response data system 2102 includes a situational awareness services module 2111, a data exchange services module 2113, a communications services module 2115, AI augmentation services module 2116, emergency management applications 2124, and a data management module 2126, according to an embodiment. The emergency response data system 2102 provides various services using data 2120, call data 2122, and operations center (OC) data 2131, according to an embodiment. Situational awareness services module 2111 includes computer-readable instructions and/or processes that notify operations center computing system 2110 (e.g., through OC emergency management application) of emergency incidents that occur on the premises management by the operations center. Data exchange services module 2113 includes computer-readable instructions and/or processes that receives, processes, and/or distributes OC data 2131 as a collaboration from the operations center for emergency incidents. In one embodiment, notifications of emergencies are provided to operations center computing system 2110 from ECC computing system 2108 and/or from emergency response data system 2102 in exchange for OC data 2131 (e.g., point of contact information, video feeds, building access controls, etc.) that can assist an ECC and/or first responders in responding to an emergency incident. Communications services module 2115 includes computer-readable instructions and/or processes that facilitates communication between the operations center, the ECC, and/or first responders, according to an embodiment. AI augmentation services module 2116 includes computer-readable instructions and/or processes that support analysis of data, augmentation of features, aggregation of data, summary generation, insight generation, and/or automated plans of action.

Emergency response data system 2102 is configured to host and/or support a number of emergency management applications 2124 that are accessed by and/or operated by ECC computing system 2108, operations center computing system 2110, and/or first responder computing device 2112, according to embodiments. Emergency response data system 2102 may be implemented with one or more servers and/or cloud services that may be distributed across multiple data centers. Emergency management applications 2124 may be implemented on/in emergency response data system 2102 as web-based applications that are accessed via a web browser, and the applications may be updated with a Web-Socket, a Webhook, a persistent Webhook, and/or one or more other secure connections. Emergency management applications 2124 may be configured to process and push (and receive) data to a mobile application or an operating system (OS) specific application that is downloaded to and operated by a particular computing system or device (e.g., a first responder smart phone). Data 2120, call data 2122, and/or OC data 2131 may be retrieved, received, managed, and processed by one or more emergency response services and emergency management applications 2124. A data management module 2126 may include computer-readable instructions and/or processes to support receipt, processing, and/or delivery of data 2120, call data 2122, and/or OC data 2131, according to embodiments of the disclosure.

The various computing systems that provide and receive OC data 2131 are tools that may be used by emergency response personnel and emergency responders to dispatch, communicate about, and respond to incidents and emergencies that are represented by or in data 2120 and/or call data 2122, according to an embodiment. ECC computing system 2108 represents a computing system (e.g., a terminal, a server, a personal computer, a laptop, etc.) operated at or for an ECC (e.g., a public safety answering point (PSAP)). ECC computing system 2108 is configured to operate or provide an ECC emergency management application 2128. ECC emergency management application 2128 may be communicatively coupled to emergency response data system 2102 to receive emergency OC data 2131, data 2120, and/or call data 2122. ECC emergency management application 2128 may be configured with a graphical user interface to visually represent emergency events and incidents (e.g., using maps, queues, icons, data cards, etc.), to enable emergency response personnel (e.g., 911 dispatchers, telecommunicators, etc.), to dispatch and communicate emergency events, and to communicate with operations center personnel.

Operations center computing system 2110 represents a computing system (e.g., a terminal, a server, a personal computer, a laptop, etc.) operated at or for an operations center (e.g., a global operations security center (GSOC), a rail network operations center (NOC), etc.). Operations center computing system 2110 is configured to operate or provide an operations center emergency management application 2130. The operations center emergency management application 2130 may be a web-browser based application that provides a graphical user interface to enable emergency response personnel (e.g., an operator, risk manager, security personnel, etc.) of corporations, other businesses, residences, academic institutions, and/or private entities to have awareness of incidents (e.g., emergency events) that occur on their particular premises or managed premises. In some embodiments, operations center emergency management application 2130 uses map layers (e.g., ESRI layers) or application programming interfaces (API) to integrate services or features from emergency response data system 2102. Operations center computing system 2110 may be representative of a number of personal computing systems, servers, laptops, tablets, smart phones, media servers, networking devices, etc. associated with an operations center and/or associated with buildings or other assets managed and/or monitored by an operations center. Operations center computing system 2110 may be configured to receive notification of an emergency incident (e.g., a 911 call/text) made from a premises or asset (e.g., building, office space, room, etc.) and may be configured to provide OC data 2131 (e.g., PoC information, floorplan(s), video feed(s), access control, etc.) that is associated with the notification. OC data 2131 may be referred to as premises resources that may be displayed, operated, analyzed, distributed, and/or otherwise utilized.

First responder computing device 2112 is representative of computing systems, mobile devices, and/or in-vehicle devices used by emergency responders to navigate to, coordinate for, and/or communicate about emergency events and other incidents, according to an embodiment. First responder emergency management application 2132 may be operated on or by first responder computing device 2112. First responder emergency management application 2132 is communicatively coupled to emergency response data system 2102 to receive emergency notifications, emergency pre-alert notifications, OC data 2131, data 2120, call data 2122, and/or AI-based summaries or insights to inform the preparation and response to emergency events, according to an embodiment.

FIG. 21B illustrates an example block diagram of an emergency response data exchange ecosystem 2140 and is representative of an example implementation of emergency response data exchange ecosystem 2100, in accordance with aspects of the disclosure.

Data sources 2104 may include data 2120 (shown on FIG. 21A) having one or more of a number of data types that originate from a broad range of data sources; data 2120 may be used to identify, characterize, analyze or otherwise gain insights about emergency events and other incidents, according to an embodiment. Examples of data sources 2104 and/or data 2120 include, but are not limited to, live call audio 2142, call data 2122, sensor data 2144, location data 2146, building data 2148 (e.g., floorplans), ambient conditions data 2150, available asset data 2152, public records data 2154, and telematics data 2156, according to an embodiment. Live call audio 2142 may be received by emergency response data system 2102 by configuring a call audio transmitter 2141 to forward/provide live call audio 2142 from ECC call handling equipment (e.g., from ECC computing system 2108) and/or by configuring call audio transmitter 2143 to forward/provide live call audio 2142 from GSOC/NOC call handling equipment (e.g., from operations center computing system 2110), for example. Audio transmitter 2143 may be implemented as a cloud based telephony service (e.g., Amazon Connect) and may represent the capability of forwarding telephone (e.g., VoIP) audio or audio recording to, for example, ERDS 2102 for processing. Live call audio 2142 may also include transcripts of radio-based dispatches of emergencies from an ECC. Call data 2122 may include call duration, caller name, repeat call statistics, etc. of a call to an ECC or operations center. Call data 2122 may represent emergency communications made to a ECC and may include a 911 call and/or a text-based message to 911. Sensor data 2144 may include, but is not limited to, data received or retrieved from residential buildings, commercial buildings, personal medical devices, personal safety devices, industrial structures, vehicle sensors, crash detectors, smoke alarms, fire alarms, smart cameras, home security devices, moisture detectors, motion detectors, shock detectors, location sensors, gas detectors, pressure sensors, or the like, according to various embodiments of the disclosure. Location data 2146 may include a location of a sensor or incident and may be a subset of call data 2122. Building data 2148 may include construction materials, structure age, floorplans, ingress/egress routes, ingress/egress access controls, renovation history, electrical schematics, HVAC layout, or the like. Ambient conditions data 2150 may include weather data, weather forecasts, road conditions, wind speeds, visibility, cloud conditions, temperature, or the like. Available asset data 2152 may include, but is not limited to, a number of available drones, a number of available medical devices (e.g., automated external defibrillator), a number of vehicles, a number of sprinklers in a building, ingress/egress access controls, or the like. Public records data 2154 may include, but are not limited to, personal property records, arrest records, residential addresses, etc. Telematics data 2156 may include various types of vehicle data, such as accelerometer data, gyroscope data, air bag sensors, vehicle log data, or the like. Additional miscellaneous data source or data types may include, but are not limited to, social media feeds, new feeds, geofence data, traffic feeds, visual impairment status, auditory impairment status, or the like. The various data sources 2104 may be communicatively coupled to emergency response data system 2102 through a number of communications channels 2158 (individually, 2158*a*, 2158*b*, 2158*c*, 2158*d*, 2158*e*, 2158*f*, 2158*g*, 2158*h*, and 2158*i*), according to embodiments of the disclosure.

Emergency response data system 2102 may use one or more modules and/or processes to improve situational awareness for an operations center while exchanging data with the operations center to improve dispatch (e.g., include more relevant information) of and response to emergencies. Emergency response data system 2102 may operate a situational awareness services module 2111 to improve situational awareness for an operations center by providing information to operations center computing system 2110 and operations center emergency management application 2130, in accordance with aspects of the disclosure. Situational awareness services module 2111 may be configured to identify, determine, and/or provide an emergency region of interest that is a disambiguated identification of a premises or portion of a premises that initiated emergency communications (e.g., 911 call, text-based message to 911, etc.). The region of interest or area of interest may include a circular marker or circular identifier on a map, floorplan, space, or other representation of all or part of a premises. The region of interest may include a text-based description (e.g., an address, a building identification, a relative description of premises, etc.) of the source of an emergency communication. The region of interest may include a highlighting, outlining, color change, pattern change, or light intensity change of all or part of a premises (e.g., the outline of a space in a building, highlighting of a space within a floorplan, highlighting a room in a building, outlining one of a number of buildings, etc.). The region of interest may include outlining or highlighting a floor in a multi-floor building, for example. Emergency response data system 2102 may estimate a height (z-axis) of initiated emergency communications, and the region of interest may be mapped to a floorplan associated with one or more particular floors of a building (e.g., a hotel, casino, apartment complex, etc.). Operations center emergency management application 2130 may display one or more maps, floorplans, or other spatial visual indicators upon which the region of interest may be layered or otherwise displayed.

Situational awareness services module 2111 may be configured to provide information related to dispatches from and calls to an ECC, according to an embodiment. Emergency response data system 2102 may generate transcribed radio dispatch information to operations center emergency management application 2130 by receiving radio dispatch audio over the air, applying to radio dispatch audio to one or more transcription services (e.g., AI augmentation services module 2116), providing the transcript to AI augmentation services module 2116, prompting AI augmentation services module 2116 to summarize or characterize the transcript, and providing the summary or transcript characterization to emergency management application 2130. Emergency response data system 2102 may generate call insights, call classification, and/or call intelligence to operations center emergency management application 2130 by receiving live call audio 2142 (e.g., through audio transmitter 2141), applying live call audio 2142 to one or more transcription services (e.g., AI augmentation services module 2116), providing the transcript of the audio to AI augmentation services module 2116, provide one or more portions of data 2120, prompting AI augmentation services module 2116 to summarize or characterize the transcript using data 2120 for context, and providing the summary or characterization to emergency management application 2130 as an emergency call insight and/or a call classification.

Situational awareness services module 2111 may be configured to provide call intelligence to operations center emergency management application 2130 based on emergency call history, according to an embodiment. The call intelligence may be based on emergency call history for premises managed by a particular operations center and/or based on emergency call history for surrounding areas that include the one or more premises managed by the operations center. Emergency response data system 2102 may record, track, or maintain emergency calls and first responder response times in a database (e.g., activity history database 2176). Emergency response data system 2102 and/or situational awareness services module 2111 may determine various analytics associated with a particular operations center and may provide the analytics to emergency management application 2130 as call intelligence. The analytics may include, but are not limited to, a rate of emergency calls (e.g., daily, weekly, monthly, quarterly, etc.), first responder response times, emergency call durations at the operations center, types of emergencies, and/or quantities of emergencies on or around one or more premises monitored or managed by an operations center. The analytics may assist the operations center in determining how many resources to allocate for a group of premises or a particular premises. The analytics may assist the operations center in determining where to direct training or emergency-preventative measures.

Situational awareness services module 2111 may be configured to provide various additional services to an operations center, according to various embodiments of the disclosure. Situational awareness services module 2111 may be configured to provide social media feeds, corporate phone highlighting, and incident clustering. Emergency response data system 2102 may be configured to retrieve social media feeds associated with a region at, on, or around a premises associated with an emergency. Emergency response data system 2102 may use situational awareness services module 2111 to provide the social medial feeds to emergency management application 2130 by, for example, retrieving and analyzing (e.g., with AI augmentation services module 2116) social media associated with the location at or around the premises around a location of an emergency call, according to an embodiment. Emergency response data system 2102 may be configured to provide highlight emergency communications initiated by corporate phones. A corporate phone is a landline or mobile device that is registered or otherwise associated with one or more premises managed by an operations center. A corporate phone user may be an employee, contractor, resident, member, or may have another type of association with the premises managed by an operations center. To highlight emergency communications initiated by a corporate phone, emergency management application 2130 may display unique color schemes, patterns, or alpha-numeric identifiers to inform an operations center operator of the source of the emergency communications, for example. Emergency response data system 2102 may be configured to cluster or group emergency communications that are related to a single incident. The emergency communications may be grouped by location and/or by an analysis of live call audio 2142 (e.g., radio-based dispatch, emergency communications made to 911, etc.) to determine the subject matter of the incident. The analysis may be performed by providing radio-based dispatch and/or live call audio 2142 to AI augmentation services module 2116 with one or more prompts, such as "summarize the nature of this call to 911", "briefly, what is the text message to 911 about", "the provided audio is a portion of a recording of a radio-based over-the-air dispatch for emergency services, what is the nature of the dispatch", or the like.

Emergency response data system 2102 may use one or more modules and/or processes to exchange data from operations center computing system 2110 to ECC computing system 2108 and/or to first responder computing device 2112 to reduce dispatch times, increase the accuracy of information provided during dispatch, and/or to increase relevant information provided to first responders for an emergency. Emergency response data system 2102 may operate a data exchange services module 2113 to facilitate an exchange of operations center (OC) data 2131 between emergency management application 2130, 2128, and/or 2132, in accordance with aspects of the disclosure. OC data 2131 may include information that an operations center may have that may be beneficial to provide an ECC or first responders to reduce the time to respond to an emergency, to reduce arrival time of first responders to a specific location, to reduce the likelihood of property damage, and/or to reduce the likelihood of first responders entering an area unprepared (e.g., for a chemical spill). OC data 2131 may include, but is not limited to, operations center point of contact (POC) or single point of contact (SPOC) information, SPOC information for the premises associated with the emergency communication, floorplans for the premises associated with the emergency communication, video feeds for the premises associated with the emergency communication, and/or access control to one or more access points (e.g., vehicle gates, doors, turnstiles, elevators, etc.) to/on the premises associated with the emergency communication. The POC or SPOC information may include a telephone number, a cell phone number, a text-based messaging handle, a video-based messaging handle, and/or a link to a video conference or audio conference room that all concerned parties enter (e.g., call into) during an emergency (e.g., as part of an operations center plan of action), according to embodiments.

Data exchange services module 2113 may also receive and/or provide 911 trunk routing, operations center plan of action, additional operations center resources, and/or first responder ETA, in accordance with aspects of the disclosure. 911 trunk routing includes determining which ECC to route an emergency call to, based on the location of an incident. Some operations centers are centralized and are set up to monitor/manage premises that are located in different counties, cities, and/or states. As result, calling 911 or another emergency number from the operations center may not directly connect the operations center with the ECC that has authority/jurisdiction to dispatch first responders to a particular premises that is managed by the operations center. In one embodiment, an operator may select a "dial 911" button or UI element in emergency management application 2130 in response to notification of an emergency on a particular premises, and emergency response data system 2102 may be configured to determine a geographically relevant ECC, establish a conference call room, call the number of the operator at the operations center, and route a 911 call to the geographically relevant ECC from the conference call room to connect the operator to the geographically relevant ECC, for example.

An operations center may include an operations center plan of action that navigates an operator through operation procedures for premises resources (e.g., door actuators, emergency lights, audio alarms, audible instructions, etc.). Data exchange services module 2113 and/or emergency response data system 2102 may be configured to receive a plan of action for an operations center, analyze data 2120 (e.g., using AI augmentation services module 2116), at least partially execute the plan of action (e.g., unlock egress doors based on video feed analysis, based on smoke detectors, based on fire alarms, based on temperature sensors, based on moisture sensors, etc.). The plan of action, the completed portions of the plan of action, and the incomplete portions of the plan of action may be displayed for the operator in emergency management application 2130, for example. In one embodiment, AI augmentation services module 2116 may store the plan of action in context-specific training data 2174 (e.g., a database or other data structure) and may have an AI model 2178 that is at least partially trained on the plan of action and/or context-specific training data 2174 to provide recommendations, summaries, insights, and/or operations that are specific to particular operations centers.

Data exchange services module 2113 may receive additional operations center resources to share with an ECC and/or with first responders. For example, additional resources may include smart defibrillators, drones, private security, medical staff, fire hoses, service animals, and the like. Data exchange services module 2113 and/or emergency response data system 2102 may display the additional operations center resources in emergency management application 2128 and/or emergency management application 2132 to notify the ECC and/or first responders of assets that may be leveraged in the emergency response of a particular premises. In one embodiment, the approximate locations (e.g., on a visual representation of a floorplan) are displayed to facilitate access to the resources.

Emergency response data system 2102 may use location data 2182 to determine and provide first responder estimated time of arrival (ETA) at a particular premises. Location data 2182 may include, but is not limited to, live locations of first responders in addition to locations of initiated emergency communications. Live locations of first responders may be received from GPS coordinates provided by a first responder computing device 2112 (e.g., smart phone, in-vehicle system, smart watch, smart glasses, laptop, tablet, etc.) operated by a first responder who has received a dispatch request and who has indicated (e.g., in emergency management application 2132) that they are responding to the dispatch request, for example. In one implementation, a first responder may select (e.g., opt in) whether the location of first responder computing device 2112 is shared with emergency response data system 2102 to support first responder ETA determination. Emergency response data system 2102 may enter a first responder location and an address into a mapping service (e.g., using mapping service API) to determine the first responder ETA. Emergency response data system 2102 and/or data exchange services module 2113 may display the first responder ETA in one or more of emergency management applications 2128, 2130, or 2132.

Emergency response data system 2102 and/or data exchange services module 2113 is configured to provide OC data 2131 and other exchanged data through emergency management applications 2124, according to an embodiment. Emergency management applications 2124 is representative of server-hosted versions of one or more of emergency management applications 2128, 2130, and/or 2132, in accordance with aspects of the disclosure. Emergency response data system 2102 and/or data exchange services module 2113 displays POC or SPOC information, floorplans, video feeds, and/or access control sharing in one or more user interfaces of emergency management applications 2128, 2130, and/or 2132, according to embodiments of the disclosure.

Emergency response data system 2102 may use one or more modules and/or processes to facilitate communications between operations center computing system 2110, ECC computing system 2108, and/or first responder computing device 2112 to reduce dispatch times, increase the accuracy of information provided during dispatch, and/or to increase relevant information provided to first responders for an emergency. Emergency response data system 2102 may operate a communications services module 2115 to facilitate communications between emergency management application 2130, 2128, and/or 2132, in accordance with aspects of the disclosure. Communications services module 2115 may support chat messaging between operations center computing system 2110, ECC computing system and/or first responder computing device 2112. For example, communication services module 2115 may provide live messaging between a user interface of operations center emergency management application 2130 and a user interface of ECC emergency management application 2128. Communication services module 2115 may provide live messaging between a user interface of operations center emergency management application 2130 and first responder emergency management application 2132, for example. Communication services module 2115, for a particular operations center incident, may provide live messaging between a user interface of first responder emergency management application 2132 and ECC emergency management application 2128, for example.

Communication services module 2115 may be configured to provide messaging services to pre-alert first responders and/or to notify a particular user base, according to implementations of the disclosure. Emergency management application 2130 may include user interface elements that enable an operator and/or administrator to submit contact information for individuals to be contacted in case of an emergency. The contact information may be stored in one or more databases or data structures and may be recalled and used to provide notifications in response to an emergency. The individuals may include, but are not limited to, managers, employees, private security personnel, landlords, or the like. Similarly, emergency management application 2130 may include user interface elements that enable an operator and/or administrator to opt in to have pre-alert messages or notifications sent to first responders in proximity to the premises associated with the initiated emergency communications prior to the first responders receiving CAD or radio-based dispatches. Transmission of pre-alert messages or notifications to first responders enables volunteers first responders to begin mobilizing prior to being dispatched to potentially reduce response times to a scene of an emergency, according to an embodiment of the disclosure.

AI augmentation services module 2116 may include a number of software/hardware components and/or processes to support generating emergency response insights 2118 for display by one or more of ECC emergency management application 2128, operations center emergency management application 2130, and/or first responder emergency management application 2132, according to an embodiment. AI augmentation services module 2116 may generate emergency response insights 2118 based on data 2120 (e.g., call data 2122, data sources 2104, etc.) and/or trigger events 2170, according to an embodiment.

Emergency response insights 2118 may include suggestions, actions, and/or notifications that are generated in response to one or more trigger events 2170, according to an embodiment. Suggestions may be displayed or transmitted to emergency management applications 2124 to provide summaries, suggested actions, additional awareness, or other insights to a dispatcher, telecommunicator, emergency management operator, or first responder, according to an embodiment. Suggestions may include, but are not limited to, proposed actions (e.g., ingress points to unlock), responder locations, estimated responder arrival times, pre-arrival instructions for first responders, severity of an incident, live updates to incidents (e.g., based on analysis of live call audio, radio-based dispatches, and/or sensor data), medical procedures, documentation (e.g., standard operating procedures), response coordination, incident characterization, and/or response suggestions, in accordance with various embodiments of the disclosure. Emergency response data system 2102 may cause one or more suggestions/insights 2118 to be displayed on a user interface of ECC emergency management application 2128, operations center emergency management application 2130, and/or first responder emergency management application 2132, according to an embodiment.

Actions are examples of actions that AI augmentation services module 2116 may, in coordination with emergency response data system 2102, initiate to facilitate a response to an emergency event. The actions may include, but are not limited to, open ingress routes, open egress routes, operate emergency lights, initiate emergency sounds (e.g., alarms, instructions, etc.), transfer calls (e.g., to an ECC having jurisdictional authority for a call), initiate conference calls, triage multiple calls (e.g., group, associate, combine, or summarize), call a point of contact (e.g., at a business location of an incident), search for a phone number of a point of contact, and/or generate a group chat or a group video conference between people who are located near or who are responding to a particular incident, according to various implementations of the disclosure.

Notifications may include informational content or alerts derived from a combination of the trigger events 2170, live call audio 2142, or other data sources 2104, in accordance with aspects of the disclosure. Notifications may include displaying particular insights 2118 about one or more related incidents, information about changes to an incident (e.g., a change of location, nature of a fire, number of victims, etc.), available asset updates, or the like.

Trigger events 2170 include events that may serve to initiate the aggregation of data sources 2104, analysis of data sources 2104, and/or the generation of emergency response insights 2118, according to an embodiment. Examples of trigger events 2170 may include, but are not limited to, a 911 call on a premises managed by an operations center, a call to a rail-related NOC (network operations center), a call to a GSOC (global security operations center), a text-based message (e.g., SMS, RCS, MMS, etc.) to 911, a text message to a rail-related NOC, initiating a videoconference with 911, an activated alarm, a change in sensor data 2144, a change in building data 2148, a change in ambient condition data 2150 (e.g., an abnormal increase or decrease in temperature or moisture in a space), according to embodiments of the disclosure. As used herein, trigger events 2170 that are based on a change in data (e.g., sensor data 2144) may be at least defined by one or more thresholds that the data exceeds or that the data falls below.

AI augmentation services module 2116 may include an architecture that is configured to support the retrieval, augmentation, and generation of emergency response data that is at least partially based on context-specific training data 2174, data 2120 (e.g., live call audio 2142), OC data 2131, according to an embodiment. AI augmentation services module 2116 includes context-specific training data 2174 (e.g., may include a vector database that supports vector searching), an activity history database 2176, an AI model 2178, and prompts 2180, according to an embodiment. Advantageously, AI augmentation services module 2116 ingests a wide swath of publicly/privately available information, may be further refined with specific local or private (e.g., 911, GSOC-specific, etc.) protocols, and actively surfaces relevant and specific pieces of information to the operations center, ECC, and/or first responder in real-time.

Context-specific training data 2174 includes information that AI augmentation services module 2116 can specifically analyze, retrieve, and/or regurgitate to generate emergency response insights 2118 that are relevant to a particular emergency communication or trigger events 2170, according to an embodiment. Context-specific training data 2174 can include, but is not limited to, standard operating procedures, images, historical transcripts (e.g., in activity history database 2176), baseline video feed analysis, product offerings for the premises managed by the operations center, automotive manuals, appliance manuals, first aid procedures, poison control information, evacuation routes (e.g., for a particular premises), application programming interface (API) calls to sources like weather and traffic, and other manuals, for example. AI augmentation services module 2116 is operable to retrieve and display specific relevant (e.g., semantically similar) portions of context-specific training data 2174 for integration into emergency response insights 2118 and/or for display by ECC computing system 2108, operations center computing system 2110, and/or first responder computing device 2112, according to an embodiment.

Activity history database 2176 is operable to store activity history related to an operations center, according to an embodiment. Activity history database 2176 may include, but is not limited to, chat message history between an ECC and an operations center, a number of emergency calls or communications made by an operations center and/or made on premises managed by the operations center, transcripts or summaries of emergency communications, resource usage (e.g., drones deployed, gallons of water used on a fire, etc.), and/or social media feed history. AI augmentation services module 2116 and/or AI model 2178 may be configured to generate insights 2118 based on activity history database 2176, in addition to data 2120 and information related to the current trigger events 2170.

AI model 2178 may be implemented using one or more of a variety of technologies. AI model 2178 may be a service that emergency response data system 2102 communicates with remotely or may include a number of libraries and software packages installed onto one or more local or distributed server (e.g., cloud) systems. AI model 2178 may be implemented using transfer learning models that apply knowledge learned from one task to another, typically using pre-trained models. Examples of transfer learning models that may be used include, but are not limited to, BERT (bidirectional encoder representations from transformers): a transformer-based model for natural language processing tasks; GPT (generative pre-trained transformer): a generative model for text-based tasks; and ResNet: a pre-trained deep learning model commonly used for image classification. AI model 2178 may incorporate other types of models, such as deep learning models, unsupervised models, generative models, recommender systems, or the like. Examples of deep learning models may include convolutional neural networks (CNN), which may be used for image recognition tasks; recurrent neural networks (RNN), which may be used for sequential data, such as time series or natural language; and long short-term memory networks (LSTMN), for example.

AI model 2178 may be implemented using one or more large language models (LLMs), according to an embodiment. LLMs are AI models that are trained to understand and generate human language. LLMs use large amounts of text data to learn patterns, context, and meaning in language. Examples of LLMs include, but are not limited to, generative pre-trained transformers (GPTs), BERT, DistilBERT, T5 (Text-to-Text Transfer Transformer), XLNet, Turing-NLG, LLaMA (Large Language Model Meta AI), Claude, PaLM (Pathways Language Model), Megatron-Turing NLG, ChatGPT, OpenAI Codex, ERNIE (Enhanced Representation through Knowledge Integration), and/or Grok.

AI model 2178 may be configured to aggregate and analyze information to generate insights that are responsive to trigger events 2170, according to an embodiment. AI model 2178 may be configured to aggregate and analyze characteristics of live call audio 2142 by analyzing and/or transcribing and analyzing live call audio 2142 that is received, for example, with audio transmitter 2141 or 2143. AI model 2178 may be configured to analyze characteristics of radio-based dispatch audio that is captured and converted to an audio file or digital transcript by emergency response data system 2102. AI model 2178 may be configured to analyze characteristics of live call audio 2142 with data 2120 and information from trigger events 2170 as context for generating emergency response insights 2118. AI model 2178 may be configured to (or prompts 2180 may instruct AI model 2178 to) search context-specific training data 2174 for context-specific information.

AI model 2178 may be configured to operate at different risk tolerance levels or temperatures. For example, under a low temperature setting, AI model 2178 may generate conservative results that are more verbatim and grounded in the information loaded into the vector database. Additionally, under a high or higher temperature setting, AI model 2178 may generate creative results that may be less verbatim and may be based on information that is external to the information loaded into the vector database, for example.

Prompts 2180 may be used to instruct AI model 2178 to operate differently for different scenarios. Prompts 2180 may be used to provide instructions to AI model 2178 to cause AI model 2178 to operate as, for example, a dispatcher, an operations center operator, and/or a first responder. Prompts 2180 may include instructions related to: classification of emergency communications; transcription and/or summarization of radio-based dispatch; implementing an operations center plan of action; organizing key data points about an incident that can be pushed to relevant stakeholders; providing an operations center operator with information they may not have readily available during an emergency call that may improve first responder response time; pulling up snapshots of relevant information from long and complicated procedural documents used during emergency response for the operations center; and/or triggering specific warnings for the operator when the information deviates from the expected.

An illustrative example of a prompt to cause AI model 2178 to operate as a dispatcher may include instructions similar to:

"You are an AI Assistant whose task is to analyze 911 communications and its associated metadata and assist an operations center (e.g., a GSOC or railroad NOC) operator with their job. In order to ensure we are capturing communications and relevant addresses, we have provided you with transcriptions of the same call or message history using two different speech-to-text services. You should read between the lines, use judgement and/or context clues about the scenario (outlined by the transcriptions AND any accompanying data) to make up for any deficiencies in one speech-to-text service's transcription or the other. The way in which you help the operator with their job is by: classifying or summarizing the nature of the emergency communication based on the activity history with similar operators, based on all available data (e.g., sensor data, location data, weather data, traffic data, etc.), and based on the provided transcripts."

Emergency management applications 2124 may provide location data 2182 (e.g., the region of interest) and alert data 2184, in addition to emergency response insights 2118, according to an embodiment. Location data 2182 may include a device-based location of an emergency event that is at least partially anonymized as a region of interest. The device-based location may be derived from call data 2122 and/or may be received from third-party server 2106. The device-based location may be based on GPS location of user device 2105 or based on registered locations of electronic devices in the vicinity of user device 2105, according to various embodiments. Alert data 2184 may include alerts or notifications that are based on sensor data 2144 or additional data 2120, according to an embodiment. Location data 2182 and/or alert data 2184 may be provided to or displayed by one or more of the emergency management applications 2128, 2130, and/or 2132, according to various embodiments.

Data management module 2126 may be configured to receive, store, and selectively provide aspects of emergency data. For example, data management module 2126 may be configured to receive and store location data for emergency communications to 911. Data management module 2126 may be configured to operate as an LIS server that associates telephone numbers with locations and with emergency communications (e.g., 911 calls), and the LIS server may selectively provide the locations of initiated emergency communications to ECCs that query the LIS server with telephone numbers.

Processing logic 2160 includes instructions, scripts, software, and/or one or more processes that support operations of emergency response data system 2102, according to an embodiment. For example, processing logic 2160 may be configured to communicate with data management module 2126 to receive, store, retrieve, and provide data (e.g., call data 2122). Processing logic 2160 may be configured to provide data and prompts to AI augmentation services module 2116 to generate and provide emergency response insights 2118 to emergency management applications 2124, for example. Processing logic 2160 may include or provide various application programming interfaces (API) to facilitate external and/or internal data requests and retrieval, according to an embodiment. Processing logic 2160 may include decision trees, flow diagrams, instructions, or other processes to support a live (real-time) interactions with human operators (e.g., dispatcher, telecommunicator, operations center operator, first responder, etc.), according to an embodiment. Processing logic 2160 may be configured to at least partially perform one or more of processes 2200, 2600, 2700, 2800, 2900, 3200, and/or 3300 (e.g., shown in FIGS. 22, 26, 27, 28A-28B, 29, 32, 33), which may be combined with any one or more processes disclosed herein, in accordance with aspects of the disclosure.

Figure 22:
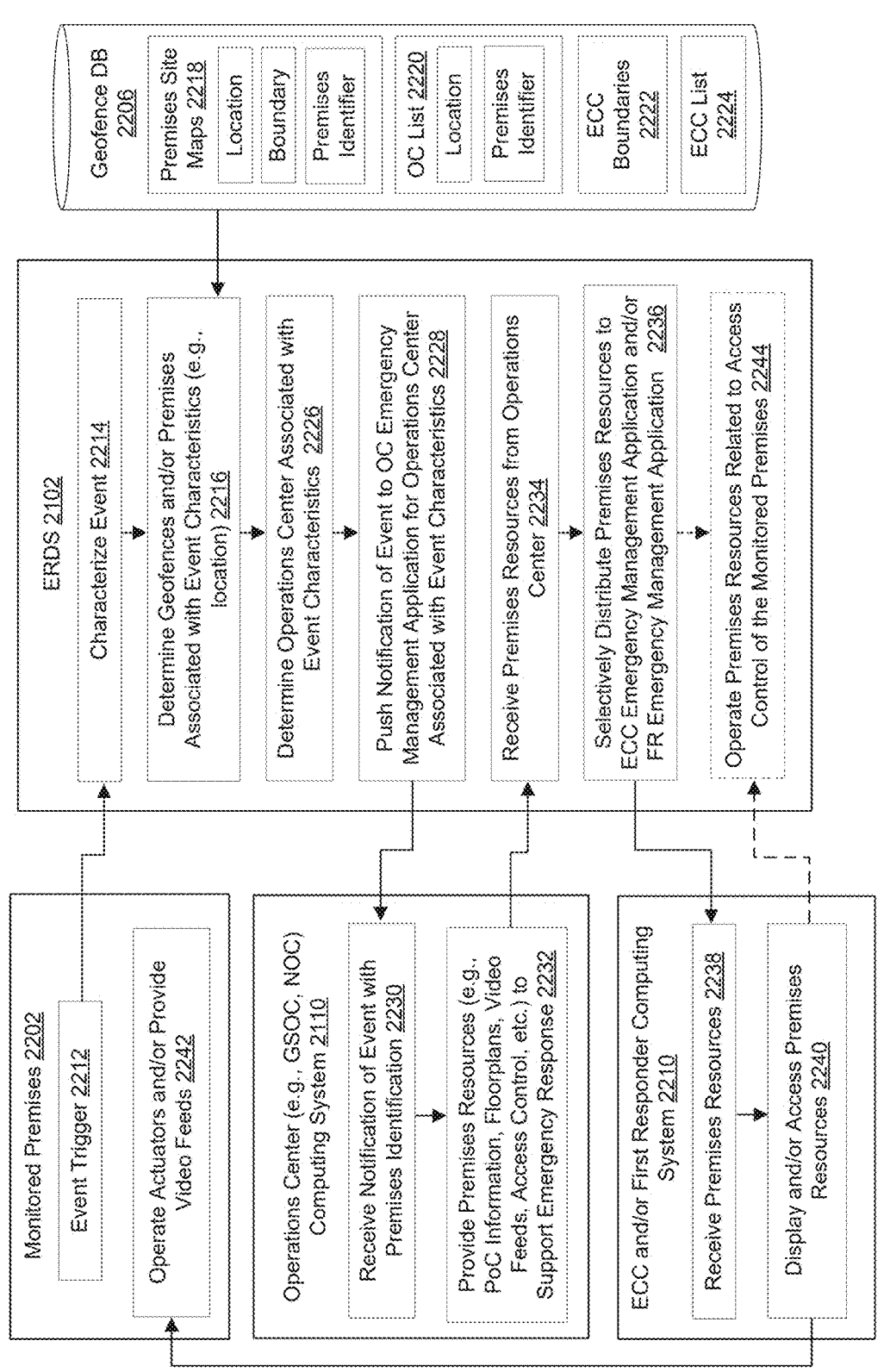
FIG. 22 illustrate an example flow diagram of a process for exchanging emergency response data, in accordance with aspects of the disclosure.

FIG. 22 illustrates an example flow diagram of a process 2200 for exchanging emergency response data, in accordance with aspects of the disclosure. Process 2200 is an example of a process that may be executed by processing logic 2160, according to an embodiment. The order in which some or all of the process operation blocks appear in process 2200 should not be deemed limiting. Rather, one of ordinary skill in the art having the benefit of the present disclosure will understand that some of the process blocks may be executed in a variety of orders not illustrated, or even in parallel. Process 2200 may operate in an emergency response data exchange ecosystem that includes monitored premises 2202, emergency response data system 2102, a geofence database 2206, an operations center computing system 2110, and an ECC and/or first responder computing system 2210, according to embodiments of the disclosure.

At operation 2212, process 2200 provides an event trigger from monitored premises 2202, according to an embodiment. Examples of premises that may be monitored by/from an operations center include, but are not limited to: casinos, hotels, retail stores, grocery stores, auto parts stores, apartment complexes, malls, parking lots, rail yards, railways, educational institutions, places of worship, military installations, entertainment venues, tourist attractions, theme parks, and/or other private and/or public commercial venues. The event trigger may be a call to 911, in one embodiment. The trigger may also be a text-based message (SMS, RCS, MMS, etc.) to 911. The trigger may also be activation of a panic button or wearable that communicates (e.g., through a smart phone) information to system servers (e.g., ERDS 2102) that is indicative of a health issue (e.g., heart rate, blood pressure, blood glucose, etc.). Operation 2212 may proceed to operation 2214.

At operation 2214, process 2200 uses emergency response data system 2102 to characterize the triggered event, according to an embodiment. Characterizing the triggered event may include, but is not limited to, determining a location of initiated emergency communications (e.g., 911 call, 911 text message, etc.) and/or determining the location of data exceeding a threshold, for example. Characterizing the triggered event may include prompting an AI model to summarize or determine the nature of an emergency related to the triggered event, for example, based on numerous data sources and/or data (e.g., data 2120). Characterizing the triggered event may also include identifying a mobile number or other unique identifier of the triggered event (e.g., smartphone identifier, sensor identifier, etc.), for example. Operation 2214 may proceed to operation 2216.

At operation 2216, process 2200 determines geofences and/or premises associated with characteristics of the triggered event, according to an embodiment. For example, ERDS 2102 may search geofence database 2206 to search for a premises associated with a location, a premises associated with an operations center, an operations center associated with a location, and/or an operations center associated with a premises. Geofence database 2206 may associated premises site maps 2218 with an operations center list 2220, with ECC boundaries 2222 (e.g., ECC state, ECC region, ECC geofence), and/or with an ECC list 2224 (e.g., ECC names, ECC identifiers, etc.). Premises site maps 2218 may include and associate premises locations, premises boundaries (e.g., geofences), and premises identifiers, according to an embodiment. Geofence database 2206 may be queried by location, operations center, premises identifier (e.g., numeric identifier, street name, address, GIS-based name, etc.), ECC boundaries 2222, and/or ECC list 2224, for example. Operation 2216 may proceed to operation 2226.

At operation 2226, process 2200 determines which one of the number of operations center is associated with trigger event characteristics (e.g., based on the results of a search of geofence database 2206), according to an embodiment. Operation 2226 may proceed to operation 2228.

At operation 2228, process 2200 pushes a notification of the event to an operations center emergency management application for the operations center associated with the event trigger, according to an embodiment. For example, if a 911 call is made from one of hundreds of BigBox Stores that are managed by BigBox operations center, the notification may be provided to the BigBox operations center. If several BigBox operations centers exist, a location-based relevant one of the BigBox operations centers may be identified and notified, according to an embodiment. Operation 2228 may proceed to operation 2230.

At operation 2230, process 2200 receives the notification of the event (e.g., at operations center computing system 2110) with an identification of a particular premises that is co-located with an initiated emergency communication, according to an embodiment. Various techniques may be used to identify or highlight a particular premises, a portion of a premises, or a region of interest co-located with a particular premises, in accordance with various aspects of the disclosure. Operation 2230 may proceed to operation 2232.

At operation 2232, process 2200 provides premises resources (e.g., using operations center computing system 2110) to ERDS 2102 for routing to ECC and/or first responder computing system 2210, according to an embodiment. Operation 2232 may proceed to operation 2234.

At operation 2234, process 2200 receives premises resources from the operations center, according to an embodiment. Operation 2234 may proceed to operation 2236.

At operation 2236, process 2200 selectively distributes premises resources to an ECC emergency management application and/or first responder emergency management application, according to an embodiment. Operation 2236 may proceed to operation 2238.

At operation 2238, process 2200 receives the premises resources, according to an embodiment. Operation 2238 may proceed to operation 2240.

At operation 2240, process 2200 displays and/or accesses premises resources (e.g., point of contact information, video feeds, floorplans, access controls), according to an embodiment. Process 2200 displays and/or accesses premises resources, based on user input by an operator or first responder, according to an embodiment. Operation 2240 may proceed to operation 2242.

At operation 2242, process 2200 operates (access control) actuators and/or provides video feeds (e.g., by monitored premises 2202), according to an embodiment. Process 2200 may terminate after operation 2242.

At operation 2244, process 2200 uses emergency response data system 2102 to operate (access control) actuators and/or receive video feeds, according to an embodiment.

FIGS. 23A, 23B, 23C, 23D, and 23E illustrate example graphical user interfaces (GUIs) and user interface (UI) elements that may be used in a variety of implementations of an operations center emergency management application configured to operate in an emergency response data exchange ecosystem, in accordance with various embodiments of the disclosure. Any UI element shown in one of FIGS. 23A, 23B, 23C, 23D, and 23E may be applied to one or more other FIGS. 23A, 23B, 23C, 23D, and 23E in the disclosure to make additional embodiments that are contemplated as being within the scope of the present disclosure. FIGS. 23A, 23B, 23C, 23D, and 23E illustrate example diagrams of UIs for operations center emergency management applications that are example implementations of operations center emergency management application 2130 that may be operated or executed by an operations center computing system (e.g., operations center computing system 2110 shown in FIGS. 21A and 21B), in accordance with aspects of the disclosure. The examples of an operations center emergency management application illustrate example implementations of situational awareness services, data exchange services, communications services, and/or emergency response insights 2118 that may be displayed or otherwise provided to an operations center operator, according to an embodiment.

Figure 23A:
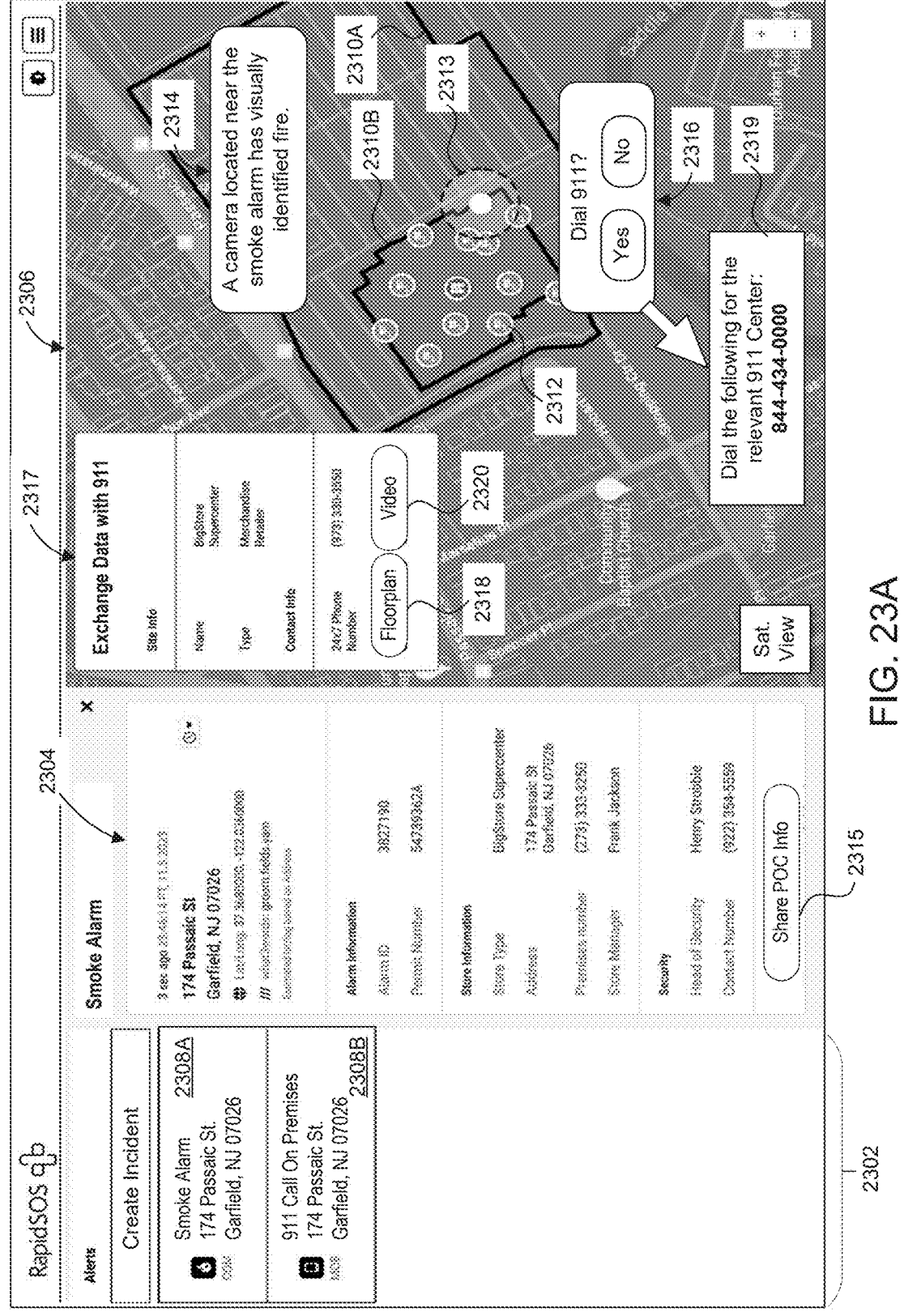
FIGS. 23A, 23B, 23C, 23D, and 23E illustrate example diagrams of user interfaces for an operations center emergency management application, in accordance with embodiments of the disclosure.

FIG. 23A illustrates an example of a UI 2300 that may be used by operations centers to manage emergencies, receive/display situational awareness services ((e.g., from ERDS 2102), receive/provide/display data exchange services, provide communications services, and/or display emergency response insights, in accordance with aspects of the disclosure. UI 2300 includes an incident queue 2302, a data card 2304, and a map 2306. Incident queue 2302 may be used to organize and visualize one or more incidents 2308 (individually, incident 2308A and 2308B), according to an embodiment. Examples of incidents may include an incident 2308A that indicates a smoke alarm activation at a first location, and a second incident 2308B that indicates a 911 call has occurred on a premises associated with (e.g., managed by, monitored by, etc.) a particular operations center, according to an embodiment.

Data card 2304 may provide various information related to one or more of the incidents 2308 in incident queue 2302, according to an embodiment. For a selected incident, data card 2304 may display address information, alarm information, sensor manufacturer information, a point of contact for the premises, contact information for the point of contact, a time of alarm or sensor activation, or the like.

Map 2306 may display one or more premises that are associated with a particular operations center. Map 2306 may display one or more boundaries 2310 (individually, boundary 2310A and boundary 2310B) that are associated with premises being monitored by a particular operations center. For example, a boundary 2310A may outline a parking structure for a premises, and a boundary 2310B may outline a building for the premises. Other examples of monitored premises may include, but are not limited to: a building, a structure, a parking lot, a roadway, a railway, a train yard, a park, a construction site, a port, a marina, a plot of land, a bridge, a tunnel, an airport, a port, a harbor, a pipeline, a power plant, a water treatment facility, a hospital, a school, a communication tower, a warehouse, a distribution center, a shopping mall, a stadium, a highway, a residential complex, an industrial plant, a forest, a nature reserve, a dam, an electrical substation, a communication substation, and/or a canal. Map 2306 may be used to illustrate available assets 2312, such as cameras, and sensors (e.g., fire alarm, smoke sensor, temperature sensor, proximity sensor, moisture sensor, pressure sensor, shock sensor, etc.) that may be used, to monitor boundaries 2310. Map 2306 may also be used to illustrate a region of interest 2313 that may be representative of a generalized or anonymized location of an emergency communication (e.g., 911 call, 911 text-based message, 911 video conference, etc.). Region of interest 2313 may be determined from call data 2122 and/or location data 2146 and may be illustrated to indicate a general region or area on the premises where an emergency communication has been initiated. Providing region of interest 2313 from ERDS 2102 may enable an operations center operator to efficiently guide emergency responders (e.g., by unlocking particular doors) to the person requesting emergency services, for example. In exchange for receiving region of interest 2313, the business or organization associated with the premises may share information (e.g., SPOC information, floor plans, video feeds, audio feeds, building access controls, etc.) with the responding ECC and/or with the emergency response data system to facilitate response to the request for emergency services, for example. UI 2300 may also display a share point of contact information button 2315 that enables an operator to provide/exchange data with an ECC to improve emergency response times.

ERDS 2102 may provide AI-based services (e.g., AI augmentation services module 2116, shown in FIG. 21B) to provide suggestions, perform actions, provide notifications, or provide other emergency response insights for a particular premises. The AI-based services may augment or supplement initiated emergency communications by aggregating and/or analyzing data 2120 of one or more data sources and incidents 2308, according to an embodiment. For example, AI-based services may use UI 2300 to display a notification 2314 that a fire has been visually identified, based on an analysis of camera data (e.g., video feeds) that can be provided by the operations center computing system 2110 in exchange for notification of an emergency communication that was initiated on managed premises. AI-based services may use UI 2300 to display an action box 2316 to dial 911 or otherwise initiate communication with an emergency communication center. Action box 2316 may be overlaid on map 2306 or may be displayed in another region of UI 2300. In one embodiment, in response to selecting "YES" with action box 2316, UI 2300 displays a message window 2319 that includes the telephone number to call to directly contact the 911 center associated with the location of the initiated emergency communication. In one embodiment, without displaying action box 2316, UI 2300 displays a message window 2319 that includes the telephone number to call to directly contact the 911 center associated with the location of the initiated emergency communication. ERDS 2102 may route the call from the operations center operator to the particular ECC having jurisdiction over the location of the emergency communications through 911 priority trunk routing. ERDS 2102 may display a message box 2317 in UI 2300 to enable the operator to exchange/share a floorplan of a premises a button 2318 and/or exchange/share live video feed from a premises with a button 2320, according to an embodiment.

Figure 23B:
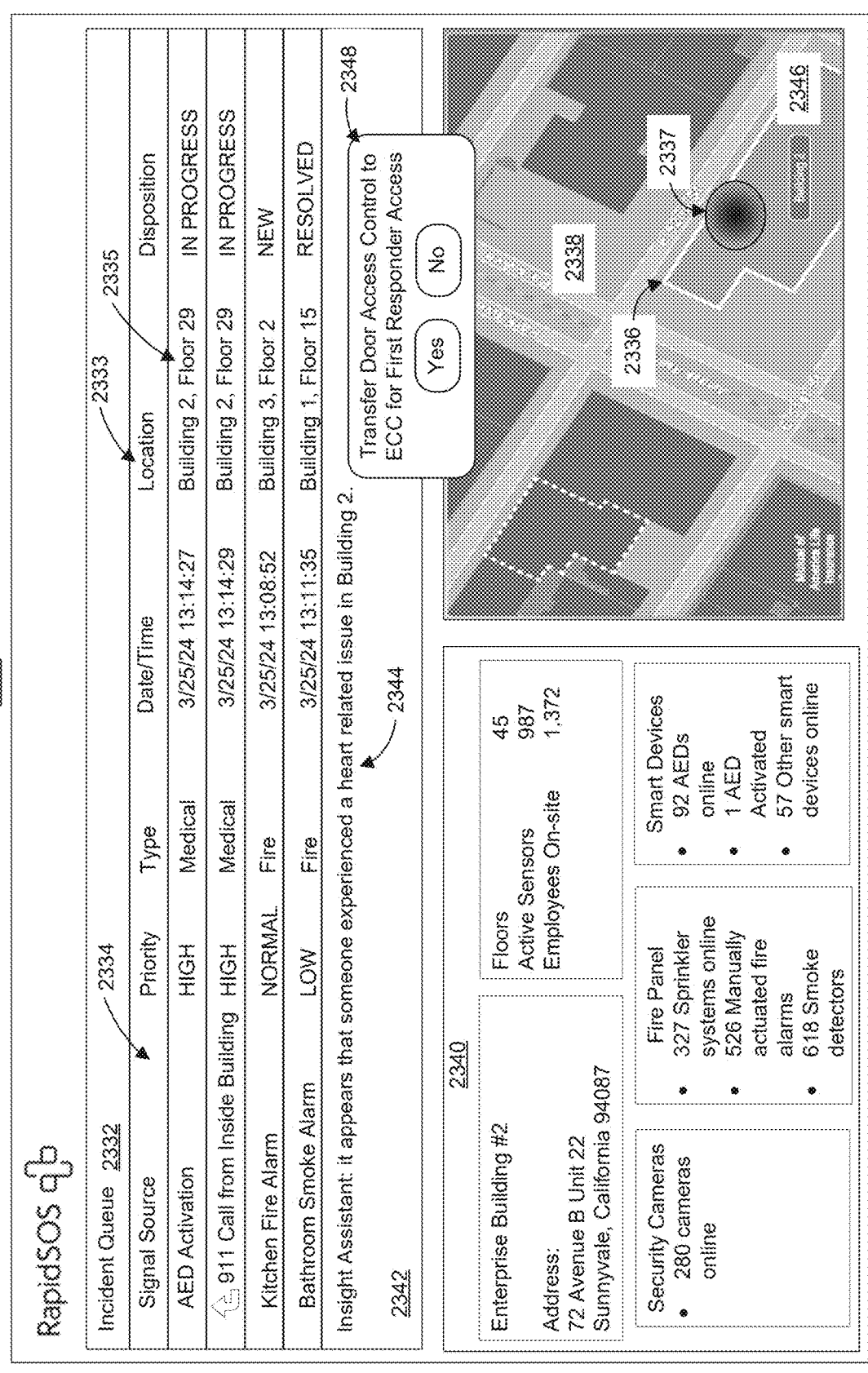

FIG. 23B illustrates a diagram of a UI 2330 that is an example of an operations center emergency management application that is configured to manage emergencies, receive/display situational awareness services (e.g., from ERDS 2102), receive/provide/display data exchange services, provide communications services, and/or display emergency response insights, in accordance with aspects of the disclosure. UI 2330 may include an incident queue 2332 that displays a number of incidents 2334 that have occurred on one or more premises managed by a particular operations center, according to an embodiment. Entries in the incident queue 2332 may include a location 2333 and a z-axis estimate 2335 of the emergency. Each of the premises may be displayed with an alpha-numeric identifier and a boundary 2336 that represents highlighting a premises on a map 2338. A region of interest 2337 may be displayed on a section of the premises to represent an anonymized or abstracted area within the premises where emergency communications have been initiated. UI 2330 may include a data card 2340 having various types of premises information that may be received, aggregated, and analyzed by ERDS 2102 and/or AI augmentation services to provide situational awareness services and/or data exchange services, according to an embodiment. UI 2330 may include an insight assistant window 2342 that includes an example of a notification 2344 that a person on the premises 2346 appears to be experiencing heart related issue. Insight assistant window 2342 may be used to receive and respond to queries from an operator of UI 2330.

UI 2330 may provide an access control message box 2348 that enables the operations center operator to, for example, transfer access control of premises doors or other ingress and/or egress points to an ECC. Access control message box 2348 may be displayed as a pop-up window or may be integrated into one or more other regions of UI 2330, in accordance with various implementations of the disclosure.

Figure 23C:
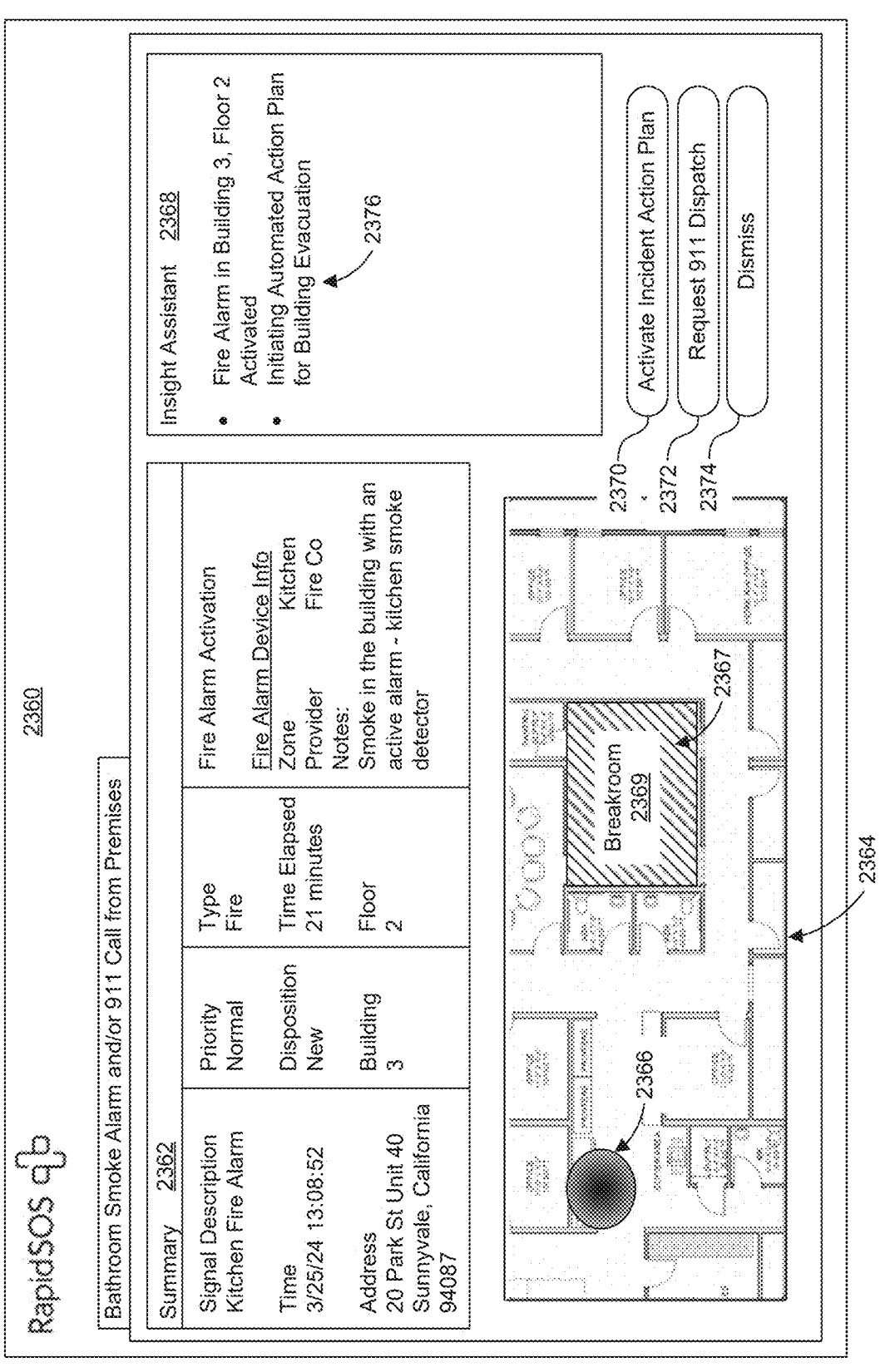

FIG. 23C illustrates an example diagram of a UI 2360 that is an example of a UI for an operations center emergency management application that is configured to manage emergencies, receive/display situational awareness services (e.g., from ERDS 2102), receive/provide/display data exchange services, provide communications services, and/or display emergency response insights, in accordance with aspects of the disclosure. UI 2360 is an example of what may be displayed in response to the selection of one of incidents 2334 of incident queue 2332 (shown in FIG. 23B), for example. UI 2360 illustrates a incidents summary 2362, a floorplan 2364, an incident location 2366, highlighting 2367, an insight assistant window 2368, and optional action buttons 2370, 2372, and 2374, according to an embodiment. Incident summary 2362 may display a signal description, a time of activation, an address, a priority level, a building (or other premises) identifier (e.g., a building number, an address, another asset identifier, etc.), a floor associated with the incident (e.g., an elevation or z-axis estimation), a type of incident (e.g., fire), and additional information about the particular alarm that is activated (e.g., a fire alarm).

Floorplan 2364 may provide a visual indication to the operator of a layout of a portion of a building and may illustrate the location of a signal source (e.g., alarm location or location where an emergency communication is initiated). UI 2360 may, for example, display incident location 2366 as an overlay or a layer over floorplan 2364 to notify an operator of a general region of interest as a location where an emergency communication has been initiated. UI 2360 provides highlighting 2367 for a space in floorplan 2364, such as a breakroom 2369, that has been identified as a general location of an initiated emergency communication, according to an embodiment. Highlighting 2367 of a space or region of interest may include, but is not limited to, a highlighting pattern (e.g., hatch lines fill, solid color fill, semi-transparent solid color fill), a highlighting color (e.g., red, yellow, flashing), a highlighting line (e.g., dark/bolded perimeter lines), for example.

AI augmentation services may provide information for display in UI 2360 to at least partially populate insight assistant window 2368 with one or more emergency response insights, according to an embodiment. AI augmentation services may provide information for use in UI 2360 to display a summary notifications 2376, for example, that a fire alarm is activated and that an action plan has been initiated. Initiation of an action plan by the AI augmentation services may include, but is not limited to, the operation of controllers on a premises to, for example, unlock and/or open doors and illuminate emergency lighting.

The emergency response data system and/or AI augmentation services may support operations of action buttons 2370, 2372, and 2374 to enable an operator to activate an incident action plan, request 911 dispatch, or dismiss previous actions, for example. UI 2360 may selectively display action buttons 2370, 2372, and 2374, or UI 2360 may statically display action buttons 2370, 2372, and 2374, in accordance with embodiments of the disclosure.

Figure 23D:
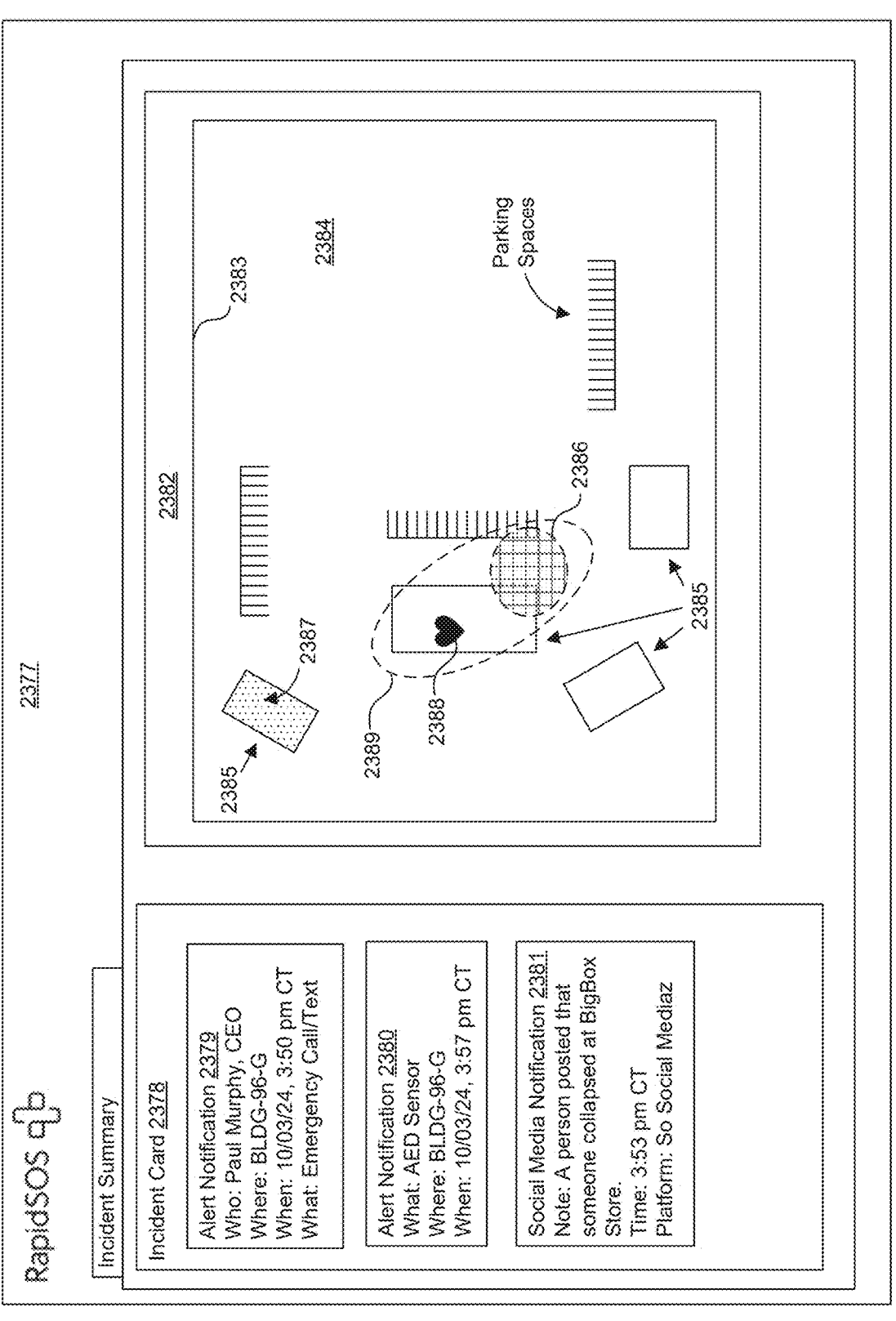

FIG. 23D illustrates a diagram of a UI 2377 that is an example of a UI for an operations center emergency management application that is configured to manage emergencies, receive/display situational awareness services (e.g., from ERDS 2102), receive/provide/display data exchange services, provide communications services, and/or display emergency response insights, in accordance with aspects of the disclosure. UI 2377 includes an incident card 2378 and a map 2382, according to an embodiment. Incident card 2378 and map 2382 may be displayed to provide an incident summary, in response to a user selecting an incident summary tab or other UI element in an operations center emergency management application.

Incident card 2378 may include an alert notification 2379, an alert notification 2380, and a social media notification 2381, according to an embodiment. Alert notification 2379 is an example of a situational awareness service and/or notification. Alert notification 2379 may provide a text-based notification or description of a particular premise (e.g., BLDG-96-G, an address, etc.) where an emergency call or textual message has been initiated. Notably, alert notification 2379 may be configured to indicate the name and/or position of an employee who initiated emergency communications from the premises, which may be referred to as corporate phone highlighting. For example, a corporate phone highlighting service may be configured to receive and store phone numbers associated with employees, particular employees (e.g., corporate officers), or corporate associates (e.g., contractors). The corporate phone highlighting service may be a subset of situational awareness services and may be configured to provide notifications to an operation center (e.g., a GSOC), in response to an initiated emergency communications on a premises that is monitored or managed by the operations center, according to one embodiment.

Alert notification 2380 may provide an indication related to one or more sensors that have been used or otherwise triggered. For example, a defibrillator sensor may be configured to generate an alert or notification message when a defibrillator is removed from its case and/or actuated. Alert notification 2380 may include a time and location (e.g., within a premises managed by an operations center) where the particular sensor has been triggered, for example.

Social media notification 2381 is configured to provide content of social media posts that are related to one or more additional alert notifications, in accordance with aspects of the disclosure. Social media notification 2381 may include a note that is a quote of a social media posts or that is a summary of a social media post. The summary of the social media post may be generated by AI augmentation services (e.g., of AI augmentation services module 2116), according to an embodiment. Social media notification 2381 may also include a timestamp of the social media post and may provide a source (e.g., So Social Mediaz) of the social media post, according to various embodiments of the disclosure.

Map 2382 illustrates examples of UI elements that support providing situational awareness details of an incident to an operations center operator, in accordance with aspects of the disclosure. Map 2382 may include a premises boundary 2383 that includes a parking lot 2384, and a number of buildings or structures 2385 to represent an example premises that is monitored or managed by an operations center, according to an embodiment. Parking lot 2384 may include a number of parking spaces and regions for traffic ingress and egress. Buildings 2385 represent one or more buildings having one or more floors that may be monitored and/or managed by an operations center, for example.

Situational awareness services and/or ERDS 2102 may use map 2382 to provide a visual notification (e.g., a region of interest or other anonymized location of an initiated emergency communication). Region of interest 2386 represents a region of interest of an initiated emergency communication. Region of interest 2386 may be used to indicate that a corporate phone was used to initiate emergency communications. For example, region of interest 2386 may be highlighted (e.g., with a fill pattern, a fill color, an intensity difference, a particular outline, etc.) to indicate that a person who initiated emergency communications from a corporate phone or from a phone that has been registered with a business (e.g., an employee, a contractor, or a corporate officer of a business). Highlighting 387 (e.g., a speckle pattern) represents a region of interest associated with an entire building or structure and can be used as an alternative to, for example, region of interest 2386, in accordance with aspects of the disclosure. Sensor icon 2388 is an example of an icon that can be used to represent a type of sensor data (e.g., defibrillator) that is the source of an alert notification (e.g., alert notification 2380). An incident cluster 2389 may be a visual and/or text-based indication (e.g., a broken line ellipse) that two or more alert notification sources may be related. Incident cluster 2389 may be at least partially defined by AI augmentation services that receive and analyze emergency communications, location data, sensor data, social media data, and the like to determine the likelihood of two or more alerts being related to one another, for example.

Figure 23E:
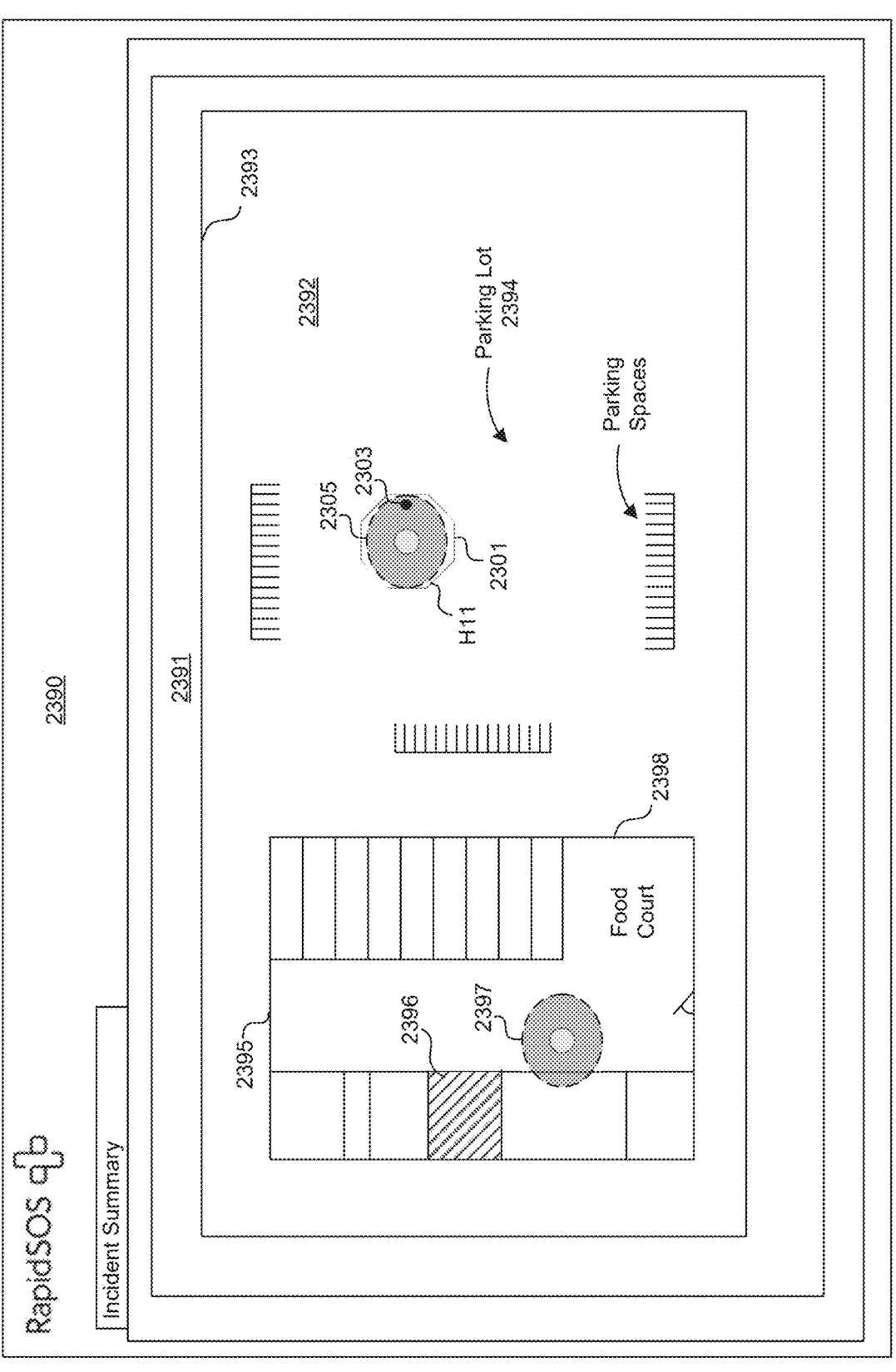

FIG. 23E illustrates a diagram of a UI 2390 that is an example of a UI for an operations center emergency management application that is configured to manage emergencies, receive/display situational awareness services (e.g., from ERDS 2102), receive/provide/display data exchange services, provide communications services, and/or display emergency response insights, in accordance with aspects of the disclosure. UI 2390 includes a map 2391 of a premises 2392 having a boundary 2393, according to an embodiment. In response to initiated emergency communications within (or near) premises boundary 2393, UI 2390 and/or map 2391 may be configured to display an anonymized location or region of interest associated with the location of an initiated emergency communications, according to an embodiment. Premises 2392 includes a parking lot 2394 and a building 2395. Building 2395 may represent a commercial space, an office space, or an educational institution. Building 2395 may represent a mall having a number of storefronts and a food court, for example. In response to an initiated emergency communication, UI 2390 may display highlighting

2396 of one of a number of storefronts, and the highlighted storefront may represent an approximate location of initiated emergency communications. UI 2390 may display a region of interest 2397, with an approximate and anonymized location of initiated emergency communications, in accordance with aspects of the disclosure. In one embodiment, a boundary 2398 of building 2395 or boundary 2393 may be highlighted to indicate a more generalized and/or anonymized location of initiated emergency communications, in accordance with various aspects of the disclosure.

Anonymization of data may be based on hexagonal grids of the H3 spatial indexing system, in accordance with aspects of the disclosure. The H3 spatial indexing system is an open-source geospatial framework developed by Uber. The H3 spatial indexing system divides the Earth's surface into a hierarchical grid of hexagonal cells, enabling efficient storage, analysis, and visualization of geographic data H3 spatial indexing system is an open-source geospatial framework. Hexagonal cell 2301 represents a hexagonal cell in which an emergency communication is initiated. The location 2303 of the emergency communication may be along the perimeter (as illustrated) or anywhere in the hexagonal cell, but a region of interest 2305 may be centered on the hexagonal cell 2301 to at least partially anonymize the precise location of the call. Any one of a number of sizes of hexagonal cells may be used. For example, within the H3 spatial indexing system, a resolution of H8 (having an edge length of 0.33 km), a resolution of H9 (having an edge length of 0.17 km), a resolution of H10 (having an edge length of 0.09 km), a resolution of H11 (having an edge length of 0.05 km), and/or a resolution of H12 (having an edge length of 0.026 km) may be selectively used based on varying geography and/or various location resolution associated with received emergency communications. In one embodiment, resolution H11 is a default region of interest size for anonymizing the source location of initiated emergency communications.

Figure 24A:
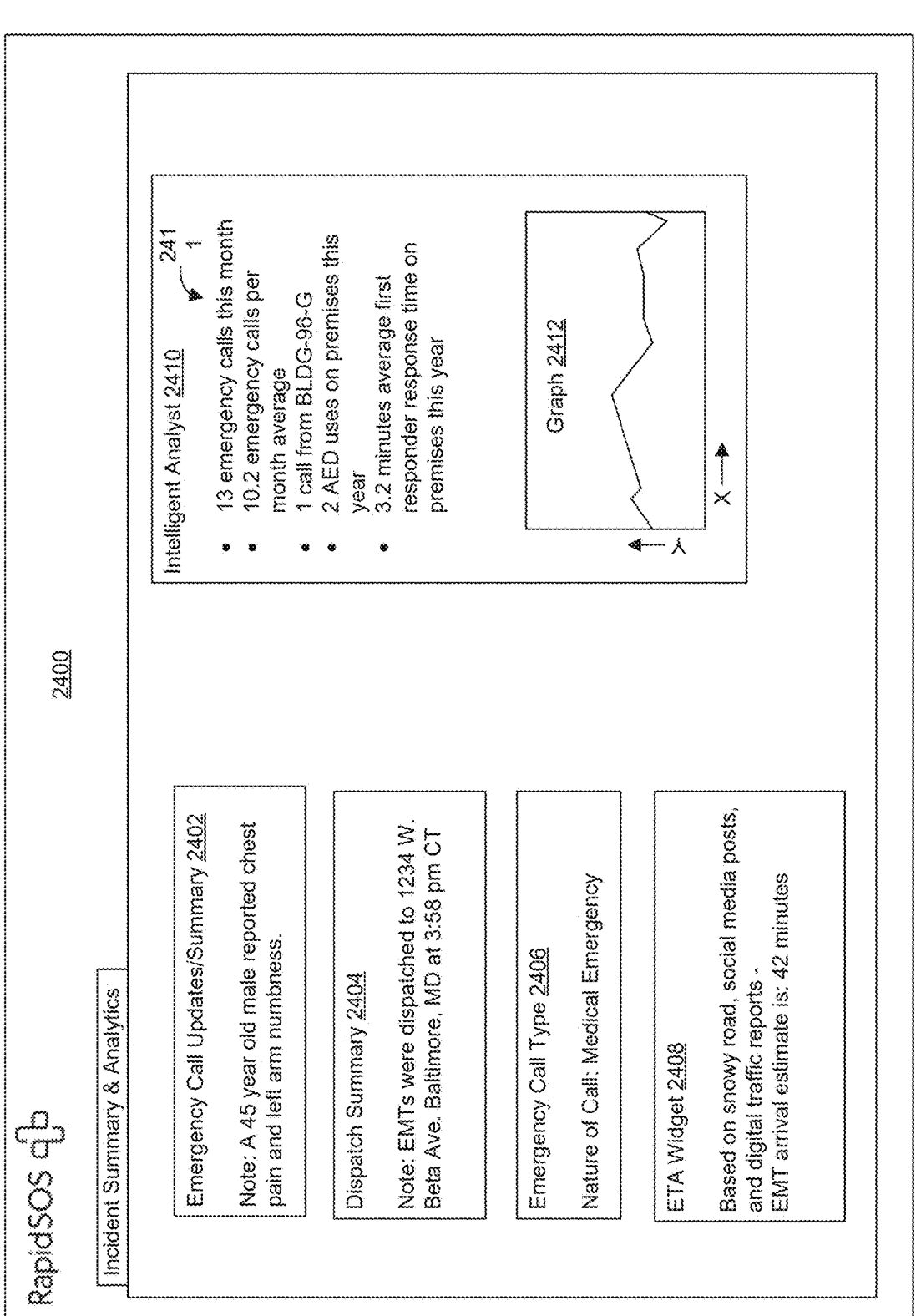
FIGS. 24A, 24B, and 24C illustrate example diagrams of user interfaces for an operations center emergency management application, in accordance with embodiments of the disclosure.
Figure 24B:
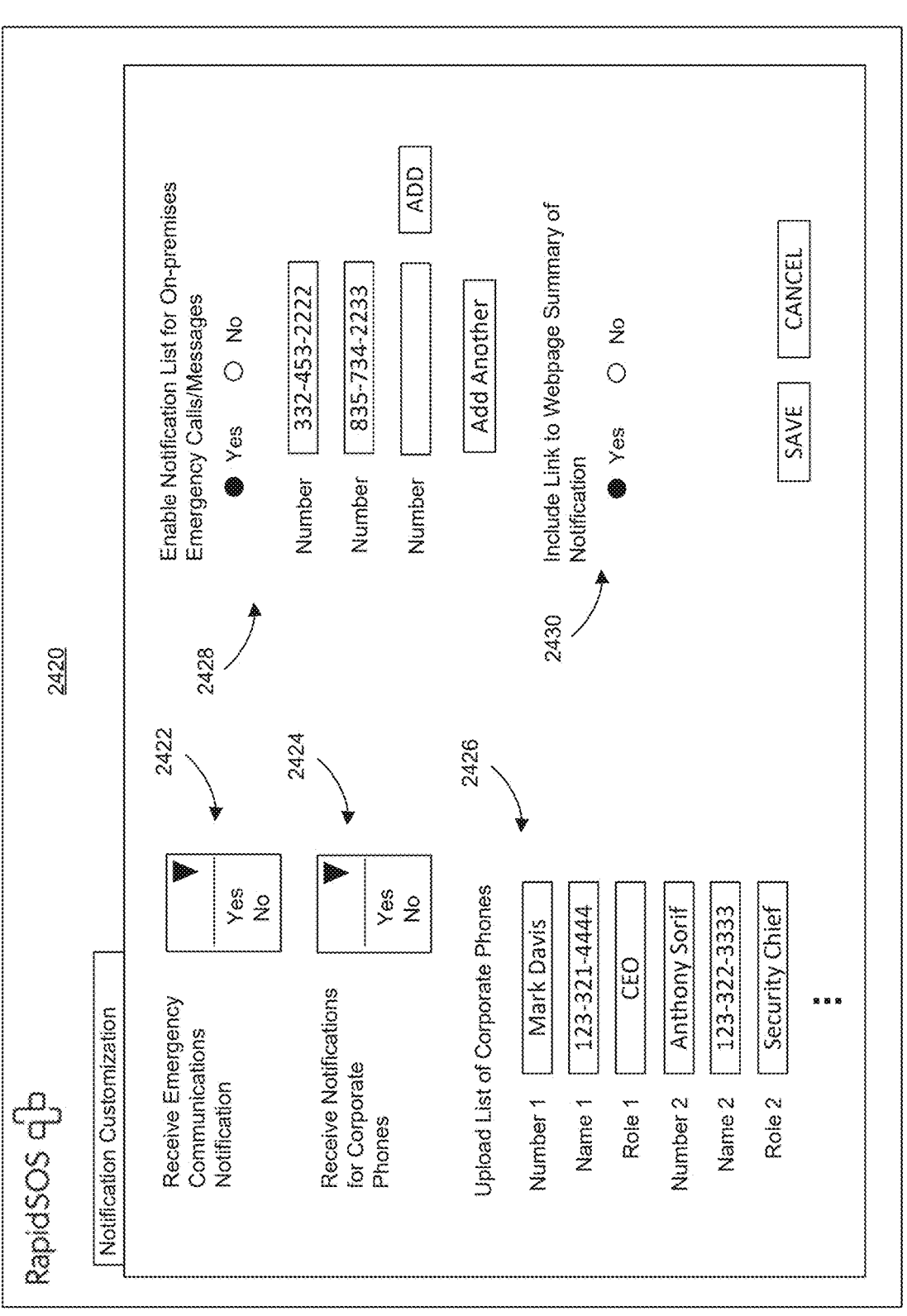
Figure 24C:
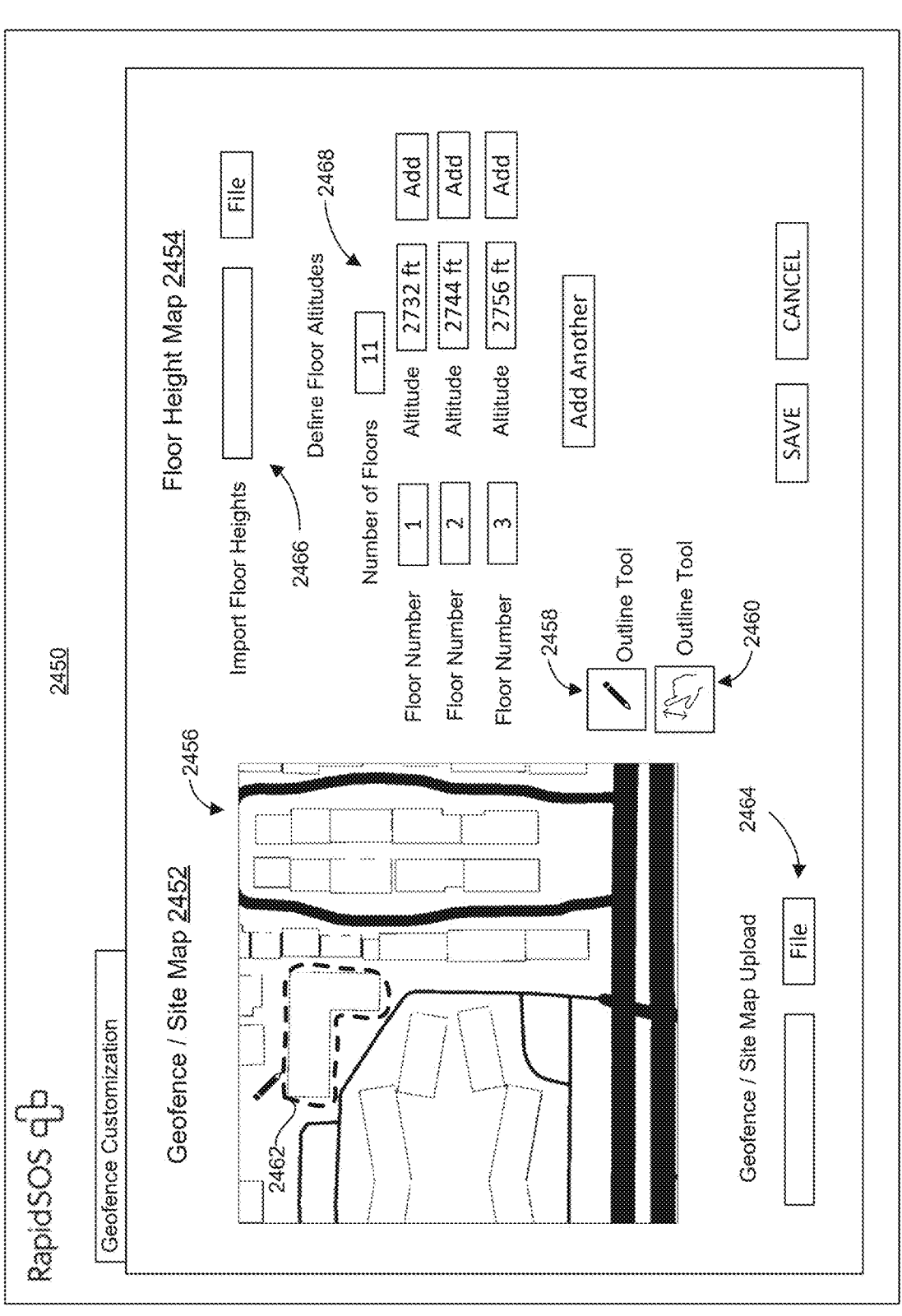

FIGS. 24A, 24B, and 24C illustrate diagrams of embodiments of UIs that are examples of a UI for an operations center emergency management application. FIG. 24A illustrates a diagram of a UI 2400 that is an example of a UI for an operations center emergency management application that is configured to manage emergencies, receive/display situational awareness services (e.g., from ERDS 2102), receive/provide/display data exchange services, provide communications services, and/or display emergency response insights, in accordance with aspects of the disclosure. UI 2400 may be configured to display an incident summary and/or various analytics for an operations center, for example. UI 2400 may include emergency call updates/summary 2402, a dispatch summary 2404, an emergency call type 2406, and/or an estimated time of arrival (ETA) widget 2408, in accordance with aspects of the disclosure. Emergency call updates/summary 2402 may include an AI-generated summary of 911 call audio that is captured, analyzed, and summarized, for example. Emergency call updates/summary 2402 may be based on textual messages provided to an ECC, textual messages provided by an ECC, and/or analysis of one or more additional data sources, for example. Dispatch summary 2404 may include an AI-generated summary of radio-based dispatch audio that is captured, analyzed, and summarized, for example. The summary may be based on a transcript or may be generated by providing dispatch audio recordings to an AI model, according to an embodiment. Emergency call type 2406 may be generated by an AI model in response to a prompt, such as, "determine the nature of the call, with the options being fire, medical emergency, traffic accident, flood, earthquake, or other." ETA widget 2408 may be generated by providing various types of data (e.g., weather reports, traffic reports, sensor data, social media posts, destination address, dispatched first responder station, etc.) to an AI model with a prompt to "determine an ETA for first responders to the destination address," for example.

UI 2400 is configured to display intelligent analyst data 2410 that may be configured to enhance the ability of an operations center to analyze and understand call patterns, improve answer times, and allocate resources more effectively. Intelligent analyst data 2410 may include textual summaries 2411 and/or graph 2412. Textual summaries 2411 may include a total number of emergency calls (e.g., in a day, a month, a quarter, a half, etc.), an average number of emergency calls, a total number of emergency calls from a particular premises (e.g., BLDG-96-G), a number of sensors triggered a particular premises, average first responder response times, and/or metrics derived therefrom, in accordance with aspects of disclosure. Graph 2412 may represent emergency-related data for particular premises that are monitored and/or managed by operations center. Graph 2412 may display charts or graphs for one or more of a number of incidents reported, a number of calls received, a number of calls for a particular premises/asset, sensor usage, rates of incidents, or the like, in accordance with various aspects of the disclosure.

FIG. 24B illustrates a diagram of a UI 2420 that is an example of a UI for an operations center emergency management application that is configured to manage emergencies, receive/display situational awareness services (e.g., from ERDS 2102), receive/provide/display data exchange services, provide communications services, and/or display emergency response insights, in accordance with aspects of the disclosure. UI 2420 may represent a notification customization page that enables an operations center to customize one or more notifications or notification types, for example. UI 2420 includes UI elements 2422 for enabling emergency communications notifications, UI elements 2424 for enabling corporate phone notifications, UI elements 2426 for receiving and associating (corporate) phone numbers with personnel, and UI elements 2428 for enabling notification distribution for on-premises emergency calls/ messages, according to an embodiment.

UI elements 2422 may include a description and a selection element that enables an operations center emergency management application to receive and display emergency communications notifications, such as a region of interest, building, highlighting, and/or corporate phone highlighting, for example. UI elements 2424 include a description and one or more UI elements that are configured to enable or disable notifications for corporate phones or phones that are registered and/or associated with a business. UI elements 2426 enable an operator to provide and/or upload phone numbers with corporate roles and/or with names of people associated with the phone numbers, for example. UI elements 2428 enable telephone number and/or email entries for a list of people to receive notification of emergency communications that have been initiated on a particular premises (e.g., in a building, a structure, a parking lot, or other managed/ monitored location). UI elements 2430 may be used to enable a link to a webpage summary of the initiated emergency communication to be sent to the list of people that receive notification of emergency communications, according to an embodiment.

FIG. 24C illustrates a diagram of a UI 2450 that is an example of a UI for an operations center emergency management application that is configured to manage emergencies, receive/display situational awareness services (e.g., from ERDS 2102), receive/provide/display data exchange services, provide communications services, and/or display emergency response insights, in accordance with aspects of the disclosure. UI 2450 may represent a geofence (e.g., site map) customization page that enables an operations center to customize define and/or upload premises boundaries and floor height (e.g., for multiple floor buildings), for example. UI 2450 includes a geofence/site map interface 2452 and a floor height map interface 2454, according to an embodiment. Geofence/site map interface 2452 includes an interactive map 2456 that receives user input (e.g., with a drawing tool) to define boundaries of geofences or site maps, according to an embodiment. Interactive map 2456 may receive and display outlines 2462 that can be drawn using an outline tool 2458. Upon receipt of outlines 2462, ERDS 102 may be operable to normalize the outline to location-based points and generate a shape file from the normalized location-based points. Interactive map 2456 may be moved, adjusted or otherwise manipulated with a pan tool 2460, for example. Geofence/site map interface 2452 includes a UI element 2464 (e.g., text box, button, etc.) for uploading a shape file that defines a geofence and/or site map. The shape file may be a GIS file type and/or a geoJSON file, for example.

Floor height map interface 2454 includes one or more UI elements that enable a user to define the height of a floor in a multi-floor building, according to an embodiment. Mapping altitudes to floor numbers, enables ERDS 102 to receive the location of an initiated emergency communication, map the location to a floor height, and display the floor number on the GSOC emergency management application with the notification of the initiated emergency communication. UI elements 2466 (e.g., text box, button, etc.) is operable to upload/import a file (e.g., a csv, spreadsheet, etc.) that maps the floor numbers with floor altitudes. The file contents may be stored as or stored in one or more searchable data structures (e.g., a database). UI elements 2468 (e.g., text boxes, buttons, etc.) are operable to receive a number of floors and floor altitudes corresponding to particular floor numbers, for example. The mapping or correlation of floor numbers to altitudes may be stored (e.g., by ERDS 2102) in one or more searchable data structures.

Figure 25:
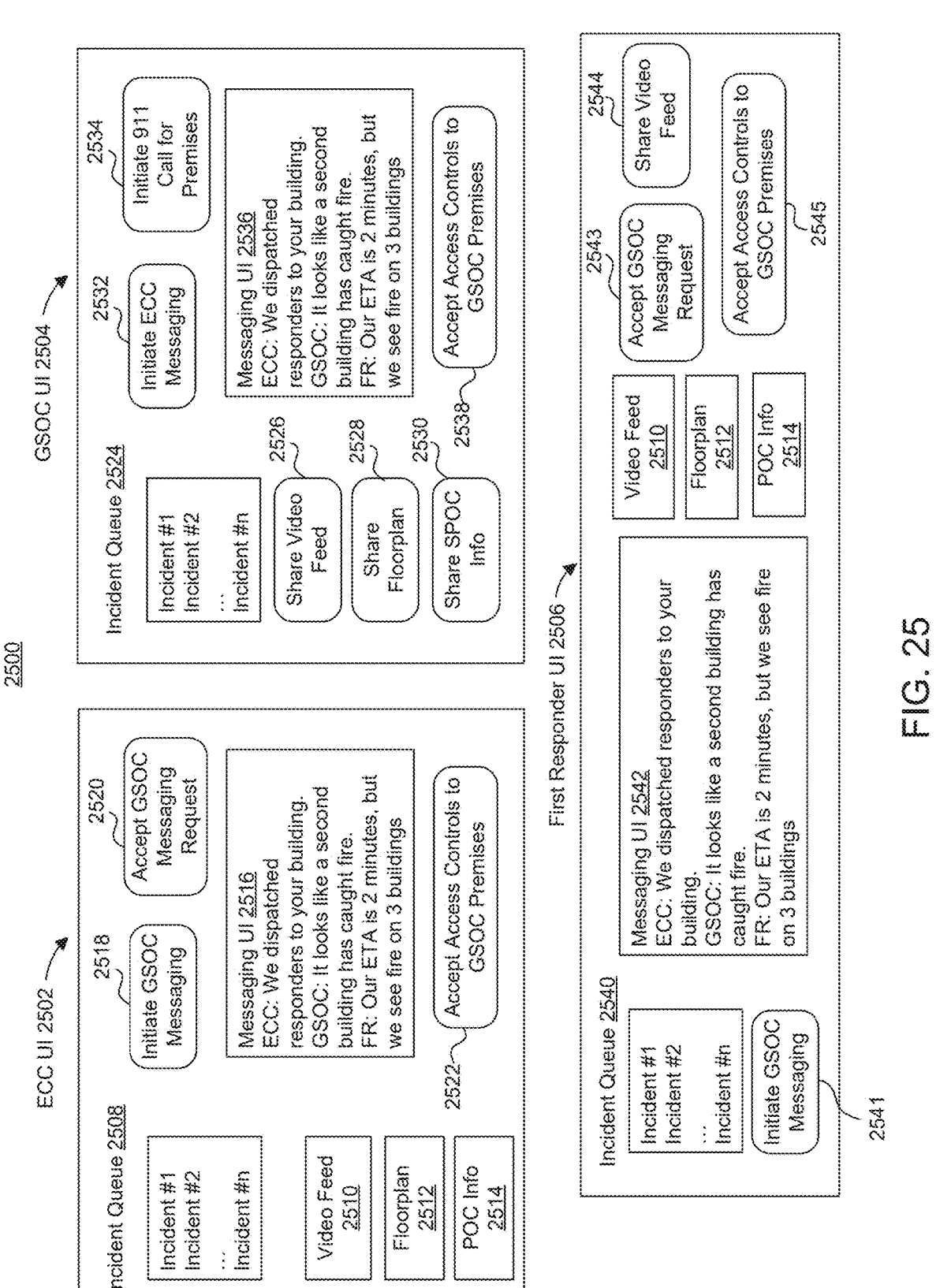
FIG. 25 illustrates a diagram of a communications environment, in accordance with embodiments of the disclosure.

FIG. 25 illustrates an example diagram of a communications environment 2500 that is operable to support an exchange of information and resources between an ECC, an operations center, and/or first responders, in accordance with aspects of the disclosure. Communications environment 2500 includes an ECC UI 2502 for an ECC emergency management application, a GSOC UI 2504 for an OC emergency management application, and a first responder UI 2506 for a first responder emergency management application, according to an embodiment. Emergency response data system 2102 and/or emergency response data exchange ecosystem 2140 may include hardware, software, networks, servers, software modules, processing logic, and/or memory to support the exchange of information and/or resources between ECC UI 2502, GSOC UI 2504, and/or first responder UI 2506, in accordance with various aspects of the disclosure.

ECC UI 2502 may include a number of UI elements arranged and operable to support communications between an ECC, GSOC, and/or first responder device, according to an embodiment. ECC UI 2502 may include an incident queue 2508 that displays a selectable list of incidents. Selection of one incident may result in the display of one or more other actions or features that may be operated. ECC UI 2502 includes one or more of a video feed window 2510 that displays a video feed shared by a GSOC, a floorplan 2512 shared by a GSOC, and/or point of contact (POC) information 2514 to enable a direct call to a person at the premises or at the operations center associated with a selected incident, according to one implementation. ECC UI 2502 may include messaging UI 2516 that enables text-based communications between an operations center associated with an incident, an ECC that has jurisdiction for the incident, and first responders associated with (e.g., dispatched to) the incident. ECC UI 2502 may include a UI element 2518 operable to initiate messaging with a GSOC and may include a UI element 2520 that is operable accept a GSOC messaging request. Messaging UI 2516 may appear or be displayed in response to operating UI element 2518 or 2520. Messaging UI 2515 may indicate who the message is from (e.g., ECC, GSOC, first responder (FR), etc.) and may associate a textual message with a sender, for example. In one embodiment, UI element 2522 is operable to accept access control to GSOC premises (e.g., to open/unlock doors for first responders).

GSOC UI 2504 may include a number of UI elements arranged and operable to support communications between an ECC, GSOC, and/or first responder device, according to an embodiment. GSOC UI 2504 may include an incident queue 2524 that displays a selectable list of incidents. Selection of one incident may result in the display of one or more other actions or features that may be operated. GSOC UI 2504 includes one or more of a share video feed UI element 2526 (e.g., a button) that is operable to share a video feed of a premises with an ECC, a share floorplan UI element 2528 (e.g., a button) that is operable to share a floorplan of a premises with an ECC, and/or a share point of contact (POC) information UI element 2530 (e.g., a button) to enable an ECC to directly call a person at the premises or at the operations center associated with a selected incident, according to one implementation. GSOC UI 2504 may include a UI element 2532 that is operable to initiate messaging with an ECC and may include a UI element 2534 that is operable to initiate a 911 call for a particular premises location of a selected incident, for example. GSOC UI 2504 may include messaging UI 2536 that enables text-based communications between an operations center associated with an incident, an ECC that has jurisdiction for the location of the incident, and first responders associated with (e.g., dispatched to) the incident, according to an embodiment. Messaging UI 2536 may appear or may be displayed in response to operating UI element 2532, for example. In one embodiment, UI element 2538 is operable to provide access control to an ECC for a particular aspect (e.g., an ingress or egress point) for the GSOC premises associated with an incident.

First responder UI 2506 may include a number of UI elements arranged and operable to support communications between an ECC, GSOC, and/or first responder device, according to an embodiment. First responder UI 2506 may include an incident queue 2540 that displays a selectable list of incidents. Selection of one incident may result in the display of one or more other actions or features that may be operated. First responder UI 2506 includes one or more of a share video feed UI element 2544 (e.g., a button) that is operable to share a video feed (e.g., of a premises) with an ECC and/or with a GSOC from a first responder device. First responder UI 2506 may include a UI element 2541 that is operable to initiate messaging with an ECC and/or GSOC. First responder UI 2506 may include a UI element 2543 that is operable to accept a messaging request from a GSOC and/or an ECC associated with an incident (e.g., a selected incident), according to an embodiment. First responder UI 2506 may include messaging UI 2542 that enables text-based communications between an operations center associated with an incident, an ECC that has jurisdiction for the location of the incident, and one or more first responders associated with (e.g., dispatched to) the incident, according to an embodiment. Messaging UI 2542 may appear or may be displayed in response to operating UI element 2541, for example. In one embodiment, UI element 2545 is operable to accept access control by a first responder device for a particular access point (e.g., an ingress or egress) of the GSOC premises associated with an incident.

FIG. 26 illustrates a flow diagram of a process 2600 for validating social media for emergency management applications for an ECC, an operations center, and/or a first responder device, in accordance with aspects of the disclosure. Social media posts can be used to provide additional context or information to support response to an emergency incident. However, simply displaying social media posts, even if the posts appear to be proximate to the location of an initiated emergency communication. In one embodiment, social media posts are initially retrieved and/or filtered by location and are subsequently applied to one or more AI models to identify posts that are relevant to an emergency call or text-based message. The order in which some or all of the process operation blocks appear in process 2600 should not be deemed limiting. Rather, one of ordinary skill in the art having the benefit of the present disclosure will understand that some of the process blocks may be executed in a variety of orders not illustrated, or even in parallel.

At operation 2602, process 2600 identifies a location associated with an initiated emergency communication (e.g., a call or textual message to 911), according to an embodiment. Location information may be extracted from a notification of the emergency communication received from the mobile device associated with the initiated emergency communication. Operation 2602 may proceed to operation 2604.

At operation 2604, process 2600 matches the location with a premises, according to an embodiment. The location or address of the location may be used to search a database of premises that are associated with an ECC and/or operations center to find a premises associated with the location. Operation 2604 may proceed to operation 2606.

At operation 2606, process 2600 retrieves premises characteristics (e.g., description, major crossroads, store name, etc.), according to an embodiment. Operation 2606 may proceed to operation 2608.

At operation 2608, process 2600 searches social media feeds based on the location and/or premises characteristics, according to an embodiment. Operation 2608 may proceed to operation 2610.

At operation 2610, process 2600 copies social media posts that are responsive to the search, according to an embodiment. Operation 2610 may proceed to operation 2612.

At operation 2612, process 2600 applies copies of relevant social media posts to one or more AI models, according to an embodiment. Operation 2612 may proceed to operation 2614.

At operation 2614, process 2600 retrieves and applies additional data (e.g., weather, traffic, location, sensor data, telematics, etc.) to the one or more AI models, according to an embodiment. Operation 2614 may proceed to operation 2616.

At operation 2616, process 2600 prompts the AI model to determine the likelihood (e.g., a percentage) of relevance of a social media post to the premises associated with the location of the initiated emergency communication, according to an embodiment. Operation 2616 proceeds to operation 2618, according to an embodiment.

At operation 2618, process 2600 determines if the likelihood exceeds a predetermined threshold. If the likelihood exceeds the predetermined threshold, operation 2618 proceeds to operation 2620, according to an embodiment. If the likelihood does not exceed the predetermined threshold, operation 2618 may proceed to operation 2622, according to an embodiment.

At operation 2620, process 2600 displays the relevant social media post or a summary of the relevant social media post on an operations center emergency management application UI, according to an embodiment. Process 2600 may terminate after operation 2620, according to an embodiment.

At operation 2622, process 2600 omits providing the (less-relevant) social media post to the operations center emergency management application UI, according to an embodiment. By selectively omitting less-relevant social media posts, process 2600 filters the less-relevant or irrelevant social media posts to reduce the noise or distracting posts from distracting operations center operators, according to an embodiment.

FIG. 27 illustrates a flow diagram of a process 2700 for selectively exchanging emergency response data between an operations center and an ECC, in accordance with aspects of the disclosure. The order in which some or all of the process operation blocks appear in process 2700 should not be deemed limiting. Rather, one of ordinary skill in the art having the benefit of the present disclosure will understand that some of the process blocks may be executed in a variety of orders not illustrated, or even in parallel.

At operation 2702, process 2700 receives notification of an initiated emergency communication that includes a location of the initiated emergency communication, according to an embodiment. An initiated emergency communication may include a 911 call, another emergency call, and/or a textual message to an emergency number (e.g., 911). Operation 2702 may proceed to operation 2704.

At operation 2704, process 2700 identifies a premises associated with the location, according to an embodiment. Process 2700 may search one or more location-based databases (e.g., a GIS database) to determine which one or more premises that are associated with the location, according to an embodiment. Operation 2704 may proceed to operation 2706.

At operation 2706, process 2700 identifies an operations center associated with the premises, according to an embodiment. The premises may include a railyard, railway tracks, a commercial building, parking lots, educational institutions, government facilities, and/or other structures, according to various aspects of the disclosure. Identifying an operations center associated with the premises may include searching one or more geofences and/or other databases that associate operations centers with managed premises. Operation 2706 may proceed to operation 2708.

At operation 2708, process 2700 provides notification of the initiated emergency communication to a UI of an operations center emergency management application, according to an embodiment. The notification may include one or more of an anonymized region of interest, highlighting of the space on a map or a floorplan, highlighting of an asset (e.g., a building, a railyard, a parking lot, train rails, shipping docks, etc.), and/or display an address of an asset associated with the location, according to various aspects of the disclosure. Operation 2708 may proceed to operation 2710.

At operation 2710, process 2700 receives operations center data from the operations center to support emergency response to the initiated emergency communication, according to an embodiment. The operations center data includes at least one of a floorplan of the premises associated with the location, video feeds of the premises, a point of contact information for the premises, and/or access control for at least part of the premises, in accordance with aspects of the disclosure. Operation 2710 may proceed to operation 2712.

At operation 2712, process 2700 selectively displays at least part of the operations center data in a UI of an ECC emergency management application and/or in a UI of a first responder emergency management application, according to an embodiment. Displaying the operations center data may be in response to a request from an ECC or first responder device. Displaying the operations center data at an ECC or on a first responder device may be performed in response to a request to share data by an operations center operator, according to an embodiment.

FIGS. 28A and 28B illustrate a flow diagram of a process 2800 for establishing communications between an operations center and an ECC, in accordance with aspects of the disclosure. The order in which some or all of the process operation blocks appear in process 2800 should not be deemed limiting. Rather, one of ordinary skill in the art having the benefit of the present disclosure will understand that some of the process blocks may be executed in a variety of orders not illustrated, or even in parallel.

At operation 2802, process 2800 receives notification of an initiated emergency communication that includes a location of the initiated emergency communication, according to an embodiment. Operation 2802 may proceed to operation 2804.

At operation 2804, process 2800 identifies a premises associated with the location, according to an embodiment. Operation 2804 may proceed to operation 2806.

At operation 2806, process 2800 identifies an operations center associated with the premises, according to an embodiment. The premises may include a railyard, railway tracks, a commercial building, parking lots, educational institutions, government facilities, and/or other structures, according to various aspects of the disclosure. Identifying an operations center associated with the premises may include searching one or more geofence databases and/or other databases that associate operations centers with managed premises. Operation 2806 may proceed to operation 2808.

At operation 2808, process 2800 provides notification of the initiated emergency communication to a UI of an operations center emergency management application, according to an embodiment. The notification may include one or more of an anonymized region of interest, highlighting of the space on a map or a floorplan, highlighting of an asset (e.g., a building, a railyard, a parking lot, train rails, shipping docks, etc.), and/or display an address of an asset associated with the location, according to various aspects of the disclosure. Operation 2808 may proceed to operation 2810.

At operation 2810, process 2800 displays an option to call an ECC or displays an option to initiate messaging with an ECC, in response to identifying the operations center associated with the premises, according to an embodiment. Operation 2810 may proceed to operation 2812.

At operation 2812, process 2800 determines if an operator selects an option to call an ECC, according to an embodiment. If an operator selects an option to call an ECC, operation 2812 may proceed to operation 2814. If an operator does not elect to select the option to call an ECC, operation 2812 may proceed to operation 2822.

At operation 2814, process 2800 identifies an ECC having jurisdiction of the location associated with the initiated emergency communication, according to an embodiment. Operation 2814 may proceed to operation 2816.

At operation 2816, process 2800 configures a telephone number from a pool of numbers to route a call to the identified ECC from the operations center, according to an embodiment. Configuring the telephone number may include using one or more third party service providers to provide SIP (Session Initiation Protocol connection)-based call routing to 911. Process 2800 may include providing the location of the initiated emergency communication to the call routing service provider, receiving a SIP connection invite, and responding to the SIP connection invite with the telephone number, so that calls to the telephone number are routed to the 911 center (e.g., ECC) that is associated with the location, according to an embodiment. Operation 2816 may proceed to operation 2818.

At operation 2818, process 2800 displays the telephone number at the operations center with the operations center emergency management application, according to an embodiment. Operation 2818 may proceed to operation 2820.

At operation 2820, process 2800 routes a call (e.g., from a cell phone, by operations center telephony equipment, etc.) to the telephone number from the operations center to the identified ECC, according to an embodiment. After operation 2820, process 2800 terminates, according to an embodiment.

At operation 2822 (shown in FIG. 28B), process 2800 determines whether an operator selects the option to initiate messaging with the ECC, according to an embodiment. If an operator does not select the option to initiate messaging with the ECC, operation 2822 proceeds to operation 2824 to terminate process 2800, according to an embodiment. If an operator selects the option to initiate messaging with the ECC, operation 2822 may proceed to operation 2826.

At operation 2826, process 2800 displays a first message window in a UI of the operations center emergency management application, according to an embodiment. Operation 2826 may proceed to operation 2828.

At operation 2828, process 2800 displays a messaging request from the operations center in a UI of an ECC emergency management application, according to an embodiment. Operation 2828 may proceed to operation 2830.

At operation 2830, process 2800 displays a second message window in a UI of the ECC emergency management application, responsive to acceptance of the request, according to an embodiment. Operation 2830 may proceed to operation 2832.

At operation 2832, process 2800 associates the first message window with the second message window, according to an embodiment. Associating the first message window with the second message window may be performed in a database that supports messaging window communications and may associate a first messaging window identifier (ID) with a second messaging window identifier, for example. Operation 2832 may proceed to operation 2834.

At operation 2834, process 2800 transmits messages between the ECC and the operations center through the first and second message windows, according to an embodiment. After operation, 2834, process 2800 terminates, according to an embodiment.

FIG. 29 illustrates a flow diagram of a process 2900 for z-axis (e.g., height) estimation of initiated emergency communications, in accordance with aspects of the disclosure. The order in which some or all of the process operation blocks appear in process 2900 should not be deemed limiting. Rather, one of ordinary skill in the art having the benefit of the present disclosure will understand that some of the process/operation blocks may be executed in a variety of orders not illustrated, or even in parallel.

At operation 2902, process 2900 associating floor numbers of a premises to floor altitudes of the premises, according to an embodiment. The floor numbers may be correlated or mapped to the floor altitudes in one or more data structures. The floor numbers and floor altitudes may be received and/or uploaded as a file (e.g., a csv, a spreadsheet, etc.). The floor numbers and floor altitudes may be entered in an emergency management application GUI, for example. Operation 2902 may proceed to operation 2904.

At operation 2904, process 2900 includes identifying a location and altitude of an initiated emergency communication, according to an embodiment. The location may, for example, be extracted from a notification of the initiated emergency communication, and the notification may include an altitude of the mobile device that initiated the emergency communication. Operation 2904 proceeds to operation 2906, according to an embodiment.

At operation 2906, process 2900 includes determining that one of the plurality of premises site maps associated with the location includes multiple floors, according to an embodiment. Operation 2906 may proceed to operation 2908.

At operation 2908, process 2900 includes searching a data structure configured to map floor altitudes to floor numbers for one or more of the plurality of premises site maps, according to an embodiment. Operation 2908 may proceed. Operation 2910.

At operation 2910, process 2900 includes identifying one of the floor numbers based on an altitude of the location of the initiated emergency communication, according to an embodiment. Operation 2910 proceeds to operation 2912.

At operation 2912, process 2900 includes displaying the floor number with the emergency response application (e.g., for the GSOC), according to an embodiment. After operation 2912, process 2900 includes may terminate, according to an embodiment.

Figure 30:
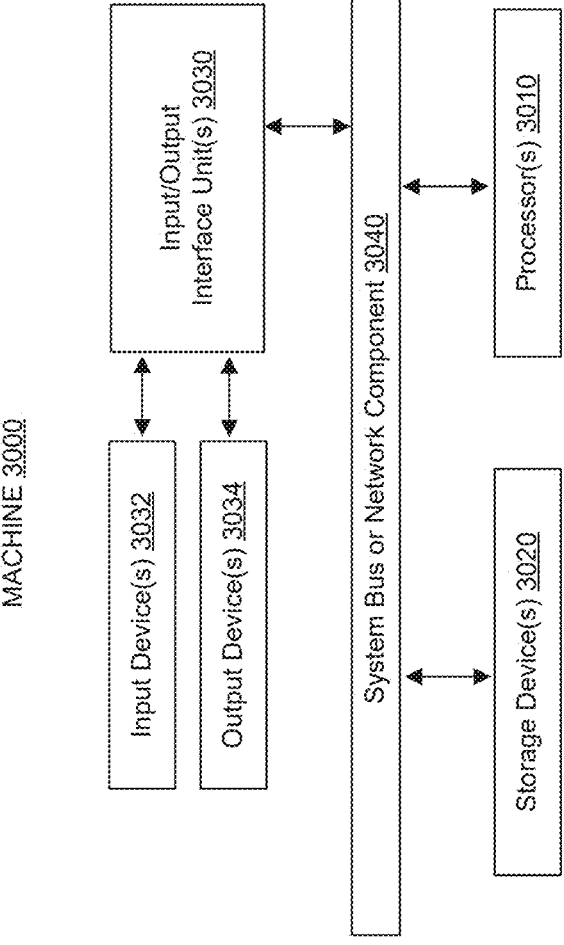
FIG. 30 illustrates example diagram of a machine, in accordance with embodiments of the disclosure.

FIG. 30 is a high-level block diagram of a machine 3000 that may be used to implement one or more of the operations, devices, and/or systems disclosed herein. Machine 3000 includes one or more processors 3010, one or more input/output interface units 3030, one or more storage devices 3020, and one or more system buses and/or network components 3040 for facilitating the communication of information among the coupled elements. One or more input devices 3032 and one or more output devices 3034 may be communicatively coupled to the one or more input/output interfaces 3030.

The one or more processors 3010 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to effect one or more aspects of the present disclosure. At least a portion of the machine executable instructions may be stored (temporarily or more permanently) on the one or more storage devices 3020 (e.g., non-transitory computer-readable medium) and/or may be received from an external source via one or more input interface unit 3030.

In one embodiment, machine 3000 may be one or more conventional personal computers, servers, distributed computing systems, augmented reality devices, virtual reality devices, wearable systems, and/or computing devices. The processors 3010 may be one or more microprocessors. The bus 3040 may include a system bus. The storage devices 3020 may include system memory, such as read only memory (ROM) and/or random access memory (RAM). The storage devices 3020 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 3032, such as a keyboard and pointing device (e.g., a mouse) for example. Other input devices such as a microphone, a joystick, an image sensor, a game pad, a satellite dish, a scanner, or the like, may also (or alternatively) be included. These and other input devices are often connected to the processing unit(s) 3010 through an appropriate interface 3030 coupled to the system bus 3040. The output devices 3034 may include a monitor or other type of display device, which may also be connected to the system bus 3040 via an appropriate interface.

Figure 31:
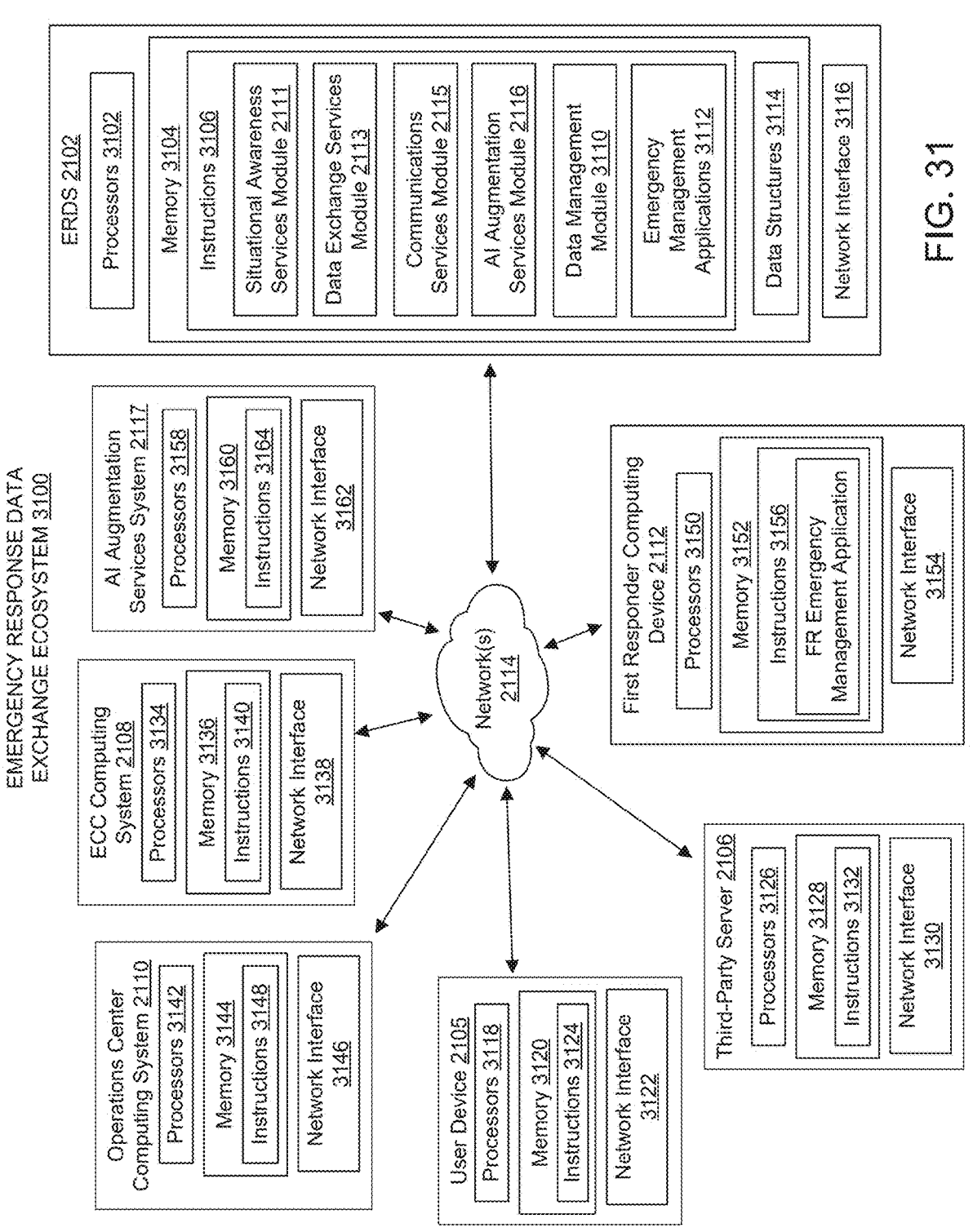
FIG. 31 illustrates an example diagram of an emergency response data exchange ecosystem, in accordance with embodiments of the disclosure.

FIG. 31 illustrates an example diagram of an emergency response data exchange ecosystem 3100, in accordance with aspects of the disclosure. Emergency response data exchange ecosystem 3100 includes processing logic, (computer-readable) instructions, and memory that may be distributed across servers, one or more computing centers, and/or one or more cloud computing centers, according to various implementations of the disclosure. Emergency response data exchange ecosystem 3100 may include emergency response data system 2102, user device 2105, third-party server 2106, ECC computing system 2108, operations center computing system 2110, first responder computing device 2112, and AI augmentation services system 2117 communicatively coupled to each other through one or more networks 2114, which may each be an example implementation of machine 3000 (shown in FIG. 30), in accordance with various embodiments of the disclosure.

Emergency response data system (ERDS) 2102 may include one or more processors 3102, memory 3104, and network interface 3116 to support operations. Memory 3104 may store instructions 3106 that may be executed by processors 3102, according to an embodiment. Instructions 3106 may include one or more aspects of situational awareness services module 2111, data exchange services module 2113, communications services module 2115, AI augmentation services module 2116, a data management module 3110, and emergency management applications 3112. Memory 3104 may include one or more data structures 3114 to support operations of ERDS 2102.

User device 2105 may include one or more processors 3118, memory 3120, and network interface 3122 to support operations. Memory 3120 may store instructions 3124 that may be executed by processors 3102, according to an embodiment.

Third-party server 2106 may include one or more processors 3126, memory 3128, and network interface 3130 to support operations. Memory 3128 may store instructions 3132 that may be executed by processors 3126, according to an embodiment.

ECC computing system 2108 may include one or more processors 3134, memory 3136, and network interface 3138 to support operations. Memory 3136 may store instructions 3140 that may be executed by processors 3134 to support operation of an ECC emergency management application, according to an embodiment.

Operations center computing system 2110 may include one or more processors 3142, memory 3144, and network interface 3146 to support operations. Memory 3144 may store instructions 3148 that may be executed by processors 3142 to support operation of an operations center emergency management application, according to an embodiment.

First responder computing device 2112 may include one or more processors 3150, memory 3152, and network interface 3154 to support operations. Memory 3152 may store instructions 3156 that may be executed by processors 3150 to support operation of a first responder emergency management application, according to an embodiment.

AI augmentation services system 2117 may be a system that is communicatively coupled to ERDS 2102 and that is operable to provide AI augmentation services. AI augmentation services system 2117 may include one or more processors 3158, memory 3160, and network interface 3162 to support operations. Memory 3160 may store instructions 3164 that may be executed by processors 3158 to run one or more aspects of AI operations, according to an embodiment. Instructions 3164 may include AI augmentation services module 2116, according to an embodiment.

FIG. 32 illustrates a flow diagram of a process 3200 for providing radio dispatch insights to an operations center, in accordance with aspects of the disclosure. The order in which some or all of the process operation blocks appear in process 3200 should not be deemed limiting. Rather, one of ordinary skill in the art having the benefit of the present disclosure will understand that some of the process blocks may be executed in a variety of orders not illustrated, or even in parallel.

At operation 3202, process 3200 receives radio dispatch audio over the air, according to an embodiment. Operation 3202 may proceed to operation 3204.

At operation 3204, process 3200 converts radio dispatch audio to digital recording of radio dispatch, according to an embodiment. Operation 3204 may proceed to operation 3206.

At operation 3206, process 3200 provides the digital recording of radio dispatch to an AI model, according to an embodiment. Operation 3206 may proceed to operation 3208.

At operation 3208, process 3200 prompts the AI model to summarize or characterize the digital recording of the radio dispatch, according to various aspects of the disclosure. Operation 3208 may proceed to operation 3210.

At operation 3210, process 3200 provides the summary or characterization of the digital recording to an operations center emergency management application as a radio dispatch insight, in accordance with aspects of the disclosure.

FIG. 33 illustrates a flow diagram of a process 3300 for providing live emergency call insights to an operations center (e.g., a GSOC, railway NOC, etc.), in accordance with aspects of the disclosure. The order in which some or all of the process operation blocks appear in process 3300 should not be deemed limiting. Rather, one of ordinary skill in the art having the benefit of the present disclosure will understand that some of the process blocks may be executed in a variety of orders not illustrated, or even in parallel.

At operation 3302, process 3300 receives live call audio directed to an ECC to request emergency resources, according to an embodiment. Operation 3302 may proceed to operation 3304.

At operation 3304, process 3300 transcribes the live call audio to generate transcripts, according to an embodiment. Operation 3304 may proceed to operation 3306.

At operation 3306, process 3300 provides a digital representation of the live call audio and/or the transcripts to an AI model, according to an embodiment. Operation 3306 may proceed to operation 3308.

At operation 3308, process 3300 prompts the AI model to summarize or characterize the live call audio, according to various aspects of the disclosure. Prompting the AI model may include prompting the AI model to summarize the nature of the emergency call. The prompt may include options of the nature of the call, such as medical, fire, train crash, car crash, smoke detector, fire alarm, or other nature, for example. Operation 3308 may proceed to operation 3310.

At operation 3310, process 3300 provides the summary or characterization of the live call audio to an operations center emergency management application as a live emergency call insight, in accordance with aspects of the disclosure.

While this disclosure contains many specific implementation details, these should not be construed as limitations on the scope of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded with the widest scope consistent with this disclosure, the principles and the novel features disclosed herein.

The term "logic" and/or "processing logic" in this disclosure may include one or more processors, microprocessors, multi-core processors, application-specific integrated circuits (ASIC), and/or field programmable gate arrays (FP- GAs) to execute operations disclosed herein. In some embodiments, memory may be integrated into the logic to store instructions to execute operations and/or store data. Logic may also include analog or digital circuitry to perform the operations in accordance with embodiments of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

A computing device or system may include a desktop computer, a laptop computer, a tablet, a phablet, a smartphone, a feature phone, a server computer, or otherwise. A server computing system may be located remotely in a data center, may be stored locally, and/or may have components (e.g., processors, memory, network interfaces, etc.) that are distributed across one or more locations.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application-specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.). Any of the one or more memories disclosed herein may be implemented as tangible non-transitory machine-readable storage medium, in accordance with aspects of the disclosure.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An emergency response data system for a global security operations center (GSOC), comprising:
    non-volatile non-transitory memory;
    a network component; and
    at least one, operatively coupled to the non-volatile non-transitory memory and to the network component, the at least one processor operative to:
    receive an electronic communication from an electronic device, wherein the electronic communication includes a location of an emergency alert;
    retrieve a set of geofences associated with a set of assets managed by a commercial service provider (CSP), wherein the CSP is a GSOC;
    determine that the location of the emergency alert is within the set of geofences;
    host an emergency response application operable by a GSOC computing system, wherein the emergency response application includes a includes a map;
    provide the location of the emergency alert to the emergency response application to enable highlighting, on the map, a portion of at least one of the set of assets that is associated with the emergency alert; and
    retrieve associated metadata from one or more notification sources related to the emergency alert;
    provide the associated metadata for the emergency alert to an AI model;
    provide content of at least part of the electronic communication to the AI model;
    prompt the AI model to generate emergency response insights related to the associated metadata that are likely relevant to the emergency alert; and
    provide, for display on the emergency response application, the emergency response insights that are likely relevant to the emergency alert.

2. The emergency response data system of claim 1, wherein highlighting the portion of the at least one of the set of assets includes highlighting a region of interest on the map, wherein the region of interest includes a perimeter around the location to at least partially anonymize a precise location of the emergency alert.

3. The emergency response data system of claim 1, wherein highlighting the portion of the at least one of the set of assets includes highlighting a boundary of the at least one of the set of assets on the map, wherein highlighting the boundary includes changing a color, weight, or style of a boundary line of the at least one of the set of assets.

4. The emergency response data system of claim 1, wherein highlighting the portion of the at least one of the set of assets includes highlighting an interior of a boundary of the at least one of the set of assets on the map, wherein highlighting the interior of the boundary includes filling at least a portion of the interior of the boundary with a color or pattern.

5. The emergency response data system of claim 1, wherein each one of the set of assets include at least one: of a building, a structure, a parking lot, a roadway, a railway, a train yard, a park, a construction site, a port, a marina, or a plot of land.

6. The emergency response data system of claim 1, wherein the portion of the at least one of the set of assets that is associated with the emergency alert is co-located with the location of the emergency alert.

7. The emergency response data system of claim 1, wherein the at least one processor is further operable to:
    receive one or more alert notifications from one or more sensors related to the emergency alert; and
    visually cluster, on the map, the location of the emergency alert with a graphical representation of the one or more sensors.

8. The emergency response data system of claim 1, wherein the associated metadata includes
    one or more social media posts related to the location of the emergency alert and the one or more notification sources include a social media platform;
    and
    wherein the emergency response insights provided for display on the emergency response application include the ones of the one or more social media posts that are likely relevant to the emergency alert.

9. The emergency response data system of claim 1, the at least one processor is further operable to:
    provide a first messaging window to the emergency response application that is operable by the GSOC computing system;
    provide a second messaging window to a second emergency management application that is operable by an emergency communications center (ECC); and
    exchange messages between the first and second messaging windows to support real-time textual communications between the GSOC and the ECC.

10. The emergency response data system of claim 1, wherein the associated metadata includes
    a plurality of sensor data related to the location of the emergency alert and the one or more notification sources include a sensor device;
    and
    wherein the emergency response insights provided to the emergency response application for display by the GSOC computing system include the plurality of sensor data.

11. The emergency response data system of claim 1, wherein the associated metadata includes
    traffic data related to the location of the emergency alert,
    weather data related to the location of the emergency alert, and
    estimated emergency responder locations;
    wherein the emergency response insights includes an estimated time of arrival (ETA) of first responders to the location of the emergency alert based on the traffic data, the weather data, the estimated emergency responder locations, and the location of the emergency alert; and wherein the ETA of the first responders is provided to the emergency response application for display by the GSOC computing system.

12. An emergency response data system for a global security operations center (GSOC), comprising:
non-volatile non-transitory memory;
a network component; and
at least one, operatively coupled to the non-volatile non-transitory memory and to the network component, the at least one processor operable to:
receive an electronic communication from an electronic device, wherein the electronic communication includes a location of an emergency alert;
retrieve a set of geofences associated with a set of assets managed by a commercial service provider (CSP), wherein the CSP is a GSOC;
determine that the location of the emergency alert is within the set of geofences;
host an emergency response application operable by a GSOC computing system, wherein the emergency response application includes a includes a map;
provide the location of the emergency alert to the emergency response application to enable highlighting, on the map, a portion of at least one of the set of assets that is associated with the emergency alert;
receive a portion of the electronic communication;
apply the portion of the electronic communication to an AI model;
prompt the AI model to identify a nature of the electronic communication or to generate a summary of the electronic communication; and
provide, for display by the emergency response application, the nature of the electronic communication or the summary of the electronic communication.

13. The emergency response data system of claim 12, wherein the
the portion of the electronic communication includes audio recordings of a radio-based dispatch from an emergency communications center (ECC); and wherein the at least one processor is further operable to:
apply the audio recordings to the AI model;
prompt the AI model to generate a summary of the radio-based dispatch; and
provide, for display by the emergency response application, the summary of the radio-based dispatch.

14. The emergency response data system of claim 12, wherein the
emergency communications is initiated from the set of assets and includes
characteristics based on emergency responses to the emergency communications; and
wherein the at least one processor is further operable to:
generate a summary of analytics for the emergency communications and for the characteristics of the emergency communications; and
provide, for display by the emergency response application, the summary of analytics for the emergency communications and for the characteristics of the emergency communications.

15. The emergency response data system of claim 12, wherein highlighting the portion of the at least one of the set of assets includes highlighting a region of interest on the map, wherein the region of interest includes a perimeter around the location to at least partially anonymize a precise location of the emergency alert.

16. The emergency response data system of claim 12, wherein highlighting the portion of the at least one of the set of assets includes highlighting a boundary of the at least one of the set of assets on the map, wherein highlighting the boundary includes changing a color, weight, or style of a boundary line of the at least one of the set of assets.

17. The emergency response data system of claim 12, wherein highlighting the portion of the at least one of the set of assets includes highlighting an interior of a boundary of the at least one of the set of assets on the map, wherein highlighting the interior of the boundary includes filling at least a portion of the interior of the boundary with a color or pattern.

18. The emergency response data system of claim 12, wherein the portion of the at least one of the set of assets that is associated with the emergency alert is co-located with the location of the emergency alert.

19. The emergency response data system of claim 12, wherein the at least one processor is further operable to:
receive one or more alert notifications from one or more sensors related to the emergency alert; and
visually cluster, on the map, the location of the emergency alert with a graphical representation of the one or more sensors.

20. An emergency response data system for a global security operations center (GSOC), comprising:
non-volatile non-transitory memory;
a network component; and
at least one, operatively coupled to the non-volatile non-transitory memory and to the network component, the at least one processor operable to:
receive an electronic communication from an electronic device, wherein the electronic communication includes a location of an emergency alert;
retrieve a set of geofences associated with a set of assets managed by a commercial service provider (CSP), wherein the CSP is a GSOC;
determine that the location of the emergency alert is within the set of geofences;
host an emergency response application operable by a GSOC computing system, wherein the emergency response application includes a includes a map;
provide the location of the emergency alert to the emergency response application to enable highlighting, on the map, a portion of at least one of the set of assets that is associated with the emergency alert;
receive operations center data from the GSOC to support emergency response to the location of the emergency alert; and
provide the operations center data to an emergency communications center (ECC) having jurisdiction over the location of the emergency alert, in response to the location of the emergency alert being provided to the emergency response application,
wherein the operations center data includes at least one of: point of contact information for an operator of the GSOC, a floorplan of the at least one of the set of assets that is associated with the emergency alert, a video feed at the at least one of the set of assets that is associated with the emergency alert, or access control to the at least one of the set of assets that is associated with the emergency alert.

21. The emergency response data system of claim 20, wherein highlighting the portion of the at least one of the set of assets includes highlighting a region of interest on the map, wherein the region of interest includes a perimeter around the location to at least partially anonymize a precise location of the emergency alert.

22. The emergency response data system of claim 20, wherein highlighting the portion of the at least one of the set of assets includes highlighting a boundary of the at least one of the set of assets on the map, wherein highlighting the boundary includes changing a color, weight, or style of a boundary line of the at least one of the set of assets.

23. The emergency response data system of claim 20, wherein highlighting the portion of the at least one of the set of assets includes highlighting an interior of a boundary of the at least one of the set of assets on the map, wherein highlighting the interior of the boundary includes filling at least a portion of the interior of the boundary with a color or pattern.

24. The emergency response data system of claim 20, wherein the portion of the at least one of the set of assets that is associated with the emergency alert is co-located with the location of the emergency alert.

25. The emergency response data system of claim 20, wherein the at least one processor is further operable to:

receive one or more alert notifications from one or more sensors related to the emergency alert; and visually cluster, on the map, the location of the emergency alert with a graphical representation of the one or more sensors.

26. An emergency response data system for a global security operations center (GSOC), comprising:

non-volatile non-transitory memory;

a network component; and at least one, operatively coupled to the non-volatile non-transitory memory and to the network component, the at least one processor operable to:

receive an electronic communication from an electronic device, wherein the electronic communication includes a location of an emergency alert;

retrieve a set of geofences associated with a set of assets managed by a commercial service provider (CSP), wherein the CSP is a GSOC;

determine that the location of the emergency alert is within the set of geofences;

host an emergency response application operable by a GSOC computing system, wherein the emergency response application includes a includes a map;

provide the location of the emergency alert to the emergency response application to enable highlighting, on the map, a portion of at least one of the set of assets that is associated with the emergency alert;

receive at least one emergency responder location;

provide the location of the emergency alert and the at least one emergency responder location to a mapping service;

query the mapping service for an estimated time of arrival (ETA) from the at least one emergency responder location to the location of the emergency alert; and display the ETA to the emergency response application for display by the GSOC computing system.

27. The emergency response data system of claim 26, wherein highlighting the portion of the at least one of the set of assets includes highlighting a region of interest on the map, wherein the region of interest includes a perimeter around the location to at least partially anonymize a precise location of the emergency alert.

28. The emergency response data system of claim 26, wherein highlighting the portion of the at least one of the set of assets includes highlighting a boundary of the at least one of the set of assets on the map, wherein highlighting the boundary includes changing a color, weight, or style of a boundary line of the at least one of the set of assets.

29. The emergency response data system of claim 26, wherein highlighting the portion of the at least one of the set of assets includes highlighting an interior of a boundary of the at least one of the set of assets on the map, wherein highlighting the interior of the boundary includes filling at least a portion of the interior of the boundary with a color or pattern.

30. The emergency response data system of claim 26, wherein the at least one processor is further operable to:

receive one or more alert notifications from one or more sensors related to the emergency alert; and visually cluster, on the map, the location of the emergency alert with a graphical representation of the one or more sensors.

* * * * *